US008382584B2

(12) United States Patent
White et al.

(10) Patent No.: US 8,382,584 B2
(45) Date of Patent: Feb. 26, 2013

(54) NETWORKED GAMING SYSTEM WITH ENTERPRISE ACCOUNTING METHODS AND APPARATUS

(75) Inventors: Warren White, Tacoma, WA (US); Mark Matthews, VC Highlands, NV (US); Loren Loiseau, Reno, NV (US); Mark Lowell, Reno, NV (US); Randy Phillips, Gardnerville, NV (US); Walt Eisele, Sparks, NV (US); Barry Cline, Sonora, CA (US); Fred Barrie, Sparks, NV (US); Christina Abate, Carson City, NV (US); Glen Wooden, Camas, WA (US); Jason Tighe, Fernley, NV (US); Marshall Lee, Dayton, NV (US); Sean Kesler, Reno, NV (US); Scott McCormick, Reno, NV (US); Tim Harmon, Gardnerville, NV (US); Dale Hermansen, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 521 days.

(21) Appl. No.: 12/470,349

(22) Filed: May 21, 2009
(Under 37 CFR 1.47)

(65) Prior Publication Data
US 2010/0016067 A1    Jan. 21, 2010

Related U.S. Application Data

(60) Provisional application No. 61/055,974, filed on May 24, 2008.

(51) Int. Cl.
*A63F 9/24* (2006.01)

(52) U.S. Cl. .......................................... 463/25

(58) Field of Classification Search ............... 463/16–25
See application file for complete search history.

(56) References Cited

U.S. PATENT DOCUMENTS

| 3,751,041 | A | 8/1973 | Seifert ........................ 273/149 P |
| 3,766,452 | A | 10/1973 | Burpee et al. .............. 317/262 R |
| 3,814,436 | A | 6/1974 | Boren ........................ 273/149 P |
| 4,026,309 | A | 5/1977 | Howard ........................ 133/8 R |
| 4,135,663 | A | 1/1979 | Nojiri et al. .................... 235/463 |
| 4,244,582 | A | 1/1981 | Raees et al. .................... 273/293 |
| 4,339,798 | A | 7/1982 | Hedges et al. ................. 364/412 |

(Continued)

FOREIGN PATENT DOCUMENTS

| DE | 3807 127 A1 | 9/1989 |
| DE | 44 39 502 C1 | 9/1995 |

(Continued)

OTHER PUBLICATIONS

International Search Report for PCT/US2009/044904, mailed Dec. 17, 2009, 3 pages.

(Continued)

*Primary Examiner* — Ha Tran T Nguyen
*Assistant Examiner* — Vongsavanh Sengdara
(74) *Attorney, Agent, or Firm* — Seed IP Law Group PLLC

(57) ABSTRACT

A computerized management system and methods including accounting, auditing, and correcting systems and processes are disclosed for use with game and/or gaming devices, systems, and methods enable users to remotely monitor, control, and modify financial data, reports, and information related to game and/or gaming machines and apparatuses of different classes, for example Class II and Class III gaming machines and table games, and different facilities, such as Class III gaming establishments, bingo establishments, and lottery establishments.

20 Claims, 120 Drawing Sheets

U.S. PATENT DOCUMENTS

| | | | |
|---|---|---|---|
| 4,373,726 A | 2/1983 | Churchill et al. | 273/138 A |
| 4,531,187 A | 7/1985 | Uhland | 364/412 |
| 4,534,562 A | 8/1985 | Cuff et al. | 273/149 P |
| 4,592,377 A | 6/1986 | Paulsen et al. | 133/5 R |
| 4,636,846 A | 1/1987 | Villarreal | 358/100 |
| 4,662,637 A | 5/1987 | Pfeiffer | 273/149 P |
| 4,667,959 A | 5/1987 | Pfeiffer et al. | 273/149 R |
| 4,693,480 A | 9/1987 | Smith | 273/296 |
| 4,725,079 A | 2/1988 | Koza et al. | 283/73 |
| 4,755,941 A | 7/1988 | Bacchi | 364/412 |
| 4,802,218 A | 1/1989 | Wright et al. | 380/23 |
| 4,814,589 A | 3/1989 | Storch et al. | 235/375 |
| 4,832,341 A | 5/1989 | Muller et al. | 273/139 |
| 4,861,041 A | 8/1989 | Jones et al. | 273/292 |
| 4,885,700 A | 12/1989 | Kondziolka et al. | 364/519 |
| 4,889,367 A | 12/1989 | Miller | 283/88 |
| 4,948,138 A | 8/1990 | Pease et al. | 273/138 A |
| 4,951,950 A | 8/1990 | Normand et al. | 273/149 P |
| 4,995,615 A | 2/1991 | Cheng | 273/292 |
| 5,007,641 A | 4/1991 | Seidman | 273/138 A |
| 5,053,612 A | 10/1991 | Pielemeier et al. | 235/462 |
| 5,067,713 A | 11/1991 | Soules et al. | 273/149 P |
| 5,083,800 A | 1/1992 | Lockton | 273/439 |
| 5,110,134 A | 5/1992 | Laughlin et al. | 273/293 |
| 5,121,921 A | 6/1992 | Friedman et al. | 273/149 P |
| 5,179,517 A | 1/1993 | Sarbin et al. | 364/410 |
| 5,199,710 A | 4/1993 | Lamle | 273/149 R |
| 5,216,234 A | 6/1993 | Bell | 235/494 |
| 5,258,837 A | 11/1993 | Gormley | 358/140 |
| 5,259,907 A | 11/1993 | Soules et al. | 156/277 |
| 5,265,874 A | 11/1993 | Dickinson et al. | 273/138 A |
| 5,275,400 A | 1/1994 | Weingardt et al. | |
| 5,283,422 A | 2/1994 | Storch et al. | 235/375 |
| 5,319,181 A | 6/1994 | Shellhammer et al. | 235/462 |
| 5,321,241 A | 6/1994 | Craine | 235/380 |
| 5,324,035 A | 6/1994 | Morris et al. | 273/138 A |
| 5,326,104 A | 7/1994 | Pease et al. | 273/138 A |
| 5,343,028 A | 8/1994 | Figarella et al. | 235/462 |
| 5,364,104 A | 11/1994 | Jones et al. | 273/292 |
| 5,386,103 A | 1/1995 | DeBan et al. | 235/379 |
| 5,397,133 A | 3/1995 | Penzias | 273/439 |
| 5,398,932 A | 3/1995 | Eberhardt et al. | 273/138 A |
| 5,470,079 A | 11/1995 | LeStrange et al. | 273/138 A |
| 5,472,194 A | 12/1995 | Breeding et al. | 273/138 A |
| 5,487,544 A | 1/1996 | Clapper, Jr. | 273/138 A |
| 5,493,613 A | 2/1996 | Denno et al. | 380/24 |
| 5,505,449 A | 4/1996 | Eberhardt et al. | 273/138 A |
| 5,505,461 A | 4/1996 | Bell et al. | 273/433 |
| 5,507,489 A | 4/1996 | Reibel et al. | 273/138 A |
| 5,518,249 A | 5/1996 | Sines et al. | 273/304 |
| 5,548,110 A | 8/1996 | Storch et al. | 235/472 |
| 5,559,312 A | 9/1996 | Lucero | 235/380 |
| 5,562,284 A | 10/1996 | Stevens | 273/139 |
| 5,580,311 A | 12/1996 | Haste, III | 463/29 |
| 5,586,936 A | 12/1996 | Bennett et al. | 463/25 |
| 5,605,334 A | 2/1997 | McCrea, Jr. | 273/309 |
| 5,605,504 A | 2/1997 | Huang | 463/22 |
| 5,605,506 A | 2/1997 | Hoorn et al. | 463/47 |
| 5,613,680 A | 3/1997 | Groves et al. | 273/138.2 |
| 5,613,912 A | 3/1997 | Slater | 463/25 |
| 5,643,086 A | 7/1997 | Alcorn et al. | 463/29 |
| 5,643,088 A | 7/1997 | Vaughn et al. | 463/40 |
| 5,651,548 A | 7/1997 | French et al. | 273/309 |
| 5,655,961 A | 8/1997 | Acres et al. | 463/27 |
| 5,707,287 A | 1/1998 | McCrea, Jr. | 463/27 |
| 5,735,525 A | 4/1998 | McCrea, Jr. | 273/309 |
| 5,735,742 A | 4/1998 | French | 463/25 |
| 5,737,418 A | 4/1998 | Saffari et al. | 380/9 |
| 5,741,183 A | 4/1998 | Acres et al. | 463/42 |
| 5,742,656 A | 4/1998 | Mikulak et al. | 377/7 |
| 5,745,110 A | 4/1998 | Ertemalp | 345/340 |
| 5,759,102 A | 6/1998 | Pease et al. | 463/25 |
| 5,759,103 A | 6/1998 | Freels et al. | 463/42 |
| 5,769,458 A | 6/1998 | Carides et al. | 283/102 |
| 5,770,533 A | 6/1998 | Franchi | 463/42 |
| 5,779,545 A | 7/1998 | Berg et al. | 463/22 |
| 5,780,831 A | 7/1998 | Seo et al. | 235/462 |
| 5,785,321 A | 7/1998 | van Putten et al. | 273/309 |
| 5,791,988 A | 8/1998 | Nomi | 463/11 |
| 5,800,268 A | 9/1998 | Molnick | 463/40 |
| 5,801,766 A | 9/1998 | Alden | 348/157 |
| 5,803,808 A | 9/1998 | Strisower | 463/11 |
| 5,809,482 A | 9/1998 | Strisower | 705/30 |
| 5,813,912 A | 9/1998 | Shultz | 463/25 |
| 5,816,918 A | 10/1998 | Kelly et al. | 463/16 |
| 5,823,534 A | 10/1998 | Banyai | 273/269 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,831,669 A | 11/1998 | Adrain | 348/143 |
| 5,842,921 A | 12/1998 | Mindes et al. | 463/16 |
| 5,850,447 A | 12/1998 | Peyret | 380/25 |
| 5,851,149 A | 12/1998 | Xidos et al. | 463/42 |
| 5,867,586 A | 2/1999 | Liang | 382/112 |
| 5,890,963 A | 4/1999 | Yen | 463/42 |
| 5,902,983 A | 5/1999 | Crevelt et al. | 235/380 |
| 5,909,876 A | 6/1999 | Brown | 273/309 |
| 5,911,626 A | 6/1999 | McCrea, Jr. | 463/27 |
| 5,919,090 A | 7/1999 | Mothwurf | 463/25 |
| 5,919,091 A | 7/1999 | Bell et al. | 463/25 |
| 5,924,926 A | 7/1999 | Brown | 463/11 |
| 5,936,527 A | 8/1999 | Isaacman et al. | 340/572.1 |
| 5,941,769 A | 8/1999 | Order | 463/12 |
| 5,941,771 A | 8/1999 | Haste, III | 463/17 |
| 5,957,776 A | 9/1999 | Hoehne | 463/25 |
| 5,971,851 A | 10/1999 | Pascal et al. | 463/24 |
| 5,999,808 A | 12/1999 | LaDue | 455/412 |
| 6,001,016 A | 12/1999 | Walker et al. | 463/42 |
| 6,021,949 A | 2/2000 | Boiron | 235/492 |
| 6,042,150 A | 3/2000 | Daley | 283/86 |
| 6,047,322 A | 4/2000 | Vaid et al. | |
| 6,048,269 A | 4/2000 | Burns et al. | 463/25 |
| 6,062,481 A | 5/2000 | Storch et al. | 235/494 |
| 6,066,439 A | 5/2000 | Nohr et al. | 430/347 |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,083,105 A | 7/2000 | Ronin et al. | 463/17 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,120,588 A | 9/2000 | Jacobson | 106/31.16 |
| 6,126,166 A | 10/2000 | Lorson et al. | 273/148 R |
| 6,135,887 A | 10/2000 | Pease et al. | 463/42 |
| 6,142,876 A | 11/2000 | Cumbers | 463/25 |
| 6,145,838 A | 11/2000 | White | 273/295 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,154,131 A | 11/2000 | Jones, II et al. | 340/540 |
| 6,165,069 A | 12/2000 | Sines et al. | 463/12 |
| 6,166,763 A | 12/2000 | Rhodes et al. | 348/143 |
| 6,168,523 B1 | 1/2001 | Piechowiak et al. | 463/26 |
| 6,183,366 B1 | 2/2001 | Goldberg et al. | 463/42 |
| 6,186,892 B1 | 2/2001 | Frank et al. | 463/19 |
| 6,186,895 B1 | 2/2001 | Oliver | 463/25 |
| 6,190,256 B1 | 2/2001 | Walker et al. | 463/25 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,227,972 B1 | 5/2001 | Walker et al. | 463/25 |
| 6,234,898 B1 | 5/2001 | Belamant et al. | 463/25 |
| 6,244,958 B1 | 6/2001 | Acres | 463/26 |
| 6,251,014 B1 | 6/2001 | Stockdale et al. | 463/16 |
| 6,254,483 B1 | 7/2001 | Acres | |
| 6,254,484 B1 | 7/2001 | McCrea, Jr. | 463/27 |
| 6,264,109 B1 | 7/2001 | Chapet et al. | 235/492 |
| 6,264,561 B1 | 7/2001 | Saffari et al. | 463/42 |
| 6,267,671 B1 | 7/2001 | Hogan | 463/25 |
| 6,275,586 B1 | 8/2001 | Kelly | 380/46 |
| 6,282,522 B1 | 8/2001 | Davis et al. | |
| 6,283,856 B1 | 9/2001 | Mothwurf | 463/17 |

| Patent No. | Date | Inventor | Class |
|---|---|---|---|
| 6,287,202 B1 | 9/2001 | Pascal et al. | 463/42 |
| 6,299,534 B1 | 10/2001 | Breeding et al. | 463/25 |
| 6,302,793 B1 | 10/2001 | Fertitta, III et al. | 463/25 |
| 6,312,332 B1 | 11/2001 | Walker et al. | 463/23 |
| 6,313,871 B1 | 11/2001 | Schubert | 348/143 |
| 6,346,044 B1 | 2/2002 | McCrea, Jr. | 463/27 |
| 6,347,738 B1 | 2/2002 | Crevelt et al. | 235/380 |
| 6,362,836 B1 | 3/2002 | Shaw et al. | |
| 6,371,482 B1 | 4/2002 | Hall, Jr. | 273/138.1 |
| 6,383,076 B1 | 5/2002 | Tiedeken | 463/40 |
| 6,394,900 B1 | 5/2002 | McGlone et al. | 463/20 |
| 6,394,907 B1 | 5/2002 | Rowe | 463/42 |
| 6,400,272 B1 | 6/2002 | Holtzman et al. | 340/572.1 |
| 6,409,602 B1 | 6/2002 | Wiltshire et al. | 463/42 |
| 6,439,996 B2 | 8/2002 | LeMay et al. | 463/29 |
| 6,443,839 B1 | 9/2002 | Stockdale et al. | 463/16 |
| 6,446,864 B1 | 9/2002 | Kim et al. | 235/382 |
| 6,459,882 B1 | 10/2002 | Palermo et al. | 455/41 |
| 6,460,848 B1 | 10/2002 | Soltys et al. | 273/149 R |
| 6,464,584 B2 | 10/2002 | Oliver | 463/25 |
| 6,468,155 B1 | 10/2002 | Zucker et al. | 463/23 |
| 6,488,581 B1 | 12/2002 | Stockdale | 463/29 |
| 6,488,585 B1 | 12/2002 | Wells et al. | 463/43 |
| 6,503,147 B1 | 1/2003 | Stockdale et al. | 463/29 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,514,140 B1 | 2/2003 | Storch | 463/25 |
| 6,517,435 B2 | 2/2003 | Soltys et al. | 463/25 |
| 6,517,436 B2 | 2/2003 | Soltys et al. | 463/29 |
| 6,517,437 B1 | 2/2003 | Wells et al. | 463/30 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,547,131 B1 | 4/2003 | Foodman et al. | 235/380 |
| 6,567,159 B1 | 5/2003 | Corech | 356/71 |
| 6,575,829 B2 | 6/2003 | Coleman et al. | 463/20 |
| 6,575,833 B1 | 6/2003 | Stockdale | 463/29 |
| 6,575,834 B1 | 6/2003 | Lindo | 463/40 |
| 6,578,847 B1 | 6/2003 | Hedrick et al. | 273/138.2 |
| 6,579,179 B2 | 6/2003 | Poole et al. | 463/25 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,585,598 B2 | 7/2003 | Nguyen et al. | 463/41 |
| 6,595,857 B2 | 7/2003 | Soltys et al. | 463/29 |
| 6,607,441 B1 | 8/2003 | Acres | 463/25 |
| 6,609,978 B1 | 8/2003 | Paulsen | 463/42 |
| 6,612,928 B1 | 9/2003 | Bradford et al. | 463/29 |
| 6,620,046 B2 | 9/2003 | Rowe | 463/25 |
| 6,628,939 B2 | 9/2003 | Paulsen | 455/414 |
| 6,629,184 B1 | 9/2003 | Berg et al. | 710/306 |
| 6,629,591 B1 | 10/2003 | Griswold et al. | 194/205 |
| 6,629,889 B2 | 10/2003 | Mothwurf | 463/20 |
| 6,638,161 B2 | 10/2003 | Soltys et al. | 463/12 |
| 6,638,169 B2 | 10/2003 | Wilder et al. | 463/35 |
| 6,638,170 B1 | 10/2003 | Crumby | 463/42 |
| 6,641,484 B2 | 11/2003 | Oles et al. | 463/47 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | 463/25 |
| 6,663,490 B2 | 12/2003 | Soltys et al. | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | 463/25 |
| 6,685,567 B2 | 2/2004 | Cockerille et al. | 463/43 |
| 6,688,979 B2 | 2/2004 | Soltys et al. | 463/25 |
| 6,690,156 B1 | 2/2004 | Weiner et al. | |
| 6,699,128 B1 | 3/2004 | Beadell et al. | 463/46 |
| 6,702,291 B2 | 3/2004 | Grebler et al. | 273/292 |
| 6,702,672 B1 | 3/2004 | Angell et al. | 463/25 |
| 6,712,695 B2 | 3/2004 | Mothwurf et al. | 463/25 |
| 6,712,696 B2 | 3/2004 | Soltys et al. | 463/25 |
| 6,718,361 B1 | 4/2004 | Basani et al. | 709/201 |
| 6,726,099 B2 | 4/2004 | Becker et al. | 235/380 |
| 6,728,740 B2 | 4/2004 | Kelly et al. | 708/250 |
| 6,729,956 B2 | 5/2004 | Wolf et al. | 463/25 |
| 6,739,975 B2 | 5/2004 | Nguyen et al. | 463/39 |
| 6,743,102 B1 | 6/2004 | Fiechter et al. | 463/42 |
| 6,745,330 B1 | 6/2004 | Maillot | 713/200 |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,866,581 B2 | 3/2005 | Martinek et al. | 463/16 |
| 6,866,586 B2 | 3/2005 | Oberberger et al. | 463/42 |
| 6,884,173 B2 | 4/2005 | Gauselmann | 463/42 |
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,905,411 B2 | 6/2005 | Nguyen et al. | 463/25 |
| 6,908,387 B2 | 6/2005 | Hedrick et al. | 463/31 |
| 6,962,530 B2 | 11/2005 | Jackson | 463/29 |
| 6,971,956 B2 | 12/2005 | Rowe et al. | 463/25 |
| 6,972,682 B2 | 12/2005 | Lareau et al. | 340/568.1 |
| 6,991,540 B2 | 1/2006 | Marlow | 463/16 |
| 6,993,587 B1 | 1/2006 | Basani et al. | 709/229 |
| 6,997,803 B2 | 2/2006 | LeMay et al. | 463/20 |
| 7,005,985 B1 | 2/2006 | Steeves | 340/572.1 |
| 7,011,309 B2 | 3/2006 | Soltys et al. | 273/149 R |
| 7,025,674 B2 | 4/2006 | Adams et al. | 463/1 |
| 7,029,009 B2 | 4/2006 | Grauzer et al. | 273/149 P |
| 7,035,626 B1 | 4/2006 | Luciano, Jr. | 455/414.1 |
| 7,050,056 B2 | 5/2006 | Meyringer | 345/440 |
| 7,062,470 B2 | 6/2006 | Prasad et al. | 705/64 |
| 7,063,617 B2 | 6/2006 | Brosnan et al. | 463/25 |
| 7,077,332 B2 | 7/2006 | Verschuur et al. | 235/492 |
| 7,086,947 B2 | 8/2006 | Walker et al. | 463/25 |
| 7,099,035 B2 | 8/2006 | Brooks et al. | 358/1.15 |
| 7,103,438 B2 | 9/2006 | Hallowell et al. | 700/116 |
| 7,112,138 B2 | 9/2006 | Hedrick et al. | 463/29 |
| 7,114,718 B2 | 10/2006 | Grauzer et al. | 273/149 R |
| 7,116,782 B2 | 10/2006 | Jackson et al. | 380/251 |
| 7,147,558 B2 | 12/2006 | Giobbi | 463/25 |
| 7,168,089 B2 | 1/2007 | Nguyen et al. | 726/4 |
| 7,179,170 B2 | 2/2007 | Martinek et al. | 463/29 |
| 7,186,181 B2 | 3/2007 | Rowe | 463/42 |
| 7,197,765 B2 | 3/2007 | Chan et al. | 726/8 |
| 7,198,571 B2 | 4/2007 | LeMay et al. | 463/25 |
| RE39,644 E | 5/2007 | Alcorn et al. | 380/251 |
| 7,213,812 B2 | 5/2007 | Schubert et al. | 273/149 R |
| 7,271,727 B2 | 9/2007 | Steeves | 340/572.7 |
| 7,291,068 B2 | 11/2007 | Bryant et al. | 463/25 |
| 7,309,065 B2 | 12/2007 | Yoseloff et al. | 273/292 |
| 7,311,605 B2 | 12/2007 | Moser | 463/25 |
| 7,316,615 B2 | 1/2008 | Soltys et al. | 463/25 |
| 7,329,185 B2 | 2/2008 | Conover et al. | 463/25 |
| 7,330,822 B1 | 2/2008 | Robson et al. | 705/9 |
| 7,331,520 B2 | 2/2008 | Silva et al. | 235/381 |
| 7,346,682 B2 | 3/2008 | Basani et al. | 709/224 |
| 7,349,920 B1 | 3/2008 | Feinberg et al. | 707/102 |
| 7,351,145 B1 | 4/2008 | Ornstein et al. | 463/25 |
| 7,351,147 B2 | 4/2008 | Stockdale et al. | 463/29 |
| 7,356,770 B1 | 4/2008 | Jackson | 715/736 |
| 7,363,342 B1 | 4/2008 | Wang et al. | 709/204 |
| 7,364,510 B2 | 4/2008 | Walker et al. | 463/42 |
| 7,370,282 B2 | 5/2008 | Cary | 715/772 |
| 7,384,339 B2 | 6/2008 | LeMay et al. | 463/30 |
| 7,390,256 B2 | 6/2008 | Soltys et al. | 463/12 |
| 7,398,327 B2 | 7/2008 | Lee | 709/250 |
| 7,404,765 B2 | 7/2008 | Soltys et al. | 463/25 |
| 7,407,438 B2 | 8/2008 | Schubert et al. | 463/22 |
| 7,410,422 B2 | 8/2008 | Fine | 463/42 |
| 7,419,428 B2 | 9/2008 | Rowe | 463/25 |
| 7,422,522 B2 | 9/2008 | Fujimoto et al. | 463/16 |

| Patent Number | Date | Inventor(s) | Class |
|---|---|---|---|
| 7,427,233 B2 | 9/2008 | Walker et al. | 463/16 |
| 7,427,236 B2 | 9/2008 | Kaminkow et al. | 463/26 |
| 7,434,805 B2 | 10/2008 | Grauzer et al. | 273/149 R |
| 7,435,179 B1 | 10/2008 | Ford | 463/42 |
| 7,438,221 B2 | 10/2008 | Washington et al. | 235/379 |
| 7,438,643 B2 | 10/2008 | Brosnan et al. | 463/42 |
| 7,448,626 B2 | 11/2008 | Fleckenstein | 273/149 R |
| 7,455,591 B2 | 11/2008 | Nguyen | 463/42 |
| 7,460,863 B2 | 12/2008 | Steelberg et al. | 455/419 |
| 7,465,231 B2 | 12/2008 | Lewin et al. | 463/37 |
| 7,473,178 B2 | 1/2009 | Boyd et al. | 463/39 |
| 7,483,394 B2 | 1/2009 | Chang et al. | 370/254 |
| 7,510,186 B2 | 3/2009 | Fleckenstein | 273/149 R |
| 7,510,194 B2 | 3/2009 | Soltys et al. | 273/293 |
| 7,510,474 B2 | 3/2009 | Carter, Sr. | 463/29 |
| 7,515,718 B2 | 4/2009 | Nguyen et al. | 380/278 |
| 7,523,937 B2 | 4/2009 | Fleckenstein | 273/149 R |
| 7,534,169 B2 | 5/2009 | Amaitis et al. | 463/39 |
| 7,549,576 B2 | 6/2009 | Alderucci et al. | 235/380 |
| 7,559,080 B2 | 7/2009 | Bhargavan et al. | 726/1 |
| 7,559,839 B2 | 7/2009 | Bahar | 463/25 |
| 7,566,274 B2 | 7/2009 | Johnson et al. | 463/42 |
| 7,575,234 B2 | 8/2009 | Soltys et al. | 273/149 R |
| 7,577,847 B2 | 8/2009 | Nguyen et al. | 713/186 |
| 7,578,739 B2 | 8/2009 | Gauselmann | 463/27 |
| 7,585,217 B2 | 9/2009 | Lutnick et al. | 463/16 |
| 7,594,030 B2 | 9/2009 | Teodosiu et al. | |
| 7,611,407 B1 | 11/2009 | Itkis et al. | 463/29 |
| 7,611,409 B2 | 11/2009 | Muir et al. | 463/29 |
| 7,634,550 B2 | 12/2009 | Wolber et al. | 709/220 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,674,179 B2 | 3/2010 | Baerlocher et al. | 463/27 |
| 7,682,249 B2 | 3/2010 | Winans et al. | 463/31 |
| 7,684,874 B2 | 3/2010 | Schlottmann et al. | 700/9 |
| 7,685,516 B2 | 3/2010 | Fischer | 715/255 |
| 7,685,593 B2 | 3/2010 | Solomon et al. | 717/170 |
| 7,686,688 B2 | 3/2010 | Friedman et al. | 463/25 |
| 7,690,995 B2 | 4/2010 | Frankulin et al. | 463/41 |
| 7,699,697 B2 | 4/2010 | Darrah et al. | 463/16 |
| 7,699,703 B2 | 4/2010 | Muir et al. | 463/29 |
| 7,722,453 B2 | 5/2010 | Lark et al. | 463/16 |
| 7,730,198 B2 | 6/2010 | Ruppert et al. | 709/230 |
| 7,744,462 B2 | 6/2010 | Grav et al. | 463/27 |
| 7,747,741 B2 | 6/2010 | Basani et al. | 709/224 |
| 7,753,781 B2 | 7/2010 | Storch | 463/25 |
| 7,753,789 B2 | 7/2010 | Walker et al. | 463/42 |
| 7,753,790 B2 | 7/2010 | Nguyen et al. | 463/42 |
| 7,762,888 B2 | 7/2010 | Rowe | 463/29 |
| 7,769,877 B2 | 8/2010 | McBride et al. | 709/230 |
| 7,778,635 B2 | 8/2010 | Crookham et al. | 455/426.1 |
| 7,780,525 B2 | 8/2010 | Walker et al. | 463/29 |
| 7,780,526 B2 | 8/2010 | Nguyen et al. | 463/29 |
| 7,780,529 B2 | 8/2010 | Rowe et al. | 463/42 |
| 7,819,742 B2 | 10/2010 | Chamberlain et al. | 463/25 |
| 7,824,267 B2 | 11/2010 | Cannon et al. | 463/42 |
| 7,828,649 B2 | 11/2010 | Cuddy et al. | 463/26 |
| 7,841,946 B2 | 11/2010 | Walker et al. | 463/42 |
| 7,846,020 B2 | 12/2010 | Walker et al. | 463/29 |
| 7,850,528 B2 | 12/2010 | Wells | 463/42 |
| 7,857,702 B2 | 12/2010 | Hilbert | 463/47 |
| 7,862,425 B2 | 1/2011 | Cavagna | 463/25 |
| 7,867,081 B2 | 1/2011 | Schneider et al. | 463/25 |
| 7,874,920 B2 | 1/2011 | Hornik et al. | 463/42 |
| 7,874,921 B2 | 1/2011 | Baszucki et al. | 463/43 |
| 7,898,679 B2 | 3/2011 | Brack et al. | 358/1.15 |
| 7,901,294 B2 | 3/2011 | Walker et al. | 463/42 |
| 7,918,738 B2 | 4/2011 | Paulsen | 463/43 |
| 7,937,464 B2 | 5/2011 | Ruppert et al. | 709/224 |
| 8,028,046 B2 | 9/2011 | Elliott et al. | 709/220 |
| 8,062,121 B2 | 11/2011 | Crivelli | |
| 8,073,657 B2 | 12/2011 | Moore, III et al. | |
| 2001/0016515 A1 | 8/2001 | Oliver | 463/25 |
| 2001/0019966 A1 | 9/2001 | Idaka | 463/40 |
| 2001/0034237 A1 | 10/2001 | Garahi | 455/456 |
| 2001/0041612 A1 | 11/2001 | Garahi et al. | 463/29 |
| 2002/0084587 A1 | 7/2002 | Bennett et al. | 273/309 |
| 2002/0103027 A1 | 8/2002 | Rowe et al. | 463/39 |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0115490 A1 | 8/2002 | Burnet et al. | 463/49 |
| 2002/0142844 A1 | 10/2002 | Kerr | 463/42 |
| 2002/0147042 A1 | 10/2002 | Vuong et al. | 463/40 |
| 2002/0187825 A1 | 12/2002 | Tracy et al. | 463/17 |
| 2003/0004871 A1 | 1/2003 | Rowe | 705/39 |
| 2003/0022714 A1 | 1/2003 | Oliver | 463/25 |
| 2003/0027625 A1 | 2/2003 | Rowe | 463/20 |
| 2003/0028480 A1 | 2/2003 | Rowe | 705/39 |
| 2003/0032474 A1 | 2/2003 | Kaminkow | 463/25 |
| 2003/0036425 A1 | 2/2003 | Kaminkow et al. | 463/25 |
| 2003/0042679 A1 | 3/2003 | Snow | 273/292 |
| 2003/0045354 A1 | 3/2003 | Giobbi | 463/40 |
| 2003/0064798 A1 | 4/2003 | Grauzer et al. | 463/29 |
| 2003/0069074 A1 | 4/2003 | Jackson | 463/43 |
| 2003/0075869 A1 | 4/2003 | Breeding et al. | 273/292 |
| 2003/0078103 A1 | 4/2003 | LeMay et al. | 463/43 |
| 2003/0078789 A1 | 4/2003 | Oren | 705/1 |
| 2003/0083126 A1 | 5/2003 | Paulsen | 463/25 |
| 2003/0090064 A1 | 5/2003 | Hoyt et al. | 273/292 |
| 2003/0104865 A1 | 6/2003 | Itkis et al. | 463/39 |
| 2003/0130024 A1 | 7/2003 | Darby | 463/13 |
| 2003/0137968 A1 | 7/2003 | Lareau et al. | 370/349 |
| 2003/0186733 A1 | 10/2003 | Wolf et al. | 463/16 |
| 2003/0186739 A1 | 10/2003 | Paulsen et al. | 463/25 |
| 2003/0195037 A1 | 10/2003 | Vuong et al. | 463/29 |
| 2003/0203755 A1 | 10/2003 | Jackson | 463/42 |
| 2003/0206548 A1 | 11/2003 | Bannai et al. | 370/389 |
| 2003/0212597 A1 | 11/2003 | Ollins | 705/14 |
| 2003/0224858 A1 | 12/2003 | Yoseloff et al. | 463/43 |
| 2003/0228912 A1 | 12/2003 | Wells et al. | 463/43 |
| 2003/0232651 A1 | 12/2003 | Huard | 463/42 |
| 2004/0002386 A1 | 1/2004 | Wolfe et al. | 463/42 |
| 2004/0002388 A1 | 1/2004 | Larsen et al. | 463/43 |
| 2004/0005920 A1 | 1/2004 | Soltys et al. | 463/25 |
| 2004/0029635 A1 | 2/2004 | Giobbi | 463/30 |
| 2004/0033095 A1 | 2/2004 | Saffari et al. | 400/120.01 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0068654 A1 | 4/2004 | Cockerille et al. | 713/168 |
| 2004/0082385 A1 | 4/2004 | Silva et al. | 463/40 |
| 2004/0087375 A1 | 5/2004 | Gelinotte | 463/47 |
| 2004/0092310 A1 | 5/2004 | Brosnan et al. | 463/42 |
| 2004/0106452 A1 | 6/2004 | Nguyen et al. | 463/42 |
| 2004/0110119 A1 | 6/2004 | Riconda et al. | 434/350 |
| 2004/0127291 A1 | 7/2004 | George et al. | 463/42 |
| 2004/0132529 A1 | 7/2004 | Mkrtchyan et al. | 463/29 |
| 2004/0133485 A1 | 7/2004 | Schoonmaker et al. | 705/30 |
| 2004/0142743 A1 | 7/2004 | Oliver | 463/25 |
| 2004/0142744 A1 | 7/2004 | Atkinson et al. | 463/29 |
| 2004/0150702 A1 | 8/2004 | Tsuyoshi et al. | 347/100 |
| 2004/0166940 A1 | 8/2004 | Rothschild | 463/42 |
| 2004/0185936 A1 | 9/2004 | Block et al. | 463/42 |
| 2004/0219982 A1 | 11/2004 | Khoo et al. | 463/42 |
| 2004/0229682 A1 | 11/2004 | Gelinotte | 463/25 |
| 2004/0259618 A1 | 12/2004 | Soltys et al. | 463/11 |
| 2004/0259630 A1 | 12/2004 | Huard et al. | 463/25 |
| 2005/0026680 A1 | 2/2005 | Gururajan | 463/25 |
| 2005/0043094 A1 | 2/2005 | Nguyen et al. | 463/42 |
| 2005/0043096 A1* | 2/2005 | Kerr | 463/42 |
| 2005/0051965 A1 | 3/2005 | Gururajan | 273/292 |
| 2005/0054408 A1 | 3/2005 | Steil et al. | 463/11 |
| 2005/0054438 A1 | 3/2005 | Rothschild et al. | 463/29 |
| 2005/0054445 A1 | 3/2005 | Gatto et al. | 463/42 |
| 2005/0059479 A1 | 3/2005 | Soltys et al. | 463/25 |
| 2005/0070358 A1 | 3/2005 | Angell et al. | 463/39 |
| 2005/0101367 A1 | 5/2005 | Soltys et al. | 463/12 |
| 2005/0116020 A1 | 6/2005 | Smolucha et al. | 235/375 |
| 2005/0116417 A1 | 6/2005 | Soltys et al. | 273/292 |
| 2005/0119052 A1 | 6/2005 | Russell et al. | 463/42 |
| 2005/0153778 A1 | 7/2005 | Nelson et al. | 463/42 |
| 2005/0156318 A1 | 7/2005 | Douglas | 257/761 |
| 2005/0164761 A1 | 7/2005 | Tain | 463/13 |
| 2005/0176507 A1 | 8/2005 | Ephrati | 463/39 |
| 2005/0181864 A1 | 8/2005 | Britt et al. | 463/25 |
| 2005/0222891 A1 | 10/2005 | Chan et al. | 705/9 |

| | | | | | | | |
|---|---|---|---|---|---|---|---|
| 2005/0227760 A1 | 10/2005 | Vlazny et al. ............... 463/28 | | 2007/0287535 A1 | 12/2007 | Soltys ............... 463/29 |
| 2005/0239542 A1 | 10/2005 | Olsen ............... 463/27 | | 2007/0293303 A1 | 12/2007 | Shayesteh ............... 463/25 |
| 2005/0258597 A1 | 11/2005 | Soltys et al. ............... 273/274 | | 2007/0298860 A1 | 12/2007 | Graves et al. ............... 463/20 |
| 2005/0266919 A1 | 12/2005 | Rowe et al. ............... 463/25 | | 2007/0298865 A1 | 12/2007 | Soltys ............... 463/22 |
| 2005/0282614 A1 | 12/2005 | Gauselmann ............... 463/20 | | 2007/0298868 A1 | 12/2007 | Soltys ............... 463/25 |
| 2005/0282623 A1 | 12/2005 | Matsuno et al. ............... 463/25 | | 2008/0004108 A1 | 1/2008 | Klinkhammer ............... 463/29 |
| 2005/0282626 A1 | 12/2005 | Manfredi et al. ............... 463/25 | | 2008/0009344 A1 | 1/2008 | Graham et al. ............... 463/25 |
| 2005/0288083 A1 | 12/2005 | Downs ............... 463/11 | | 2008/0026832 A1 | 1/2008 | Stevens et al. ............... 463/26 |
| 2005/0288084 A1 | 12/2005 | Schubert ............... 463/11 | | 2008/0026848 A1 | 1/2008 | Byng ............... 463/42 |
| 2005/0288085 A1 | 12/2005 | Schubert et al. ............... 463/11 | | 2008/0038035 A1 | 2/2008 | Shuldman et al. ............... 400/76 |
| 2006/0004618 A1 | 1/2006 | Brixius ............... 705/8 | | 2008/0045341 A1 | 2/2008 | Englman ............... 463/42 |
| 2006/0009282 A1 | 1/2006 | George et al. ............... 463/29 | | 2008/0064501 A1 | 3/2008 | Patel ............... 463/40 |
| 2006/0015716 A1 | 1/2006 | Thornton et al. ............... 713/155 | | 2008/0076536 A1 | 3/2008 | Shayesteh ............... 463/25 |
| 2006/0019745 A1 | 1/2006 | Benbrahim ............... 463/29 | | 2008/0076572 A1 | 3/2008 | Nguyen et al. ............... 463/42 |
| 2006/0026499 A1 | 2/2006 | Weddle ............... 715/503 | | 2008/0085772 A1 | 4/2008 | Iddings et al. |
| 2006/0035707 A1 | 2/2006 | Nguyen et al. ............... 463/29 | | 2008/0090651 A1 | 4/2008 | Baerlocher ............... 463/27 |
| 2006/0046849 A1 | 3/2006 | Kovacs ............... 463/39 | | 2008/0096659 A1 | 4/2008 | Kreloff et al. ............... 463/39 |
| 2006/0066444 A1 | 3/2006 | Steeves ............... 340/10.5 | | 2008/0108433 A1 | 5/2008 | DiMichele et al. ............... 463/40 |
| 2006/0116208 A1 | 6/2006 | Chen et al. ............... 463/43 | | 2008/0113764 A1 | 5/2008 | Soltys ............... 463/22 |
| 2006/0121970 A1 | 6/2006 | Khal ............... 463/16 | | 2008/0113773 A1 | 5/2008 | Johnson et al. ............... 463/25 |
| 2006/0178185 A1 | 8/2006 | Weis | | 2008/0113781 A1 | 5/2008 | Soltys et al. ............... 463/28 |
| 2006/0183541 A1 | 8/2006 | Okada et al. ............... 463/29 | | 2008/0119284 A1 | 5/2008 | Luciano, Jr. et al. ............... 463/42 |
| 2006/0195847 A1 | 8/2006 | Amano et al. ............... 718/103 | | 2008/0146337 A1 | 6/2008 | Halonen et al. ............... 463/42 |
| 2006/0199649 A1 | 9/2006 | Soltys et al. ............... 463/47 | | 2008/0153599 A1 | 6/2008 | Atashband et al. ............... 463/42 |
| 2006/0205482 A1* | 9/2006 | Crivelli ............... 463/25 | | 2008/0153600 A1 | 6/2008 | Swarna ............... 463/43 |
| 2006/0205508 A1 | 9/2006 | Green ............... 463/40 | | 2008/0154916 A1 | 6/2008 | Atashband ............... 707/10 |
| 2006/0205519 A1 | 9/2006 | Soltys ............... 463/47 | | 2008/0155665 A1 | 6/2008 | Ruppert et al. ............... 726/5 |
| 2006/0211481 A1 | 9/2006 | Soltys et al. ............... 463/16 | | 2008/0162729 A1 | 7/2008 | Ruppert ............... 709/249 |
| 2006/0229944 A1* | 10/2006 | Walker et al. ............... 705/14 | | 2008/0171588 A1 | 7/2008 | Atashband ............... 463/20 |
| 2006/0247013 A1 | 11/2006 | Walker et al. ............... 463/20 | | 2008/0171598 A1 | 7/2008 | Deng ............... 463/40 |
| 2006/0247057 A1 | 11/2006 | Green et al. ............... 463/42 | | 2008/0200255 A1 | 8/2008 | Eisele ............... 463/42 |
| 2006/0248161 A1 | 11/2006 | O'Brien et al. ............... 709/217 | | 2008/0217851 A1 | 9/2008 | Colton ............... 273/274 |
| 2006/0277487 A1 | 12/2006 | Poulsen et al. ............... 715/772 | | 2008/0243697 A1 | 10/2008 | Irving et al. ............... 705/54 |
| 2007/0004500 A1 | 1/2007 | Soltys et al. ............... 463/22 | | 2008/0261701 A1 | 10/2008 | Lewin et al. ............... 463/43 |
| 2007/0004501 A1 | 1/2007 | Brewer et al. | | 2008/0287197 A1 | 11/2008 | Ruppert et al. ............... 463/42 |
| 2007/0006329 A1 | 1/2007 | Morrow et al. ............... 726/34 | | 2008/0293494 A1 | 11/2008 | Adiraju et al. ............... 463/42 |
| 2007/0015583 A1 | 1/2007 | Tran ............... 463/40 | | 2008/0311971 A1 | 12/2008 | Dean ............... 463/20 |
| 2007/0026935 A1 | 2/2007 | Wolf et al. ............... 463/25 | | 2008/0318685 A9 | 12/2008 | Oak et al. ............... 463/42 |
| 2007/0032288 A1 | 2/2007 | Nelson et al. | | 2009/0005176 A1 | 1/2009 | Morrow et al. ............... 463/43 |
| 2007/0033247 A1 | 2/2007 | Martin ............... 709/201 | | 2009/0011833 A1 | 1/2009 | Seelig et al. ............... 463/42 |
| 2007/0054725 A1 | 3/2007 | Morrow et al. ............... 463/16 | | 2009/0029775 A1 | 1/2009 | Ruppert et al. ............... 463/42 |
| 2007/0054740 A1 | 3/2007 | Salls et al. ............... 463/42 | | 2009/0069076 A1 | 3/2009 | Silvestro ............... 463/25 |
| 2007/0057453 A1 | 3/2007 | Soltys et al. ............... 273/149 P | | 2009/0104915 A1 | 4/2009 | Koyama ............... 463/25 |
| 2007/0057454 A1 | 3/2007 | Fleckenstein ............... 273/149 R | | 2009/0115133 A1 | 5/2009 | Kelly et al. ............... 273/274 |
| 2007/0057462 A1 | 3/2007 | Fleckenstein ............... 273/274 | | 2009/0117994 A1 | 5/2009 | Kelly et al. ............... 463/25 |
| 2007/0057466 A1 | 3/2007 | Soltys et al. ............... 273/292 | | 2009/0118001 A1 | 5/2009 | Kelly et al. ............... 463/29 |
| 2007/0057469 A1 | 3/2007 | Grauzer et al. ............... 273/309 | | 2009/0118005 A1 | 5/2009 | Kelly et al. ............... 463/31 |
| 2007/0060259 A1 | 3/2007 | Pececnik ............... 463/16 | | 2009/0118006 A1 | 5/2009 | Kelly et al. ............... 463/31 |
| 2007/0060260 A1 | 3/2007 | Fleckenstein ............... 463/16 | | 2009/0124329 A1 | 5/2009 | Palmisano ............... 463/20 |
| 2007/0060307 A1 | 3/2007 | Mathis et al. ............... 463/25 | | 2009/0124392 A1 | 5/2009 | Ruppert et al. ............... 463/42 |
| 2007/0060365 A1 | 3/2007 | Tien et al. ............... 463/42 | | 2009/0124394 A1 | 5/2009 | Swarna ............... 463/43 |
| 2007/0077995 A1 | 4/2007 | Oak et al. ............... 463/42 | | 2009/0125603 A1 | 5/2009 | Atashband et al. ............... 709/207 |
| 2007/0082737 A1 | 4/2007 | Morrow et al. ............... 463/42 | | 2009/0131144 A1 | 5/2009 | Allen ............... 463/20 |
| 2007/0093298 A1 | 4/2007 | Brunet ............... 463/42 | | 2009/0131163 A1 | 5/2009 | Arbogast et al. ............... 463/29 |
| 2007/0105628 A1 | 5/2007 | Arbogast et al. ............... 463/42 | | 2009/0132720 A1 | 5/2009 | Ruppert et al. ............... 709/231 |
| 2007/0111775 A1 | 5/2007 | Yoseloff ............... 463/16 | | 2009/0163279 A1 | 6/2009 | Hermansen ............... 463/42 |
| 2007/0111791 A1 | 5/2007 | Arbogast et al. ............... 463/40 | | 2009/0170594 A1 | 7/2009 | Delaney et al. ............... 463/25 |
| 2007/0111794 A1 | 5/2007 | Hogan et al. ............... 463/42 | | 2009/0176556 A1 | 7/2009 | Gagner et al. ............... 463/25 |
| 2007/0117608 A1 | 5/2007 | Roper et al. ............... 463/16 | | 2009/0176558 A1* | 7/2009 | Englman et al. ............... 463/25 |
| 2007/0124483 A1 | 5/2007 | Marples et al. ............... 709/228 | | 2009/0176580 A1 | 7/2009 | Herrmann et al. ............... 463/43 |
| 2007/0129145 A1 | 6/2007 | Blackburn et al. ............... 463/42 | | 2009/0181776 A1 | 7/2009 | Deng ............... 463/42 |
| 2007/0150329 A1 | 6/2007 | Brook et al. ............... 705/8 | | 2009/0183243 A1 | 7/2009 | Ruppert et al. ............... 726/5 |
| 2007/0155490 A1 | 7/2007 | Phillips et al. | | 2009/0253483 A1 | 10/2009 | Pacey et al. ............... 463/20 |
| 2007/0167235 A1 | 7/2007 | Naicker ............... 463/42 | | 2009/0270170 A1 | 10/2009 | Patton ............... 463/36 |
| 2007/0168251 A1 | 7/2007 | Hilbert et al. ............... 705/14 | | 2009/0275374 A1 | 11/2009 | Nelson et al. ............... 463/16 |
| 2007/0191102 A1 | 8/2007 | Coliz et al. ............... 463/42 | | 2009/0275393 A1 | 11/2009 | Kisenwether et al. ............... 463/25 |
| 2007/0192748 A1 | 8/2007 | Martin et al. ............... 715/856 | | 2009/0275394 A1 | 11/2009 | Young et al. ............... 463/25 |
| 2007/0198418 A1 | 8/2007 | MacDonald et al. ............... 705/52 | | 2009/0275395 A1 | 11/2009 | McAllister et al. ............... 463/25 |
| 2007/0208816 A1 | 9/2007 | Baldwin et al. ............... 709/206 | | 2009/0275398 A1 | 11/2009 | Nelson ............... 463/27 |
| 2007/0218998 A1 | 9/2007 | Arbogast et al. ............... 463/42 | | 2009/0275399 A1 | 11/2009 | Kelly et al. ............... 463/27 |
| 2007/0235521 A1 | 10/2007 | Mateen et al. ............... 235/379 | | 2009/0275400 A1 | 11/2009 | Rehm et al. ............... 463/27 |
| 2007/0241497 A1 | 10/2007 | Soltys et al. ............... 273/149 R | | 2009/0275401 A1 | 11/2009 | Allen et al. ............... 463/29 |
| 2007/0241498 A1 | 10/2007 | Soltys ............... 273/149 R | | 2009/0275402 A1 | 11/2009 | Backover et al. ............... 463/29 |
| 2007/0243925 A1 | 10/2007 | LeMay et al. | | 2009/0275407 A1 | 11/2009 | Singh et al. ............... 463/31 |
| 2007/0243927 A1 | 10/2007 | Soltys ............... 463/25 | | 2009/0275411 A1 | 11/2009 | Kisenwether et al. ............... 463/42 |
| 2007/0243935 A1 | 10/2007 | Huizinga ............... 463/42 | | 2009/0276341 A1 | 11/2009 | McMahan et al. ............... 705/30 |
| 2007/0259709 A1 | 11/2007 | Kelly et al. ............... 463/20 | | 2009/0276715 A1 | 11/2009 | Arbogast et al. ............... 715/736 |
| 2007/0259711 A1 | 11/2007 | Thomas ............... 463/22 | | 2009/0298583 A1 | 12/2009 | Jones ............... 463/29 |
| 2007/0287534 A1 | 12/2007 | Fleckenstein ............... 463/29 | | 2009/0307069 A1 | 12/2009 | Meyerhofer ............... 705/14.12 |

| | | | |
|---|---|---|---|
| 2009/0325708 A9 | 12/2009 | Kerr | |
| 2010/0016067 A1 | 1/2010 | White et al. | |
| 2010/0016068 A1 | 1/2010 | White et al. | 463/25 |
| 2010/0029385 A1 | 2/2010 | Garvey et al. | 463/35 |
| 2010/0048291 A1 | 2/2010 | Warkentin | 463/25 |
| 2010/0093441 A1 | 4/2010 | Rajaraman et al. | 463/42 |
| 2010/0130280 A1 | 5/2010 | Arezina et al. | 463/20 |
| 2010/0131772 A1 | 5/2010 | Atashband et al. | 713/189 |
| 2010/0151926 A1 | 6/2010 | Ruppert et al. | 463/1 |
| 2010/0161798 A1 | 6/2010 | Ruppert et al. | 709/225 |
| 2010/0234104 A1 | 9/2010 | Ruppert et al. | 463/30 |
| 2010/0248842 A1 | 9/2010 | Ruppert | 463/42 |
| 2011/0009184 A1 | 1/2011 | Byng | 463/20 |
| 2011/0009188 A1 | 1/2011 | Adiraju et al. | |
| 2011/0124417 A1 | 5/2011 | Baynes et al. | 463/43 |

FOREIGN PATENT DOCUMENTS

| | | |
|---|---|---|
| DE | 197 48 930 A1 | 5/1998 |
| DE | 199 40 954 A1 | 3/2001 |
| EP | 0 327 069 A2 | 8/1989 |
| EP | 0 790 848 B1 | 8/1997 |
| EP | 0 700 980 B1 | 11/1999 |
| EP | 1074955 A2 | 2/2001 |
| EP | 1 291 045 A2 | 3/2003 |
| EP | 1463008 A2 | 9/2004 |
| FR | 2 775 196 A1 | 8/1999 |
| GB | 2 370 791 A | 7/2002 |
| GB | 2 380 143 A | 4/2003 |
| GB | 2 382 034 A | 5/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 96/03188 A1 | 2/1996 |
| WO | 96/36253 A1 | 11/1996 |
| WO | 97/13227 A1 | 4/1997 |
| WO | 00/22585 A2 | 4/2000 |
| WO | 02/05914 A1 | 1/2002 |
| WO | 03/060846 A2 | 7/2003 |
| WO | 2005/035084 | 4/2005 |
| WO | 2006/110348 | 10/2006 |
| WO | 2007/033207 A2 | 3/2007 |

OTHER PUBLICATIONS

Written Opinion for PCT/US2009/044904 mailed Dec. 17, 2009, 4 pages.
U.S. Appl. No. 12/271,337, Singh et al., Nov. 14, 2008.
U.S. Appl. No. 12/271,736, Crowder, Nov. 14, 2008.
Bally Technologies, Inc., iVIEW, http://ballytech.com/systems/product.cfm?id=9, download date Nov. 6, 2007, 2 pages.
Bally TMS, "MP21—Automated Table Tracking/Features," 2 pages, Nov. 2005.
Bally TMS, "MPBacc—Intelligent Table Tracking/Features," 2 pages, Nov. 2005.
Bally TMS, "MPLite—Table Management System/Features," 2 pages, Nov. 2005.
Bravo Gaming Systems, "Casino Table Wager Analysis and Player Tracking System—Table Operations/Unique Features," accessed Apr. 11, 2005, URL = http://www.genesisgaming.com, 4 pages.
Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Casino Software & Services, LLC., accessed Aug. 25, 2006, URL = http:/casinosoftware.com/home.html, 6 pages.

*Gambling Magazine*, "Gaming Company Takes RFID to the Casino," Dec. 27, 2004, accessed Aug. 25, 2006, URL = http:/www.gamblingmagazine.com/managearticle.asp?C=290&A=13186, 4 pages.
Gros, R., "All You Ever Wanted to Know About Table Games," reprinted from *Global Gaming Business*, Aug. 1, 2003, 2 pages.
Hewlett Packard Handhelds, accessed Sep. 8, 2003, URL = http://www.shopping.hp.com/cgi-bin/hpdirect/shopping/scripts/home/store_access.jsp?temp..., 2 pages.
International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.
Linksys WAP11 "Wireless Network Access Point," accessed Sep. 8, 2003, URL = http:/www.linksys.com/products/product.asp-?prid=157&grid=, 4 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Plaintiff's Declaration of Lawrence Luciano in Opposition to Shuffle Master's Motion for Preliminary Injunction, *Card, LLC v. Shuffle Master, Inc.*, D. Nev. (No. CV-N-03-0244-ECR-(RAM)), Nov. 24, 2003.
Pro, L.V., "Book Review—The Card Counter's Guide to Casino Surveillance," *Blackjack Insider Newsletter*, May 2003, #40, accessed Aug. 25, 2006, URL = http:/bjinsider.com/newsletter_40_surveillance.shtml, 5 pages.
Semtek PDA & Handheld Devices, Compaq iSwipe™ Magnetic Card Reader, accessed Sep. 8, 2003, URL = http:/www.semtek.com/products/iswipe.html, 3 pages.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents the Ultimate Player Rating System . . . Bloodhound Sniffs Out the Pros and Cons," Dec. 31, 1997, 6 pages.
Snyder, A., "The High-Tech Eye," excerpt from *Blackjack Forum*, Spring 1997, accessed Dec. 21, 2005, from Casino Software & Services, LLC, URL = http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.
Winkler, C., "Product Spotlight: MindPlay," reprinted from *Gaming and Leisure Technology*, Fall 2003, 2 pages.
MagTek, "Port Powered Swipe Reader," Technical Reference Manual, Manual Part No. 99875094 Rev 12, Jun. 2003, 20 pages.
Palermo, V. "Near-field magnetic comms emerges," EE Times Design, Oct. 31, 2003.
White, W. et al., "Networked Gaming System With Enterprise Accounting Methods and Apparatus," Office Action dated Nov. 10, 2011, for U.S. Appl. No. 12/470,353, 24 pages.
Warren White et al., "Networked Gaming System with Enterprise Accounting Methods and Apparatus," Amendment filed Jan. 4, 2012, for U.S. Appl. No. 12/470,353, 13 pages.
Rajaraman, "Apparatus, Method and Article for Evaluating a Stack of Objects in an Image," U.S. Appl. No. 61/397,694, filed Aug. 26, 2009, 82 pages.
US 6,599,191, 07/2003, Breeding et al. (withdrawn)

* cited by examiner

FIG. 3

Machine Detail Financials

| Site | Christinas So Lake Tahoe xCasino | Gaming Day | 1/19/2008 | Machine ID | SDG_000841247550 | | Machine Variances |

Machine System Information

| | Meter Name | Daily Totals | System Totals | System Variance | Promo In | WAT In | WAT Out | Adjustment | System Adjustment Totals | Manual Adjustment Totals |
|---|---|---|---|---|---|---|---|---|---|---|
| Daily Total / Voucher Paid / Voucher Printed / Jackpot Printed | | | | | | | | | | |
| ☐ Select All | Games Played | 614.95 | 58.76 | 1.84 | | | | 0 | | 393.26 |
| ☐ | Money Played | 0.89 | 12.37 | 5.69 | | | | 0 | | 155.81 |
| ☐ | Money Won | 303.88 | 44.62 | 0.8 | | | | 0 | | 108.62 |
| ☐ | Voucher Paid A... | 325.24 | 97.3 | 3.62 | | | | 0 | | 509.08 |
| ☐ | Voucher Paid C... | 607.35 | 89.92 | 6.75 | | | | 0 | | 977.98 |
| ☐ | Voucher Printed... | 822.1 | 12.23 | 6.17 | | | | 0 | | 836.45 |
| ☐ | Voucher Printed... | 546.89 | 46.91 | 5.86 | | | | 0 | | 122.94 |
| ☐ | Jackpot Paid Am... | 818.08 | 92.65 | 8.29 | | | | 0 | | 570.85 |
| ☐ | Bill In 1$ Amount | 192.07 | 31.2 | 4.16 | | | | 0 | | 50.52 |
| ☐ | Bill In 2$ Amount | 578.36 | 91.15 | 1.39 | | | | 0 | | 568.05 |
| ☐ | Bill In 5$ Amount | 473.3 | 72.51 | 9.82 | | | | 0 | | 527.49 |
| ☐ | Bill In 10$ Amount | 968.16 | 73.9 | 8.39 | | | | 0 | | 181.76 |

Selected ☐  Displayed ☐  Daily ☐

○ Display Machine note

Make adjustment to daily totals [Adjustment] — 604

Machine Meter Information

| Select All | Date | Event | Gaming Day | Games Played | Money Played | Money Won | Voucher Paid Amount | Voucher Paid Count | Voucher Printed Amount | Voucher Printed Count | Jackpot Amount |
|---|---|---|---|---|---|---|---|---|---|---|---|
| ☐ | 07/19/2007 | End of Day | 01/19/2008 | 9961 | 996100 | 1461870 | 0 | 0 | 380850 | 133 | 0 |
| ☐ | 07/18/2007 | End of Day | 01/19/2008 | 2843 | 284300 | 401271 | 0 | 0 | 60000 | 2 | 0 |
| ☐ | 07/20/2007 | End of Day | 01/19/2008 | 9993 | 999300 | 1388240 | 0 | 0 | 387280 | 143 | 0 |
| ☐ | 07/21/2007 | End of Day | 01/19/2008 | 9952 | 995300 | 1272647 | 0 | 0 | 279640 | 105 | 0 |
| ☐ | 07/22/2007 | End of Day | 01/19/2008 | 10022 | 1002100 | 1343404 | 0 | 0 | 338790 | 124 | 0 |
| ☐ | 07/23/2007 | End of Day | 01/19/2008 | 10048 | 1004800 | 1372360 | 0 | 0 | 370990 | 120 | 0 |
| ☐ | 07/24/2007 | End of Day | 01/19/2008 | 9753 | 975300 | 1339014 | 0 | 0 | 360790 | 168 | 0 |
| ☐ | 07/26/2007 | End of Day | 01/19/2008 | 6437 | 671150 | 916474 | 0 | 0 | 244755 | 131 | 0 |

700a

◉ Display Financial Net
◯ Display Events for this gaming day
◯ Display Events around EOD
◯ From [12/11/2007 12:00 AM ▽] To [12/11/2007 12:00 AM ▽]

[Adjustment]

Voucher Printed Wizard

Machine Variance

| ☐ Select All | Machine ID | Variance | | Machine Metered | | System Reported | |
|---|---|---|---|---|---|---|---|
| | | Printed Amount | Printed Count | Printed Amount | Printed Count | Printed Amount | Printed Count |
| ☐ | CAL_123 | 58.69 | 20 | 998.25 | 55 | 88.00 | 88.00 |
| ☐ | CAL_187 | 158.69 | 120 | 1998.25 | 155 | 188.00 | 188.00 |
| ☐ | CAL_002 | 258.69 | 220 | 2998.25 | 255 | 288.00 | 288.00 |

Adjustment Results

Total Variances Before Adjustments made  99.25

Total Variances After Adjustments made   8854

What would you like to do

⦿ Update the machine summary meters with the count and amount from the vouchering system Reason  [Caused by EOD Window ⌄]   ☐ New reason

[Make Adjustment]   [Cancel]

○ Variance Criteria over [0.00 <>] %
○ Variance Criteria over [0.00 <>] Amount
Select View [Machines with a Voucher Printed variance >] 🗋

What would you like to do
⊙ Update the machine summary meters with the count and amount from the vouchering system
　　Reason [Caused by EOD Window >]　☐ New reason

[Make Adjustment]　[Cancel]

FIG.7E

Switched Canister Wizard

Switched Canisters

| ☐ Select All | Machine ID | Currency Variance Amount | Currency Variance Count | Voucher Variance Amount | Voucher Variance Count | Machine ID | Currency Variance Amount | Currency Variance Count | Curre Varia Coun |
|---|---|---|---|---|---|---|---|---|---|

Adjustment Results Box

| | Currency Variance | | Voucher Variance | |
|---|---|---|---|---|
| | Amount | Count | Amount | Count |
| Total Variances Before Adjustments made | 170 | 26 | 166.15 | 7 |
| Total Variances After Adjustments made | 0 | 0 | 0 | 0 |

What would you like to do:

⦿ Transpose the Machine identifier for the selected rows in the grid

Reason [ Caused by wrong header card ⌄ ]  ☐ New reason

[ Make Adjustment ]  [ Cancel ]

Adjusted Results Box

| | Currency Variance | | Voucher Variance | |
|---|---|---|---|---|
| | Amount | Count | Amount | Count |
| Total Variances Before Adjustments made | 170 | 26 | 166.15 | 7 |
| Total Variances After Adjustments made | 0 | 0 | 0 | 0 |

What would you like to do:

⦿ Transpose the Machine identifier for the selected rows in the grid

Reason [Caused by wrong header card ⌄]  ☐ New reason

[Make Adjustment]   [Cancel]

Manual Payout

- 902 — Validation ID
- 904 — Amount
- 906 — Cashier name
- 908 — Cashier terminal
- 910 — Machine ID
- 912 — Business day February 2008

| Su | Mo | Tu | We | Th | Fi | Sa |
|---|---|---|---|---|---|---|
|  |  |  |  |  | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 |  |

- ☒ Open
- ☒ Closed
- ☐ Reopened
- ☒ Archived
- ☐ Current

Selected business day

Caused by EOD Window

2/20/2008

914 — Reason

☐ New reason

Create    Close

| Session Detail | | | | | | | | | |
|---|---|---|---|---|---|---|---|---|---|
| | | | | Printed | | | Paid | | |
| Validation ID | Action | Status | Business Day | Date and Time | Where | Amount | Business Day | Date and Time | Where | Amount |
| 190090060O573... | Redeem | Success | 04/14/2008 | 4/16/2008 10:52... | PT090-06 | 2372.27 | 04/14/2008 | 4/16/2008 10:54... | CT01 | 2372.27 |

WAT Transaction Detail

Transaction Details

Validation ID: D7A175724E39A4E9310A1619B168

Action: To Egm

WAT Transaction History

| Business Day | Date and Time | Action | Status | Amount | Machine ID | Cashier | Card Number |
|---|---|---|---|---|---|---|---|
| 04/13/2008 | 4/24/2008 11:39:16 AM | To Egm | Commit Acked | 10.00 | 6794 | TESTER | |

Promo Voucher Detail — 1200

Promo Voucher Information

Validation ID: 7750000040000016549
Action: Redeem

Promo Voucher History

| Business Day | Date and Time | Action | Status | Amount | Machine ID | Cashier | Card Number |
|---|---|---|---|---|---|---|---|
| 03/01/2008 | 3/1/2008 8:00:00 PM | Create | Success | 0.01 | PT090-03 | | |
| 04/01/2008 | 4/1/2008 8:00:00 PM | Redeem | Success | 0.01 | PT090-03 | | |

FIG. 12

Voucher Detail

Voucher Information

Validation ID: 190090030100408902

Action: Expire

Voucher History

| Buisness Day | Date and Time | Action | Status | Amount | Machine ID | Cashier | Card Number |
|---|---|---|---|---|---|---|---|
| 03/01/2008 | 3/1/2008 7:08:17 PM | Create | Success | 25.00 | 6794 | | |
| 03/01/2008 | 3/31/2008 7:08:26 PM | Expire | Success | 25.00 | Default | | |

Find Voucher

Voucher Details

1400

| | | | | | |
|---|---|---|---|---|---|
| Validation ID | | | | | |
| Amount range of the [$] | | From | | To | |
| Date Time when the voucher was printed | ☐ | From 04/28/2008 12:19:24 | | To 04/28/2008 12:19:24 | |
| Voucher print location | | Select an asset | ∨ | | |
| Date Time when the voucher was paid | ☐ | From 04/28/2008 12:19:24 | | To 04/28/2008 12:19:24 | ∨ |
| Action | | Select All | ∨ | | |

Find     Close

| | | | Printed | | |
|---|---|---|---|---|---|
| ☐ Select All | Validation ID | Action | Business Day | Date and Time | Where | Amount | Business Day |
| ☐ | 190090060034 9... | Create | 3/18/2008 12:00... | 3/18/2008 5:47:0... | PT090-06 | 5.00 | |
| ☐ | 190090060034 9... | Create | 3/18/2008 12:00... | 3/18/2008 5:47:1... | PT090-06 | 3.75 | |
| ☐ | 190090060034 9... | Create | 3/18/2008 12:00... | 3/18/2008 6:14:4... | PT090-06 | 3.75 | |
| ☐ | 190090060034 9... | Create | 3/18/2008 12:00... | 3/18/2008 6:21:5... | PT090-06 | 10.00 | |
| ☐ | 190090060034 9... | Create | 3/18/2008 12:00... | 3/18/2008 6:24:5... | PT090-06 | 3.75 | |
| ☐ | 190090060034 9... | Create | 3/18/2008 12:00... | 3/18/2008 6:38:1... | PT090-06 | 25.00 | |
| ☐ | 190090060034 9... | Create | 3/18/2008 12:00... | 3/18/2008 6:41:1... | PT090-06 | 25.00 | |

Select and Close

| Cancel Adjustment | | | | | | | | | |
|---|---|---|---|---|---|---|---|---|---|
| Date and Time | Business Day | Adjustment Type | Adjustment Name | Adjusted To | Adjusted By | Machine ID | Previous Value | Adjustment | New Value | Date and Time Approved | Appr Supe |
| 4/23/2008 2:11... | 04/07/2008 | Wizard Adju... | Create a new E... | Floor Event | aud | PT090-11 | 0.00 | | | | |

1700

[ Confirm ]  [ Cancel ]

Cashier Detail — 1900

Cashier Information

- First Name: CT8
- Last Name: CT8
- Department: Supervisor
- Phone: 775-850-1500
- Pager:

DropAndCountDetailsForm

Site: Unknown Site | Business Day: 4/14/2008 | Machine ID: CAI-PT060-09

| Type of Note | Note Meters | | | | Vouchers | | |
|---|---|---|---|---|---|---|---|
| | Amount | | Count | | Validation ID | Dropped Amount | Counted Amount |
| | Dropped | Counted | Dropped | Counted | | | |
| $1 Bills | | 0.00 | | 0 | 19006070020376744 | | 49.25 |
| $2 Bills | | 0.00 | | 0 | 19006070020418420 | | 5.00 |
| $5 Bills | | 0.00 | | 0 | 19006070020422175 | | 5.00 |
| $10 Bills | | 0.00 | | 0 | 19006070020445181 | | 6.50 |
| $20 Bills | | 0.00 | | 0 | 19006070020471333 | | 25.00 |
| $50 Bills | | 0.00 | | 0 | 19006070020498187 | | 52.50 |
| $100 Bills | | 0.00 | | 0 | 19006070020517475 | | 11.25 |
| $500 Bills | | 0.00 | | 0 | 19006070020523568 | | 50.00 |
| $1000 Bills | | 0.00 | | 0 | 19006070020570630 | | 45.00 |
| Voucher Meters | | 4500.41 | | | 19006070020592878 | | 50.00 |
| | | | | | 19006070020619957 | | 25.00 |
| | | | | | 19006070020637975 | | 50.00 |
| | | | | | 19006070020653234 | | 50.00 |
| | | | | | 19006070027408776 | | 45.00 |
| | | | | | 19006070027422819 | | 50.00 |
| | | | | | 19006070027449328 | | 5.50 |
| | | | | | 19006070027450263 | | 25.00 |
| | | | | | 19006070027464703 | | 5.50 |
| | | | | | 19006070027473521 | | 33.75 |
| | | | | | 19006070027492041 | | 7.50 |
| | | | | | 19006070027518390 | | 5.00 |
| | | | | | 19006070027533973 | | 5.00 |

Close

No Accounting Meter Wizard

Machine Variances

| | System Reported Values | | | | | | | | |
|---|---|---|---|---|---|---|---|---|---|
| Machine ID | Vouchers Printed Amount | Vouchers Printed Count | Vouchers Paid Amount | Vouchers Paid Count | Jackpot Printed Amount | Jackpot Printed Count | Promo In Amount | Promo In Count | WAT In Amount | WAT In Count |
| PT060-06 | 0.00 | 0 | 0.00 | 0 | 0.00 | 0 | 0.00 | 0 | 0.00 | 0 |

Events and Meters

| Select | Event Name | Date and Time | Vouchers Printed Amount | Vouchers Printed Count | Vouchers Paid Amount | Vouchers Paid Count | Jackpots Printed Amount | Jackpots Printed Count | Promo In Amount | Promo In Count |
|---|---|---|---|---|---|---|---|---|---|---|

Adjustment Results

| | System Reported Variance | | Voucher Variance | |
|---|---|---|---|---|
| | Amount | Count | Amount | Count |

What would you like to do:
- ⦿ Generate EOD event from System Reported values
- ○ Select available event to use as an EOD event [ ⌄ ] ☐ Save Reason Reason [ ]

[ Make Adjustment ] [ Cancel ]

2400

Voucher Printed Wizard

Machine Variance

| Machine ID | Variance | | Machine Metered | | System Reported | |
|---|---|---|---|---|---|---|
| | Amount | Count | Amount | Count | Amount | Count |
| 6794 | 26.25 | 5 | 8326.71 | 123 | 8352.96 | 128 |

Adjustment Results

| Adjustment Type | | Variance | |
|---|---|---|---|
| | | Amount | Count |
| Before Adjustment | | 26.25 | 5 |
| After Adjustment | | 0.00 | 0 |

What would you like to do

◉ Update the machine summary Voucher Printed meters with the count and amount from the vouchering system Reason [         ⌄]  ☐ Save Reason

[ Make Adjustment ]   [ Cancel ]

Voucher Paid Wizard

Machine Variance

| Machine ID | Variance | | Machine Metered | | System Reported | |
|---|---|---|---|---|---|---|
| | Amount | Count | Amount | Count | Amount | Count |
| PT060-02 | 5408.63 | 101 | 70.50 | 2 | 5479.13 | 103 |

Adjustment Results

| Adjustment Type | Variance | |
|---|---|---|
| | Amount | Count |
| Before Adjustment | 5,408.63 | 101 |
| After Adjustment | 0.00 | 0 |

What would you like to do

⊙ Update the machine summary Voucher Printed meters with the count and amount from the vouchering system Reason [ ▾ ]  ☐ Save Reason

[ Make Adjustment ]  [ Cancel ]

2600

Jackpot Printed Wizard — 2700

Machine Variance

| Machine ID | Variance | | Machine Metered | | System Reported | |
|---|---|---|---|---|---|---|
| | Amount | Count | Amount | Count | Amount | Count |
| PT060-02 | -23.50 | -4 | 55.25 | 13 | 31.75 | 9 |

Adjustment Results

| Adjustment Type | Variance | |
|---|---|---|
| | Amount | Count |
| Before Adjustment | -23.50 | -4 |
| After Adjustment | 0.00 | 0 |

What would you like to do

⦿ Update the machine summary Jackpot Printed meters with the count and amount from the Jackpot system Reason [ ⌄ ]  ☐ Save Reason

[ Make Adjustment ]  [ Cancel ]

FIG.27

Promo Coupon Wizard — 2800

Machine Variance

| Machine ID | Variance | | Machine Metered | | System Reported | |
|---|---|---|---|---|---|---|
| | Amount | Count | Amount | Count | Amount | Count |
| PT090-03 | 0.48 | 41 | 0.00 | 0 | 0.48 | 41 |
| 6794 | 0.32 | 31 | 0.00 | 0 | 0.32 | 31 |
| PT090-09 | 0.42 | 43 | 0.00 | 0 | 0.42 | 43 |
| PT090-06 | 0.36 | 43 | 0.00 | 0 | 0.36 | 43 |

Adjustment Results

| Adjustment Type | Variance | |
|---|---|---|
| | Amount | Count |
| Before Adjustment | 1.57 | 158 |
| After Adjustment | 0.00 | 0 |

What would you like to do

◉ Update the machine summary Promo in meters with the count and amount from the Promo system ☐ Save Reason Reason: [          ]

[ Make Adjustment ]  [ Cancel ]

Enterprise Accounting Manager — Audit System Financials

Site: Unknown Site  Business Day: 4/14/2008

⦿ Show variances by amount   ○ Show variances by count

| | Soft Count Currency | Soft Count Voucher | Net Variance | Voucher Printed | Voucher Paid | Jackpot Printed | Promo In | WAT In | WAT Out |
|---|---|---|---|---|---|---|---|---|---|
| Machine Reported | 0.00 | | -16458.72 | 16892.80 | 70.50 | 55.25 | 0.00 | 70.50 | 0.00 |
| System Reported | 8112.00 | 11320.23 | -16301.80 | 25464.56 | 5479.13 | 31.75 | 0.00 | 0.00 | 0.00 |
| Variance | -8112.00 | -11320.23 | -156.92 | -8571.76 | -5406.63 | 23.50 | 0.00 | 70.50 | 0.00 |

Tabs: Machine Financials / Soft Count / Net Variance / Adjustments / Voucher / Promo Activity / WAT Transactions / Cashier Activity / Kiosk Activity / PT Financial

| ☐ Select All | Machine ID | Count Room | Date and Time | | Meter | | Currency System | | Variance | |
|---|---|---|---|---|---|---|---|---|---|---|
| | | | Dropped | Counted | Amount | Count | Amount | Count | Amount | Count |
| ☐ | CAI-PT060-09 | R00002 | | 4/14/2008 7:16 PM | | | 155.00 | 1 | 155.00 | 1 |
| ☐ | CAI-PT060-09 | R00002 | | 4/14/2008 7:16 PM | | | 1,300.00 | 6 | 1,300.00 | 6 |
| ☐ | CAI-PT060-09 | R00002 | | 4/14/2008 7:16 PM | | | 90.00 | 0 | 90.00 | 0 |
| ☐ | CAI-PT060-09 | R00002 | | 4/14/2008 7:16 PM | | | 50.00 | 0 | 50.00 | 0 |
| ☐ | CAI-PT060-09 | R00002 | | 4/14/2008 7:16 PM | | | 180.00 | 0 | 180.00 | 0 |
| ☐ | CAI-PT060-09 | R00002 | | 4/14/2008 7:16 PM | | | 2,000.00 | 10 | 2,000.00 | 10 |
| ☐ | PT090-11 | R00002 | | | | | 90.00 | 0 | 90.00 | 0 |
| ☐ | PT090-11 | R00002 | | | | | 2,000.00 | 10 | 2,000.00 | 10 |

Audit Machine | Machine Detail | Fix It | Show Details

Select View: Display all drops and soft counts

Variance Threshold
  ○ currency
  ☐ Apply a  ○ voucher   variance of at least +/− $ 0.00
             ○ combined Accounting
 ☐ Audit System Financials
 ☐ Soft Count Accounting | Administration | Reports Ready

Incorrect Business Day Wizard [X]

Incorrect Business Day

| Machine ID | Dropped Business Day | Counted Business Day | Currency | | | Voucher | | | Count |
|---|---|---|---|---|---|---|---|---|---|
| | | | Amount | Count | | Amount | Count | | |
| 6794 | 05/04/2008 | 05/05/2008 | 73.00 | | 10 | 3.01 | | 1 | TestF |

Adjustment Results

| Adjustment Type | Currency Variance | | Voucher Variance | |
|---|---|---|---|---|
| | Amount | Count | Amount | Count |
| Before Adjustment | 0.00 | 0 | 0.00 | 0 |
| After Adjustment | 0.00 | 0 | 0.00 | 0 |

What would you like to do:
◉ Change the business day of the count record
○ Change the business day of the drop record Reason [_____>]  ☐ Save Reason

[Make Adjustment]  [Cancel]

Voucher Not Paid Wizard

Voucher Exceptions

| Validation ID | Amount | Business Day | Counted for Machine | Count Room |
|---|---|---|---|---|
| 190060050065559494 | 27.50 | 04/14/2008 | PT060-02 | R0002 |

Adjustment Results

| Adjustment Type | Variance | |
|---|---|---|
| | Amount | Count |
| Before Adjustment | 27.50 | 1 |
| After Adjustment | 0.00 | 0 |

What would you like to do:
- ⦿ Change the status of selected vouchers to Paid
- ○ Invalidate selected vouchers from the count file Reason [ ∨ ] ☐ Save Reason

[ Make Adjustment ] [ Cancel ]

Voucher Printed Wizard

Machine Variance

| Machine ID | Variance | | Machine Metered | | System Reported | |
|---|---|---|---|---|---|---|
| | Amount | Count | Amount | Count | Amount | Count |
| 6794 | 26.25 | 5 | 8326.71 | 123 | 8352.96 | 128 |

Adjustment Results

| Adjustment Type | Variance | |
|---|---|---|
| | Amount | Count |
| Before Adjustment | 26.25 | 5 |
| After Adjustment | 0.00 | 0 |

What would you like to do

◉ Update the machine summary Voucher Printed meters with the count and amount from the vouchering system ☐ Save Reason Reason: [            ⌄]

[Make Adjustment]  [Cancel]

Voucher Paid Wizard

Machine Variance

| Machine ID | Variance | | Machine Metered | | System Reported | |
|---|---|---|---|---|---|---|
| | Amount | Count | Amount | Count | Amount | Count |
| PT060-02 | 5408.63 | 101 | 70.50 | 2 | 5479.13 | 103 |

Adjustment Results

| Adjustment Type | Variance | |
|---|---|---|
| | Amount | Count |
| Before Adjustment | 5,408.63 | 101 |
| After Adjustment | 0.00 | 0 |

What would you like to do

⦿ Update the machine summary Voucher Paid meters with the count and amount from the vouchering system Reason: [         ∨]   ☐ Save Reason

[Make Adjustment]   [Cancel]

Jackpot Printed Wizard

Machine Variance

| Machine ID | Variance | | Machine Metered | | System Reported | |
|---|---|---|---|---|---|---|
| | Amount | Count | Amount | Count | Amount | Count |
| PT060-02 | -23.50 | -4 | 55.25 | 13 | 31.75 | 9 |

Adjustment Results

| Adjustment Type | Variance | |
|---|---|---|
| | Amount | Count |
| Before Adjustment | -23.50 | -4 |
| After Adjustment | 0.00 | 0 |

What would you like to do

⦿ Update the machine summary Jackpot Printed meters with the count and amount from the Jackpot system Reason: [          >]   ☐ Save Reason

[ Make Adjustment ]   [ Cancel ]

Promo Coupon Wizard

Machine Variance

| Machine ID | Variance | | Machine Metered | | System Reported | |
|---|---|---|---|---|---|---|
| | Amount | Count | Amount | Count | Amount | Count |
| PT060-05 | 0.37 | 36 | 0.00 | 0 | 0.37 | 36 |
| 6794 | 0.32 | 31 | 0.00 | 0 | 0.32 | 31 |
| PT090-09 | 0.42 | 43 | 0.00 | 0 | 0.42 | 43 |
| PT060-01 | 0.30 | 26 | 0.00 | 0 | 0.30 | 26 |

Adjustment Results

| Adjustment Type | Variance | |
|---|---|---|
| | Amount | Count |
| Before Adjustment | 1.86 | 175 |
| After Adjustment | 0.00 | 0 |

What would you like to do

⦿ Update the machine summary Promo In meters with the count and amount from the Promo system ☐ Save Reason Reason: [          ]

[ Make Adjustment ]   [ Cancel ]

FIG. 43

WAT IN Wizard

Machine Variance

| Machine ID | Variance | | Machine Metered | | System Reported | |
|---|---|---|---|---|---|---|
| | WAT In Amount | WAT In Count | WAT In Amount | WAT In Count | WAT In Amount | WAT In Count |
| PT060-02 | -70.50 | -2 | 70.50 | 2 | 0.00 | 0 |

Adjustment Results

| Adjustment Type | Variance | |
|---|---|---|
| | Amount | Count |
| Before Adjustment | -70.50 | -2 |
| After Adjustment | 0.00 | 0 |

What would you like to do
- ● Update the machine summary meters with the count and amount from the vouchering system
- ○ Post balancing adjustment against WAT system using the delta from machine meters Validation ID [                    ]
Reason [System adjustment for meter out-of-range ▼]  ☐ Save Reason

[Make Adjustment]  [Cancel]

WAT Out Wizard

Machine Variance

| Machine ID | Variance | | Machine Metered | | System Reported | |
|---|---|---|---|---|---|---|
| | WAT Out Amount | WAT Out Count | WAT Out Amount | WAT Out Count | WAT Out Amount | WAT Out Count |
| 6794 | 10.00 | 1 | 0.00 | 0 | 10.00 | 1 |

Adjustment Results

| Adjustment Type | Variance | |
|---|---|---|
| | Amount | Count |
| Before Adjustment | 10.00 | 1 |
| After Adjustment | 0.00 | 0 |

What would you like to do
● Update the machine summary meters with the count and amount from the vouchering system
○ Post balancing adjustment against WAT system using the delta from machine meters Validation ID [System adjustment for meter out-of-range ▼]

Reason [ ] ☐ Save Reason

[ Make Adjustment ] [ Cancel ]

Voucher Printed Created Wizard

Voucher Exceptions

| Issue Text | Validation ID | Status | Amount | Printed | | |
|---|---|---|---|---|---|---|
| | | | | Business Day | Date and Time | Where |
| Printed on incorr... | 19009006000569... | Create | 250.00 | 04/13/2008 | 4/14/2008 12:... | PT090-06 |
| Printed on incorr... | 190090030141 4... | Create | 50.00 | 04/13/2008 | 4/14/2008 12:... | 6794 |
| Printed on incorr... | 190090030141 5... | Create | 52.50 | 04/13/2008 | 4/14/2008 12:... | 6794 |

Adjustment Results

| Adjustment Type | Variance | |
|---|---|---|
| | Amount | Count |
| Before Adjustment | 13708.74 | 178 |
| After Adjustment | 13356.24 | 175 |

What would you like to do:
- ● Change the business day of the selected vouchers
- ○ Accept the variance of the selected vouchers Reason [                    ∨ ]  ☐ Save Reason Select a business day < April 2008 >
Su Mo Tu We Th Fr Sa
       1  2  3  4  5
 6  7  8  9 10 11 12
13 14 15 16 17 18 19
20 21 22 23 24 25 26
27 28 29 30

☑ Open
☑ Closed
☑ Reopened
☑ Archived
☐ Current

Move to this business day [4/24/2008]

[ Make Adjustment ]  [ Cancel ]

Voucher Past Expiration Period Wizard

Voucher Exceptions

| Issue Text | Validation ID | Status | Amount | Business Day | Printed Date and Time | Where | B |
|---|---|---|---|---|---|---|---|
| Voucher past Ex... | 19009003011323... | Create | 3.75 | 03/13/2008 | 3/13/2008 7:5... | 6794 | |
| Voucher past Ex... | 19009003011323... | Create | 50.00 | 03/13/2008 | 3/13/2008 7:5... | 6794 | |
| Voucher past Ex... | 19009003011323... | Create | 12.50 | 03/13/2008 | 3/13/2008 7:5... | 6794 | |
| Voucher past Ex... | 19009006002943... | Create | 25.00 | 03/13/2008 | 3/13/2008 8:0... | PT090-06 | |

What would you like to do:

⦿ Change the status of the selected vouchers to  Expired  ▽    ☐ Save Reason

Reason _____

[Make Adjustment]  [Cancel]

No Accounting Meter Wizard ✕

Machine Variances

| Machine ID | System Reported Values | | | | | | | | | |
|---|---|---|---|---|---|---|---|---|---|---|
| | Vouchers Printed Amount | Vouchers Printed Count | Vouchers Paid Amount | Vouchers Paid Count | Jackpots Printed Amount | Jackpots Printed Count | Promo In Amount | Promo In Count | WAT IN Amount | WAT IN Count |
| 13554 | 0.00 | 0 | 0.00 | 0 | 0.00 | 0 | 0.00 | 0 | 0.00 | 0 |
| PT090-11 | 0.00 | 0 | 0.00 | 0 | 0.00 | 0 | 0.00 | 0 | 0.00 | 0 |
| PT060-03 | 0.00 | 0 | 0.00 | 0 | 0.00 | 0 | 0.00 | 0 | 0.00 | 0 |

Events and Meters

| Select | Event Name | Date and Time | Vouchers Printed Amount | Vouchers Printed Count | Vouchers Paid Amount | Vouchers Paid Count | Jackpots Printed Amount | Jackpots Printed Count | Promo In Amount | Promo In Count |
|---|---|---|---|---|---|---|---|---|---|---|
| ☐ | | | | | | | | | | |

Adjustment Results

| Currency Variance | | Voucher Variance | |
|---|---|---|---|
| Amount | | Amount | |
| | Count | | Count |

What would you like to do:
⦿ Generate EOD event from System Reported values
  Select available event to use as an EOD event
  [ ⌄ ]  ☐ Save Reason Reason [ _____ ]     [ Make Adjustment ]  [ Cancel ]

Voucher Paid Wizard

Machine Variance

| Machine ID | Variance | | Machine Metered | | System Reported | |
|---|---|---|---|---|---|---|
| | Amount | Count | Amount | Count | Amount | Count |
| PT090-03 | -30.00 | 0 | 30.00 | 0 | 0.00 | 0 |

Adjustment Results

| Adjustment Type | Variance | |
|---|---|---|
| | Amount | Count |
| Before Adjustment | -30.00 | 0 |
| After Adjustment | 0.00 | 0 |

What would you like to do

⦿ Update the machine summary Voucher Paid meters with the count and amount from the vouchering system ☐ Save Reason Reason: [         ]

[ Make Adjustment ]  [ Cancel ]

Jackpot Printed Wizard — 5900

Machine Variance

| Machine ID | Variance | | Machine Metered | | System Reported | |
|---|---|---|---|---|---|---|
| | Amount | Count | Amount | Count | Amount | Count |
| PT060-02 | -23.50 | -4 | 55.25 | 13 | 31.75 | 9 |

Adjustment Results

| Adjustment Type | Variance | |
|---|---|---|
| | Amount | Count |
| Before Adjustment | -23.50 | -4 |
| After Adjustment | 0.00 | 0 |

What would you like to do

⦿ Update the machine summary Jackpot Printed meters with the count and amount from the Jackpot system ☐ Save Reason Reason: [ ▾ ]

[ Make Adjustment ]   [ Cancel ]

FIG. 59

Promo Coupon Wizard

Machine Variance

| Machine ID | Variance | | Machine Metered | | System Reported | |
|---|---|---|---|---|---|---|
| | Amount | Count | Amount | Count | Amount | Count |
| 6794 | 0.32 | 31 | 0.00 | 0 | 0.32 | 31 |
| PT090-09 | 0.42 | 43 | 0.00 | 0 | 0.42 | 43 |
| PT060-01 | 0.30 | 26 | 0.00 | 0 | 0.30 | 26 |

Adjustment Results

| Adjustment Type | | Variance | |
|---|---|---|---|
| | | Amount | Count |
| Before Adjustment | | 1.03 | 100 |
| After Adjustment | | 0.00 | 0 |

What would you like to do

⦿ Update the machine summary Promo In meters with the count and amount from the Promo system ☐ Save Reason Reason: [_____]

[ Make Adjustment ]  [ Cancel ]

WAT In Wizard

Machine Variance

| Machine ID | Variance | | Machine Metered | | System Reported | |
|---|---|---|---|---|---|---|
| | WAT In Amount | WAT In Count | WAT In Amount | WAT In Count | WAT In Amount | WAT In Count |
| 6794 | 10.00 | 1 | 0.00 | 0 | 10.00 | 1 |
| PT090-06 | 10.00 | 1 | 0.00 | 0 | 10.00 | 1 |

Adjustment Results

| Adjustment Type | Variance | |
|---|---|---|
| | Amount | Count |
| Before Adjustment | 20.00 | 2 |
| After Adjustment | 0.00 | 0 |

What would you like to do
- ⦿ Update the machine summary meters with the count and amount from the vouchering system
- ○ Post balancing adjustment against WAT system using the delta from machine meters Validation ID [        ]

Reason [System adjustment for meter out-of-range ▼]    ☐ Save Reason

[ Make Adjustment ]    [ Cancel ]

WAT Out Wizard

Machine Variance

| Machine ID | Variance | | Machine Metered | | System Reported | |
|---|---|---|---|---|---|---|
| | WAT Out Amount | WAT Out Count | WAT Out Amount | WAT Out Count | WAT Out Amount | WAT Out Count |
| 6794 | 10.00 | 1 | 0.00 | 0 | 10.00 | 1 |

Adjustment Results

| Adjustment Type | Variance | |
|---|---|---|
| | Amount | Count |
| Before Adjustment | 10.00 | 1 |
| After Adjustment | 0.00 | 0 |

What would you like to do
- ● Update the machine summary meters with the count and amount from the vouchering system
- ○ Post balancing adjustment against WAT system using the delta from machine meters Validation ID [          ]

Reason [System adjustment for meter out-of-range ▽]   ☐ Save Reason

[Make Adjustment]   [Cancel]

Meter Adjustment — 7200

| Row Type | Date and Time | Event | Gaming Day | $1 In Delta | $1 In Adjustment | $5 In Delta | $5 In Adjustment | $10 In Delta | $10 In Adj |
|---|---|---|---|---|---|---|---|---|---|
| Raw | 1/17/2008 12:00 A... | End of Day | 1/16/2008 | 0.00 | | 0.00 | | 0.00 | |
| Raw | 1/17/2008 12:00 A... | Drop | 1/16/2008 | 1.00 | | 5.00 | | 10.00 | |
| Raw | 1/17/2008 12:00 A... | Drop | 1/16/2008 | 1.00 | | 15.00 | | 0.00 | |
| Raw | 1/17/2008 12:00 A... | Cabinet Door Op... | | | | | | | |
| Raw | 1/17/2008 12:00 A... | Note Stacked | | | | | | | |

Proposed Change:

| Gaming Day Totals | | | | 2.00 | | 20.00 | | 10.00 | |

Type of Adjustment to Perform
- ○ Invalidate these Events
- ○ Move these Events to different gaming day Calculate New Deltas
- ○ Make these Events as a drop Events Perform Manual Adjustments Reason: [ ___ ∨ ]  ☐ Save Reason Columns to Display
- ☐ Meter Start        ☑ $1 In Amount
- ☐ Meter End          ☐ $2 In Amount
- ☑ Meter Delta        ☑ $5 In Amount
- ☑ Adjustments        ☑ $10 In Amount
- ☐ Adjusted Delta     ☑ $20 In Amount
                       ☑ $50 In Amount

[ Make Adjustment ]
[ Cancel ]

[ Show Meters Having Values ]
[ Show Meters Having Adjustments ]

FIG.72

| Meter Adjustment | | | | | | | | | – □ × |
|---|---|---|---|---|---|---|---|---|---|
| | | | | | $1 In | | $5 In | | $10 In |
| Row Type | Date and Time | Event | Gaming Day | | Delta | Adjustment | Delta | Adjustment | Delta | Adj |
| Raw | 1/17/2008 12:00 A... | End of Day | 1/16/2008 | | 0.00 | | 0.00 | | 0.00 | |
| Raw | 1/17/2008 12:00 A... | Drop | 1/16/2008 | | 1.00 | | 5.00 | | 10.00 | |
| Raw | 1/17/2008 12:00 A... | Drop | 1/16/2008 | | 1.00 | | 15.00 | | 0.00 | |
| Raw | 1/17/2008 12:00 A... | Cabinet Door Op... | | | | | | | | |
| Raw | 1/17/2008 12:00 A... | Note Stacked | | | | | | | | |
| Proposed Change: | | | | | | | | | | |
| Gaming Day Totals | | | | | 2.00 | | 20.00 | | 10.00 | |
| System Values | | | | | | | | | | |
| Variances | | | | | | | | | | |

March 2008
Su Mo Tu We Th Fr Sa
             1
2  3  4  5  6  7  8
9  10 11 12 13 14 15
16 17 18 19 20 21 22
23 24 25 26 27 28 29
30 31

☒ Open
☒ Closed
☒ Reopened
☒ Archived
☐ Current

Show Meters Having Values
Show Meters Having Adjustments

Type of Adjustment to Perform
○ Invalidate these Events
● Move these Events to different gaming day
○ Calculate New Deltas
○ Make these Events as a drop Events
○ Perform Manual Adjustments Reason: [        ∨]  ☐ Save Reason Columns to Display
☐ Meter Start    ☒ $1 In Amount
☐ Meter End      ☐ $2 In Amount
☒ Meter Delta    ☒ $5 In Amount
☒ Adjustments    ☒ $10 In Amount
☐ Adjusted Delta ☒ $20 In Amount
                 ☒ $50 In Amount Make Adjustment
Cancel

FIG. 73

Meter Adjustment — 7400

| Row Type | Date and Time | Event | Gaming Day | Games Played C | Money Played A | Win Amounts | | Vouchers Printed | |
|---|---|---|---|---|---|---|---|---|---|
| | | | | | | Game Won Amo | | Amount | Counts |
| | | | | Delta | Delta | Delta | Delta | Delta | Delta |
| Raw | 1/18/2008 12:00 A... | End of Day | 1/17/2008 | 9562 | 11,952.50 | 17,903.04 | | 5,948.51 | 178 |
| Current Values | | | | 9562 | 11,952.50 | 17,903.04 | | 5,948.51 | 178 |
| Add to Delta | | | | 1 | 100.00 | 0.00 | | 0.00 | 0 |
| Find Delta | | | | 9563 | 12,052.50 | 17,903.04 | | 5,948.51 | 178 |
| Proposed Change: | | | | | | | | | |
| Gaming Day Totals | | | | 9563 | 12,052.50 | 17,903.04 | | 5,948.51 | 1 |
| System Values | | | | | | | | 5.00 | |
| Variances | | | | | | | | 5,943.51 | 177 |

Type of Adjustment to Perform:
- ○ Invalidate these Events
- ○ Move these Events to different gaming day
  - Calculate New Deltas
- ○ Make these Events as a drop Events
- ● Perform Manual Adjustments Reason: [  ▾  ] ☐ Save Reason Columns to Display:
- ☐ Meter Start     ☐ $1000 in Count       ☑ Games Played Count
- ☐ Meter End       ☑ Bills In Count       ☑ Money Played Amount
- ☑ Meter Delta                              ☑ Games Won Amount Show Meters Having Values
Show Meters Having Adjustments
☐ Show Adjustments

[ Make Adjustment ]
[ Cancel ]

FIG. 74

| Meter Adjustment | | | | |
|---|---|---|---|---|
| Row Type | Date and Time | Event | Gaming Day | |
| Raw | 1/17/2008 12:00 A... | End of Day | 1/16/2008 | |
| Current Values | | | | |
| Add to Delta | | | | |
| Final Delta | | | | |
| | | | | |
| Raw | 1/17/2008 12:00 A... | Drop | 1/16/2008 | |
| Current Values | | | | |
| Add to Delta | | | | |
| Final Delta | | | | |
| | | | | |
| Raw | 1/17/2008 12:00 A... | Drop | 1/16/2008 | |
| Current Values | | | | |
| Add to Delta | | | | |
| Final Delta | | | | |
| | | | | |
| Proposed Change: | | | | |
| Gaming Day Totals | | | | |
| System Values | | | | |
| Variances | | | | |

Type of Adjustment to Perform
- ○ Invalidate these Events
- ○ Move these Events to different gaming day
- ⊙ Calculate New Deltas
- ○ Make these Events as a drop Events
  Perform Manual Adjustments Reason: [            ▼]  ☐ Save Reason Columns to Display
- ☐ Meter Start
- ☐ Meter End
- ☑ Meter Delta

- ☑ $1 in Amount
- ☐ $2 In Amount
- ☑ $5 In Amount
- ☑ $10 In Amount
- ☑ $20 In Amount
- ☑ $50 In Amount

[ Show Meters Having Values ]
[ Show Meters Having Adjustments ]

FIG.75A

| $1 In | | $5 In | | $10 In | | $20 In | |
|---|---|---|---|---|---|---|---|
| Delta | x | Delta | x | Delta | x | Delta | x |
| 0.00 | | 0.00 | | 0.00 | | 0.00 | |
| 0.00 | | 0.00 | | 0.00 | | 0.00 | |
| 0.00 | | 0.00 | | 0.00 | | 0.00 | |
| 0.00 | ☑ | 0.00 | ☐ | 0.00 | ☐ | 0.00 | ☐ |
| 1.00 | | 5.00 | | 10.00 | | 20.00 | |
| 1.00 | | 5.00 | | 10.00 | | 20.00 | |
| 0.00 | | 0.00 | | 0.00 | | 0.00 | |
| 1.00 | ☐ | 5.00 | ☐ | 10.00 | ☐ | 20.00 | ☐ |
| 1.00 | | 15.00 | | 0.00 | | 20.00 | |
| 1.00 | | 15.00 | | 0.00 | | 20.00 | |
| -1.00 | | 0.00 | | 0.00 | | 0.00 | |
| 0.00 | ☑ | 15.00 | ☐ | 0.00 | ☐ | 20.00 | ☐ |
| 1.00 | | 20.00 | | 10.00 | | 40.00 | |

Bills In Amount — 7500

Make Adjustment
Cancel

FIG. 75B

System Adjustment Voucher Paid

Variance before adjustment

- Machine reported: 4840.47
- System reported: 29981.25
- Variance: -25140.78

Adjustment Results

- Total Count of Items moved: 1
- Total Amount of Items moved: 151.50
- Old Variance: -25140.78
- Adjustment: 152.00
- New Variance: -25292.78

Select a business day

March 2008

| Su | Mo | Tu | We | Th | Fr | Sa |
|----|----|----|----|----|----|----|
|    |    |    |    |    |    | 1  |
| 2  | 3  | 4  | 5  | 6  | 7  | 8  |
| 9  | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |    |    |    |    |    |

☑ Open
☑ Closed
☑ Reopened
☑ Archived
☐ Current

Move to this business day: 3/24/2008

Reason: Caused by EOD Window

☐ New reason

Make Adjustment   Cancel

FIG. 76

Daily Total — 7700

| Meter Name | Machine Reported | | System Reported | | Variance | | System Adjustment Totals | Manual Adjustment Totals |
|---|---|---|---|---|---|---|---|---|
| | Amount | Count | Amount | Count | Amount | Count | | |
| Voucher Prin... | 6739.25 | 134 | 9588.49 | 149 | -2849.24 | -15 | 0.00 | 0.00 |

What would you like to do

⊙ Update the machine summary Daily Adjustment meters with the count and amount from the Daily Totals Reason: [   ∨ ]    ☐ Save Reason

[ Make Adjustment ]    [ Cancel ]

Machine Variances

| Meter Name | Machine Reported | | System Reported | | Variance | | System Adjustment Totals | Manual Adjustment Totals |
|---|---|---|---|---|---|---|---|---|
| | Amount | Count | Amount | Count | Amount | Count | | |
| WAT Out | 0.00 | 0 | 0.00 | 0 | 0.00 | 0 | 0.00 | 0.00 |
| WAT In | 0.00 | 0 | 0.00 | 0 | 0.00 | 0 | 0.00 | 0.00 |
| Voucher Printed | 212151.87 | 6027 | 753091.50 | 21350 | -540939.63 | 15323 | 0.00 | 0.00 |
| Voucher Paid | 0.00 | 0 | 0.00 | 0 | 0.00 | 0 | 0.00 | 0.00 |
| Promo In | 0.00 | 0 | 0.00 | 0 | 0.00 | 0 | 0.00 | 0.00 |
| Money Won | 772234.12 | 0 | 0.00 | 0 | 772234.12 | 0 | 0.00 | 0.00 |
| Money Played | 563683.75 | 0 | 0.00 | 0 | 563683.75 | 0 | 0.00 | 0.00 |
| Jackpot Printed | 0.00 | 0 | 0.00 | 0 | 0.00 | 0 | 0.00 | 0.00 |
| Games Played | 0.00 | 450996 | 0.00 | 0 | 0.00 | 450996 | 0.00 | 0.00 |
| Bill In 500$ | 0.00 | 0 | 0.00 | 0 | 0.00 | 0 | 0.00 | 0.00 |
| Bill In 50$ | 0.00 | 0 | 0.00 | 0 | 0.00 | 0 | 0.00 | 0.00 |
| Bill In 5$ | 0.00 | 0 | 0.00 | 0 | 0.00 | 0 | 0.00 | 0.00 |
| Bill In 20$ | 0.00 | 0 | 0.00 | 0 | 0.00 | 0 | 0.00 | 0.00 |
| Bill In 2$ | 0.00 | 0 | 0.00 | 0 | 0.00 | 0 | 0.00 | 0.00 |
| Bill In 1000$ | 0.00 | 0 | 0.00 | 0 | 0.00 | 0 | 0.00 | 0.00 |
| Bill In 100$ | 0.00 | 0 | 0.00 | 0 | 0.00 | 0 | 0.00 | 0.00 |
| Bill In 10$ | 0.00 | 0 | 0.00 | 0 | 0.00 | 0 | 0.00 | 0.00 |
| Bill In 1$ | 0.00 | 0 | 0.00 | 0 | 0.00 | 0 | 0.00 | 0.00 |

NETWORKED GAMING SYSTEM WITH ENTERPRISE ACCOUNTING METHODS AND APPARATUS

CROSS-REFERENCE TO RELATED APPLICATIONS

This application claims benefit under 35 U.S.C. 119(e) from U.S. provisional patent application Ser. No. 61/055,974, filed May 24, 2008, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Technical Field

The various inventions described here pertain generally to management systems and methods, and more particularly to computerized methods and systems for collecting data, reporting, auditing, identifying variances, and correcting reports of game- or gaming-related financial activities from one or more sites and one or more game or gaming platforms.

2. Description of Related Art

Various networked gaming systems have been developed to perform various tasks and assignments concerned with the monitoring and managing of gaming machines.

One of the areas which are subject to significant scrutiny involve the tallying, reporting, and auditing of proceeds from gaming machines. Largely, this has been a time intensive task which has been prone to human error as well as data misinformation resulting in erroneous reports. There has thus continued to be a need for the development of automated accounting, auditing, and data/report correcting systems.

SUMMARY OF THE INVENTION

A computer-implemented method of operating a gaming related accounting system may be summarized as including at an enterprise accounting system, receiving accounting related information from one of at least a table game management system, a slot management system, or a bingo management system; at the enterprise accounting system, receiving accounting related information from another one of the table game management system, the slot management system, or the bingo management system; and computationally processing the received accounting related information at the enterprise accounting system.

The method may further include computationally identifying at least one variance in the received accounting related information; and in response to a user input, computationally correcting the at least one identified variance in the accounting related information.

The method may further include displaying at least a portion of a graphical user interface including a plurality of user selectable icons, at least one of the user selectable icons indicative of a first wizard function; and displaying a first set of user prompts in response to a selection of the user selectable icon indicative of the first wizard function.

The method may further include based at least in part on a first set of user inputs provided by a user in response to the first set of user prompts, computationally identifying at least one variance in the received accounting related information.

The method may further include in response to a user input indicative of a selection to fix a variance, computationally correcting the at least one identified variance in the accounting related information.

The method may further include determining whether a first set of the processed accounting related information is balanced; storing the first set of the processed accounting related information in an audit database; later, storing the first set of the processed accounting related information in an archive database, and deleting the first set of the processed accounting related information from the audit database in response to the storing of the first set of the processed accounting related information to the archive database.

The method may further include computationally generating at least a first report based on the processed accounting related information; and storing at least the first report in a report database. Receiving accounting related information from one of at least a table game management system, a slot management system, or a bingo management system may include receiving accounting related information from a first site and receiving accounting related information from a second site remotely located from the first site. Receiving accounting related information from one of at least a table game management system, a slot management system, or a bingo management system may include receiving at least one of raw meter information, gaming event information, gaming voucher information, progressive gaming information, gaming system status information, cash information, jackpot information, electronic account transfer information or cashier information. Receiving accounting related information from one of at least a table game management system, a slot management system, or a bingo management system may include receiving the accounting related information from a database associated with at least one gaming machine.

The method may further include displaying at least a portion of a graphical user interface including a calendar having days that are color coded to indicated whether the day is at least one of open, closed or archived with respect to an accounting for each of the days.

The method may further include displaying a graphical representation of variance in the accounting information.

The method may further include in response to a user input indicative of a selection to audit system financials, displaying a status of each of a number of days showing at least some variances, if any, for each of a plurality of casino floor areas.

A gaming related enterprise accounting system may be summarized as including at least one enterprise accounting computing system communicatively coupled to receive accounting related information from at least two of a table game management system, a slot management system, a bingo management system, progressive gaming management system, jackpot management system, a voucher management system, the enterprise accounting computing system comprising at least one processor and at least one processor-readable storage medium that stores instructions that cause the at least one processor to process gaming related information, by: computationally processing the received accounting related information from at least two of the table game management system, the slot management system, the bingo management system, progressive gaming management system, jackpot management system, or the voucher management system.

The gaming related enterprise accounting system wherein the at least one processor-readable storage medium may store instructions that cause the at least one processor to process gaming related information, further by: computationally identifying at least one variance in the received accounting related information; and in response to a user input, computationally correcting the at least one identified variance in the accounting related information.

The gaming related enterprise accounting system wherein the at least one processor-readable storage medium may store instructions that cause the at least one processor to process gaming related information, further by: displaying at least a portion of a graphical user interface including a plurality of user selectable icons, at least one of the user selectable icons indicative of a first wizard function; and displaying a first set of user prompts in response to a selection of the user selectable icon indicative of the first wizard function.

The gaming related enterprise accounting system wherein the at least one processor-readable storage medium may store instructions that cause the at least one processor to process gaming related information, further by: based at least in part on a first set of user inputs provided by a user in response to the first set of user prompts, computationally identifying at least one variance in the received accounting related information.

The gaming related enterprise accounting system wherein the at least one processor-readable storage medium may store instructions that cause the at least one processor to process gaming related information, further by: in response to a user input indicative of a selection to fix a variance, computationally correcting the at least one identified variance in the accounting related information.

The gaming related enterprise accounting system wherein the at least one processor-readable storage medium may store instructions that cause the at least one processor to process gaming related information, further by: determining whether a first set of the processed accounting related information is balanced; storing the first set of the processed accounting related information in an audit database; later, storing the first set of the processed accounting related information in an archive database, and deleting the first set of the processed accounting related information from the audit database in response to the storing of the first set of the processed accounting related information to the archive database.

The gaming related enterprise accounting system wherein the at least one processor-readable storage medium may store instructions that cause the at least one processor to process gaming related information, further by: displaying at least a portion of a graphical user interface including a calendar having days that are color coded to indicated whether the day is at least one of open, closed or archived with respect to an accounting for each of the days; and displaying a graphical representation of variance in the accounting information.

The gaming related enterprise accounting system may further include at least two of the table game management system, the slot management system, the bingo management system, progressive gaming management system, jackpot management system, or the voucher management system.

A computer-implemented method of operating a gaming related accounting system may be summarized as including displaying at least a portion of a graphical user interface including a plurality of user selectable icons, at least one of the user selectable icons indicative of a first wizard function; and in response to a selection of the user selectable icon indicative of the first wizard function, executing the first wizard function, wherein executing the first wizard function comprises: identifying any suspected variances in gaming related accounting information; displaying indicia indicative of a set of accounting related data items having identified suspected variances.

The method wherein executing the first wizard function may further include receiving at least one user input indicative of a user selection of at least one of the accounting related data items having at least one identified suspected variances; and determining a set of adjustments to correct the at least one suspected variance in any of the selected ones of the accounting related data items. Receiving at least one user input indicative of a user selection of at least one of the accounting related data items having at least one identified suspected variance may include receiving a single user input indicative of all of the accounting related data items having at least one identified suspected variance, and wherein determining a set of adjustments to correct the at least one suspected variance in any of the selected ones of the accounting related data items may include determining a set of adjustments to correct the at least one suspected variance in all of the selected ones of the accounting related data items.

The method wherein executing the first wizard function may further include displaying information indicative of the determined set of adjustments; receiving a user input indicative of an acceptance of the determined set of adjustments; and automatically computationally correcting the at least one suspected variance in the selected ones of the accounting related data items in response to the received user input indicative of the acceptance of the determined set of adjustments.

The method wherein executing the first wizard function may further include maintaining an audit log of any adjustments made in computationally correcting the at least one suspected variance in the selected ones of the accounting related data items.

The method wherein executing the first wizard function may further include displaying a number of queries requesting at least one piece of information related to the at least one identified suspected variance; and receiving at least one user input providing a response to the queries.

The method of claim 21 may further include receiving a user input indicative of a floor area associated with at least one unresolved variance; and displaying a set of detailed accounting information each gaming device having an unresolved variance in response to the user input indicative of indicative of the floor area. Identifying any suspected variances in gaming related accounting information may include identifying any instances of gaming devices that are active on a gaming floor not sending an end-of-day record. Identifying any suspected variances in gaming related accounting information may include identifying any instances of gaming devices that are not active on a gaming floor sending an end-of-day record. Identifying any suspected variances in gaming related accounting information may include identifying any instances of a meter reported value for vouchers printed by a gaming device differs from a value reported by a voucher system. Identifying any suspected variances in gaming related accounting information may include identifying any instances of a meter reported value for vouchers paid by a gaming device differs from a value reported by a voucher system. Identifying any suspected variances in gaming related accounting information may include identifying any instances of a meter reported value for jackpot vouchers printed by a gaming device differs from a value reported by a voucher system. Identifying any suspected variances in gaming related accounting information may include identifying any instances of a meter reported value for promotional vouchers paid by a gaming device differs from a value reported by a voucher system. Identifying any suspected variances in gaming related accounting information may include identifying any instances where a meter reported value for a wagering account transfer differs from a value reported by a wagering account transfer system. Identifying any suspected variances in gaming related accounting information may include identifying any instances where a meter reported value for a wagering account transfer out differs from a value reported by a wagering account transfer system. Identifying any suspected variances in gaming related accounting information may include identifying any suspected instances of switched canisters. Identifying any suspected variances in gaming related accounting information may include identifying any instances of a piece of drop meter information being recorded for an incorrect business day. Identifying any suspected variances in gaming related accounting information may include identifying any instances of a drop event record being sent by a gaming device on a floor, but where no counted data was reported by a count room for the gaming device. Identifying any suspected variances in gaming related accounting information may include identifying any instances of a count room reporting counted data for a gaming device but the gaming device did not send a drop event record. Identifying any suspected variances in gaming related accounting information may include identifying any instances of a voucher being counted by a count room but the voucher system did not report that the that the voucher had been paid. Identifying any suspected variances in gaming related accounting information may include identifying any instances of a count room encountering two or more separate vouchers identified with a same machine-readable identifier. Identifying any suspected variances in gaming related accounting information may include identifying any instances of a voucher system reporting that a voucher was inserted into a gaming device, but a corresponding payment was not completed. Identifying any suspected variances in gaming related accounting information may include identifying any gaming device identifying any instances where, based on at least one of a voucher printed date or a voucher paid date, a voucher record appears to specify an incorrect business day. Identifying any suspected variances in gaming related accounting information may include identifying any instances where a voucher appears to have been paid before the voucher was actually created. Identifying any suspected variances in gaming related accounting information may include identifying any instances a voucher is expired, but the voucher system has not reported the expiration of the voucher. Identifying any suspected variances in gaming related accounting information may include identifying any instances where a voucher system reports that a voucher was printed or paid by a gaming device that is not known.

A gaming related enterprise accounting system may be summarized as including at least one enterprise accounting computing system communicatively coupled to receive accounting related information, the enterprise accounting computing system comprising at least one processor and at least one processor-readable storage medium that stores instructions that cause the at least one processor to process gaming related information, by: displaying at least a portion of a graphical user interface including a plurality of user selectable icons, at least one of the user selectable icons indicative of a first wizard function; and in response to a selection of the user selectable icon indicative of the first wizard function, executing the first wizard function, wherein executing the first wizard function comprises: identifying any suspected variances in gaming related accounting information; displaying indicia indicative of a set of accounting related data items having identified suspected variances.

The gaming related enterprise accounting system wherein executing the first wizard function may further include receiving at least one user input indicative of a user selection of at least one of the accounting related data items having at least one identified suspected variances; and determining a set of adjustments to correct the at least one suspected variance in any of the selected ones of the accounting related data items.

The gaming related enterprise accounting system wherein executing the first wizard function may further include displaying information indicative of the determined set of adjustments; receiving a user input indicative of an acceptance of the determined set of adjustments; and automatically computationally correcting the at least one suspected variance in the selected ones of the accounting related data items in response to the received user input indicative of the acceptance of the determined set of adjustments. Identifying any suspected variances in gaming related accounting information may include identifying at least one of any instances of gaming devices that are active on a gaming floor not sending a respective end-of-day record or any instances of gaming devices that are not active on the gaming floor sending a respective end-of-day record. Identifying any suspected variances in gaming related accounting information may include identifying at least one of any instances of a meter reported value for vouchers printed by a gaming device that differs from a value reported by a voucher system or any instances of the meter reported value for vouchers paid by the gaming device that differs from the value reported by the voucher system. Identifying any suspected variances in gaming related accounting information may include identifying at least one of or any instances of the meter reported value for jackpot vouchers printed by the gaming device that differs from the value reported by the voucher system or any instances of the meter reported value for promotional vouchers paid by the gaming device that differs from the value reported by the voucher system. Identifying any suspected variances in gaming related accounting information may include identifying at least one of any instances where a meter reported value for a wagering account transfer differs from a value reported by a wagering account transfer system or identifying any instances where the meter reported value for a wagering account transfer out differs from the value reported by the wagering account transfer system. Identifying any suspected variances in gaming related accounting information may include identifying any suspected instances of switched canisters. Identifying any suspected variances in gaming related accounting information may include identifying at least one of any instances of a piece of drop meter information being recorded for an incorrect business day or any instances of a drop event record being sent by a gaming device on a floor where no counted data was reported by a count room for the gaming device, or any instances of the count room reporting counted data for the gaming device but the gaming device did not send a corresponding drop event record. Identifying any suspected variances in gaming related accounting information may include identifying at least one of any instances of a voucher being counted by a count room but the voucher system did not report that the that the voucher had been paid, or any instances of the count room encountering two or more separate vouchers identified with a same machine-readable identifier. Identifying any suspected variances in gaming related accounting information may include identifying at least one of any instances of a voucher system reporting that a voucher was inserted into a gaming device but a corresponding payment was not completed or any instances where, based on at least one of a voucher printed date or a voucher paid date, a voucher record appears to specify an incorrect business day. Identifying any suspected variances in gaming related accounting information may include identifying at least one of any instances where a voucher appears to have been paid before the voucher was actually created or any instances where a voucher is expired but a voucher system has not reported the expiration of the voucher, or any instances where the voucher system reports that the voucher was printed or paid by a gaming device that is not known to the gaming related enterprise accounting system.

A computer-implemented method of correlating canisters in a gaming related accounting system may be summarized as including receiving accounting related information that defines a first set of identifiers and corresponding currency counts and a second set of identifiers and corresponding voucher information; and computationally correlating the currency counts to the voucher information based on the identifiers. Computationally correlating the currency counts to the voucher information based on the identifiers may include correlating the currency counts to the voucher information to account for identifiers having either no currency count or no voucher information. Computationally correlating the currency counts to the voucher information based on the identifiers may include correlating consecutive runs of the identifiers between the first and the second sets, from a longest run of the identifiers to a shortest run of the identifiers. Correlating consecutive runs of the identifiers between the first and the second sets, from a longest run of the identifiers to a shortest run of the identifiers may include identifying a longest string of the identifiers that appear consecutively in the first sets for which there is a matching string of the identifiers that appear consecutively in the second set, and correlating the currency counts and voucher information corresponding to the identifiers in the longest string before correlating the currency counts and voucher information corresponding to the identifiers in any shorter strings of identifiers that appear consecutively in the first set and for which there is a matching string of identifiers that appear consecutively in the second set.

Correlating consecutive runs of the identifiers between the first and the second sets, from a longest run of the identifiers to a shortest run of the identifiers may further include identifying a next longest string of the identifiers that appear consecutively in the first sets for which there is a matching string of the identifiers that appear consecutively in the second set, and correlating the currency counts and voucher information corresponding to the identifiers in the next longest string before correlating the currency counts and voucher information corresponding to the identifiers in any shorter strings of identifiers that appear consecutively in the first set and for which there is a matching string of identifiers that appear consecutively in the second set. Receiving accounting related information that defines a first set of identifiers and corresponding currency counts and a second set of identifiers and corresponding voucher information may include receiving accounting related information where at least some of the identifiers in the first set are the same as respective ones of at least some of the identifiers in the second set. Receiving accounting related information that defines a first set of identifiers and corresponding currency counts and a second set of identifiers and corresponding voucher information may include receiving accounting related information where all of the identifiers in the first set are the same as respective ones of all of the identifiers in the second set. Receiving accounting related information that defines a first set of identifiers and corresponding currency counts and a second set of identifiers and corresponding voucher information may include receiving accounting related information where the identifiers in the first and the second sets are terminal identifiers that uniquely identify a terminal. Receiving accounting related information that defines a first set of identifiers and corresponding currency counts and a second set of identifiers and corresponding voucher information may include receiving accounting related information where the identifiers in the first and the second sets are terminal identifiers that uniquely identify a canister that contains at least one of currency or vouchers.

A gaming related enterprise accounting system may be summarized as including at least one enterprise accounting computing system communicatively coupled to receive accounting related information, the enterprise accounting computing system comprising at least one processor and at least one processor-readable storage medium that stores instructions that cause the at least one processor to process gaming related information, by: receiving accounting related information that defines a first set of identifiers and corresponding currency counts and a second set of identifiers and corresponding voucher information; and computationally correlating the currency counts to the voucher information based on the identifiers. Computationally correlating the currency counts to the voucher information based on the identifiers may include correlating the currency counts to the voucher information to account for identifiers having either no currency count or no voucher information. Computationally correlating the currency counts to the voucher information based on the identifiers may include correlating consecutive runs of the identifiers between the first and the second sets, from a longest run of the identifiers to a shortest run of the identifiers. Correlating consecutive runs of the identifiers between the first and the second sets, from a longest run of the identifiers to a shortest run of the identifiers may include identifying a longest string of the identifiers that appear consecutively in the first sets for which there is a matching string of the identifiers that appear consecutively in the second set, and correlating the currency counts and voucher information corresponding to the identifiers in the longest string before correlating the currency counts and voucher information corresponding to the identifiers in any shorter strings of identifiers that appear consecutively in the first set and for which there is a matching string of identifiers that appear consecutively in the second set.

Correlating consecutive runs of the identifiers between the first and the second sets, from a longest run of the identifiers to a shortest run of the identifiers may further include identifying a next longest string of the identifiers that appear consecutively in the first sets for which there is a matching string of the identifiers that appear consecutively in the second set, and correlating the currency counts and voucher information corresponding to the identifiers in the next longest string before correlating the currency counts and voucher information corresponding to the identifiers in any shorter strings of identifiers that appear consecutively in the first set and for which there is a matching string of identifiers that appear consecutively in the second set. Receiving accounting related information that defines a first set of identifiers and corresponding currency counts and a second set of identifiers and corresponding voucher information may include receiving accounting related information where at least some of the identifiers in the first set are the same as respective ones of at least some of the identifiers in the second set. Receiving accounting related information that defines a first set of identifiers and corresponding currency counts and a second set of identifiers and corresponding voucher information may include receiving accounting related information where all of the identifiers in the first set are the same as respective ones of all of the identifiers in the second set. Receiving accounting related information that defines a first set of identifiers and corresponding currency counts and a second set of identifiers and corresponding voucher information may include receiving accounting related information where the identifiers in the first and the second sets are terminal identifiers that uniquely identify a terminal. Receiving accounting related information that defines a first set of identifiers and corresponding currency counts and a second set of identifiers and corresponding voucher information may include receiving accounting related information where the identifiers in the first and the second sets are terminal identifiers that uniquely identify a canister that contains at least one of currency or vouchers.

A computer-implemented method of processing gaming related transactions in a gaming related accounting system may be summarized as including receiving a first voucher for redemption at a first gaming site, the first voucher distributed printed at a second game site that is remote from the first gaming site; computationally evaluating at least one characteristic of the first voucher; and determining whether to authorized the redemption of the first voucher based at least in part on the evaluation of the at least one characteristic of the first voucher. Determining whether to authorized the redemption of the first voucher based at least in part on the evaluation of the at least one characteristic of the first voucher may include determining at the first gaming site whether to authorized the redemption of the first voucher based at least in part on the evaluation of the at least one characteristic of the first voucher.

The computer-implemented method wherein determining whether to authorized the redemption of the first voucher based at least in part on the evaluation of the at least one characteristic of the first voucher may include determining at a location remote from the first gaming site whether to authorized the redemption of the first voucher based at least in part on the evaluation of the at least one characteristic of the first voucher; and may further include transmitting at least one signal to the first gaming site indicative of whether or not the redemptions of the first voucher is authorized. Receiving a first voucher for redemption at a first gaming site may include machine-reading information from the first voucher at the first gaming site. Computationally evaluating at least one characteristic of the first voucher may include confirming that a paid state of the first voucher is identified as unpaid in a voucher database. Computationally evaluating at least one characteristic of the first voucher may include confirming that an expiration date of the first voucher has not expired as identified in a voucher database. Computationally evaluating at least one characteristic of the first voucher may include verifying an amount value of the first voucher against an amount value in a voucher database. Computationally evaluating at least one characteristic of the first voucher may include confirming that an issue date of the first voucher is not after a current date. Computationally evaluating at least one characteristic of the first voucher may include confirming that a unique identifier read from the first voucher matches a unique identifier as identified in a voucher database. Computationally evaluating at least one characteristic of the first voucher may include confirming that a voucher issuing device identifier that unique identifies a voucher issuing device is a known voucher issuing device.

A gaming related enterprise accounting system may be summarized as including at least one enterprise accounting computing system communicatively coupled to receive accounting related information, the enterprise accounting computing system comprising at least one processor and at least one processor-readable storage medium that stores instructions that cause the at least one processor to process gaming related information, by: receiving a first voucher for redemption at a first gaming site, the first voucher distributed printed at a second game site that is remote from the first gaming site; computationally evaluating at least one characteristic of the first voucher; and determining whether to authorized the redemption of the first voucher based at least in part on the evaluation of the at least one characteristic of the first voucher.

The gaming related enterprise accounting system wherein the at least one processor-readable storage medium may store instructions that cause the at least one processor to process gaming related information, further by: transmitting at least one signal to the first gaming site indicative of whether or not the redemptions of the first voucher is authorized. Receiving a first voucher for redemption at a first gaming site may include machine-reading information from the first voucher at the first gaming site. Computationally evaluating at least one characteristic of the first voucher may include confirming that a paid state of the first voucher is identified as unpaid in a voucher database. Computationally evaluating at least one characteristic of the first voucher may include confirming that an expiration date of the first voucher has not expired as identified in a voucher database. Computationally evaluating at least one characteristic of the first voucher may include verifying an amount value of the first voucher against an amount value in a voucher database. Computationally evaluating at least one characteristic of the first voucher may include confirming that an issue date of the first voucher is not after a current date. Computationally evaluating at least one characteristic of the first voucher may include confirming that a unique identifier read from the first voucher matches a unique identifier as identified in a voucher database. Computationally evaluating at least one characteristic of the first voucher may include confirming that a voucher issuing device identifier that unique identifies a voucher issuing device is a known voucher issuing device.

BRIEF DESCRIPTION OF THE DRAWINGS

In the exemplar drawings, identical reference numbers identify similar elements or acts. The sizes and relative positions of elements in the drawings may not necessarily be drawn to scale. The shapes of various elements and angles may not necessarily be drawn to scale, and some elements may be arbitrarily enlarged and positioned to improve drawing legibility. Further, the particular shapes of elements as drawn, are not intended to convey any information regarding the actual shape of the particular elements, and have been solely selected for ease of recognition in the drawings.

FIG. 3 is a screen print showing a top level window or screen of an Enterprise Accounting graphical user interface (GUI), according to one illustrated embodiment.

FIG. 6 is a screen print of a casino floor area window or screen which may be displayed in response to a user action that indicates selection of a casino floor area, according to one illustrated embodiment.

Figure 7B:
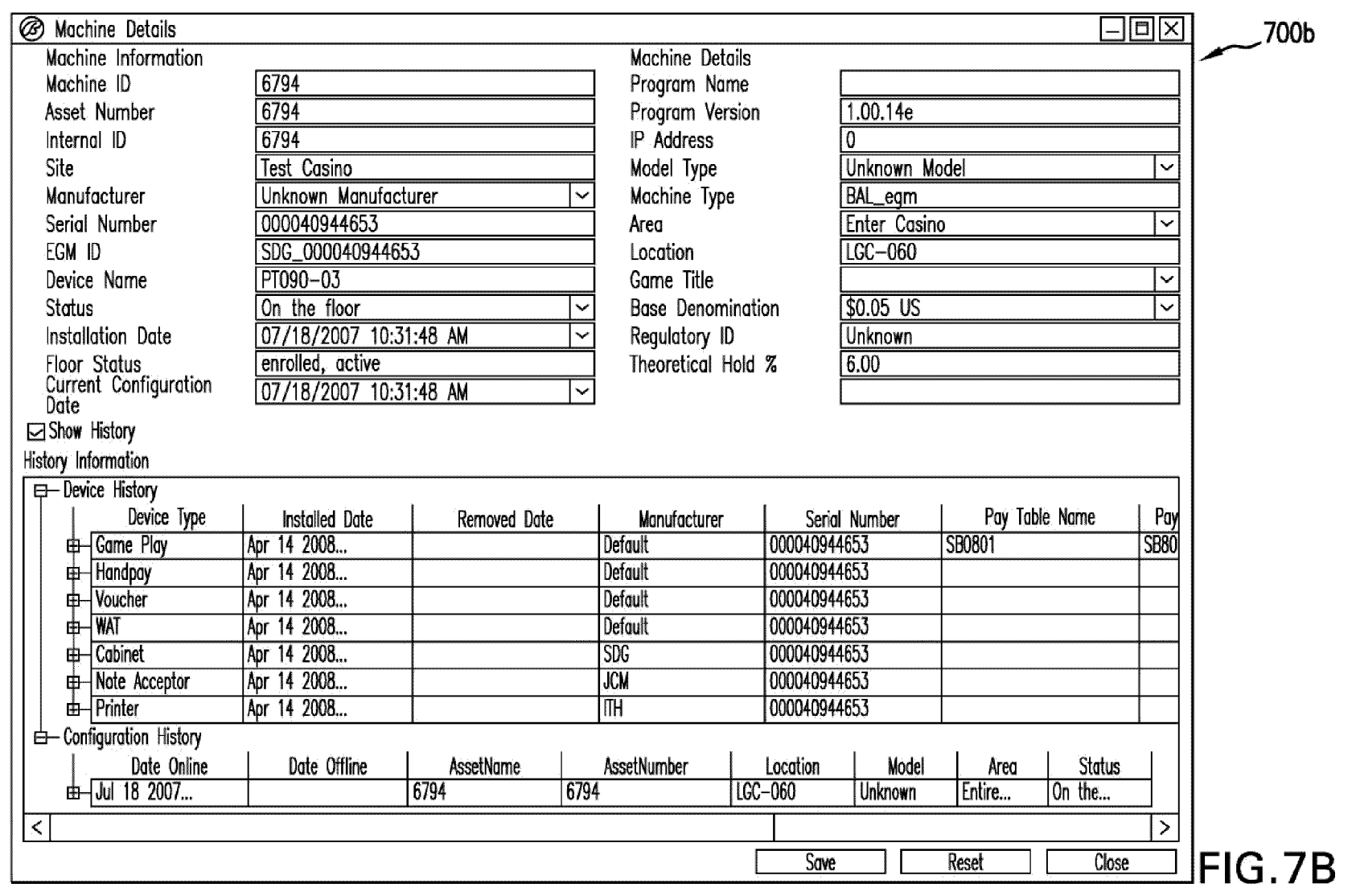
Figure 7C:
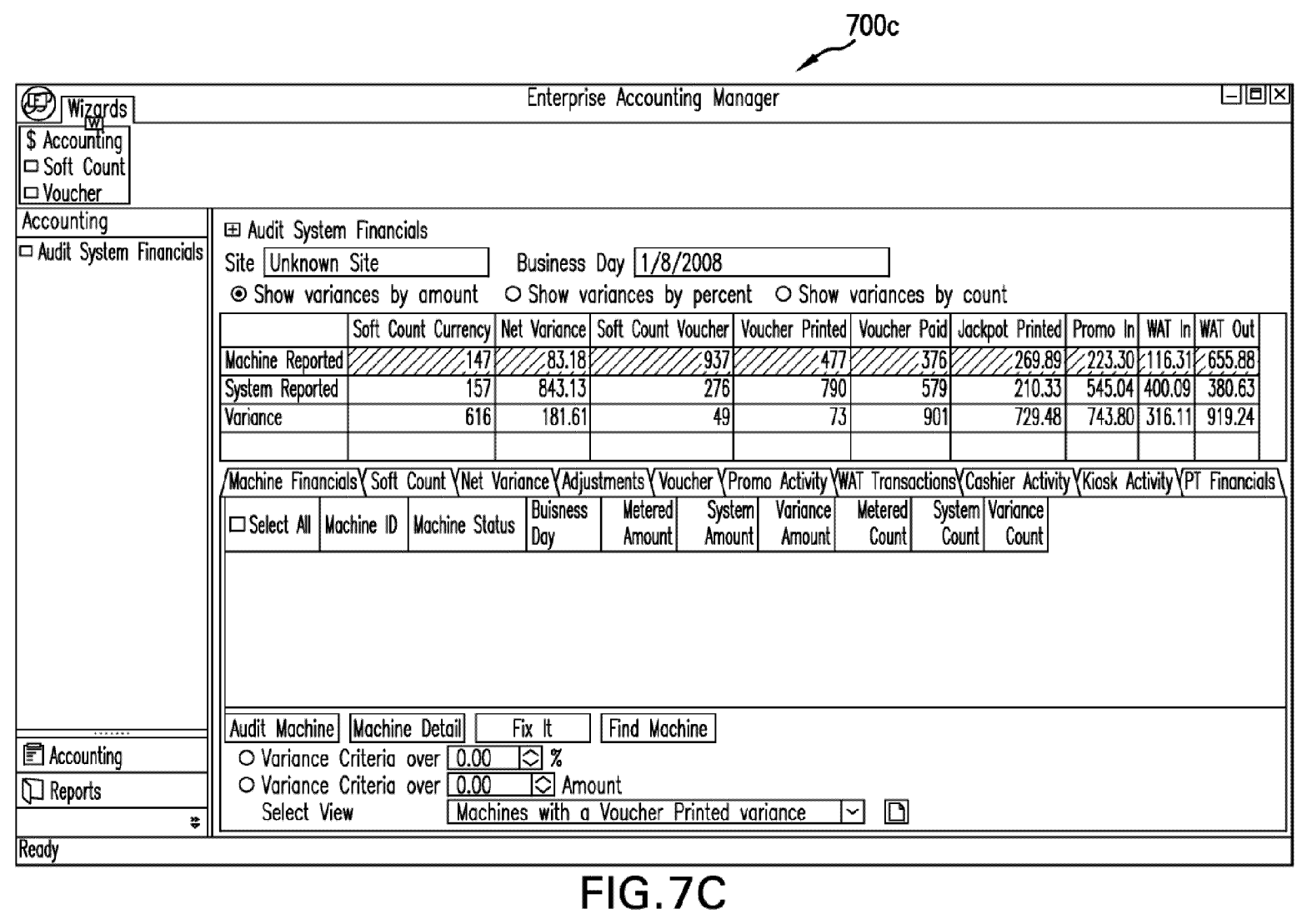
Figure 7H:
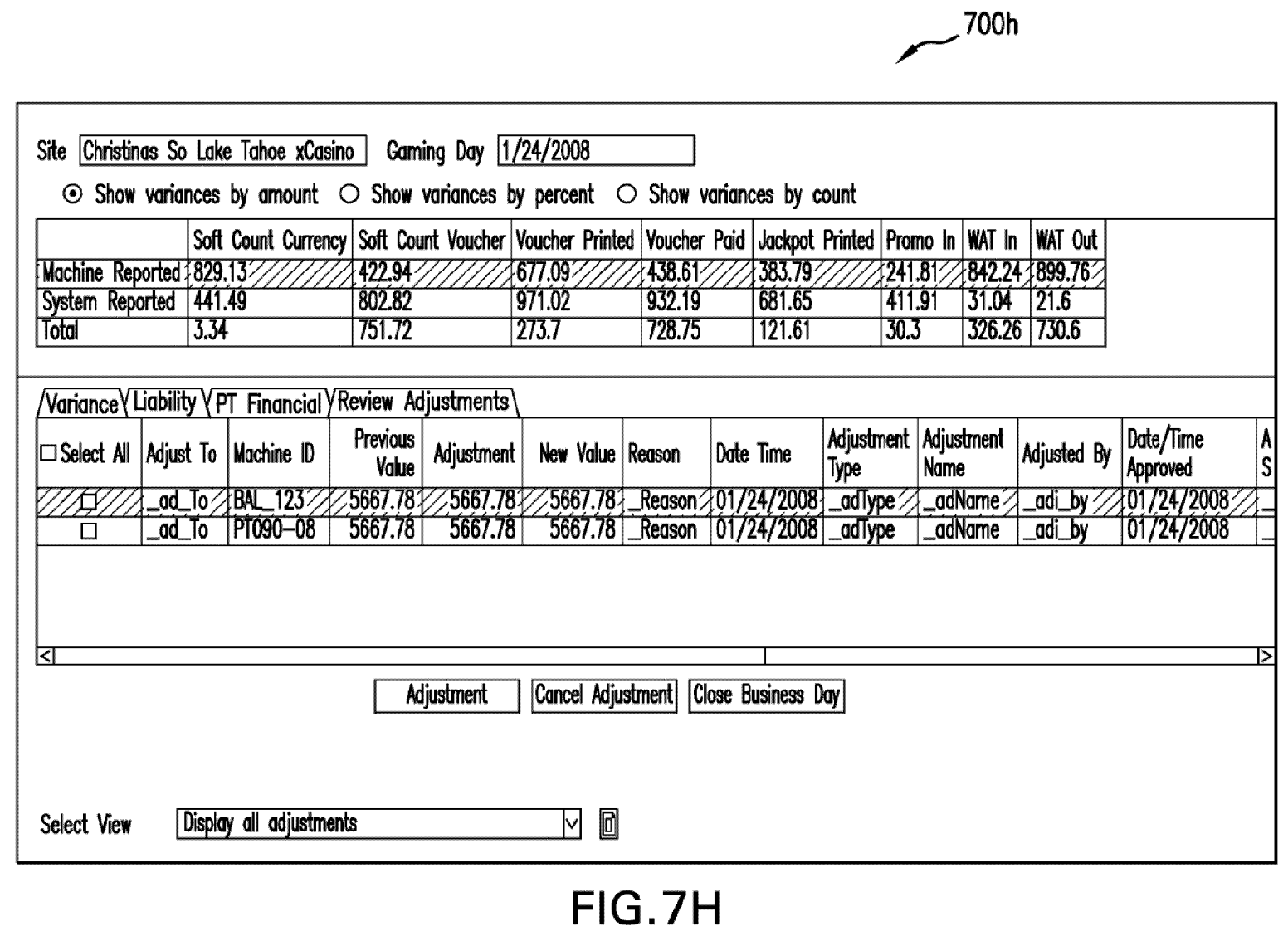

FIGS. 7A-7H are screen prints showing exemplary windows or screens which may appear when a user selects one of the user selectable icons or tabs of the casino floor area window or screen, according to one illustrated embodiment.

FIG. 9 is a screen print showing a manual payout window of screen, according to one illustrated embodiment.

FIG. 10 is a screen print showing a session detail window or screen, according to one illustrated embodiment.

FIG. 11 is a screen print showing a WAT Transaction Detail window or screen, according to one illustrated embodiment.

FIG. 12 is a screen print showing a Promo Voucher Detail window or screen, according to one illustrated embodiment.

FIG. 13 is a screen print showing a Voucher Detail window or screen, according to one illustrated embodiment.

FIG. 14 is a screen print showing a Find Voucher window or screen, according to one illustrated embodiment.

FIG. 15 is a screen print showing a Create Voucher window or screen, according to one illustrated embodiment.

FIG. 16 is a screen print showing a Find Machine window or screen, according to one illustrated embodiment.

FIG. 17 is a screen print showing a Cancel Adjustment window or screen, according to one illustrated embodiment.

FIG. 18 is a screen print showing an Approve Adjustments window or screen, according to one illustrated embodiment.

FIG. 19 is a screen print showing a Cashier Detail window or screen, according to one illustrated embodiment.

FIG. 20 is a screen print showing a Show Details window or screen, according to one illustrated embodiment.

FIG. 21 is a screen print showing an Enterprise window or screen, according to one illustrated embodiment.

FIG. 22 is a screen print showing an Audit System Financials window or screen, according to one illustrated embodiment.

FIG. 23 is a screen print showing an Audit System Financials window or screen, according to one illustrated embodiment.

FIG. 24 is a screen print showing a No Accounting Meter window or screen, according to one illustrated embodiment.

FIG. 25 is a screen print showing a Voucher Printed Variance window or screen, according to one illustrated embodiment.

FIG. 26 is a screen print showing a Voucher Paid Variance window or screen, according to one illustrated embodiment.

FIG. 27 is a screen print showing a Jackpot Printed window or screen, according to one illustrated embodiment.

FIG. 28 is a screen print showing a Promo Coupon window or screen, according to one illustrated embodiment.

FIG. 29 is a screen print showing a WAT in Variance window or screen, according to one illustrated embodiment.

FIG. 30 is a screen print showing a WAT Out Variance window or screen, according to one illustrated embodiment.

FIG. 31 is a screen print showing an Audit Systems Financial window or screen, according to one illustrated embodiment.

FIG. 33 is a screen print showing an Incorrect Business Day window or screen, according to one illustrated embodiment.

FIG. 34 is a screen print showing a Missing Count window or screen, according to one illustrated embodiment.

FIG. 35 is a screen print showing a Missing Drop window or screen, according to one illustrated embodiment.

FIG. 36 is a screen print showing a Voucher Not Paid window or screen, according to one illustrated embodiment.

FIG. 37 is a screen print showing a Duplicate Validation ID window or screen, according to one illustrated embodiment.

FIG. 38 is a screen print showing a Net Variance window or screen, according to one illustrated embodiment.

FIG. 39 is a screen print showing a No Accounting Meter window or screen, according to one illustrated embodiment.

FIG. 40 is a screen print showing a Voucher Printed window or screen, according to one illustrated embodiment.

FIG. 41 is a screen print showing a Voucher Paid Variance window or screen, according to one illustrated embodiment.

FIG. 42 is a screen print showing a Jackpot Printed window or screen, according to one illustrated embodiment.

FIG. 43 is a screen print showing a Promo Coupon window or screen, according to one illustrated embodiment.

FIG. 44 is a screen print showing a WAT In window or screen, according to one illustrated embodiment.

FIG. 45 is a screen print showing a WAT Out window or screen, according to one illustrated embodiment.

FIG. 46 is a screen print showing an Audit System Financials window or screen, according to one illustrated embodiment.

FIG. 47 is a screen print showing an Audit System Financials window or screen, according to one illustrated embodiment.

FIG. 48 is a screen print showing a Paid Pending Vouchers window or screen, according to one illustrated embodiment.

FIG. 49 is a screen print showing an All Printed Vouchers window or screen, according to one illustrated embodiment.

FIG. 50 is a screen print showing a Voucher Past Expiration window or screen, according to one illustrated embodiment.

FIG. 51 is a screen print showing an Audit System Financials window or screen, according to one illustrated embodiment.

FIG. 52 is a screen print showing an Audit System Financials—WAT Transactions window or screen, according to one illustrated embodiment.

FIG. 53 is a screen print showing an Audit System Financials—Cashier Activity window or screen, according to one illustrated embodiment.

FIG. 54 is a screen print showing an Audit System Financials—Kiosk Activity window or screen, according to one illustrated embodiment.

FIG. 55 is a screen print showing an Audit System Financials—PT Financial window or screen, according to one illustrated embodiment.

FIG. 56 is a screen print showing a No Accounting Meter window or screen, according to one illustrated embodiment.

FIG. 58 is a screen print showing a Voucher Paid window or screen, according to one illustrated embodiment.

FIG. 59 is a screen print showing a Jackpot Printed window or screen, according to one illustrated embodiment.

FIG. 60 is a screen print showing a Promo Coupon window or screen, according to one illustrated embodiment.

FIG. 61 is a screen print showing a WAT In window or screen, according to one illustrated embodiment.

FIG. 62 is a screen print showing a WAT Out window or screen, according to one illustrated embodiment.

FIG. 63 is a screen print showing a System Information—Daily Total window or screen, according to one illustrated embodiment.

FIG. 64 is a screen print showing a System Information—Voucher Paid window or screen, according to one illustrated embodiment.

FIG. 65 is a screen print showing a System Information—Voucher Printed window or screen, according to one illustrated embodiment.

FIG. 66 is a screen print showing a System Information—Jackpot Printed window or screen, according to one illustrated embodiment.

FIG. 67 is a screen print showing a System Information—Promo In window or screen, according to one illustrated embodiment.

FIG. 68 is a screen print showing a System Information—WAT In window or screen, according to one illustrated embodiment.

FIG. 69 is a screen print showing a System Information—WAT Out window or screen, according to one illustrated embodiment.

FIG. 70 is a screen print showing a System Information—Adjustments window or screen, according to one illustrated embodiment.

FIG. 71 is a screen print showing a Machine Detail Financials—Metered Information window or screen, according to one illustrated embodiment.

FIG. 72 is a screen print showing an Adjustment—Meter window or screen, according to one illustrated embodiment.

FIG. 73 is a screen print showing a Moving Events to Different Gaming Day window or screen, according to one illustrated embodiment.

FIG. 74 is a screen print showing a Perform Manual Events window or screen, according to one illustrated embodiment.

FIGS. 75A and 75B are a screen print showing a Calculate New Deltas window or screen, according to one illustrated embodiment.

FIG. 76 is a screen print showing an Adjustment—System window or screen, according to one illustrated embodiment.

FIG. 77 is a screen print showing an Adjustment—Daily Total window or screen, according to one illustrated embodiment.

FIG. 78 is a screen print showing a Machine Detail Financials—Machine Variance window or screen, according to one illustrated embodiment.

FIG. 79 is a screen print showing a Final Balance Worksheet—Variance window or screen, according to one illustrated embodiment.

FIG. 80 is a screen print showing a Final Balance Worksheet—Liability window or screen, according to one illustrated embodiment.

FIG. 81 is a screen print showing a Final Balance Worksheet—PT Financial window or screen, according to one illustrated embodiment.

FIG. 82 is a screen print showing a Final Balance Worksheet—Review Adjustments window or screen, according to one illustrated embodiment.

DETAILED DESCRIPTION OF THE PREFERRED EMBODIMENTS

Figure 1:
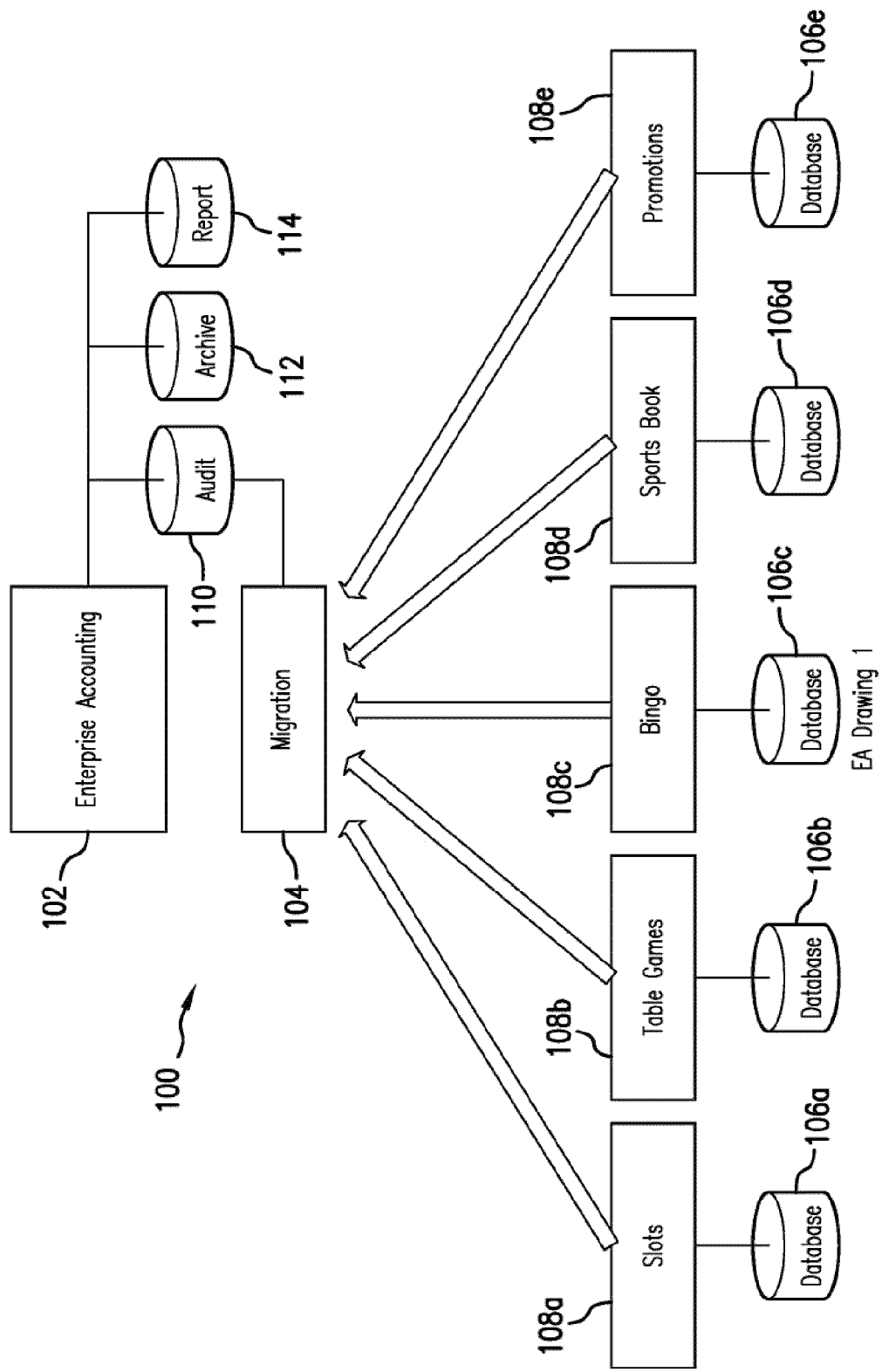
FIG. 1 is a schematic view of a gaming environment including an Enterprise Accounting module that includes a migration module, communicatively coupled to various gaming machines and apparatuses, according to one illustrated embodiment.

In the following description, certain specific details are set forth in order to provide a thorough understanding of various disclosed embodiments. The illustrations and descriptions are exemplar in nature, and specific examples are introduced to facilitate understanding of the underlying inventive concepts. One skilled in the relevant art may recognize that embodiments may be practiced without one or more of these specific details, or with other methods, components, materials, etc. In other instances, well-known structures associated with computing systems, networks including servers, routers and bridges, and gaming machines have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Enterprise Accounting Module (EAM)

Overview

Today, casinos rely on a staff of accounting personnel taking several hours every day to balance and audit casino revenue by sifting through a myriad of cumbersome GUI screens and reports. By automating workflow mechanism, the casino enterprise accounting balance and auditing functions are greatly simplified in some cases to the point of full automation. The EAM saves time and human resources by automating the balancing and auditing of casino financial activity; improves accuracy of casino financial activity by minimizing human involvement; consolidates data from multiple casino area management systems including, but not limited to Tables, Slots, Keno, Lottery, Bingo, Activity Wagering, Promotions, Comps, Cage/Credit, Kiosks, Progressives, etc.; includes a Master Fix It Wizard for entire casino floor; when selected automatically balances (repairs) casino floor accounting data; automatically generates a secure audit trail of Fix It Wizard adjustments; any remaining variances are highlighted in an easy to trouble-shoot fashion; a secure audit trail is generated for every manual adjustment; includes a Master Fix It Wizard for casino areas (tables, slots, keno, etc); when selected automatically balances (repairs) casino floor accounting data; automatically generates a secure audit trail of Fix It Wizard adjustments; any remaining variances are highlighted in an easy to trouble-shoot fashion; a secure audit trail is generated for every manual adjustment; includes Fix It Wizards per casino area audit subgroup; audit subgroups include, but are not limited to cash, vouchers (cash and promotional), electronic credit transfers (cash and promotional), progressives, jackpots, machine meters, and cashier activity; and consolidates reporting for Multiple Sites at the enterprise level. As used herein, a wizard refers to a user interface element where the user is presented with a sequence of dialog boxes, which lead the user through a series of steps to perform a number of tasks in sequence.

Referring to FIG. 1, a gaming environment 100 may include an Enterprise Accounting module 102 and a Migration Service module 104, which may be implemented in software, that executes on a computing system such as a common enterprise accounting (EA) server or may be implemented on a separate computer, such as a personal computer or workstation depending upon the processing and storage requirements. The Enterprise Accounting module 102 and Migration Service module 104 are communicatively coupled to a number of databases 106a-106e (collectively 106) associated with various gaming machines and apparatuses 108a-108e (collectively 108). The gaming machines and apparatus 108 may, for example, include slot machines 108a, table games 108b, bingo 108c, sports book 108d, and promotions 108e. These gaming machines and apparatuses 108 may be installed in a common facility or separate facilities, and may be communicatively linked by a network to the respective databases 106.

The Migration Service module 104 may be used to extract data from the area systems 106 and normalize the data in an Auditing database 110. Data may be archived in an Archive database 112, and reports may generated and stored in a Reports database 114. The migration service module 104 may be available to transition data from a variety of originating systems into a single accounting system. This may allow a gaming operation to have multiple sources, such as a Bingo or Table Game systems, yet perform auditing, accounting and performance analysis through a common interface. Additionally, for multi-site gaming groups, a single source may be available for consolidated operations.

By example, the following types of data may be sent from the data extraction service to the Enterprise Accounting module 102: Site configuration data; Asset configuration data; Raw meter data; Event data; Voucher data; Progressive data; System Status data; Cash Data; Jackpot Data; Electronic Transfer Data; and Cashier Data.

The data being requested may be retrieved from the various sources (e.g., systems, machines, databases, etc.) and may be stored in the enterprise accounting databases. Users can then view the data using an enterprise accounting client and reconcile the accounting data. In some cases data may be updated on the area system to reflect state change by in the EA system. An example would be changing the paid state of a voucher.

Figure 2:
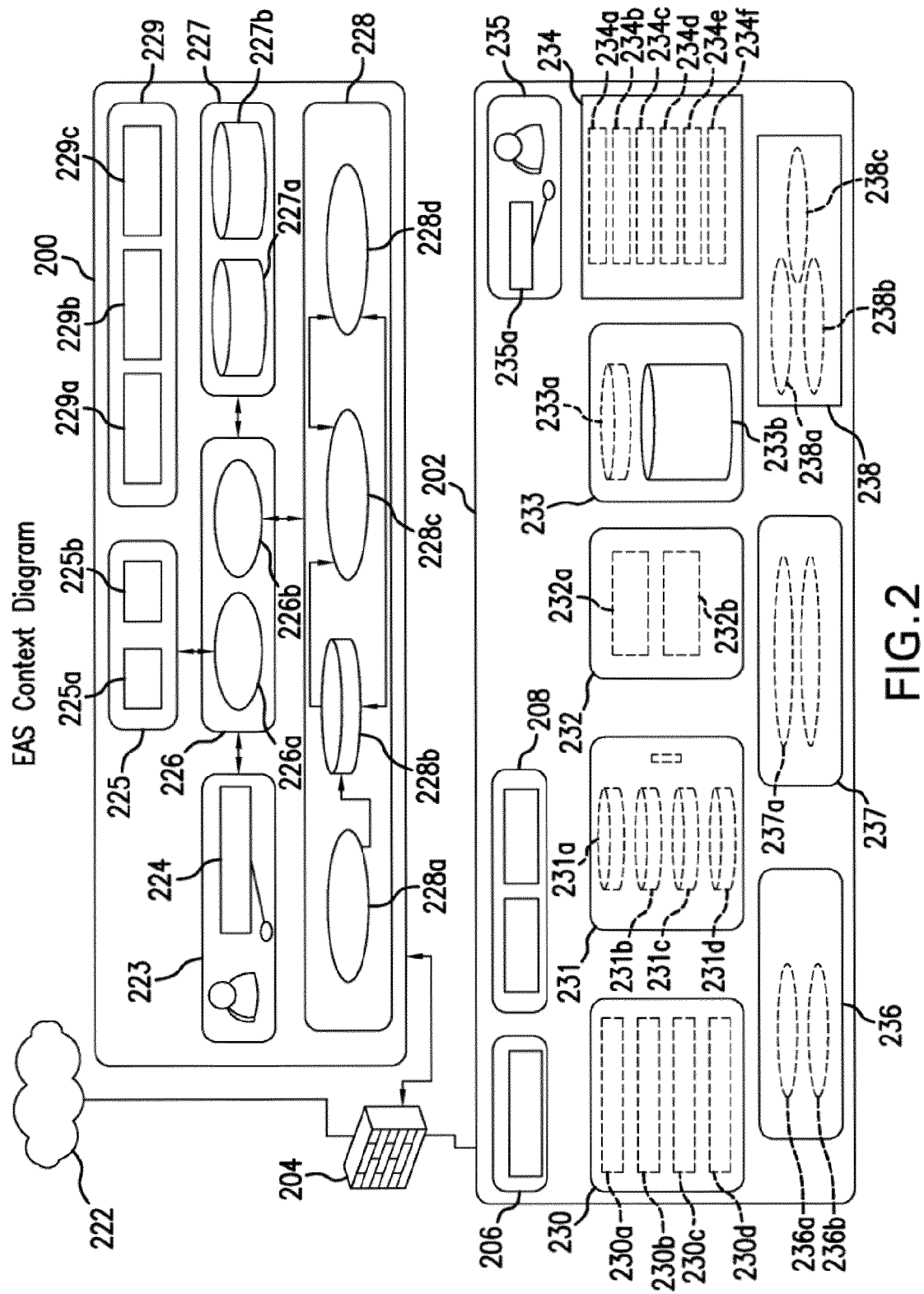
FIGS. 2, 2A, 2B are context diagrams showing an exemplary embodiment of an Enterprise Accounting System communicatively coupled to a slot management system, according to one illustrated embodiment.
Figure 2A:
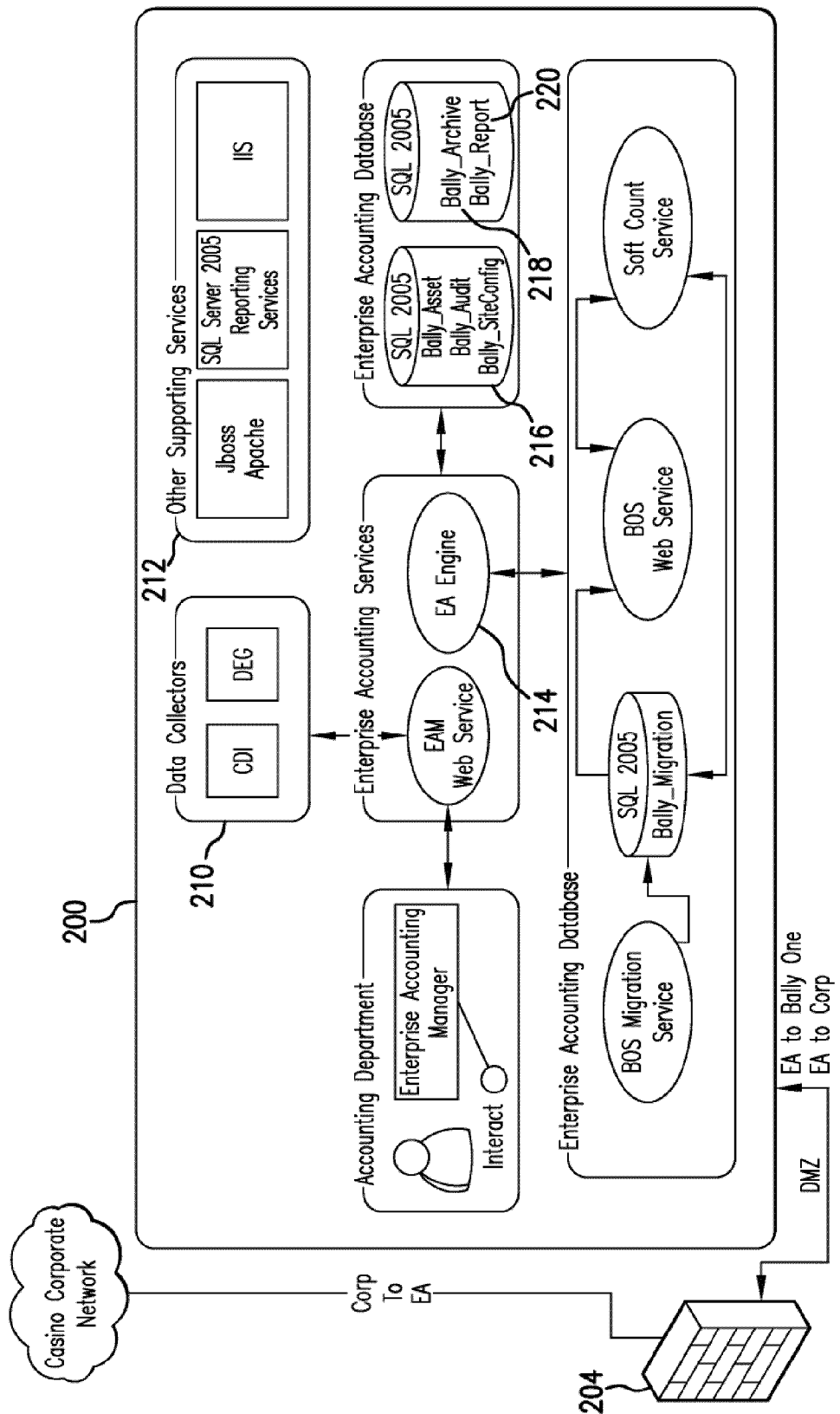
Figure 2B:
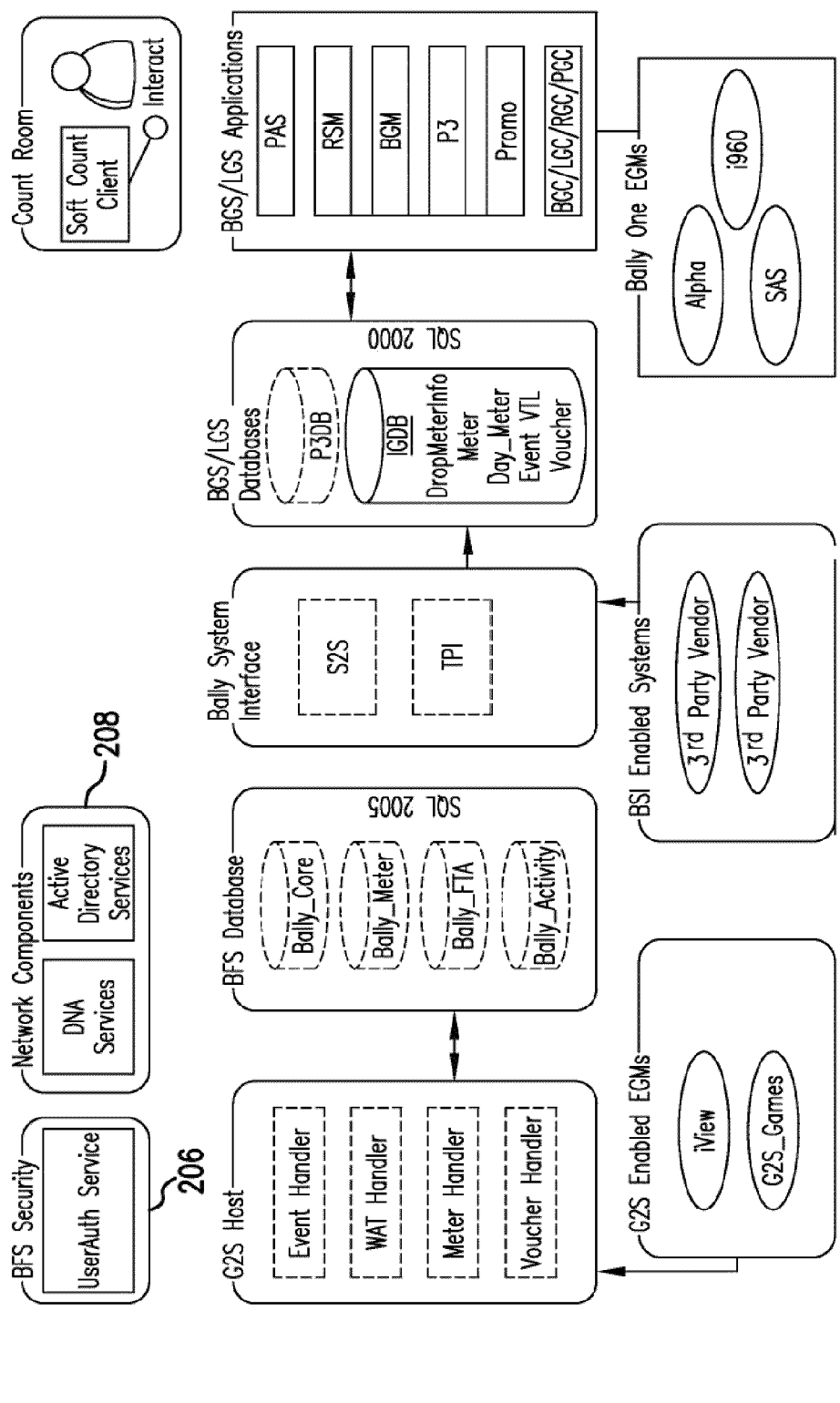

Referring to FIGS. 2, 2A, 2B, an internal view of an exemplary Enterprise Accounting System 200 is shown communicatively coupled to a slot management system. The slot management system 202 may take a variety or forms, such as a commercially available Bally Floor System, Bally One, or Bally SDS Slot Management System.

In this example embodiment, the EA system 200 is separated using firewall technology 204 on a separate network for security and performance reasons. EA system 200 may share security services (e.g., Userauth Service) 206 and/or network services (e.g., DNS and Active Directory) 208 with the slot (e.g., Bally One) system 202. Interfaces may be Web service based. Data can be made available for other systems, for example via Data Collectors 210. Other support services 212 may be available.

In operation, once the EA criterion are determined satisfied through execution of an EA processing module 214. The database accounting information may be determined to be balanced and audited for the selected day, and that day's accounting information can be closed. The EA processing module 214 may then move the data from the active database 216 to the archive database 218. Reopening a closed-day may be allowed depending upon selectable internal controls which may be set to a default and modified by an authorized enterprise user. After archiving, archived data may be summarized to the report database 220. Periodic and historical reports can advantageously be produced from this database without impact to the performance of main accounting databases.

The EA system 200 and/or the slot management system 202 may communicate through the firewall 204 with one or more external systems, for example via a casino corporate network 222.

The EA system 200 may include an accounting department module 223 with an enterprise accounting manager module or function 224 to provide enterprise wide accounting functionality. The EA system 200 may include data collector modules 225, for instance CDI and DEG (i.e., electronic gaming machine data) modules 225*a*, 225*b*, respectively. The EA system 200 may include an enterprise accounting services module 226, which may include an enterprise accounting management Web services module 226*a* and an enterprise engine module 226*b*. The EA system 200 may include an enterprise accounting database 227 stored on a computer-readable storage medium. The enterprise accounting database 227 may include a SQL database 227*a* with asset, audit and site configuration data, and may also include a SQL database 227*b* with archive and report information. The EA system 200 may include an enterprise accounting data migration module 228, which may include migration services 228*a*, a SQL database 228*b* with migration information, an operating system Web service 228*c* and a soft count service 228*d*. The EA system 200 may further include one or more other supporting services modules 229, which may, for example, include Apache services 229*a*, SQL Server reporting services 229*b* and IIS 229*c*.

The slot management system 202 may include a G2S Host module 230, which may include one or more of an Event Handler 230*a*, WAT Handler 230*b*, Meter Handler 230*c*, and Voucher Handler 230*d*. The slot management system 202 may include one or more Financial Systems databases 231 stored on computer-readable storage media, which may, for example, include Core database 231*a*, Meter database 231*b*, Financial Transaction Accounting database 231*c*, and/or Activity database 231*d*. The slot management system 202 may include a Systems Interface module 232 including an system to system (S2S) interface 232*a* and/or a TPI interface 232*b*. The slot management system 202 may further include one or more Gaming System (BGS/LGS) databases 233 stored on computer-readable storage media. The Gaming System databases 233 may, for example, include a P3 database 233*a* and an integrated gaming database (IGDB) 233*b* which may include drop meter information, meter information, day meter information, event information VLT and/or Voucher information. The slot management system 202 may include various applications (BGS/LGS applications) 234. Such applications may, for example include: Player Accounting System (PAS) 234*a*, RSM 234*b*, Bally Game Management (BGM) 234*c*, P3 234*d*, Promo 234*e* and/or BGC/LGC/RGC/PGC 234*f* applications. The slot management system 202 may include a count room module 235 for handling a count room. The count room module may include one or more Soft Count clients 235*a* to allow entry of soft count information. The slot management system 202 may include a number of G2S Enabled electronic gaming machines 236, each of which may execute a user interface such as Bally IView® interface 236*a*, and one or more G2S game applications 236*b*. The slot management system 202 may include a number of Bally SI enabled systems 237, which may execute one or more 3$^{rd}$ Party Vendor applications 237*a*. The slot management system 202 may include a number of Bally One electronic gaming machines 238. The electronic gaming machines 238 may execute one or more applications for example Alpha, SAS and/or i960 applications 238*a*-238*c*, respectively.

Figure 3:
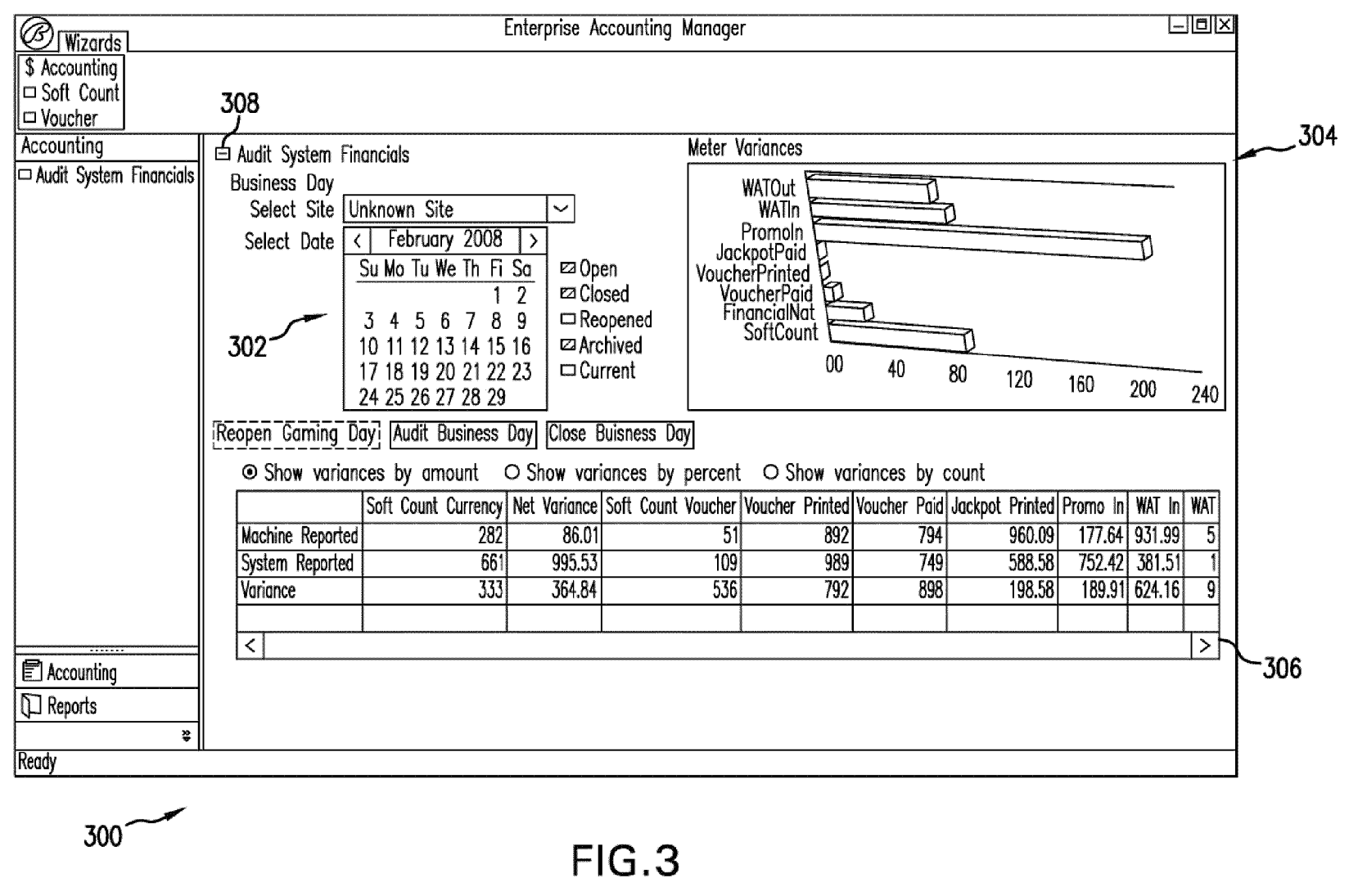

Referring to FIG. 3, a top level window or screen 300 of an EA graphical user interface (GUI) is shown. Such window or screen 300 may be displayed on a display at a user workstation, such as a Dell or Sun computer workstation that includes a display, keyboard, and networked operating system software. When an EA user application first loads, the user (e.g., an auditor) is presented with a graphical user interface that includes a calendar 302 and graphical variance display 304. A user can quickly view and identify any accounting variances, such as Machine Reported; System Reported; Variance Amount; Soft Count Currency; Net Variance; Soft Count Voucher; Voucher Printed; Voucher Paid; Jackpot Printed; Promo In; WAT In; and WAT Out.

For each day on the calendar, the day is color coded as being open, closed, or archived, and possibly reported. In response to a user selection of a certain day on the calendar: quantity of variance types for that day are graphically displayed, and, quantity of variance types for that day are displayed in a table format 306. When the user selects "Audit System Financials" user selectable icon 308, a window or screen is displayed showing: the status of each accounting day and key variance information relating to each casino floor area.

Figure 4:
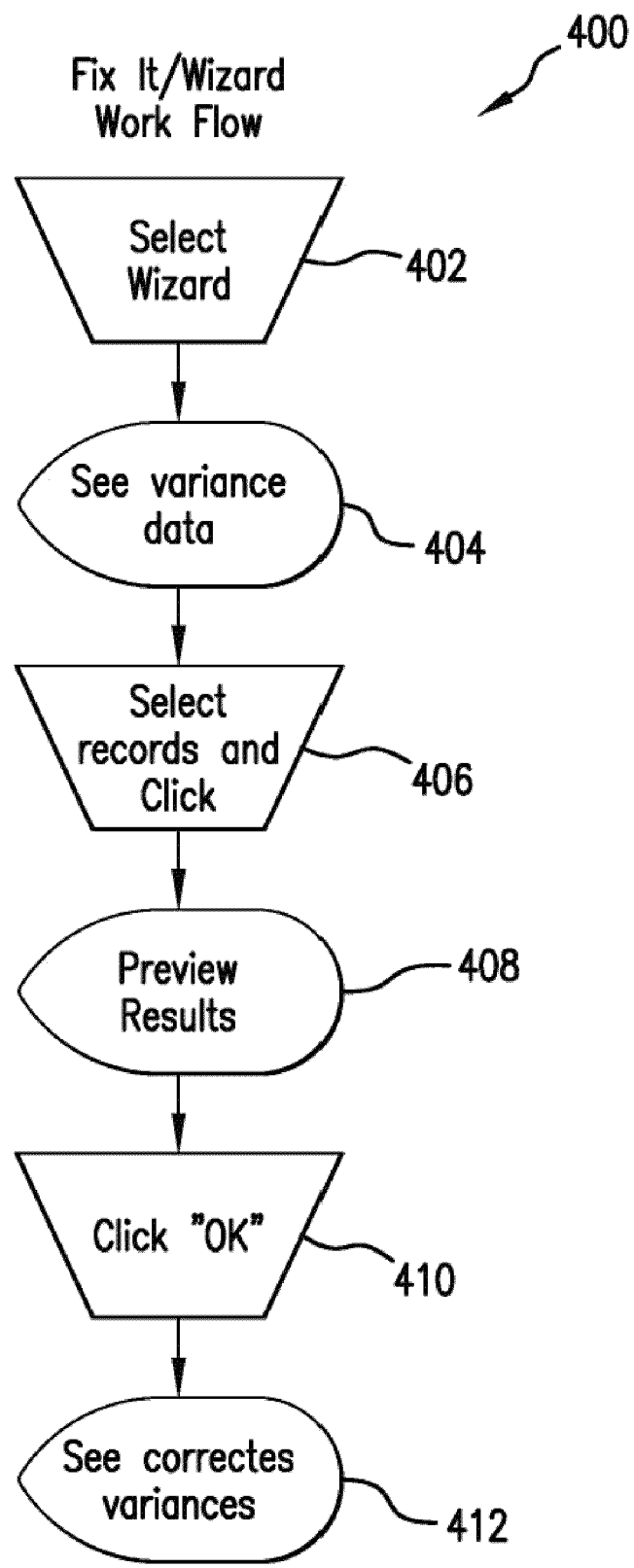
FIG. 4 is a flow diagram showing a method of operating an EA Wizards function and Fix It Button process, according to one illustrated embodiment.

Referring to FIG. 4, shows a method 400 of operating an EA Wizards function and Fix It Button process, according to one illustrated embodiment. At 402, a user (e.g., an Auditor) selects a user selectable icon to launch a "Wizard", for example a "Show all Switched Canisters" wizard (e.g., a situation where a canister is removed from machine "A" and Machine "B", but, when the information for the canisters is entered into the computer, the count for "A" is identified as "B" and the count for "B" is identified as "A"). At 404, the EA Wizard function and Fix It procedure analyzes the data according to preset criterion and flags or displays those data items that are suspected to be switched canisters. At 406, the user selects any or all of the suspected records and selects the "Fix It" button. The EA module may calculate the adjustments required to fix the issue and correct the variance. Before any adjustments are made, the expected results may be displayed at 408, and a user may either accept or decline the adjustment at 410. Sometimes, the user may need to provide additional information or select among more than one possible approach. When the user is satisfied with the predicted results, they select an appropriate user selectable icon (e.g., "Make Adjustment" icon) and the adjustments are created automatically, and displayed at 412. A list of example wizards and their descriptions are set at in Table 1.

TABLE 1

All Paid Pending Vouchers
All Paid Vouchers with a paid date prior to the creation date
All Printed Vouchers not on correct business day
All Voucher Exceptions
All Vouchers for this business day
All Vouchers past the Expiration Period
Display all adjustments
Display all machine adjustments
Display all machine detail adjustments
Display all manual adjustments
Display all system adjustments
Display all un-approved adjustments
Display all wizard adjustments
Machines that are expected to report financial activity
Machines that are expected to report financial activity
Machines that have a duplicate validation ID's
Machines that have a voucher not paid variance
Machines that have data from the count room but have missing drop event
Machines that have net variances detected
Machines that have reported drops on incorrect business days
Machines that have reported missing data from the count room
Machines that have switched

Figure 5:
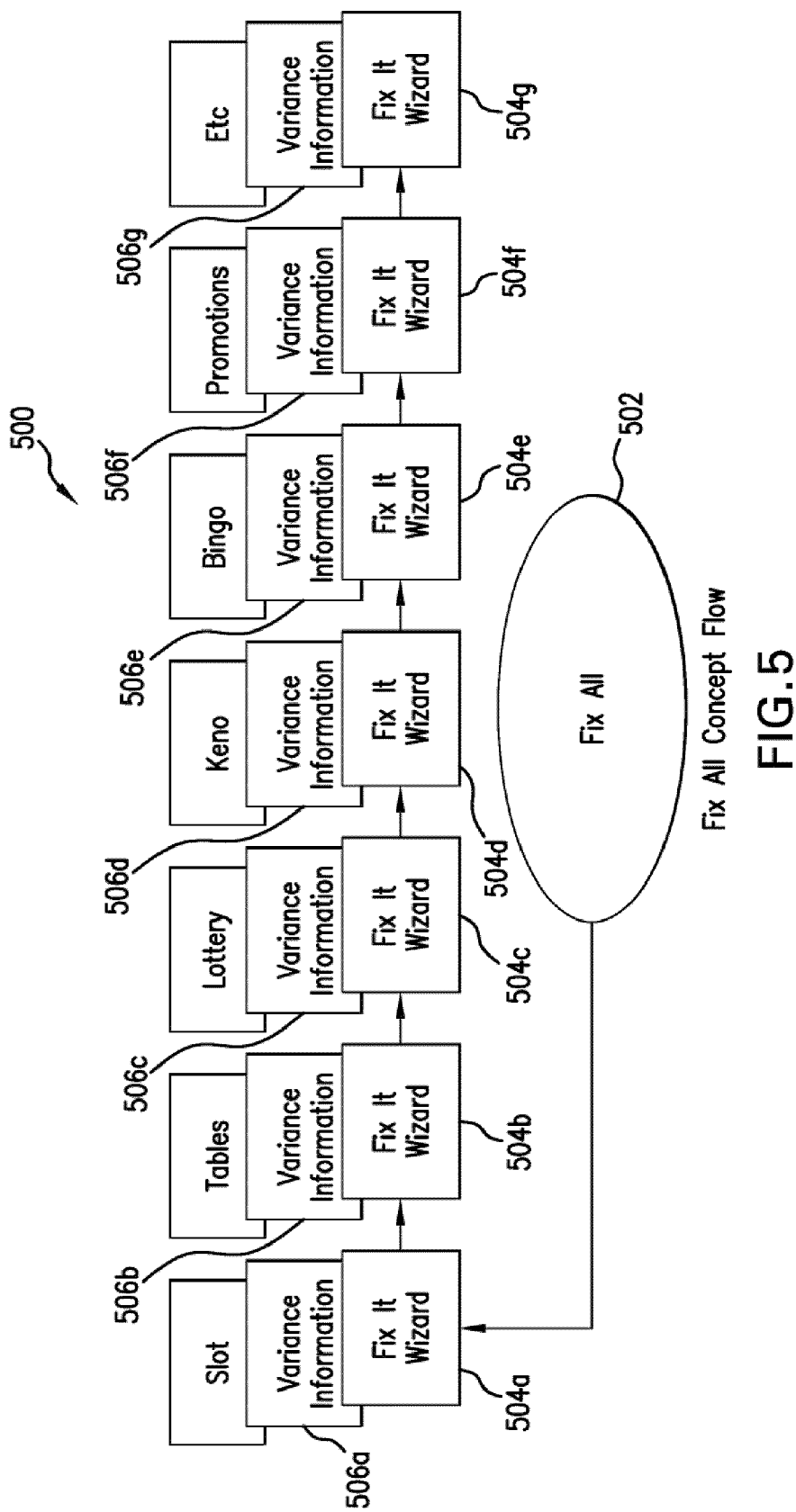
FIG. 5 is a flow diagram showing an exemplary fix all method, according to one illustrated embodiment.

TABLE 1-continued canisters detected
Machines that reported financial activity but were not expected
Machines that reported financial activity but were not expected
Machines that were supposed to report financial activity but did not
Machines that were supposed to report financial activity but did not
Machines with a Jackpot Printed variance
Machines with a Jackpot Printed variance
Machines with a Promo In variance
Machines with a Promo In variance
Machines with a Voucher Paid variance
Machines with a Voucher Paid variance
Machines with a Voucher Printed variance
Machines with a Voucher Printed variance
Machines with a WAT In variance
Machines with a WAT In variance
Machines with a WAT Out variance
Machines with a WAT Out variance
Show all Cashiers
Show all Kiosk
Show all WAT In transactions
Show all WAT In transactions for machines with a WAT In variance
Show all WAT Out transactions
Show all WAT Out transactions for machines with a WAT Out variance
Show all WAT Transactions FIG. 5 shows a "fix all" method 500, according to one illustrated embodiment. A user may request the individual Fix It/Wizards function to execute consecutively until completed by selecting an appropriate user selectable icon (e.g., 'FIX ALL' button or key icon) 502. When the user (e.g., an auditor) selects the "Fix All" icon, the user may be guided through each Fix It/Wizard 504a-504g (collectively 504) for which an issue or variance 506a-506g (collectively 506) is detected. All changes may then be tracked in a secure audit log that can be scrutinized at any time. The GUI is updated to display remaining variances if any. The "Fix All" icon 502 may be grayed out to indicate that it has already been processed. At this point, all detectable issues and variances 506 may be corrected. Any remaining unique or unusual variances may be investigated, for example, by a user selecting the particular item. In response to the selection, a more detailed screen or screens may be displayed until the user has reached a desired level and determined a course of action, which may include correcting the variance. For example, the user (e.g., an auditor) may select a particular casino floor area (slots, tables, etc) to drill-down further into the detailed information that may support the process of correcting remaining variances.

Referring to FIG. 6, shows an exemplary casino floor area window or screen 600, according to one illustrated embodiment. The casino floor area window or screen 600 may, for example, be displayed in response to a user selecting a user selectable icon indicative of a casino floor area. This particular example depicts a slot casino area. The user (e.g., an auditor) may then select any tab 602 (only one called out in the Figure) to view detail on remaining variances and make adjustments. Selection of a user selectable Adjustment icon 604, allows the user to make adjustments to selected variances (e.g., individual variances identified via fields or checkboxes 606) or all variances (e.g., via field or checkbox 608).

FIGS. 7A-7H show exemplary windows or screen 700a-700h, respectively, that are displayed in response to a user selecting one of the user selectable icons or tabs of the casino floor area window or screen 600, according to one illustrated embodiment. The user may select the user selectable icons or tabs in order to view a specific item in more detail, for instance machine meter information for a series of days. Once all adjustments have been made, the user (e.g., an auditor) may return to the top level window or screen to close out that day. Context sensitive help may be available through-out the application. For example, the user may highlight the section of the window or screen where help is needed, and activates a switch (e.g., activates or clicks the right mouse button) to request help. Relevant help text may be displayed in a pop-up dialogue box (not shown). Example help screen information may, for example, provide a description of a particular Wizard such as shown in Table 2.

TABLE 2

| Fix It/Wizard | Description |
| --- | --- |
| . . . that did Not Report financials | Finds machines that are active on the floor but that did not send end-of-day snap records. |
| that reported Unexpected financials | Finds machines that are NOT active on the floor but that did send end-of-day snap records. |
| with a Voucher Printed variance | Finds machines where the meter reported values for vouchers printed differ from the values reported by the Voucher System. |
| with a Voucher Paid variance | Finds machines where the meter reported values for vouchers paid differ from the values reported by the Voucher System. |
| with a Jackpot Printed variance | Finds machines where the meter reported values for Jackpot vouchers printed differ from the values reported by the Voucher System. |
| with a Promo In variance | Finds machines where the meter reported values for promotional vouchers paid differ from the values reported by the Voucher System. |
| with a WAT In variance | Finds machines where the meter reported values for Wagering Account Transfers In differ from the values reported by the Wagering Account Transfer System. |
| with a WAT Out variance | Finds machines where the meter reported values for Wagering Account Transfers Out differ from the values reported by the Wagering Account Transfer System. |

TABLE 2-continued

| Fix It/Wizard | Description |
|---|---|
| a switched canisters detected | Finds the condition where the identifier on two canisters were switched, resulting in two machines with equal and opposite variances. |
| reported drops on incorrect business days | Finds the condition where the drop meter information occurred after the day ended and was incorrectly recorded for the wrong business day. |
| reported missing data from the count room | Finds the condition where a drop event was sent by a machine on the floor, but no counted data was reported by the count room for that machine. |
| data from the count room but have missing drop event | Finds the condition where the count room reported counted data for a machine, but the machine did not send a drop event record. |
| a voucher counted but not paid | Finds the condition where a voucher is counted by the count room (this would mean it was redeemed), but the Voucher system did not report that the voucher had been paid. |
| vouchers counted twice | Finds the condition where the count room encounters multiple, separate vouchers that have the same barcode. (This is most likely a patron that attempted to photocopy a voucher and get paid more than once.) |
| All Paid Pending Vouchers | Finds the condition where the voucher system reports a voucher was inserted into a machine, but not the completion of the payment. This leaves a voucher in a "pending" status that needs to be corrected to balance with the count room. |
| All Printed Vouchers not on a correct business day | Finds the condition where, based on the printed or paid date, it is suspected that a voucher record has the wrong business day on it. |
| All Paid Vouchers with a paid date prior to the creation date | Finds the condition where a voucher appears to have been paid before it was actually created. This is an error from the Voucher system. |
| All Vouchers past the expiration period | Finds the condition where a voucher (or vouchers) is old enough to have been expired, but the voucher system has not reported the expiration. This adversely impacts liability. |
| All Voucher Exceptions | Finds the condition where the vouchers system reports that a voucher was printed or paid by a machine that is not known to the system. |

The commercially available Bally SDS (slot data system) slot management and casino management system (SMS/CMS) is illustrative of a version of the current state of the art that includes structure and software for performing accounting procedures which may be either modified or replaced to implement the embodiments described herein. In commercially available slot management and casino management systems with accounting and audit functions, available accounting functions and procedures may be described to facilitate an understanding of the nature of the functions and procedures that are incorporated in the present embodiments.

Various SDS Accounting Procedures may be employed.

For example, While Drop is in Progress: may include: 1) Get meter readings from the floor for games not able to communicate with SDS; and 2) Pick up slips from the Casino Floor lock boxes and the Cage.

Also for example, Morning Reconciliation—After Drop is Complete, may include: 1. create Morning Batch Reports (unless MIS generates); 2. view the Adjustments Report; 3. reconcile Progressives; 4. reconcile Metered Machines (if needed); 5. reconcile Fills, Jackpots, Beefs, and Bleeds; 6. reconcile Scale (by using the following reports); 7. reconcile Soft Count (by using the following reports); 8. complete Slot Problem Worksheets for any slot machines with questionable variances; and 9. perform any necessary Revenue File Maintenance.

Reconcile Progressives may include: a) get progressive meter readings from the floor using the Progressive Meters Worksheet; b) investigate variances between SDS and the progressive meters on the floor; c) review the Progressive Jackpot Detail Report (PRGHIT); and d) review the Progressive Meter Update Report (PRGRPT).

Reconcile Fills, Jackpots, Beefs, and Bleeds may include: a) void all unprinted Jackpot slips (JPVOID) and Fill slips (FIVOID); b) Slip Reports (JASLIP, FISLIP, BESLIP, BLSLIP); and Fill/JP Summary Balance Sheet (FILLJP).

Reconcile Scale may be performed by using the following reports: a) Scale Drop Comparison Report (SCALE); b) Rejected Scale Entries Report (ONLSCL); c) Scale Missing Buckets Report (CHECK); d) List Scale Report (LSTSCA); and e) Weigh/Wrap Report (WRAP).

Reconcile Soft Count may be performed by using the following reports: a) Soft Count Comparison Report (SFTVAL); b) Soft Count Variance Report (SFTVRN); c) Daily Slots Not Dropped Report (SFTDRP); and d) Online Soft Count Report (ONLSF1).

Also for example, Afternoon Reconciliation—Once Reconciliation is Completed, may include: 1. Run Afternoon Batch Reports; and 2. Verify the SDS totals for Jackpots/Fills, Scale and Soft Count by comparing the Slot Summary Report and the Accounting Report to Casino/Cage totals.

Also for example Morning Batch Reports—The Morning Batch Reports provide SDS users with the reporting information they need to begin their day. Rather than creating and printing each report separately, the Morning Batch automatically creates all the reports needed for reconciliation.

The Morning Batch Reports may: enable Slot Auditing to begin their daily reconciliation process; provide information to Slot Technicians to begin maintenance on machines and fix diagnostic problems; allow MIS to monitor the health of the system; and Note Drop processing, which should be completed prior to running this procedure. To verify drop processing is complete, select the Display Drop Status option from the Slot Menu.

Also for example, Creating Morning Reports may include: 1. From the SDS Main Menu, choose the option for the Batch File Menu and press ENTER; 2. From the Batch File Menu, type the option to Create Morning Batch Reports and press ENTER; 3. Type a "Y" to proceed with creating the Morning Batch Reports; and 4. Press ENTER to return to the SDS Main Menu.

By example, the Morning Batch may contain the reports set out in Table 3.

TABLE 3

Morning Batch Reports

| | | |
|---|---|---|
| FILLJP | Daily Fill/Jackpot Summary Balance Sheet | Accounting |
| JASLIP | Jackpot Slip Report | Accounting |
| FISLIP | Fill Slip Report | Accounting |
| BESLIP | Beef Slip Report | Accounting |
| BLSLIP | Bleed Slip Report | Accounting |
| PRGHIT | Progressive Jackpot Hit Detail Report | Accounting |
| PRGRPT | Progressive Meter Update Report | Accounting |
| ADJUST | Adjustments Report | Accounting |
| COINRP | Coin Differences Report | Accounting |
| BILLRP | Bill Differences Report | Accounting |

Afternoon Batch Reports—The Afternoon Batch Reports provide historical information that is retained for auditing and regulatory purposes. The afternoon reports reflect audited totals and may, by example, be processed before 11 p.m. due to the Archive process.

Creating Afternoon Reports may include: 1. from the SDS Main Menu, choose the option for the Batch File Menu and press ENTER; 2. from the Batch File Menu, type the option number to Create Afternoon Batch Reports and press ENTER; 3. type a "Y" to proceed with creating the Afternoon Batch Reports. Select or press ENTER to return to the SDS Main Menu. Note: It may be desirable to perform this procedure after all reconciliations have been completed. If the Afternoon Batch is submitted prior to the reconciliation being completed for the day, the Afternoon Batch may be resubmitted once reconciliation has been completed.

By example, the Afternoon Batch may contain the reports set out in Table 4.

TABLE 4

Afternoon Batch Reports

| | | |
|---|---|---|
| ACCNT | Slot Accounting Report | Accounting |
| EXPRPT | SDS Expense Detail Report | Accounting |
| FILL/JP | Daily Fill/Jackpot Summary Balance Sheet | Accounting |
| SCALE | Scale Drop Comparison Report | Accounting |
| SFTVAL | Soft Count Comparison Report | Accounting |
| ADTDMP | Audit Trail Dump Report | Accounting |
| SLTSUM | Slot Summary Report | Accounting |

Retaining Accounting Reports—Each state's Gaming Control Board regulates how long to retain accounting reports. With the SDS Archive Utility and proper Archive Backups, it is not vital to retain paper copies of reports. However, it is convenient to have the accounting reports when trouble-shooting problems that require researching past days, recommends keeping paper copies of certain reports. Binding the reports together by type and date (e.g., week, month, or year) can help organize Audit operation and ease future research into historical documents. Various accounting reports are set out in Table 5.

TABLE 5

Accounting Reports

| Report Name | Bound By |
|---|---|
| Slot Accounting Report | Week |
| SDS Expense Detail Report | Week |
| Audit Trail Report | Month |
| Slot Summary Report | Year |
| All Jackpot Reconciliation Reports | Month |
| FILLJP - Daily Fill/JP Summary Balance Sheet | |
| All Slip Reports (JASLIP, FISLIP, BESLIP, BLSLIP) | |
| List of all Voided Unprinted slips - JPVOID/FIVOID | |
| Scale Reconciliation Reports | Month |
| SCALE - Drop Comparison Report | |
| CHECK - Scale Missing Buckets Report | |
| ONLSCL - Rejected Scale Entries Report | |
| LSTSCA - List Scale Report | |
| Soft Count Reconciliation Reports | Month |
| SFTVRN - Soft Count Variance Report | |
| SFTVAL - Soft Count Comparison Report | |
| SFTDRP - Daily Slots Not Dropped Report | |
| Progressive Reports | Month |
| PRGHIT - Progressive Jackpot Hit Detail Report | |
| PRGRPT - Progressive Meter Update Report | |
| PROLST - Progressive Meter Worksheet | |

The procedures discussed above are contemplated to be integrated into or modified in various of the embodiments described herein. In existing SMS/CMS systems, an additional accounting server and storage device or devices may be implemented or existing accounting servers and databases may be utilized together with an enterprise accounting software module or a series of software modules that when executed on a server provide the services and features described herein. In other embodiments, a standalone enterprise accounting server (EA server) may include enterprise accounting software and set-up software such that the EA server may be connected to a host computer of an SMS/CMS system, associate the existing databases with the EA server software, and perform the accounting, audit, and correction services described herein. In yet another embodiment, the EA server and software may be implemented within an SMS &/or CMS during initial manufacture.

In one or more embodiments, some of the following features and services may be incorporated:

Introduction of EA Server & Module

Purpose

Enterprise Accounting server module is designed to provide an integrated accounting, auditing, and analysis resource and replace the tools currently available in the gaming floor systems for auditing, accounting and analysis. Enterprise Accounting may give the gaming operation the ability to track cash and cashless activity generated by activity on electronic gaming machines (EGM's). Enterprise Accounting may utilize a group of databases. A data extraction process may be implemented to extract data from the floor system on a scheduled or non-scheduled basis and normalize the data in an Auditing database. This extraction process is called the Migration Service and may be implemented as a stand-alone software module or integrated within an EA software module. The migration service may be used to transition data from a variety of originating systems into a single accounting system. This may allow a gaming operation to have multiple sources, such as a Bingo or Lottery system, yet perform auditing, accounting and performance analysis through a common interface. Additionally, for multi-site gaming groups, a single source may be available for consolidated operations.

System Compatibility and Software Dependencies

In a first embodiment, the following may be integrated: 1) Casino Management System and Bingo Gaming System, e.g. Bally One System; 2) Slot Management System, e.g. BFS (i.e., Bally Floor System); 3) Lottery Gaming System; 4) Soft Count Engine, e.g. Bally SDS; 5) Report Manager, e.g. Report Manager; 6) CDI Stored Procedures, e.g. CDI Stored Procs; 7) Date Exchange Gateway.

In a second embodiment, in addition to the foregoing: 1) Mexico, Macau, or other ROW Gaming Systems; and 2) Third Party Interfaces may be integrated.

In one or more embodiments, the following may additionally be integrated: 1) a GUI web service may be used to separate the client from the database; 2) some existing code may be reused from previous accounting client; 3) Enterprise Accounting may for example use SQL 2005 as the database engine; 4) migration from the floor system may be accurate within a 30 minute variance; 5) applications may accept field input via a USB scanner if available.

System Architecture

Multi-Site Support

In a first embodiment, 1) architecture may support the ability to migrate data from multiple sites and retain traceability; 2) access to sites is limited by user roles and capabilities (e.g., security requirements); 3) default site is assigned by user role; 4) site is selected prior to selecting gaming date for auditing purposes; 5) only one site is active during audit session; 6) audit options default from system configuration (e.g., options requirements); 7) reports can be run for a single site; 8) adjustments and close period action effect only the current active audit site; and 9) one instance of Enterprise Accounting databases may be utilized per site.

In a second embodiment, 1) default site is assigned from last active session; 2) audit options can be configured by site (e.g., options requirements); 3) reports can be run for a single site or to include multiple sites; 4) one instance of Enterprise Accounting databases may support combined sites; and 5) multiple independent site data may be consolidated for reporting in a single database.

Data Warehouses

Audit

In a first embodiment, 1. migration services may move active data from the floor system to the Audit database; and 2. all auditing and adjustments may be made to "Open" gaming dates from this data set.

In a second embodiment, 1. summary tables may be created during migration to audit for transactional details such as Voucher.

Archive

In a first embodiment, 1. a separate database may be used to archive all Audit details when a period is closed; 2. audit data may be copied to Archive database when "Close" action is performed.

In a second embodiment, 1. audit data may be purged on closed period at a interval defined by the user at a system level; 2. archive data may be purged at an internal defined by the user at a system level; 3. purge may be performed as a daily automated job; 4. a query tool may be implemented to access detailed archived data; and 5. some reports may be pre-defined using Archive data.

Report

In a first embodiment, 1. a separate database may be used to generate reports on audited data; 2. audited data may be generated in Report database when a "Close" action is performed; 3. data may be created to allow efficient processing of reports for large data sets (e.g., one year period in less than 2 minutes); and 4. a purge may be performed as a daily automated job.

Reporting Functions

Reporting services may be provided via the Report Module (BRM). Individual reports may be defined by the EA development team. Reports available for Open gaming days may be limited to the selected business day. Only audit/adjustment reports are available for open gaming days. Date range for reports using Closed gaming data may be user selectable at run time. Reports that are processed to include a large number of days may not impact use of the application. If a reporting date range includes un-closed or re-opened gaming dates, that information may be noted in the report footing.

Product Features

System Options

In a first embodiment, 1. specify primary EGM identifier for lookup and reports (Asset, Device Name, etc.); 2. Meter Display Mode may use Pre-set Standards; 3. Default Soft Count Variance Dollar Amount; 4. Default Actual versus Theoretical Hold Variance Percentage; and 5. Default Cash to Played Net Variance Dollar Amount.

In a second embodiment, 1. specify number of days prior to purge of Audit "closed" data; 2. specify number of days prior to purge of Archive data; 3. specify number of days prior to purge of Report data; 4. Meter Display Mode may allow site to select, e.g. SAS, G2S, One.

User Interface

In a first embodiment, 1. "Fix It" buttons execute an appropriate adjustment to all machines that meet the current criteria and have the grid checkbox selected; 2. a checkbox may be included in the grid. A check all, uncheck all toggle button or user icon may be on the form; 3. a splash screen may be displayed during extended processes (example, retrieving data to populate a form that takes longer than 2 seconds); splash screen is modal; 4. all transaction timestamps may be displayed with date and time format; 5. any list box which can contain more than 25 selections may be styled as a combo box or field (this may allow the user to type a portion or all of the value the user is looking for and condense the displayed list); 6. the application may adopt GUI standards for color, font, field behavior, form navigation, etc.; 7. auditing sub forms (e.g., tabs) may have a grid sub form displaying machines and columns pertinent to the task; 8. auditing sub forms (e.g., tabs) may have a list of wizards displayed in a radio button list; 9. multiple users can access the application concurrently; 10. on all forms and sub forms (example, Audit Day) the currently selected site, gaming date and user login name is displayed in the status bar of the form; 11. users should be able to navigate forms and execute actions without requiring the use of a mouse; 12. when an active wizard selection is changed, information in the grid may be refreshed to display only machines that meet the criteria; 20. when changes on a form are saved, the application may verify it has not been changed by another user (the current user may be able to accept or override or discard their work); 14. when possible, wizards may have a "Fix It" button; and 15. Wizards may have a calculation parameter (such as a percentage) that can be overridden on the form.

In a second embodiment, 1. windows localization selections should be used for text, date/time and currency displays.

Help Engine

In a first embodiment, 1. context sensitive help may be available on controls; 2. selecting the Help menu option may launch an indexed, searchable, detailed help subsystem; 3.

tool tips may be available on control labels and 4. Help may use the current Documentation template.

Main Form

In a first embodiment, 1. options (snap ins) displayed are based on user settings (e.g., security); 2. default option is Home; and 3. users can select other options.

Home Snap-In

In a first embodiment, 1. application launches to this form; 2. the audit site is defaulted; 3. user/auditor may select alternate gaming date by typing a date or selecting it from a calendar control; 4. user/auditor selects to "Audit Day" or "Close Day"; 5. gaming day selection is defaulted to earliest open gaming day; 6. if gaming date is closed and "Audit Day" is selected, user is prompted to "Re-Open Gaming Day?"; 7. if the gaming date is open and "Audit Day" is selected, the Audit System Financials form is launched; 8. if the gaming date is open and "Close Day" is selected, the Close Gaming Day form is launched; 9. the user may select the site and gaming day for audit; 10. the user may be able to change their password on this form; 11. user access is validated through security settings; and 12. users may be prompted to create new password based on security settings.

In a second embodiment, 1. user/auditor may select alternate site from a drop-down list box.

Re-Open Gaming Day

In a first embodiment, 1. selecting a "Cancel" icon returns to the Accounting form; 2. a flag is set in the _Audit database to show the gaming date is in a "Re-opening" status; 3. if the gaming details have not been purged from the _Audit database, the system changes the status to "Open"; 4. if the user does not have appropriate rights, system prompts for Supervisor login; 5. once an appropriate security level is authenticated, system prompts the user to "Cancel" or "Re-Open Day"; 6. Re-Open Gaming Day checks the user capabilities (e.g., security options); 7. this action is logged in the system, including gaming date, site, user authorizing re-opening, start time, complete time; 8. this action should not impact usability of the application by other users; and 9. when all details have been restored to the _Audit database, a "Re-opening gaming date xx-xx-xxxx for xxxxxx site is complete." is displayed to the user.

In a second embodiment, 1. selection of a "Re-Open Day" icon checks the purge status in the _Audit database; 2. if the details have been purged from the _Archive database, a message is displayed to the user and the system returns to the Accounting form; 3. if the details have not been purged from the _Archive database, a process restores them for access in _Audit database; and 4. if the gaming details have been purged from the _Audit database, the system checks availability in the _Archive database.

Accounting Snap-In form

In a first embodiment, 1. the Accounting snap-in panel has auditing options listed.

EGM Form

In a first embodiment, 1. the EGM form is the second option on the Accounting snap-in panel. This is a maintenance form for EGM details; 2. the EGM form displays a grid sub form with a machine list; 3. Details reside in the _Asset database; 4. a find option allows the user to enter machine attributes. As attributes are added, the machines displayed in the grid are reduced to those meeting the current criteria; 5. machine attributes include: Manufacturer ID; Serial Number; EGM ID; Asset Number (Internal ID); Device Name (System Generated); Location; Game Title; Entry of Game Title is from a drop-down combo box; Base Denomination; Regulatory ID; Theoretical Hold %; Current Configuration Date; Asset Status (example, in-transit, live, warehouse, retired); Floor status (Enabled, Disabled); 6. a combination of manufacturer and serial number identify a unique machine; 7. the manufacturer ID matches GSA identifier; 8. the migration service maps non-standard GSA manufacturer ID; 9. the migration service maps Game Theme to Game Title on Games CD; 10. the migration service maps game payout to Hold % on Games CD (calculate value); 11. this form may have a feature to lookup the configuration history (changes to machine attributes); 12. a unique identifier for EGM lookup and reporting is defined at system level (Audit ID); 20. this information is editable within Accounting forms; and 14. changes to this information may not be pushed back to the floor system.

In a second embodiment, 1. machine attributes include: Progressive Game Type (Non-progressive, Progressive, Wide-Area Progressive); Regulatory Status (example, Class II/Compact/Commission); Migration service draws regulatory status from floor system; and Fee Attributes (example, participation fee, WAP fee, state fee); and 2. changes to this information may be pushed back to the floor system.

Audit System Financials

In a first embodiment, 1. Audit System Financials is the first option in the Accounting snap-in panel; 2. Audit System Financials checks user capabilities (e.g., security options); 3. if the user is not configured to audit financial data for the selected site, access fails and the user is returned to the Accounting form; 4. once the appropriate security level is authenticated, the system launches the Audit System Financials main form; 5. one or more tabbed sub forms are displayed, based on user capabilities.

Soft Count Reconciliation

In a first embodiment, 1. selection of a Soft Count Reconciliation tab on the Audit System Financials form allows the user to audit details of machine metered drop activity to activity reported by the Count Room(s); 2. this grid may have an option to group by count room and EGM number, or group by EGM number; 3. this form may have a Variance wizard that may compare the total dollar value of the drop to count. The wizard may have a parameter that may filter to include records that have a variance >=the dollar amount specified. The default for this parameter is a site level option; 4. the user can select a record from the grid and access the EGM Details form; 5. this form may have a switched canister wizard to quickly identify machines that may have had an incorrect EGM number entered in the Count Room. Such may be determined when two machines have equal and opposite variances for each attribute (e.g., bills and vouchers). This wizard may have a Fix It button. The Fix It button may transpose the EGM number for the rows currently selected in the grid; 6. this form may have an incorrect business day to quickly identify machines that may have reported the drop on an incorrect business day. This wizard may have a Fix It button. The Fix It button may prompt the user to either change the business day of the count record or the drop record for the machines currently selected in the grid; 7. this form may have a missing count wizard to quickly identify machines that reported drop but were missing data from the count room. This wizard may have a Fix It button. The Fix It button may prompt the user to either invalidate machine drop meters or create a count record for the machines currently selected in the grid; 8. this form may have a missing drop wizard to quickly identify machines that had data reported from the count room but did not have a drop reported from the machine. This wizard may have a Fix It button. The Fix It button may prompt the user to either invalidate the count record or create a drop record for the machines currently selected in the grid; 9. this form may have a voucher not paid variance wizard to quickly identify machines that included a voucher barcode in the count file, but the voucher is not recorded as paid by the machine. The Fix It button may prompt the user to change the status to paid by the machine or invalidate the voucher in the count file for the vouchers currently selected in the grid; and 10. this form may have a Duplicate Validation ID wizard to quickly identify machines that have the same validation ID in vouchers scanned. The Fix It button may allow the auditor to accept the dollar amount as an adjustment to Liability.

Voucher

In a first embodiment, 1. the Voucher tab on the Audit System Financials form lists all vouchers with activity on the gaming date. Details are grouped by voucher status; 2. the form may have a Paid Pending wizard to identify all vouchers with a status of Paid Pending (the Fix It button may prompt the user to change the status to paid by the device associated with the action or to reset the status to Outstanding with no associated device); 3. this form may have a Printed/Created wizard to identify all vouchers that show a printed date not corresponding with the business date of the voucher (the Fix It button may prompt the user to change the gaming date of the vouchers currently selected or accept the variance); 4. this form may have a Paid/Created wizard to identify vouchers that show a paid date prior to the creation date (there is no Fix It button with this wizard, the Fix It button may prompt the user to change the gaming date of the vouchers currently selected or accept the variance); 5. this form may have a Past Expiration Period wizard to identify all vouchers that have passed the expiration period for the site but do not have a status of Expired (the Fix It button may prompt the user to change the status to Expired); 6. this form may have a Validation ID wizard that allows the user to enter the barcode number of a specific voucher (there is no Fix It button associated with this wizard); 7. this form may have a Machine Exception wizard that allows the user to quickly identify vouchers that have either a printed or paid device that does not correspond to an existing device in _Asset (his wizard has no Fix It button); 8. this form may give the user access to a Voucher Detail form for the currently selected record.

Voucher Detail

In a first embodiment, 1. this form shows all details of a single voucher; 2. this form allows the auditor to change the details of the current record; 3. this form allows the auditor to insert a Voucher record; 4. if the new Voucher record has a Validation ID of a pre-existing record, the new record is tracked separately.

EGM Financial

In a first embodiment, the EGM Financial tab on the Audit System Financials form lists each machine with activity during a gaming date; 2. form may have a No Accounting Meter wizard to quickly identify machines that did not have an EOD accounting meter reported to the system. This wizard may have a Fix It button that prompts the user to either generate an EOD based on detailed transactions or to manually select an available event to use for activity; 3. The form may have a Net Variance wizard to quickly identify machines that have a variance between net calculated on cash transactions and net calculated on money played. This calculation is based on [Cash In+voucher In+Promo In+WAT In]−[Voucher Out+Cash Out+Cancelled Credit Out+Promo Out+WAT Out−Credits on Machine]=Cash Net. There is no Fix It Button on this wizard; 4. The form may have a Voucher Printed wizard to quickly identify machines that have a variance between machine metered voucher printed values and individual transactions in the vouchering system. This wizard may have a Fix It button that allows auditor to update the machine summary meters with the count and amount from the vouchering system; 5. The form may have a Voucher Paid wizard to quickly identify machines that have a variance between machine metered voucher printed values and individual transactions in the vouchering system. This wizard may have a Fix It button that allows auditor to update the machine summary meters with the count and amount from the vouchering system; 6. This form may have a Jackpot wizard to quickly identify machines that have a variance between machine metered Jackpot values and individual jackpot voucher and jackpot handpay cancelled credit events. This wizard may have a Fix It button that allows auditor to update the machine summary meters with the count and amount from the vouchering system; 7. This form may have a Promo Coupon wizard to quickly identify machines that have a variance between machine metered promotional coupons redeemed and individual transactions in the promotional system. This wizard may have a Fix It button that allows auditor to update the machine summary meters with the count and amount from the vouchering system; 8. This form may have a WAT In wizard to quickly identify machines that have a variance between machine metered WAT transfers to the machine and individual transactions from the WAT system. This wizard may have a Fix It button that prompts the user to either update the machine meters with the WAT system values or to post balancing adjustment against the WAT system using the delta from machine meters; 9. This form may have a WAT Out wizard to quickly identify machines that have a variance between machine metered WAT transfers from the machine and individual transaction to the WAT system. This wizard may have a Fix It button that prompts the user to either update the machine meters with the WAT system values or to post balancing adjustment against the WAT system using the delta from machine meters; 10. This form may give the user access to the Audit EGM Financials form for the currently selected machine.

WAT Transactions

In a first embodiment: 1. The WAT Transactions tab on the Audit System Financials form lists all transfer in and transfer out activity. This form defaults activity grouped by machine. The auditor can regroup this activity by patron identifier; 2. This form may have a WAT In wizard to quickly identify machines that have a variance between machine metered WAT transfers to the machine and individual transactions from the WAT system. This wizard may have a Fix It button that prompts the user to either update the machine meters with the WAT system values or to post balancing adjustment against the WAT system using the delta from machine meters; 3. This form may have a WAT Out wizard to quickly identify machines that have a variance between machine metered WAT transfers from the machine and individual transaction to the WAT system. This wizard may have a Fix It button that prompts the user to either update the machine meters with the WAT system values or to post balancing adjustment against the WAT system using the delta from machine meters; 4. This form may give the user access to the WAT Transaction Details form for the currently selected record.

In a second embodiment, 1. WAT liability is added.

Cashier Activity

In a first embodiment

The Cashier Activity tab on the Audit System Financials form lists each cashier with activity during a gaming date.

A grid subform may list the cashier, total vouchers paid, total vouchers printed, total vouchers voided, total hand pay, and total manual payouts.

The form may give the user access to the Manual Payout form.

In a second embodiment

The grid subform may enhanced to include full cashier reconciliation.

Kiosk Activity

In a first embodiment

The Kiosk Activity tab on the Audit System Financials form lists each kiosk with activity during a gaming date.

A grid subform may list the kiosk and total voucher paid.

Manual Payout

In a first embodiment

The user can enter a cash payout from this form.

The auditor may enter the cashier terminal and cashier name where the payout occurred.

the auditor may enter the machine number that the adjustment applies to.

Audit EGM Financials

In a first embodiment, 1. the Audit EGM Financials form is the third option on the Accounting snap-in pane; and 2. this form allows the user to select a specific EGM and review/audit all activity for the selected gaming day.

Variance

In a first embodiment, 1. the Audit EGM Financials form has a grid subform that summarizes machine metered totals and detailed transactions, with a calculated variance displayed.

Tabbed Subforms

In a first embodiment, 1. the Audit EGM Financials form has a tabbed subform; and 2. these tabs match the Audit System Financial tabs, but limit the data to the selected EGM Meters In a first embodiment, 1. the Audit EGM Financials form has a Meters grid subform; 2. the subform lists all meter detail gathered from subsystems for this machine; 3. individual meters may be selected and invalidated; and 4. two meters may be selected and used to recalculate daily machine summary totals.

Close Day

In a first embodiment, 1. selection of a "Close Day" option checks user capabilities (Security options); 2. if a user does not have appropriate rights, system prompts for Supervisor login; 3. once appropriate security level is authenticated, system prompts to Cancel or Review Adjustments; 4. selection of a Cancel icon returns to Accounting Form; 5. selection of a Review Adjustments icon launches an Adjustment form; 6. a "Close Day" action flags the business date as "Closing . . . ", prevents any additional audit activity for the gaming date, creates daily reporting data in _Report, copies data to _Archive and updates the status to "Closed" when all processes are complete.

Review Adjustments

In a first embodiment, 1. The form displays a site-level balance; 2. Grid lists each adjustment, type, user login and financial details; 3. Grid can be modified to regroup details by Adjustment Type or User; 4. Auditor can cancel adjustment (s) which may refresh balance; 5. The user or Auditor can accept selected adjustments; 6. The user or Auditor can print an adjustment report; 7. The user or Auditor can exit to the Audit System Financials form; and 8. The user or Auditor can close day and return to the Accounting form.

Introduction

Purpose

To populate data in the _Report database from the _Audit database in a warehouse format as gaming days close. This may provide reporting capability on closed gaming days and queries against the _Report database.

To populate data in the _Archive database from the _Audit database as a mirror image of the _Audit database as gaming days are closed. After gaming days are closed, archived in the _Archive database, the data can be deleted from the _Audit database based on a configurable retention period.

The _Archive database may provide the historical detail data needed for legal retention purposes, and provide a source of data if a gaming day is re-opened beyond the _Audit database retention period.

Diagram Overview

Figure 8:
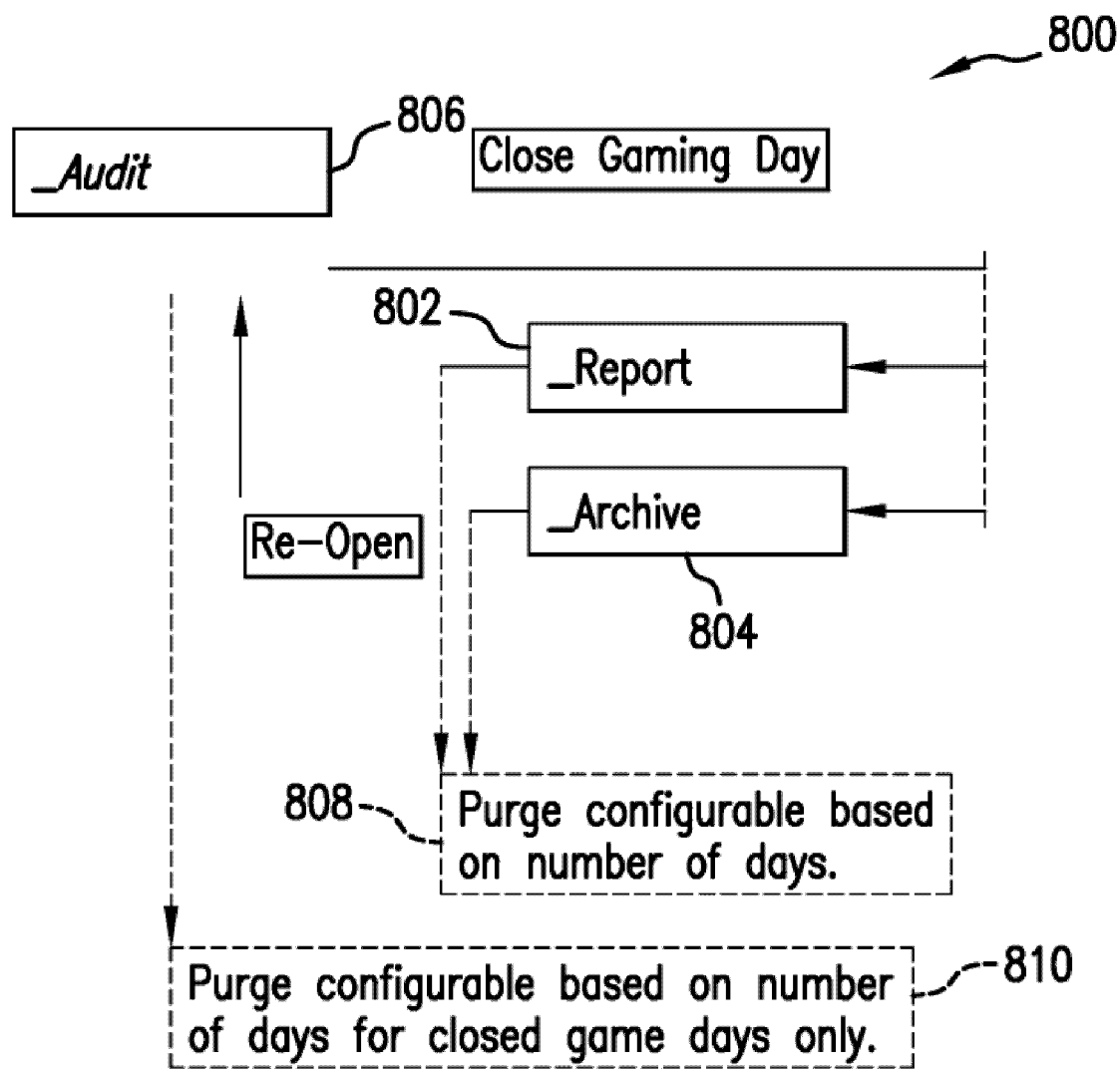
FIG. 8 is a schematic diagram of a database flow schema implemented by an EA module for auditing, reporting, and archiving following the close of a gaming day, according to one illustrated embodiment.

FIG. 8 shows an exemplary database flow schema 800 implemented by an EA module, for auditing, reporting, and archiving following the close of a gaming day.

Detailed Functional Requirements

Archive _Audit Gaming Day

The EA Manager client may provide the capability for the user to select a gaming day and Close and Archive that gaming day.

The data may first be written to the _Report database 802 in a data warehouse design, with fact, aggregate and dimension tables.

Then the data may be written to the _Archive database 804. The financial data may be identical to _Audit data 806. The _Archive database 804 may provide the historical data needed for legal retention purposes.

When the data copy and processing to _Report database 802 and _Archive database 804 is complete and verified as successful, the gaming day status in _Report and _Audit databases 802, 806, respectively, may be change from 'Closing' to 'Closing'.

The _Report and _Archive databases 802, 804 may support updates to the data.

The _Report database 802 and EA Manager client may not include Cage Cashier Session data and functionality. The _Report database 802 may include Cashier user and summary data for vouchers printed by cashier.

No reporting can occur against the _Report database 802 on a gaming day that is flagged as 'Closing'. This may be communicated to the EA Manager client user.

If the archive fails from the _Audit database 806 to the _Report database 802 and the _Archive database 804, this failure may be logged and event notification may be sent.

The time zone and the daylight savings flag may be copied to the _Report database 802.

A purge function 808 on the _Report database 802 and _Archive database 804 may be configurable based on number of days.

The purge function 808 on the _Archive may be configurable based on number of days for 'Closed' game days only.

Re-Open _Audit Gaming Day that has been Archived

The EA Manager client may have the capability for the user to select a closed game and Re-Open the gaming day. If the gaming day has not been purged 810 from the _Audit database 806, the game day may be re-opened from the _Audit database 806. If the gaming day has been purged 808 from the _Archive database 804, an additional message may be displayed to the user that they are 'confirming' the re-open from the _Archive database 804.

When the Re-Open action is selected the Gaming Day status in _Report database 802 and _Archive database 804 may be changed to 'Re-Open In-Progress'.

The data may be copied from the _Archive database 804 back to the _Audit database 806. When the processing to the _Audit database 806 from the _Archive database 804 is complete and verified as successful, the gaming day status in the _Report database 802 and the _Archive database 804 may be change from 'Re-Open In-Progress' to 'Re-Opened'.

The reports may be able to reflect that the gaming day was re-opened.

If the date range requested for a report includes a game day that is not closed this should be indicated through the client or the report.

If the 'Re-Open' processing fails from the _Audit database 806 to the _Archive database 804, this failure may be logged and event notification may be sent.

Internationalization and Localization Requirements

The _Report database 802 may support localization.

International language support may be included in the Report Manager (BRM) project, such as Spanish, French, etc.

Human Interface requirements

The EA Manager client may contain functionality to include: i) archiving a gaming day; ii) re-Opening an Archived gaming day; iii) an indication when a reports needs to be re-printed due to re-open and close of a gaming day; iv) the EA Manager should include a status of the gaming days that have been archived.

Performance Requirements

The process of closing and archiving a gaming day should take less than 10 minutes.

When the Archiving or the Re-Opening processing occurs, the _Report reports should process s without any impact to performance from the Closing or the Re-Opening processing.

The EA Manager client should process without impact to performance while other processes from the Closing or the Re-Opening processing.

Legal Requirements

The retention period for historical data in the _Archive database 804 may be configurable to whatever the legal requirement is of that jurisdiction, or decision by the casino.

Manufacturing and Hardware Requirements

CPU, memory and disk space may be analyzed in conjunction with all of the EA processes to determine the correct configuration.

Upgradeability Requirements

The _Report database 802 and the _Archive database 804 and the client functionality may be expanded in a future releases to include Cage Cashier Session reconciliation for cage and handheld. The progressive data may also be included in future releases.

Any schema changes to the _Audit database 806 may be reviewed as these changes may need to be incorporated into the Report database 802 and the _Archive database 804.

Reliability Requirements

Archiving a gaming day processing may be designed and tested to ensure if the process succeeds under normal conditions and if it does fail it gives accurate trouble shooting information and the ability to re-run the archiving process successfully. Abnormal conditions include power outages or server down.

Re-Opening a gaming day processing may be designed and tested to ensure if the process succeeds under normal conditions and if it does fail it gives accurate trouble shooting information and the ability to re-run the re-open process successfully. Abnormal conditions include power outages or server down.

Introduction—Enterprise Accounting Software Module (EAM)—The purpose of Enterprise Accounting Manager is to simplify the audit process for a floor system audit. The user (e.g., an auditor) is presented with a simple and straight forward approach to see where the variances are, and is quickly able to make adjustments and close out the business day.

User Characteristics—The EAM may have various levels of security associated with respective users or user roles. For instance, an Accountant may be able to view financial data and make adjustments to the accounting data. This role may not be allowed to manage user accounts, configure Enterprise Accounting functions, or close business days. Also for instance, an Accountant Supervisor may be able to view financial data and make adjustments to the accounting data and close business days. This role may be allowed to configure Enterprise Accounting functions, approve adjustments, and close business days. This role may not be allowed to manage user accounts, or re-open business days. As another example, an Auditor may be able to manage reports, view financial data, approve adjustments, close and re-open business days. This role may not be allowed to manage user accounts. As a further example, an Audit Supervisor can do everything. This role is designed for small sites with a limited staff who needs to be able to perform all functions required in the other roles.

Operations—Table 6 lists example available operations in the Enterprise Accounting Client:

TABLE 6

| Operation | Description |
| --- | --- |
| View Machine Information | Allow the user to view the current details of a machine |
| View Machine History | Allow the user to view historical details of a machine |
| View Cashier Detail | Allow the user to view Cashier user information |
| View Session Detail | Allow the user to view session activity by a cashier |
| View Fund Detail | Allow the user to view system transactions like vouchers, handpays, promotional vouchers, WAT In, and WAT Out |
| View Closed Financial Information | Allow the user to view financial information even if the day has already been closed |
| View Open Financial Information | Allow the user to view financial information for open business days |
| Run Reports | Allow the user to run reports |
| Manage Reports | Allow the user to load and remove reports |
| View Adjustments | Allow the user to view existing adjustments |
| Make Adjustments | Allow the user to make adjustments |
| Approve Adjustments | Allow the user to approve the adjustments |
| Cancel Adjustments | Allow the user to cancel adjustments |
| Use Financial Adjustment Utility | Allow the user to use the built-in Financial Adjustment Utility of the EAM client |
| Configure EA Functions | Allow the user to configure EA functions and configured settings |
| Close Business Day | Allow the user to close a business day |
| Re-open Business Day | Allow the user to re-open a closed business day |
| Create Manual Payout | Allow the user to create a manual payout transaction |
| Create Voucher | Allow the user to create a manual voucher |

Table 7 lists an exemplary set of authorizations for various users or user roles, granting particular users or user roles right to view, modify or delete certain information.

TABLE 7

Security Matrix

| Operation | Accountant | Accountant Supervisor | Auditor | Auditor Supervisor |
| --- | --- | --- | --- | --- |
| View Machine Information | Yes | Yes | Yes | Yes |
| View Machine History | Yes | Yes | Yes | Yes |
| View Cashier Detail | Yes | Yes | Yes | Yes |
| View Session Detail | Yes | Yes | Yes | Yes |
| View Fund Detail | Yes | Yes | Yes | Yes |

TABLE 7-continued

Security Matrix

| Operation | Accountant | Accountant Supervisor | Auditor | Auditor Supervisor |
|---|---|---|---|---|
| View Closed Financial Information | Yes | Yes | Yes | Yes |
| View Open Financial Information | Yes | Yes | Yes | Yes |
| Run Reports | Yes | Yes | Yes | Yes |
| Manage Reports | No | No | Yes | Yes |
| View Adjustments | Yes | Yes | Yes | Yes |
| Make Adjustments | Yes | Yes | Yes | Yes |
| Approve Adjustments | No | Yes | Yes | Yes |
| Cancel Adjustments | No | Yes | Yes | Yes |
| Use Financial Adjustment Utility | Yes | Yes | Yes | Yes |
| Configure EA Functions | No | Yes | Yes | Yes |
| Close Business Day | No | Yes | Yes | Yes |
| Re-open Business Day | No | No | Yes | Yes |
| Create Manual Payout | Yes | Yes | Yes | Yes |
| Create Voucher | Yes | Yes | Yes | Yes |

Button Processing Description

Audit Business Day—Selection of an Audit Business Day icon may allow the user to audit a business day for a site. The user may only be able to audit an open or re-opened business day. If the user selects a business day that does not have an open or re-opened status, then the user may be prompted to continue in a read-only mode. If the user selects the read-only mode, then the user may be able to enter the audit system financials screens but all the adjustment buttons may be disabled.

Audit Machine—Use the select box to select one and only one machine, then select the Audit Machine button icon to go to the Machine Financial Detail main screen. If no machine is selected when the Audit Machine button icon is selected, then a pop-up box is displayed that provides a message such as 'Select a machine to audit'. If more than one machine is selected, a pop-up box is displayed that provides a message such as 'Select only one machine to audit'.

Select All/Deselect All—When selected, the select box on all rows is set to selected and the text in the grid is changed to 'Deselect All'. When unselected, the select box on all rows is cleared and the text in the grid is changed back to 'Select All'.

Fix It—Selection of a Fix It icon may correct known problems on selected rows. Not active for all filter selections.

Machine Detail—Use the select box to select one and only one machine, then select the Machine Detail button icon to go to the Machine Details main screen. If no machine is selected when the Machine Detail button icon is selected, then a pop-up box is displayed that provides a message such as 'Select one machine to see the details'. If more than one machine is selected, a pop-up box is displayed that provides a message such as 'Select only one machine to see the details'.

Referring again to FIG. 7B, the following information may be displayed in the Machine Detail screen: Manufacturer; Serial Number; EGM ID; Machine ID; Asset Number (Internal ID or Machine ID); Internal ID; Device Name (System Generated); Location; Game Title; Base Denomination; Regulatory ID; Theoretical Hold %; Current Configuration Date; Status (example, in-transit, live, warehouse, retired); Floor Status (Enabled, Disabled); Site; Installation Date; Program Name; Program Version; IP Address; Model Type; Machine Type; Area; Show History.

Variance Criteria—There is one check box that allows the user to select an amount when processing the filters. Once check box is selected, the user can enter an amount via an appropriate field.

FIG. 9 shows an exemplary manual payout window or screen 900 is shown, according to one illustrated embodiment.

Manual Payout—Selection of the Manual Payout button icon allows the user to create a manual payout. The following information may be provided before the manual payout can be created: validation ID 902; amount of the manual payout 904; the Cashier name who did the manual payout 906; identity of the Cashier terminal where the manual payout was done 908; the Machine ID that the adjustment applies to 910; business day for the manual payout 912; reason why the manual payout slip was created 914.

FIG. 10 shows a session detail window or screen 1000, according to one illustrated embodiment.

Session Detail—Selection of the Session Detail button icon allows the user to view the details of the cashier session. It may display a pop up box that may display the details of all the activity that occurred during the session for the cashier selected.

TABLE 8

Session Detail Grid

| Column Text | Description | Type | Format |
|---|---|---|---|
| Validation ID | The barcode of the promotional voucher | | |
| Action | Indicates Vouchers current status like Create, Redeem etc. | | |
| Status | Indicates Actions status as success or failed | | |
| Printed Business Day | Business Day when voucher was printed | | |
| Printed Date and Time | Date and time when voucher was printed | | |
| Printed Where | Voucher printed location | | |
| Printed Amount | Voucher printed amount | | |
| Paid Business Day | Business day when voucher was paid | | |
| Paid Date and Time | Date and time when voucher was paid | | |
| Paid Where | Voucher paid location | | |
| Paid Amount | Voucher paid amount | | |
| Void Business Day | Business day when voucher was void | | |
| Void Date and Time | Date and time when voucher was void | | |
| Void Where | Voucher void location | | |
| Void Amount | Voucher void amount | | |
| Expired Business Day | Business day when voucher was expired | | |
| Expired Date and Time | Date and time when voucher was expired | | |
| Expired Amount | Voucher expired amount | | |

FIG. 11 shows a wagering account transfer (i.e., WAT) Transaction Detail window or screen 1100, according to one illustrated embodiment.

WAT Detail—This button allows the user to view the details of the WAT transaction. It may display a pop up box that may display the details of the WAT transaction history.

TABLE 9

| | WAT Detail Grid | | |
|---|---|---|---|
| Column Text | Description | Type | Format |
| Business Day | Business day when WAT transaction occurred | | |
| Date and Time | Date and time when WAT transaction occurred | | |
| Action | Indicates direction of transaction | | |
| Status | Indicates Success, fail and etc | | |
| Amount | Amount of the transaction | | |
| Machine ID | The Machine from which the transaction occurred | | |
| Cashier | Cashier, who did the transaction | | |
| Card Number | | | |

FIG. 12 shows a Promo Voucher Detail window or screen 1200, according to one illustrated embodiment.

Promotion Detail—This button allows the user to view the details of the promotion. It may display a pop up box that may display the start and end times of the promotion, and the current status of the promotion.

TABLE 10

| | Promotion Detail Grid | | |
|---|---|---|---|
| Column Text | Description | Type | Format |
| Business Day | Business day when the action occurred | | |
| Date and Time | Date and time when action occurred | | |
| Action | Create, redeem etc | | |
| Status | Success or failure | | |
| Amount | Amount of the promotion | | |
| Machine ID | Machine at which promotion occurred | | |
| Cashier | | | |
| Card Number | | | |

FIG. 20 shows a Voucher Detail window or screen 2000, according to one illustrated embodiment.

Voucher Detail—Use the select box to select one and only one voucher, then select the Voucher Detail button to go to the Voucher Details main screen.

TABLE 11

| | Voucher Detail Grid | | |
|---|---|---|---|
| Column Text | Description | Type | Format |
| Business Day | Business day when voucher action happened | | |
| Date and Time | Date and time when voucher action happened | | |
| Action | Voucher creation, redeem etc. | | |
| Status | Success, failure, etc | | |
| Amount | Amount of voucher | | |
| Machine ID | Machine where voucher's action occurred | | |

TABLE 11-continued

| | Voucher Detail Grid | | |
|---|---|---|---|
| Column Text | Description | Type | Format |
| Cashier | Cashier who did voucher's action | | |
| Card Number | | | |

FIG. 14 shows a Find Voucher window or screen 1400, according to one illustrated embodiment.

Find Voucher—Select the Find Voucher button icon to go to the Find Voucher main screen. This screen may allow the user to enter the following criteria: Validation ID; Amount range of the voucher ($); Date Time when the voucher was printed; Voucher print location; Date Time when the voucher was paid; Location where voucher was paid; Action.

TABLE 12

| | Find Voucher Grid | | |
|---|---|---|---|
| Column Text | Description | Type | Format |
| Select All | Select a voucher | | |
| Validation ID | The barcode of the promotional voucher | | |
| Action | Indicates voucher's action | | |
| Printed Business Day | Business day when the voucher was printed | | |
| Printed Date and Time | Date and time when the voucher was printed | | |
| Printed Where | Location where the voucher was printed | | |
| Printed Amount | Amount of printed voucher | | |
| Paid Business Day | Business day when the voucher was paid | | |
| Paid Date and Time | Date and time when the voucher was paid | | |
| Paid Where | Voucher's paid location | | |
| Paid Amount | Voucher's paid amount | | |
| Void Business Day | Business day when the voucher was void | | |
| Void Date and Time | Date and time when the voucher was void | | |
| Void Where | Where the Voucher was void | | |
| Void Amount | Voucher's void amount | | |
| Expired Business Day | Business day when the voucher was expired | | |
| Expired Date and Time | Date and time when the voucher was expired | | |
| Expired Amount | Voucher's expired amount | | |

Figure 15:
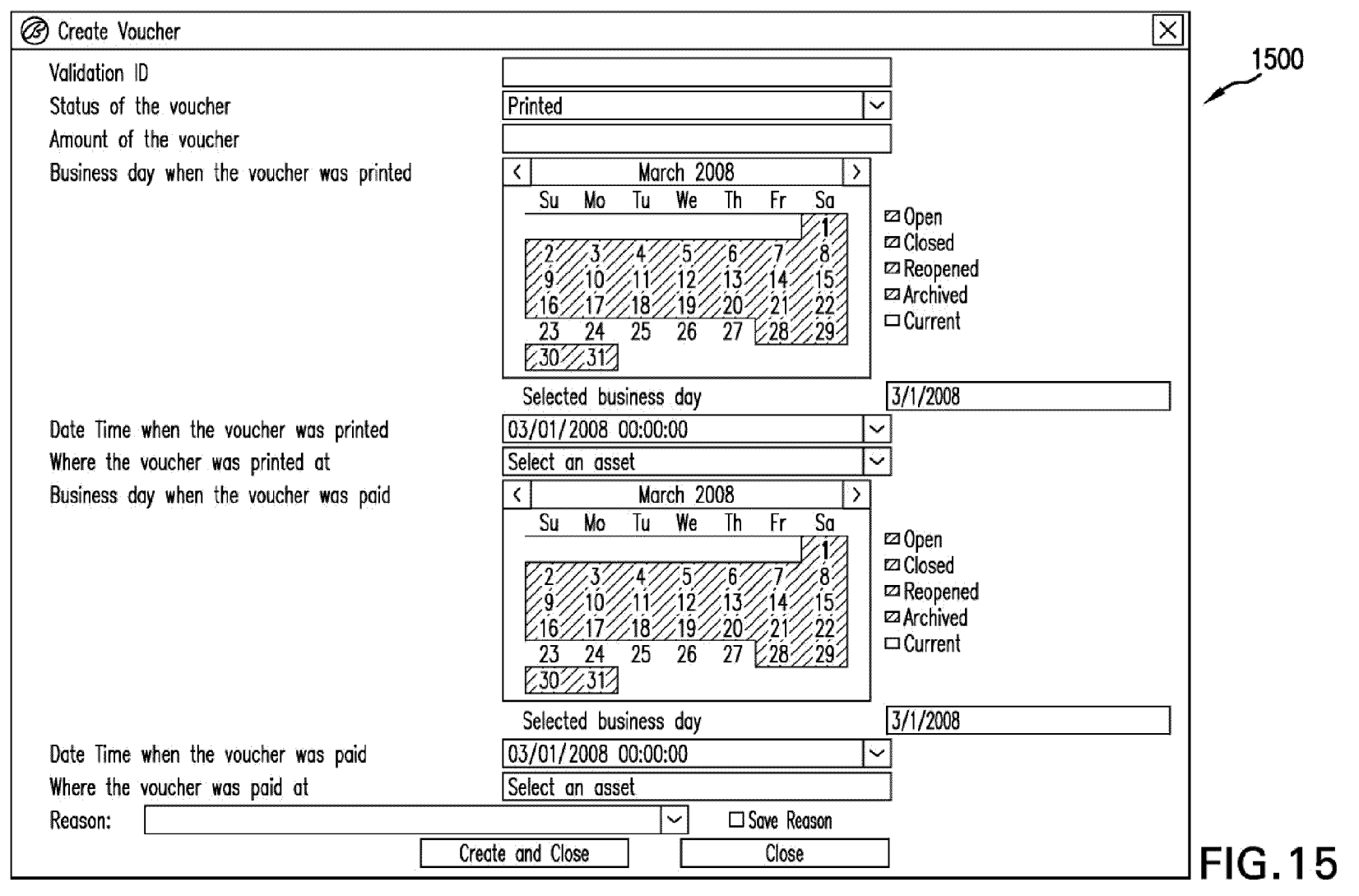

FIG. 15 shows a Create Voucher window or screen 1500, according to one illustrated embodiment.

Create Voucher—Select the Create Voucher button icon to allow the user to manually create a new voucher. The following information needs to be provided before the voucher can be created: Validation ID; Status of the voucher; Amount of the voucher; Business day when the voucher was printed; Date Time when the voucher was printed; Where the voucher was printed at; Business day when the voucher was paid; Date Time when the voucher was paid; Where the voucher was paid at; Reason why the voucher is being created.

Figure 16:
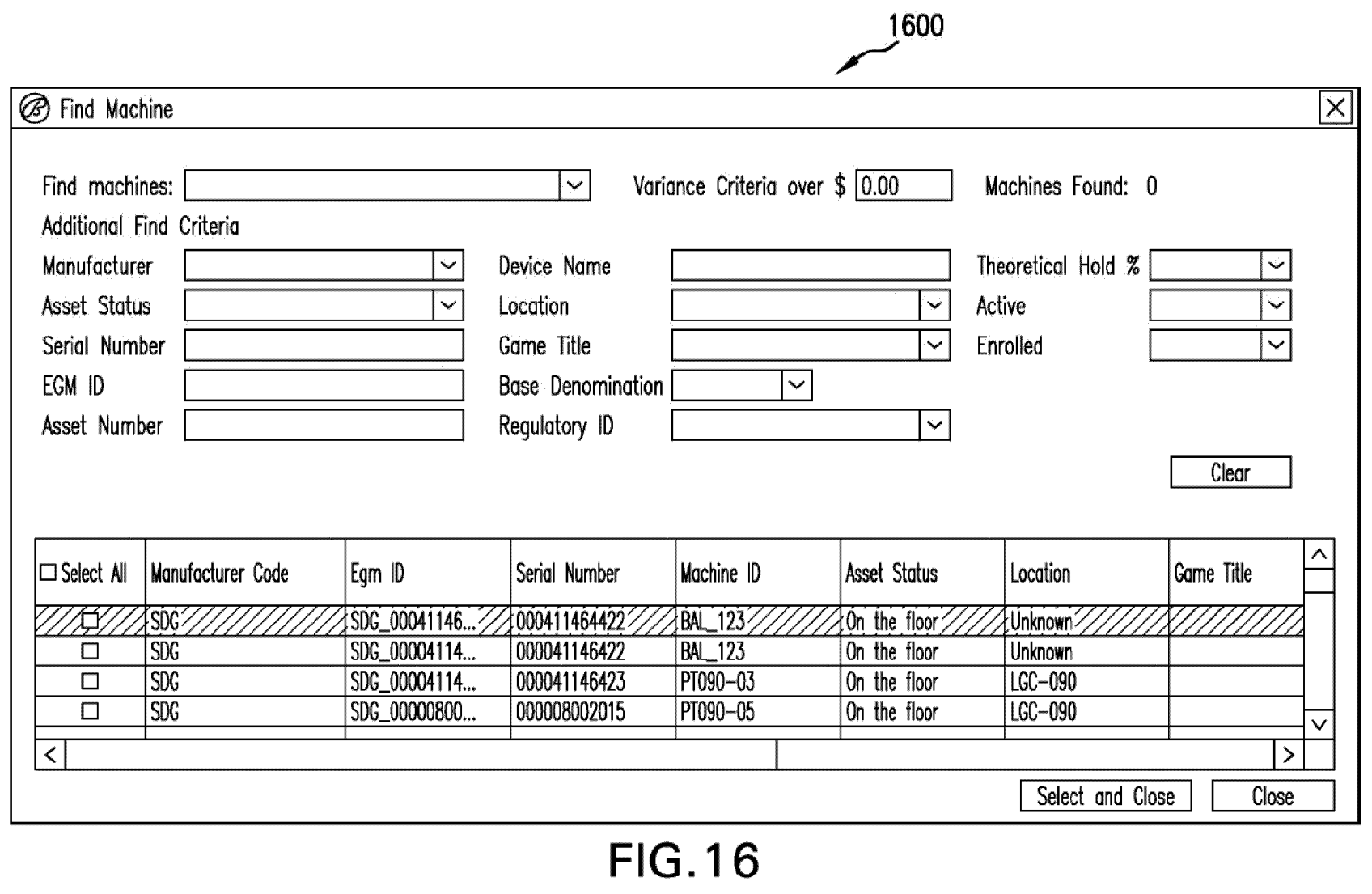

FIG. 16 shows a Find Machine window or screen 1600, according to one illustrated embodiment.

Find Machine—Select the Find Machine button icon to go to the Find Machine main screen. This screen may allow the user to enter the following criteria: Manufacturer; Serial Number; EGM ID; Asset Number (Internal ID); Device Name (System Generated); Location; Game Title; Base Denomination; Regulatory ID; Theoretical Hold %; Asset Status (example, in-transit, live, warehouse, retired); Active; Enrolled.

TABLE 13

Find Machine Grid

| Column Text | Description | Type | Format |
|---|---|---|---|
| Select All | Select a machine | | |
| Manufacturer Code | Code of the machine manufacturer | | |
| Egm ID | | | |
| Serial Number | Serial number of the machine | | |
| Machine ID | Id of the machine | | |
| Asset Status | Indicates asset current status as located on the floor etc | | |
| Location | Indicates location of the machine | | |
| Game Title | Title of the active game in the machine | | |
| Denomination | Indicates what are the denominations can be accepted by the active game in the machine | | |
| Regulatory ID | Regulatory Id of the machine | | |
| Theoretical Hold | The percentage of amount the machine can hold | | |
| Current Configuration Date | Date on which the last configuration has done on the machine | | |

Close Business Day

FIG. 17 shows a Cancel Adjustment window or screen 1700, according to one illustrated embodiment.

Cancel Adjustments—Selection of a Cancel Adjustments user selectable icon allows the supervisor to cancel selected adjustments.

TABLE 14

Cancel Adjustment Grid

| Column Text | Description | Type | Format |
|---|---|---|---|
| Date and Time | Date and time when the adjustment canceled | | |
| Business Day | Business day on which the adjustment canceled | | |
| Adjustment Type | Indicates whether system, manual or wizard adjustment | | |
| Adjustment Name | | | |
| Adjusted To Adjusted By | Counted, The cashier who did the adjustment | | |
| Machine ID | Machine Id on which the adjustment happened | | |
| Previous Value | Indicates the value before adjustment | | |
| Adjustment | Indicates adjustment amount | | |
| New Value | Previous value + adjustment | | |
| Date and Time Approved | Adjustment approved date and time | | |
| Approving Supervisor | Supervisor who approved the adjustment | | |
| Reason | Reason of the adjustment | | |
| Event | | | |
| Device Type | Device type class name | | |
| Meter Type | Adjusted meter type | | |
| Meter Start | Starting value of the meter | | |
| Meter End | End value of the meter | | |
| Meter Delta | Difference of the start and end value | | |
| Meter Adjustment | Adjusted amount on meter | | |

Figure 18:
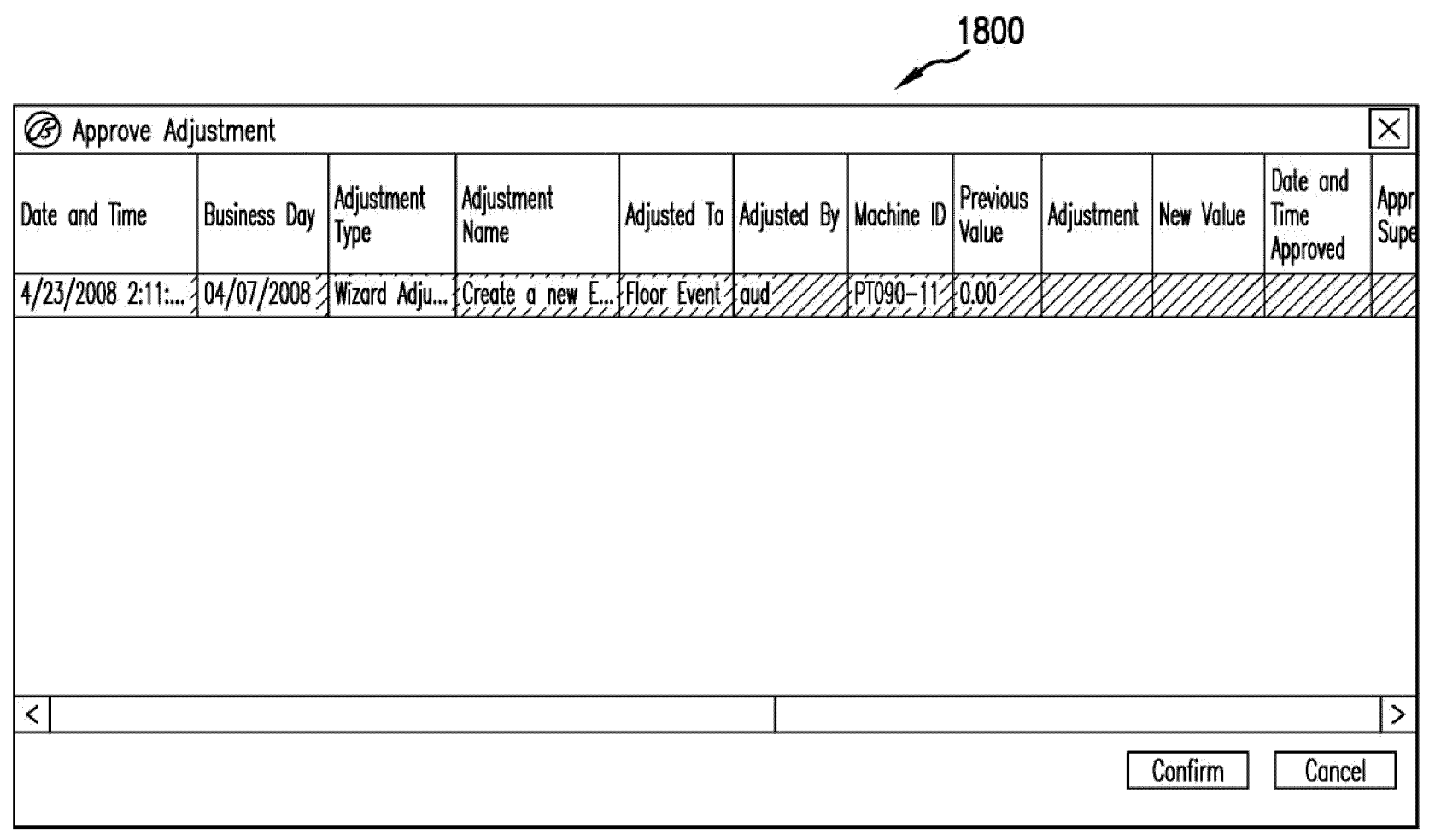

FIG. 18 shows an Approve Adjustments window or screen 1800, according to one illustrated embodiment.

Approve Adjustments—Selection of an Approve Adjustments user selectable icon allows the supervisor to approve selected adjustments.

TABLE 15

Approve Adjustment Grid

| Column Text | Description | Type | Format |
|---|---|---|---|
| Date and Time | Date and time when the adjustment approved | | |
| Business Day | Business day on which the adjustment approved | | |
| Adjustment Type | Indicates whether system, manual or wizard adjustment | | |
| Adjustment Name | | | |
| Adjusted To Adjusted By | Counted, The cashier who did the adjustment | | |
| Machine ID | Machine Id on which the adjustment happened | | |
| Previous Value | Indicates the value before adjustment | | |
| Adjustment | Indicates adjustment amount | | |
| New Value | Previous value + adjustment | | |
| Date and Time Approved | Adjustment approved date and time | | |
| Approving Supervisor | Supervisor who approved the adjustment | | |
| Reason | Reason of the adjustment | | |
| Event | | | |
| Device Type | Device type class name | | |
| Meter Type | Adjusted meter type | | |
| Meter Start | Starting value of the meter | | |
| Meter End | End value of the meter | | |
| Meter Delta | Difference of the start and end value | | |
| Meter Adjustment | Adjusted amount on meter | | |

FIG. 19 shows a Cashier Detail window or screen 1900, according to one illustrated embodiment.

Cashier Detail—Selection of a Cashier Detail user selectable icon allows the user to view the details of the cashier. This screen may show the following details: First Name; Last Name; Department; Phone; Pager.

FIG. 20 shows a Show Details window or screen 2000, according to one illustrated embodiment.

Show Details—Selection of a Show Details user selectable icon shows machine vouchers in detail as barcode and amount.

TABLE 16

Show Details Grid

| Column Text | Description | Type | Format |
|---|---|---|---|
| | Note Meters | | |
| Type of Note | Denomination in bills | | |
| Amount Dropped | Amount dropped or sent from the machine | | |
| Amount Counted | Amount counted by cashier | | |
| Count Dropped | Count dropped by machine | | |
| Count Counted | Count counted by cashier | | |
| | Vouchers | | |
| Validation ID | The barcode of the promotional voucher | | |
| Dropped Amount | Amount dropped by machine | | |
| Counted Amount | Amount counted by cashier | | |

Figure 21:
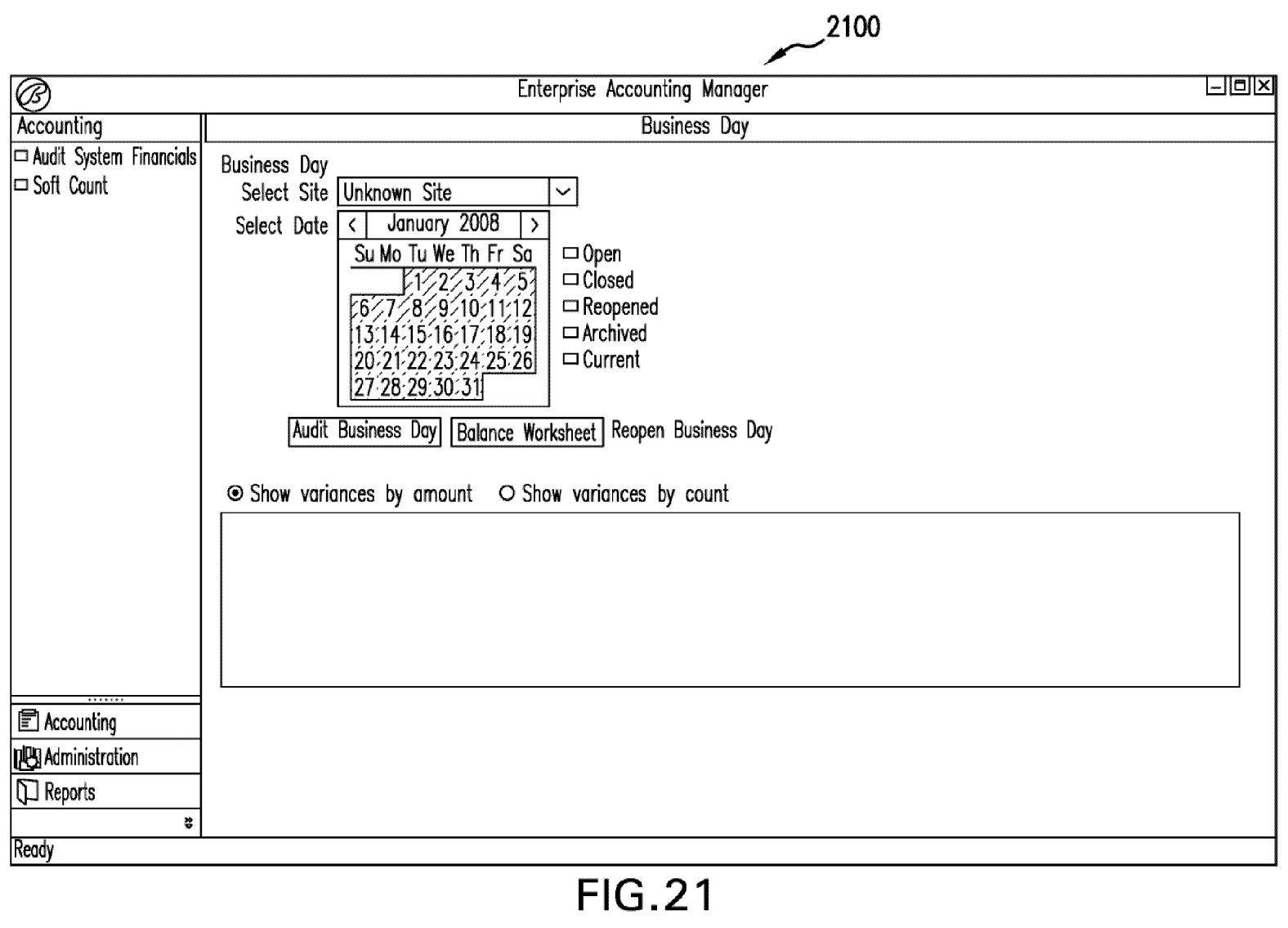

FIG. 21 shows an Enterprise window or screen 2100, according to one illustrated embodiment.

Select Site—This window or screen 2100 may display a list of sites that the user is allowed to audit. This may be based on the security roles returned from UserAuth after the login process. The user role for this user may have a default site returned from UserAuth which may be the first site displayed to the user.

Audit Options may be requested from a Web method after the site is selected so that the auditors may all use the same options for that site. These options may be stored in a table in Bally_SiteConfig database or data structure for that site. The security role returned from UserAuth may have a capability set that allows the user to Audit Sites and to Audit System Financials.

Once the user selects the site, a permanent calendar may be displayed which may show the states of the business day for the chosen site. There may be a meter variances grid which may show the financial variances for the business day selected on the calendar. The calendar may default to the first open business day for this site. The user may be restricted to being able to select the Audit Business Day button for open business days.

Meter Variance Grid—The grid may have a radial button option to display variances either by amount, or counts.

TABLE 17

| Column Text | Description | Type | Format |
|---|---|---|---|
| These rows are ALWAYS displayed. | | | |
| Machine Reported | Shows the financial activity reported by the machines | | |
| System Reported | Shows the financial activity reported by the machines | | |
| Variance | Shows the variance between what the machines reported and what the system reported | | |
| These columns are ALWAYS displayed. | | | |
| Soft Count Currency | Soft Count Currency amount for this site and business day | | |
| Net Variance | Net minus Cash Net | | |
| Soft Count Voucher | Soft Count Voucher amount/percentage/count for this site and business day | | |
| Voucher Printed | Voucher Printed amount/percentage/count for this site and business day | | |
| Voucher Paid | Voucher Paid amount/percentage/count for this site and business day | | |
| Jackpot Printed | Jackpot Printed amount/percentage/count for this site and business day | | |
| Promo In | Promo Voucher Paid amount/percentage/count for this site and business day | | |
| WAT In | WAT In amount/percentage/count for this site and business day | | |
| WAT Out | WAT Out amount/percentage/count for this site and business day | | |

TABLE 18

Processing Buttons"

| Button Name | Description |
|---|---|
| Audit Business Day | Allow the user to audit the business day for this site |

TABLE 19

| Button Name | Fix It Active? | Description |
|---|---|---|
| Audit Business Day | No | Allow the user to audit this site for this business day |
| Close Business Day | No | Allow the user to close this business day for this site |

TABLE 19-continued

| Button Name | Fix It Active? | Description |
| --- | --- | --- |
| Reopen Business Day | No | Allow the user to reopen this closed business day |

Figure 22:
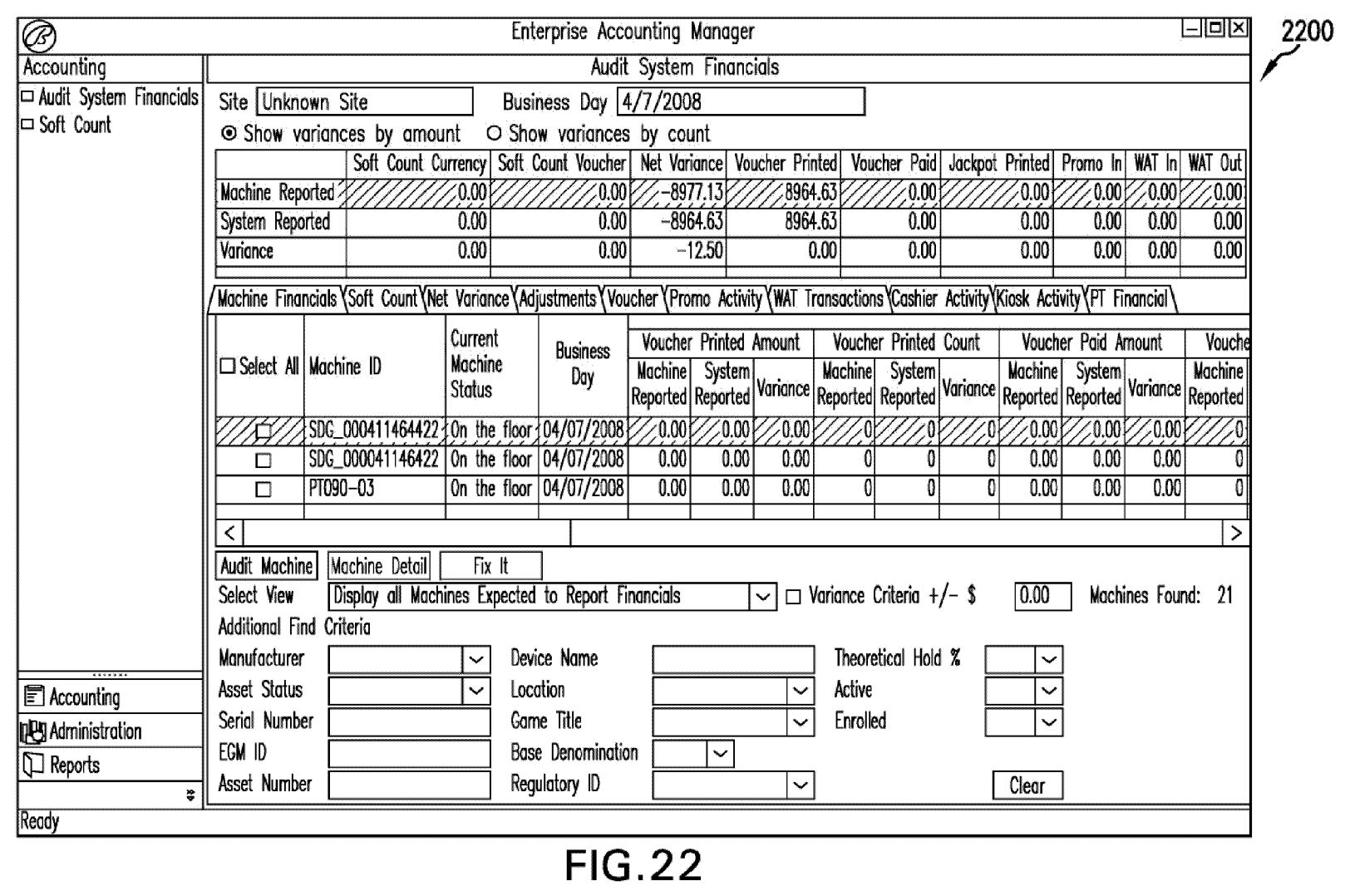

FIG. 22 shows an Audit System Financials window or screen 2200, according to one illustrated embodiment.

Audit System Financials—Machine Tool Bar—This tool bar is used to show machine variances and may be updated when an adjustment is performed, and when the Web service receives an adjustment from a different client for the same site and business day.

Machine Tool Bar Grid—The grid may have a radio button option to display variances either by amount or counts.

TABLE 20

| Column Text | Description | Type | Format |
| --- | --- | --- | --- |
| The following three row headers are always displayed. | | | |
| Machine Reported | Shows the financial activity reported by the machines | | |
| System Reported | Shows the financial activity reported by the machines | | |
| Variance | Shows the variance between what the machines reported and what the system reported | | |
| These columns are ALWAYS displayed. | | | |
| Soft Count Currency | Soft Count Currency amount for this site and business day | | |
| Soft Count Voucher | Soft Count Voucher amount/percentage/count for this site and business day | | |
| Net Variance | Net minus Cash Net | | |
| Voucher Printed | Voucher Printed amount/percentage/count for this site and business day | | |
| Voucher Paid | Voucher Paid amount/percentage/count for this site and business day | | |
| Jackpot Printed | Jackpot Printed amount/percentage/count for this site and business day | | |
| Promo In | Promo Voucher Paid amount/percentage/count for this site and business day | | |
| WAT In | WAT In amount/percentage/count for this site and business day | | |
| WAT Out | WAT Out amount/percentage/count for this site and business day | | |

TABLE 21

| Filters for Tool Bar" | | |
| --- | --- | --- |
| Filter Text | Fix It Active? | Description |
| Show variances by Amount | No | Default, show variances by amount |
| Show variances by Count | No | Show variances by count |

Figure 23:
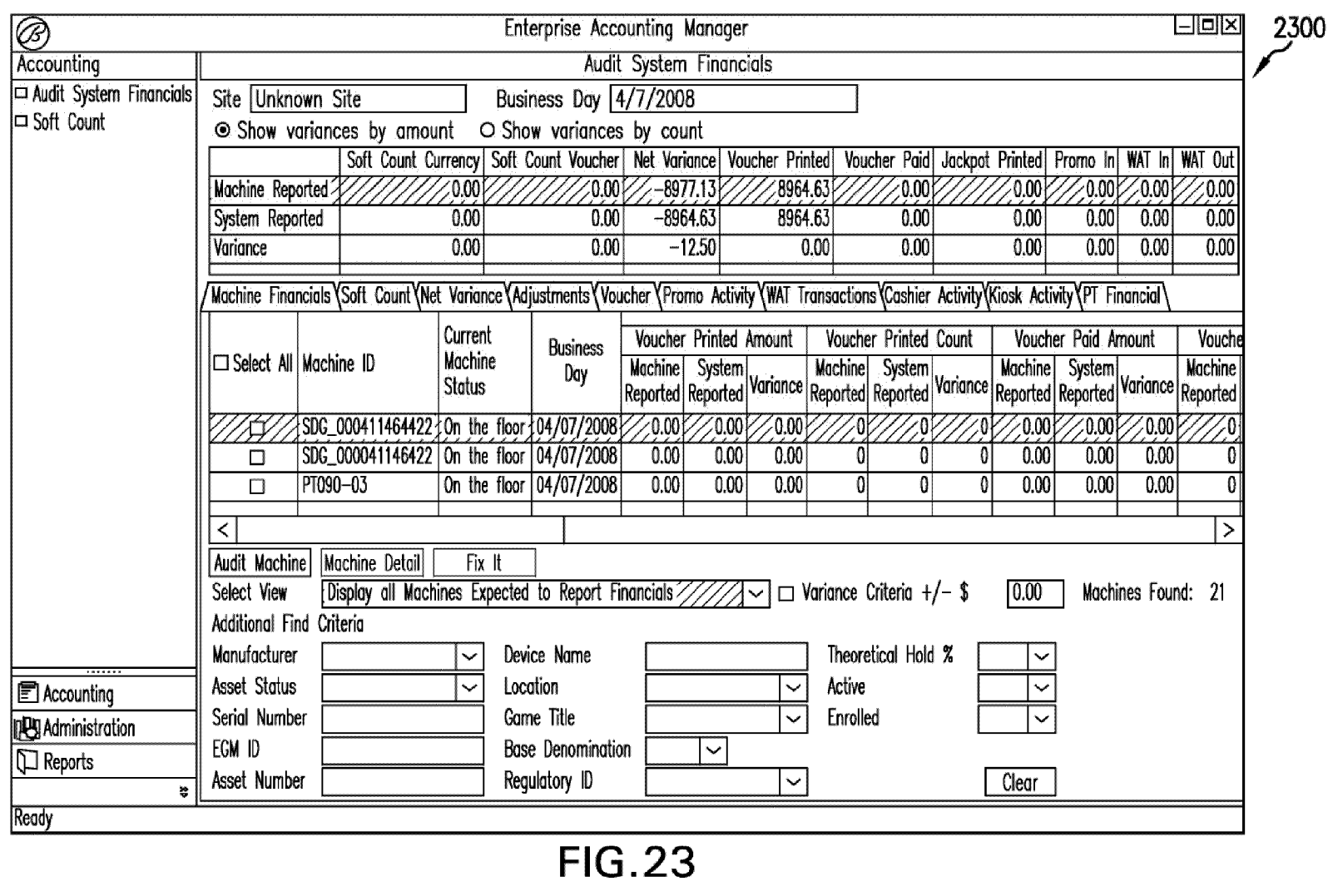

FIG. 23 shows an Audit System Financials window or screen 2300, according to one illustrated embodiment.

Audit System Financials—Machine Financials—The purpose of this window or screen 2300 is to allow the auditor to identify machines that have variances. This widow or screen 2300 allows the auditor to find and select machines based on certain variance criteria, and to select the machine to audit the financial details.

TABLE 22

| Machine Financials Grid | | | |
| --- | --- | --- | --- |
| Column Text | Description | Type | Format |
| These columns are ALWAYS displayed. | | | |
| Select All | Select box to select a machine to audit | Boolean | Check box |
| Machine ID | The configured display name of the machine | Varchar 32 | Ascii |
| Current Machine Status | Status of machine on the floor | Varchar 32 | Ascii |
| Business Day | The business day for the information | Varchar 32 | MMDDYYYY |
| These columns are for Voucher Printed Amount Variance | | | |
| Machine Reported | Machine reported amount from the meter table for this business day | Numeric | Dollar amount |
| System Reported | System reported amount from the fund transfer table for this business day | Numeric | Dollar amount |
| Variance | Metered minus System amount | Numeric | Dollar amount |
| These columns are for Voucher Printed Count Variance | | | |
| Machine Reported | Machine reported count from the meter table for this business day | Numeric | Whole integers |
| System Reported | System reported count from the fund transfer table for this business day | Numeric | Whole integers |
| Variance | Metered minus System count | Numeric | Whole integers |
| These columns are for Voucher Paid Amount Variance | | | |
| Machine Reported | Machine reported amount from the meter table for this business day | Numeric | Dollar amount |
| System Reported | System reported amount from the fund transfer table for this business day | Numeric | Dollar amount |
| Variance | Metered minus System amount | Numeric | Dollar amount |
| These columns are for Voucher Paid Count Variance | | | |
| Machine Reported | Machine reported count from the meter table for this business day | Numeric | Whole integers |
| System Reported | System reported count from the fund transfer table for this business day | Numeric | Whole integers |
| Variance | Metered minus System count | Numeric | Whole integers |
| These columns are for Jackpots Printed Amount Variance | | | |
| Machine Reported | Machine reported amount from the meter table for this business day | Numeric | Dollar amount |

TABLE 22-continued

Machine Financials Grid

| Column Text | Description | Type | Format |
|---|---|---|---|
| System Reported | System reported amount from the fund transfer table for this business day | Numeric | Dollar amount |
| Variance | Metered minus System amount | Numeric | Dollar amount |
| *These columns are for Jackpots Printed Count Variance* | | | |
| Machine Reported | Machine reported count from the meter table for this business day | Numeric | Whole integers |
| System Reported | System reported count from the fund transfer table for this business day | Numeric | Whole integers |
| Variance | Metered minus System count | Numeric | Whole integers |
| *These columns are for Promo In Amount Variance* | | | |
| Machine Reported | Machine reported amount from the meter table for this business day | Numeric | Dollar amount |
| System Reported | System reported amount from the fund transfer table for this business day | Numeric | Dollar amount |
| Variance | Metered minus System amount | Numeric | Dollar amount |
| *These columns are for Promo In Count Variance* | | | |
| Machine Reported | Machine reported count from the meter table for this business day | Numeric | Whole integers |
| System Reported | System reported count from the fund transfer table for this business day | Numeric | Whole integers |
| Variance | Metered minus System count | Numeric | Whole integers |
| *These columns are for WAT In Amount Variance* | | | |
| Machine Reported | Machine reported amount from the meter table for this business day | Numeric | Dollar amount |
| System Reported | System reported amount from the fund transfer table for this business day | Numeric | Dollar amount |
| Variance | Metered minus System amount | Numeric | Dollar amount |
| *These columns are for WAT In Count Variance* | | | |
| Machine Reported | Machine reported count from the meter table for this business day | Numeric | Whole integers |
| System Reported | System reported count from the fund transfer table for this business day | Numeric | Whole integers |
| Variance | Metered minus System count | Numeric | Whole integers |
| *These columns are for WAT Out Amount Variance* | | | |
| Machine Reported | Machine reported amount from the meter table for this business day | Numeric | Dollar amount |
| System Reported | System reported amount from the fund transfer table for this business day | Numeric | Dollar amount |
| Variance | Metered minus System amount | Numeric | Dollar amount |
| *These columns are for WAT Out Count Variance* | | | |
| Machine Reported | Machine reported count from the meter table for this business day | Numeric | Whole integers |
| System Reported | System reported count from the fund transfer table for this business day | Numeric | Whole integers |
| Variance | Metered minus System count | Numeric | Whole integers |

TABLE 23

Processing Buttons

| Button Name | Description |
|---|---|
| Audit Machine | Allow the user to audit a single machine |
| Machine Detail | Allow the user to view machine details |
| Variance Criteria | Allow the user to enter criteria for showing variances |
| Fix It | Allow the user to use a wizard to fix known issues |

Finding a Machine: The user can provide additional criteria to find a machine, for example, the following information: Manufacturer ID; Asset status; Serial Number; EGM ID; Asset Number; Device Name; Location; Game Title; Base Denomination; Regulatory ID; Theoretical Hold %; Active; Enrolled.

TABLE 24

Filters

| Filter Text | Fix It Active? | Description |
|---|---|---|
| Display all Machines with a Voucher Printed Variance | Yes | Machines that have a variance between the voucher printed meter and what the voucher system reported printed by that machine |
| Display all Machines with a Voucher Paid Variance | Yes | Machines that have a variance between the voucher paid meter and what the voucher system reported paid by that machine |
| Display all Machines with a Jackpot Printed Variance | Yes | Machines that have a variance between the jackpot printed meter and what the voucher system reported jackpots printed by that machine |
| Display all Machines with a Promo In Variance | Yes | Machines that have a variance between the promo in meter and what the promo system reported paid by that machine |
| Display all Machines with a WAT In Variance | Yes | Machines that have a variance between the WAT In meter and what the system reported WAT In transactions for that machine |

TABLE 24-continued

Filters

| Filter Text | Fix It Active? | Description |
|---|---|---|
| Display all Machines with a WAT Out Variance | Yes | Machines that have a variance between the WAT Out meter and what the system reported WAT Out transactions for that machine |
| Display all Machines | No | All machines |
| Display all Machines Expected to Report Financials | No | Machines that should have sent an end-of-day event, whether they did or not. These are the machine that had activity or are currently active. A machine had activity if any of its configurations had fund transfers or floor events for that game day. A machine is currently active if its last configuration is flagged as active |
| Display all Machines that did Not Report Financials | Yes | Machines that should have sent an end-of-day event but didn't. These are the machine that had activity or are currently active. |
| Display all Machines that reported Unexpected Financials | No | Machines that sent an end-of-day event but shouldn't have. These are the machines in which any configuration of the asset sent an end-of-day event for that game day, and which are currently not enrolled. A machine is currently not enrolled if its last configuration is flagged as not enrolled |

Fix It Button Functions for Machine Financials

FIG. 24 shows a No Accounting Meter window or screen 2400, according to one illustrated embodiment.

That did Not Report financials—The window or screen 2400 may have a No Accounting Meter wizard to quickly identify machines that did not have an EOD accounting meter reported to the system. This wizard may have a Fix It button that prompts the user to either generate an EOD based on detailed transactions or to manually select an available event to use for activity. When the user selects the Fix It button, it may pop up the "No Accounting Meter Wizard".

TABLE 25

No Accounting Meter Wizard Grid

| Column Text | Description | Type | Format |
|---|---|---|---|
| Machine Variances Grid | | | |
| Machine ID | The configured display name of the machine | | |
| System Reported Values | | | |
| Vouchers Printed Amount | Voucher Printed amount by the machine | | |
| Vouchers Printed Count | Voucher Printed count by the machine | | |
| Vouchers Paid Amount | Voucher Paid amount by the machine | | |
| Vouchers Paid Count | Voucher Paid count by the machine | | |
| Jackpots Printed Amount | Jackpot Printed amount by the machine | | |
| Jackpots Printed Count | Jackpot Printed count by the machine | | |
| Promo In Amount | Promo Voucher Paid amount by the machine | | |
| Promo In Count | Promo Voucher Paid count by the machine | | |
| WAT In Amount | WAT In amount for the machine | | |
| WAT In Count | WAT In count for the machine | | |
| WAT Out Amount | WAT Out amount for the machine | | |
| WAT Out Count | WAT Out count for the machine | | |
| Events and Meters Grid | | | |
| Select | Select meters | | |
| Event Name | This is the name of the event that was adjusted | | |
| Date and Time | Date and time of event adjusted | | |
| Vouchers Printed Amount | Vouchers Printed amount by the machine | | |
| Vouchers Printed Count | Vouchers Printed count by the machine | | |
| Vouchers Paid Amount | Voucher Paid amount by the machine | | |
| Vouchers Paid Count | Voucher Paid count by the machine | | |
| Jackpots Printed Amount | Jackpot Printed amount by the machine | | |
| Jackpots Printed Count | Jackpot Printed count by the machine | | |
| Promo In Amount | Promo Voucher Paid amount by the machine | | |
| Promo In Count | Promo Voucher Paid count by the machine | | |
| WAT In Amount | WAT In amount for the machine | | |
| WAT In Count | WAT In count for the machine | | |
| WAT Out Amount | WAT Out amount for the machine | | |
| WAT Out Count | WAT Out count for the machine | | |
| Adjustment Results Grid | | | |
| Currency Variance Amount | Variance amount in currency | | |
| Currency Variance Count | Variance count in currency | | |
| Voucher Variance Amount | Variance amount in voucher | | |
| Voucher Variance Count | Variance count in voucher | | |

FIG. 25 shows a Voucher Printed Variance window or screen 2500, according to one illustrated embodiment.

Machines with a Voucher Printed variance—The window or screen 2500 may have a Voucher Printed wizard to quickly identify machines that have a variance between machine metered voucher printed values and individual transactions in the vouchering system. This wizard may have a Fix It button that allows auditor to update the machine summary meters with the count and amount from the vouchering system. When the user selects the Fix It button, it may pop up the "Voucher Printed Wizard".

TABLE 26

| Voucher Printed Wizard Grid | | | |
|---|---|---|---|
| Column Text | Description | Type | Format |
| Machine Variance Grid | | | |
| Machine ID | The configured display name of the machine | | |
| Variance Amount | System Reported Amount-Machine Reported Amount | | |
| Variance Count | System Reported Count-Machine Reported Count | | |
| Machine Metered Amount | The voucher printed amount reported by machine | | |
| Machine Metered Count | The voucher printed count reported by machine | | |
| System Reported Amount | The voucher printed amount reported by system | | |
| System Reported Count | The voucher printed count reported by system | | |
| Adjustment Results Grid | | | |
| Adjustment Type Rows | | | |
| Before Adjustment | Amount or count before adjustment | | |
| After Adjustment | Amount or count after adjustment | | |
| Variance Columns | | | |
| Amount | Variance in amount | | |
| Count | Variance in count | | |

FIG. 26 shows a Voucher Paid Variance window or screen 2600, according to one illustrated embodiment.

Machines with a Voucher Paid variance—The window or screen 2600 may have a Voucher Paid wizard to quickly identify machines that have a variance between machine metered voucher printed values and individual transactions in the vouchering system. This wizard may have a Fix It button that allows auditor to update the machine summary meters with the count and amount from the vouchering system. When the user selects the Fix It button, it may pop up the "Voucher Paid Wizard".

TABLE 27

| Voucher Paid Wizard Grid | | | |
|---|---|---|---|
| Column Text | Description | Type | Format |
| Machine Variance Grid | | | |
| Machine ID | The configured display name of the machine | | |
| Variance Amount | System Reported Amount-Machine Reported Amount | | |
| Variance Count | System Reported Count-Machine Reported Count | | |

TABLE 27-continued

| Voucher Paid Wizard Grid | | | |
|---|---|---|---|
| Column Text | Description | Type | Format |
| Machine Metered Amount | The voucher paid amount reported by machine | | |
| Machine Metered Count | The voucher paid count reported by machine | | |
| System Reported Amount | The voucher paid amount reported by system | | |
| System Reported Count | The voucher paid count reported by system | | |
| Adjustment Results Grid | | | |
| Adjustment Type Rows | | | |
| Before Adjustment | Amount or count before adjustment | | |
| After Adjustment | Amount or count after adjustment | | |
| Variance Columns | | | |
| Amount | Variance in amount | | |
| Count | Variance in count | | |

FIG. 27 shows a Jackpot Printed window or screen 2700, according to one illustrated embodiment.

Machines with a Jackpot Printed variance—This window or screen 2700 may have a Jackpot wizard to quickly identify machines that have a variance between machine metered Jackpot values and individual jackpot voucher and jackpot handpay cancelled credit events. This wizard may have a Fix It button that allows auditor to update the machine summary meters with the count and amount from the vouchering system. When the user selects the Fix It button, it may pop up the "Jackpot Printed Wizard".

TABLE 28

| Jackpot Printed Wizard Grid | | | |
|---|---|---|---|
| Column Text | Description | Type | Format |
| Machine Variance Grid | | | |
| Machine ID | The configured display name of the machine | | |
| Variance Amount | System Reported Amount-Machine Reported Amount | | |
| Variance Count | System Reported Count-Machine Reported Count | | |
| Machine Metered Amount | The jackpot printed amount reported by machine | | |
| Machine Metered Count | The jackpot printed count reported by machine | | |
| System Reported Amount | The jackpot printed amount reported by system | | |
| System Reported Count | The jackpot printed count reported by system | | |
| Adjustment Results Grid | | | |
| Adjustment Type Rows | | | |
| Before Adjustment | Amount or count before adjustment | | |
| After Adjustment | Amount or count after adjustment | | |

TABLE 28-continued

Jackpot Printed Wizard Grid

| Column Text | Description | Type | Format |
|---|---|---|---|
| | Variance Columns | | |
| Amount | Variance in amount | | |
| Count | Variance in count | | |

FIG. 28 shows a Promo Coupon window or screen 2800, according to one illustrated embodiment.

Machines with a Promo In variance—This window or screen 2800 may have a Promo Coupon wizard to quickly identify machines that have a variance between machine metered promotional coupons redeemed and individual transactions in the promotional system. This wizard may have a Fix It button that allows auditor to update the machine summary meters with the count and amount from the vouchering system. When the user selects the Fix It button, it may pop up the "Promo Coupon Wizard".

TABLE 29

Promo Coupon Wizard Grid

| Column Text | Description | Type | Format |
|---|---|---|---|
| | Machine Variance Grid | | |
| Machine ID | The configured display name of the machine | | |
| Variance Amount | System Reported Amount-Machine Reported Amount | | |
| Variance Count | System Reported Count-Machine Reported Count | | |
| Machine Metered Amount | The Promo In amount reported by machine | | |
| Machine Metered Count | The Promo In count reported by machine | | |
| System Reported Amount | The Promo In amount reported by system | | |
| System Reported Count | The Promo In count reported by system | | |
| | Adjustment Results Grid Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

Figure 29:
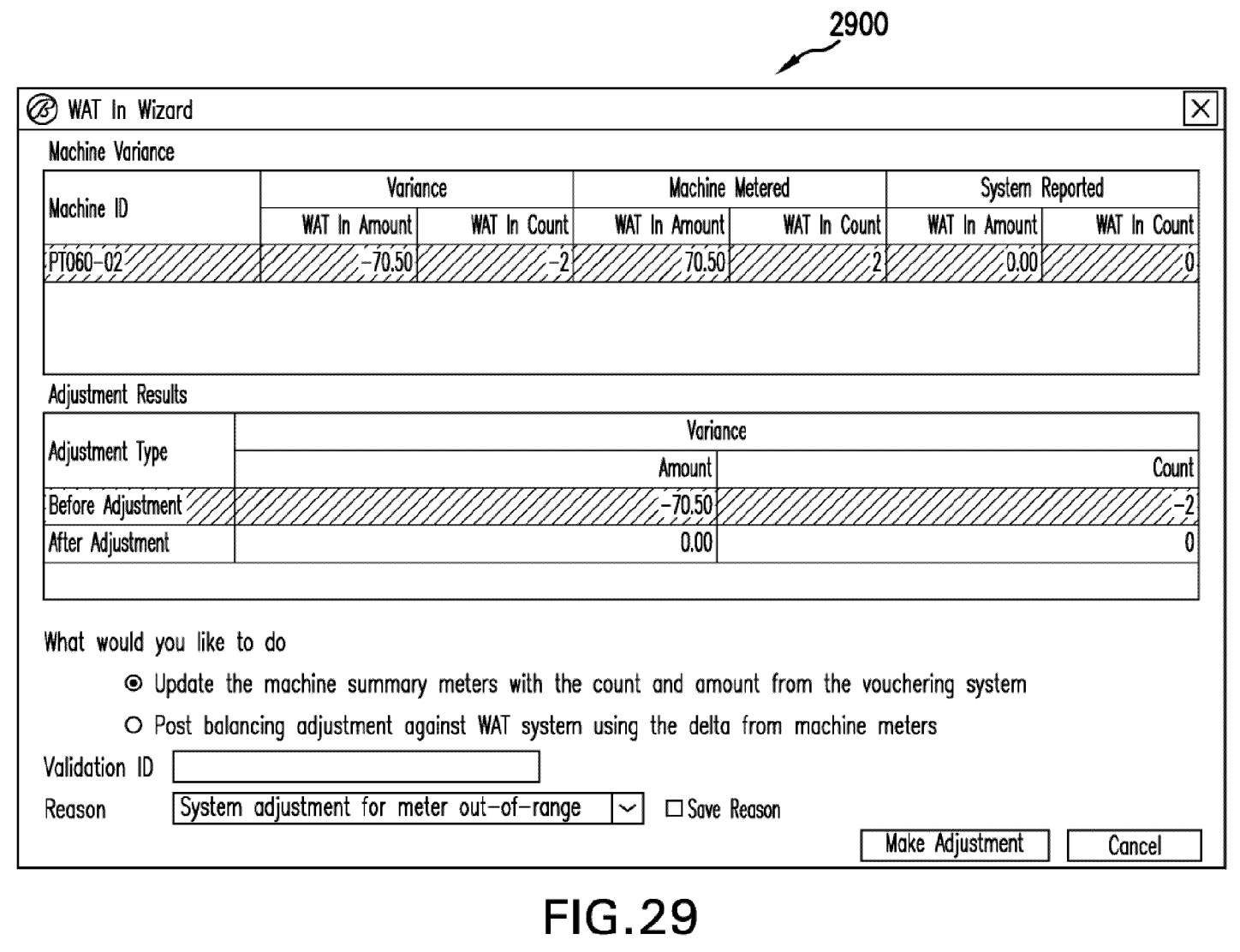

FIG. 29 shows a WAT in Variance window or screen 2900, according to one illustrated embodiment.

Machines with a WAT In variance—This window or screen 2900 may have a WAT In wizard to quickly identify machines that have a variance between machine metered WAT transfers to the machine and individual transactions from the WAT system. This wizard may have a Fix It button that prompts the user to either update the machine meters with the WAT system values or to post balancing adjustment against the WAT system using the delta from machine meters. When the user selects the Fix It button, it may pop up the "WAT In Wizard".

TABLE 30

WAT In Wizard Grid

| Column Text | Description | Type | Format |
|---|---|---|---|
| | Machine Variance Grid | | |
| Machine ID | The configured display name of the machine | | |
| Variance WAT In Amount | System Reported WAT In Amount-Machine Reported WAT In Amount | | |
| Variance WAT In Count | System Reported WAT In Count-Machine Reported WAT In Count | | |
| Machine Metered WAT In Amount | The WAT In amount reported by machine | | |
| Machine Metered WAT In Count | The WAT In count reported by machine | | |
| System Reported WAT In Amount | The WAT In amount reported by system | | |
| System Reported WAT In Count | The WAT In count reported by system | | |
| | Adjustment Results Grid Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

Figure 30:
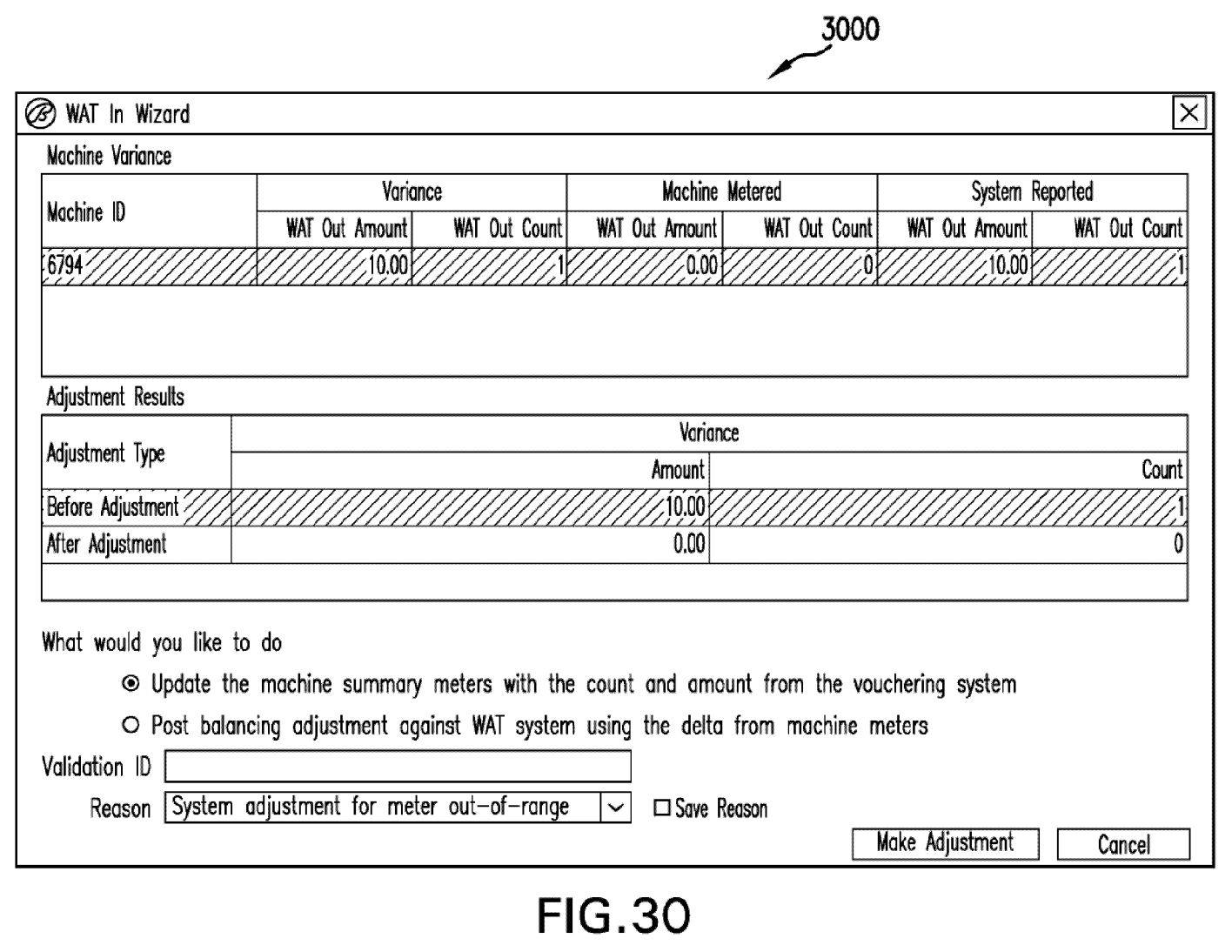

FIG. 30 shows a WAT Out Variance window or screen 3000, according to one illustrated embodiment.

Machines with a WAT Out variance—This window or screen 3000 may have a WAT Out wizard to quickly identify machines that have a variance between machine metered WAT transfers from the machine and individual transaction to the WAT system. This wizard may have a Fix It button that prompts the user to either update the machine meters with the WAT system values or to post balancing adjustment against the WAT system using the delta from machine meters. When the user selects the Fix It button, it may pop up the "WAT Out Wizard".

TABLE 31

WAT Out Wizard Grid

| Column Text | Description | Type | Format |
|---|---|---|---|
| | Machine Variance Grid | | |
| Machine ID | The configured display name of the machine | | |
| Variance WAT Out Amount | System Reported WAT Out Amount-Machine Reported WAT Out Amount | | |
| Variance WAT Out Count | System Reported WAT Out Count-Machine Reported WAT Out Count | | |
| Machine Metered WAT Out Amount | The WAT Out amount reported by machine | | |

TABLE 31-continued

WAT Out Wizard Grid

| Column Text | Description | Type | Format |
|---|---|---|---|
| Machine Metered WAT Out Count | The WAT Out count reported by machine | | |
| System Reported WAT Out Amount | The WAT Out amount reported by system | | |
| System Reported WAT Out Count | The WAT Out count reported by system | | |
| *Adjustment Results Grid* | | | |
| *Adjustment Type Rows* | | | |
| Before Adjustment | Amount or count before adjustment | | |
| After Adjustment | Amount or count after adjustment | | |
| *Variance Columns* | | | |
| Amount | Variance in amount | | |
| Count | Variance in count | | |

Web Interface

FIG. 31 shows an Audit Systems Financial window or screen 3100, according to one illustrated embodiment.

Audit System Financials—Soft Count—The purpose of this window or screen 3100 is to allow the auditor to identify machines that have variances between the reported drop and the count room. This screen allows the auditor to find and select machines based on certain variance criteria, and to correct soft count related variances.

TABLE 32

Soft Count Variance Grid

| Column Text | Description | Type | Format |
|---|---|---|---|
| *These columns are ALWAYS displayed.* | | | |
| Select All | Select box to select a machine to audit | Boolean | Check box |
| Machine ID | The configured display name of the machine | Varchar 32 | Ascii |
| Count Room | The count room which counted the canister | Varchar 32 | Ascii |
| *Date and Time* | | | |
| Dropped | Dropped date and time | | |
| Counted | Counted date and time | | |
| *These columns are for Soft Count Currency* | | | |
| Metered Amount | EGM reported amount from the meter table for this business day. | Numeric | Dollar amount with dollar signs |
| System Amount | System reported amount from the fund transfer table for this business day. | Numeric | Dollar amount with dollar signs |
| Variance Amount | Metered minus System amount | Numeric | Dollar amount with dollar signs |
| Metered Count | EGM reported count from the meter table for this business day. | Numeric | Whole integers |
| System Count | System reported count from the fund transfer table for this business day. | Numeric | Whole integers |
| Variance Count | Metered minus System count | Numeric | Whole integers |

TABLE 32-continued

Soft Count Variance Grid

| Column Text | Description | Type | Format |
|---|---|---|---|
| *These columns are for Soft Count Voucher* | | | |
| Metered Amount | EGM reported amount from the meter table for this business day. | Numeric | Dollar amount with dollar signs |
| System Amount | System reported amount from the fund transfer table for this business day. | Numeric | Dollar amount with dollar signs |
| Variance Amount | Metered minus System amount | Numeric | Dollar amount with dollar signs |
| Metered Count | EGM reported count from the meter table for this business day. | Numeric | Whole integers |
| System Count | System reported count from the fund transfer table for this business day. | Numeric | Whole integers |
| Variance Count | Metered minus System count | Numeric | Whole integers |
| *These columns are hidden unless "Voucher not paid" or "Duplicate Validation ID's" filters is applied.* | | | |
| Validation ID | The barcode of the promotional voucher | | |
| *Machine 1* | | | |
| Machine ID | The configured display name of the machine | | |
| Time Paid | The time paid by machine | | |
| Amount | The amount paid by machine | | |
| *Machine 2* | | | |
| Machine ID | The configured display name of the machine | | |
| Time Paid | The time paid by machine | | |
| Amount | The amount paid by machine | | |
| *This column is hidden unless "Voucher not paid" filter is applied* | | | |
| *Machine 2* | | | |
| Time Counted | Vouchers counted time | | |

TABLE 33

Processing Buttons

| Button Name | Description |
|---|---|
| Audit Machine | Allow the user to audit a single machine |
| Machine Detail | Allow the user to view machine details |
| Variance Criteria | Allow the user to enter criteria for showing variances |
| Fix It | Allow the user to use a wizard to fix known issues |
| Show Details | Allow the user to view vouchers in details |

Variance Threshold: Provides currency, voucher, combined radio buttons to filter out the machines based on variance currency or voucher or both of them.

TABLE 34

Filters for Soft Count

| Filter Text | Fix It Active? | Description |
|---|---|---|
| Display all drops and soft counts | No | Unfiltered, All rows displayed |
| Display all switched canisters detected | Yes | Show rows where the switched canisters have been detected |
| Display all drops and soft counts on incorrect business days | Yes | Show machines that may have reported the drop on an incorrect business day |
| Display all drops that have missing data from the count room | Yes | Show machines that have reported a drop but is missing count room data |
| Display all soft counts that have missing drop events | Yes | Show machines that have count data but are missing the drop event |
| Display all vouchers counted but not paid | Yes | Show machines that have a voucher barcode in the count file, but the voucher is not recorded as paid by that machine |
| Display all vouchers counted twice | Yes | Show machines that have duplicate voucher barcodes |

Fix It Button Functions for Soft Count

Figure 32:
FIG. 32 is a screen print showing a Switched Canister window or screen, according to one illustrated embodiment.

FIG. 32 shows a Switched Canister window or screen 3200, according to one illustrated embodiment.

Machines that have switched canisters detected—This window or screen 3200 may have a switched canister wizard to quickly identify machines that may have had an incorrect EGM number entered in the Count Room. This is determined when two machines have equal and opposite variances for each attribute (bills and vouchers). The Fix It button may transpose the EGM number for the rows currently selected in the grid. When the user selects the Fix It button, it may pop up the "Switched Canister Wizard".

TABLE 35

6.5.5.1.1 Switched Canister Wizard Grid

| Column Text | Description | Type | Format |
|---|---|---|---|
| Switched Canisters grid | | | |
| Machine 1 | | | |
| Machine 2 | | | |
| Dropped for Machine 1 and Counted for Machine 2 | | | |
| Currency Amount | Total Amount as currency | | |
| Currency Count | Total Count of currency | | |
| Voucher Amount | Total Amount of Voucher | | |
| Voucher Count | Total Count of Voucher | | |
| Dropped for Machine 2 and Counted for Machine 1 | | | |
| Currency Amount | Total Amount as currency | | |
| Currency Count | Total Count of currency | | |
| Voucher Amount | Total Amount of Voucher | | |
| Voucher Count | Total Count of Voucher | | |
| Count Room 1 Count Room 2 | | | |
| | Adjustment Results grid | | |
| | Adjustment Type Rows | | |
| Before Adjustment | Amount/count before adjustment | | |
| After Adjustment | Amount/count after adjustment | | |
| Machine 1 Currency Variance | | | |
| Amount | Variance in amount | | |
| Count | Variance in count | | |
| Machine 2 Currency Variance | | | |
| Amount | Variance in amount | | |
| Count | Variance in count | | |
| Machine 1 Voucher Variance | | | |
| Amount | Variance in amount | | |
| Count | Variance in count | | |
| Machine 2 Voucher Variance | | | |
| Amount | Variance in amount | | |
| Count | Variance in count | | |

FIG. 33 shows an Incorrect Business Day window or screen 3300, according to one illustrated embodiment.

Machines that have reported drops on incorrect business days—This form may have an incorrect business day to quickly identify machines that may have reported the drop on an incorrect business day. The Fix It button may prompt the user to either change the business day of the count record or the drop record for the machines currently selected in the grid. When the user selects the Fix It button, it may pop up the "Incorrect Business Day Wizard".

TABLE 36

Incorrect Business Day Wizard Grid

| Column Text | Description | Type | Format |
|---|---|---|---|
| Incorrect Business Day grid | | | |
| Machine ID | The configured display name of the machine | | |
| Dropped Business Day | Business day when the amount dropped | | |
| Counted Business Day | Business day when the dropped amount counted | | |
| Currency Amount | Amount as currency | | |
| Currency Count | Amount as count | | |
| Voucher Amount | Total voucher amount | | |
| Voucher Count | Number of the vouchers | | |
| Count Room Dropped Date and Time | Date and time when the drop occurred | | |

TABLE 36-continued

Incorrect Business Day Wizard Grid

| Column Text | Description | Type | Format |
|---|---|---|---|
| Counted Date and Time | Date and time when the count happen | | |
| | Adjustment Result grid | | |
| | Adjustment Type Rows | | |
| Before Adjustment | Amount/count before adjustment | | |
| After Adjustment | Amount/count after adjustment | | |
| | Currency Variance | | |
| Amount | Variance in amount | | |
| Count | Variance in count | | |
| | Voucher Variance | | |
| Amount | Variance in voucher amount | | |
| Count | Variance in voucher count | | |

Figure 34:
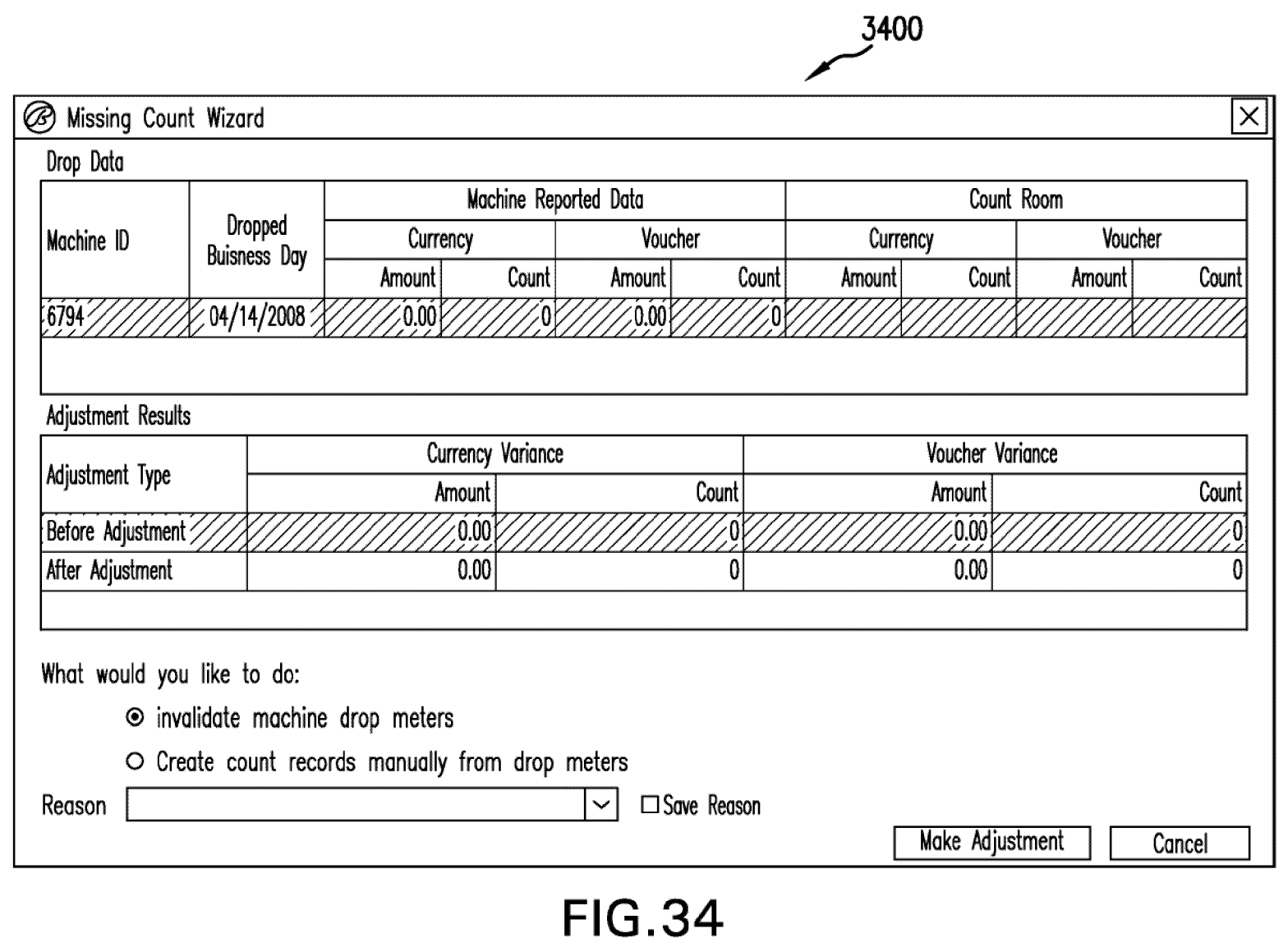

FIG. 34 shows a Missing Count window or screen 3400, according to one illustrated embodiment.

Machines that have reported missing data from the count room—This window or screen 3400 may have a missing count wizard to quickly identify machines that reported drop but were missing data from the count room. The Fix It button may prompt the user to either invalidate machine drop meters or create a count record for the machines currently selected in the grid. When the user selects the Fix It button, it may pop up the "Missing Count Wizard".

TABLE 37

Missing Count Wizard Grid

| Column Text | Description | Type | Format |
|---|---|---|---|
| | Drop Data Grid | | |
| Machine ID | The configured display name of the machine | | |
| Dropped Business Day | Business day on which the dropped happen | | |
| | Machine Reported Data | | |
| Currency Amount | Amount reported by the machine | | |
| Currency Count | Count reported by the machine | | |
| Voucher Amount | Voucher amount reported by the machine | | |
| Voucher Count | Voucher count reported by the machine | | |
| | Count Room | | |
| Currency Amount | Currency amount reported by the count room | | |
| Currency Count | Currency count reported by the count room | | |
| Voucher Amount | Voucher amount reported by the count room | | |
| Voucher Count | Voucher count reported by the count room | | |
| | Adjustment Result Grid | | |
| | Adjustment Type Rows | | |
| Before Adjustment | Amount/Count value before adjustment | | |
| After Adjustment | Amount/Count value after adjustment | | |

TABLE 37-continued

Missing Count Wizard Grid

| Column Text | Description | Type | Format |
|---|---|---|---|
| | Currency Variance | | |
| Amount | Currency amount | | |
| Count | Currency count | | |
| | Voucher Variance | | |
| Amount | Voucher Amount | | |
| Count | Voucher Count | | |

Figure 35:
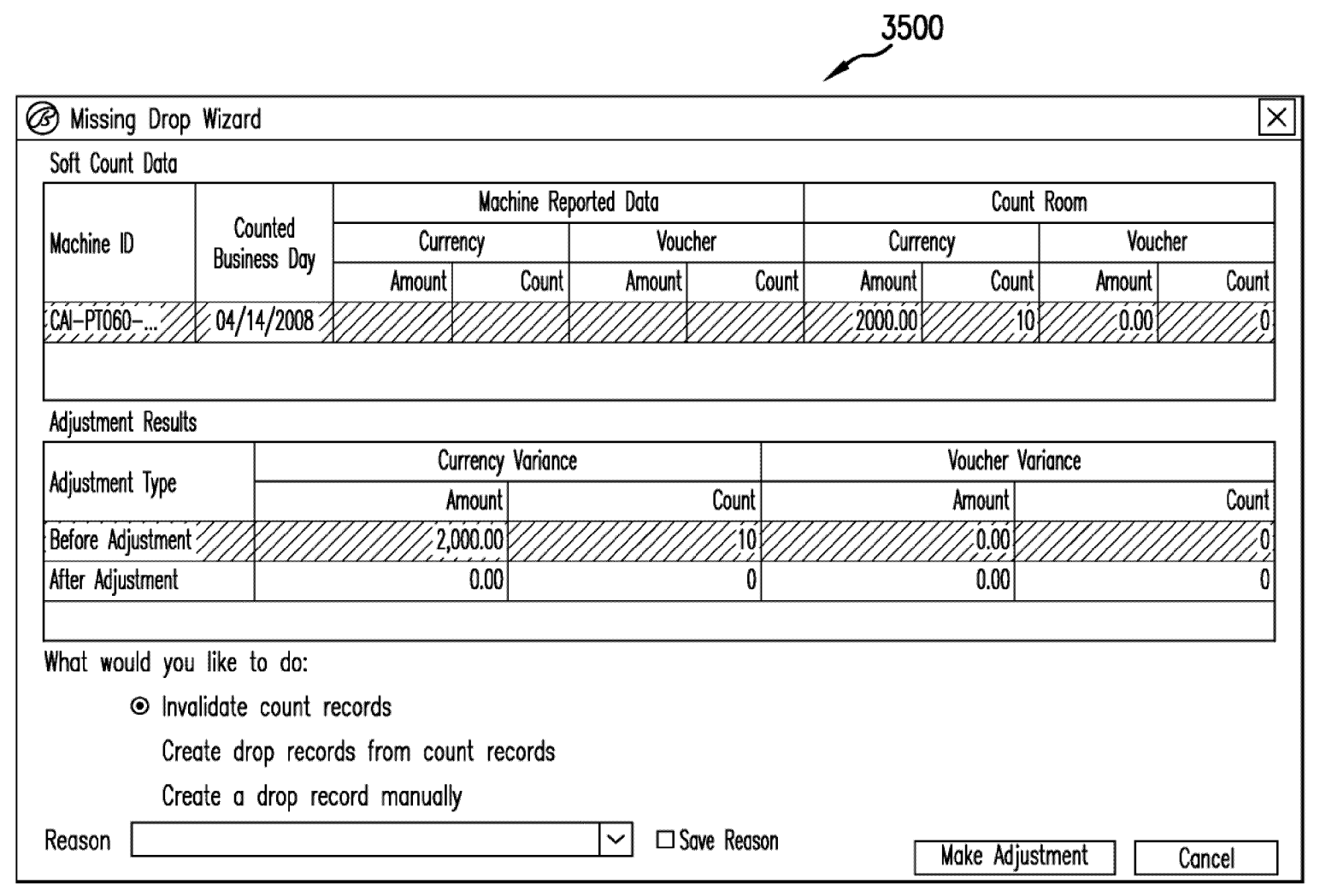

FIG. 35 shows a Missing Drop window or screen 3500, according to one illustrated embodiment.

Machines that have data from the count room but have missing drop event—This window or screen 3500 may have a missing drop wizard to quickly identify machines that had data reported from the count room but did not have a drop reported from the machine. The Fix It button may prompt the user to either invalidate the count record or create a drop record for the machines currently selected in the grid. When the user selects the Fix It button, it may pop up the "Missing Drop Wizard".

TABLE 38

Missing Drop Wizard Grid

| Column Text | Description | Type | Format |
|---|---|---|---|
| | Drop Data Grid | | |
| Machine ID | The configured display name of the machine | | |
| Counted Business Day | Business day on which the Count happen | | |
| | Machine Reported Data | | |
| Currency Amount | Amount reported by the machine | | |
| Currency Count | Count reported by the machine | | |
| Voucher Amount | Voucher amount reported by the machine | | |
| Voucher Count | Voucher count reported by the machine | | |
| | Count Room | | |
| Currency Amount | Currency amount reported by the count room | | |
| Currency Count | Currency count reported by the count room | | |
| Voucher Amount | Voucher amount reported by the count room | | |
| Voucher Count | Voucher count reported by the count room | | |
| | Adjustment Result Grid | | |
| | Adjustment Type Rows | | |
| Before Adjustment | Amount/Count value before adjustment | | |
| After Adjustment | Amount/Count value after adjustment | | |
| | Currency Variance | | |
| Amount | Currency amount | | |
| Count | Currency count | | |
| | Voucher Variance | | |
| Amount | Voucher Amount | | |
| Count | Voucher Count | | |

FIG. 36 shows a Voucher Not Paid window or screen 3600, according to one illustrated embodiment.

Machines that have a voucher not paid variance—This window or screen 3600 may have a voucher not paid variance wizard to quickly identify machines that included a voucher barcode in the count file, but the voucher is not recorded as paid by the machine. The Fix It button may prompt the user to change the status to paid by the machine or invalidate the voucher in the count file for the vouchers currently selected in the grid. When the user selects the Fix It button, it may pop up the "Voucher Not Paid Wizard".

TABLE 39

Voucher Not Paid Wizard Grid

| Column Text | Description | Type | Format |
|---|---|---|---|
| | Voucher Exceptions Grid | | |
| Validation ID | The barcode of the promotional voucher | | |
| Amount | Amount of voucher | | |
| Business Day | Voucher creation business day | | |
| Counted for Machine | Machine where the voucher was created | | |
| Count Room | Count room where its counted | | |
| | Adjustment Results Grid | | |
| | Adjustment Type Rows | | |
| Before Adjustment | Amount/Count value before adjustment | | |
| After Adjustment | Amount/Count value after adjustment | | |
| | Variance | | |
| Amount | Voucher Amount | | |
| Count | Voucher Count | | |

Figure 37:
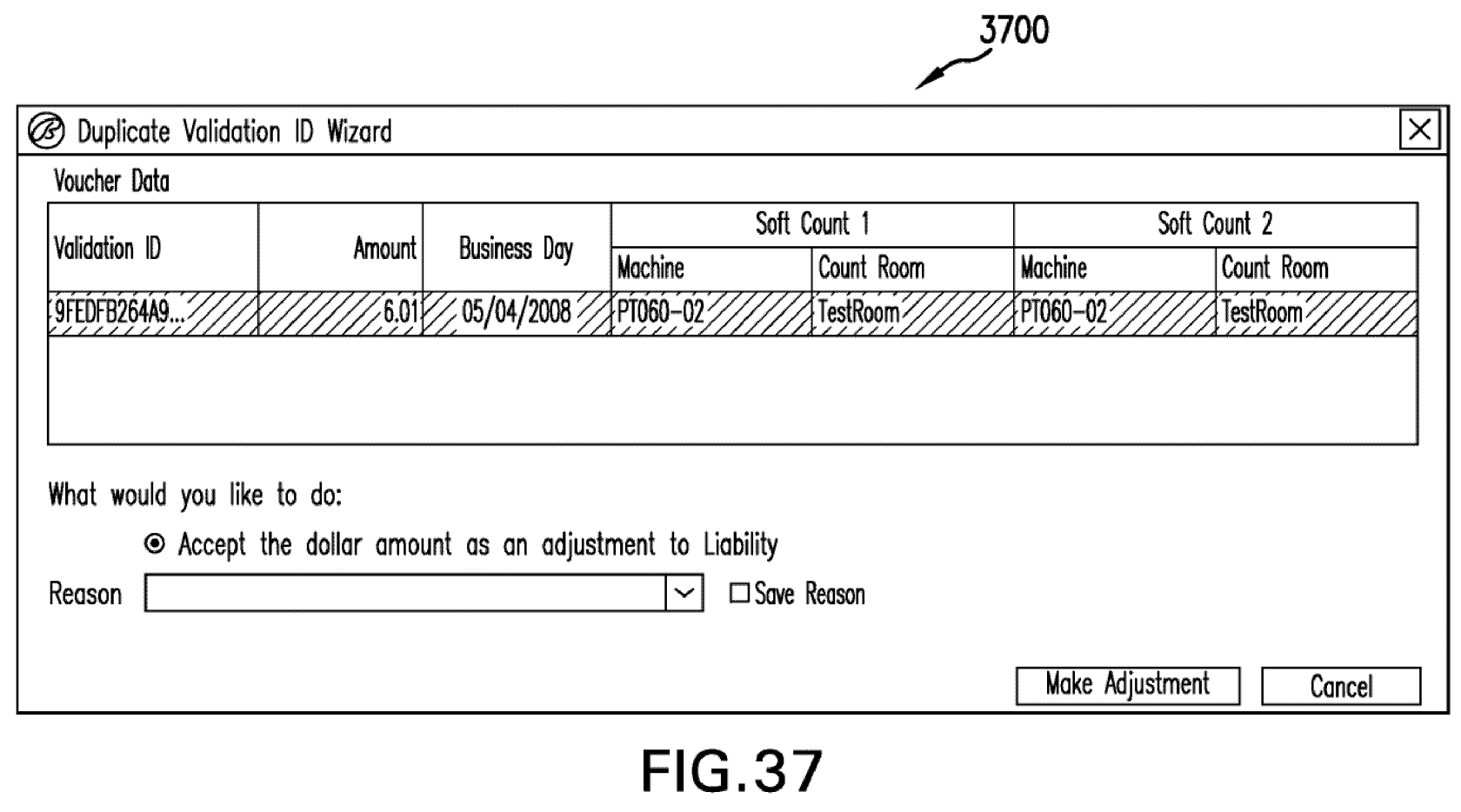

FIG. 37 shows a Duplicate Validation ID window or screen 3700, according to one illustrated embodiment.

Machines that have a duplicate validation ID's.—This window or screen 3700 may have a Duplicate Validation ID wizard to quickly identify machines that have the same validation ID in vouchers scanned. The Fix It button may allow the auditor to accept the dollar amount as an adjustment to Liability. When the user selects the Fix It button, it may pop up the "Duplicate Validation ID Wizard".

TABLE 40

Duplicate Validation ID Wizard Grid

| Column Text | Description | Type | Format |
|---|---|---|---|
| Validation ID | The barcode of the promotional voucher | | |
| Amount | Amount of the voucher | | |
| Business Day | Business day of the voucher | | |
| Soft Count1 Machine | | | |
| Soft Count1 Count Room | | | |
| Soft Count2 Machine | | | |
| Soft Count2 Count Room | | | |

Interface for Soft Count

Figure 38:
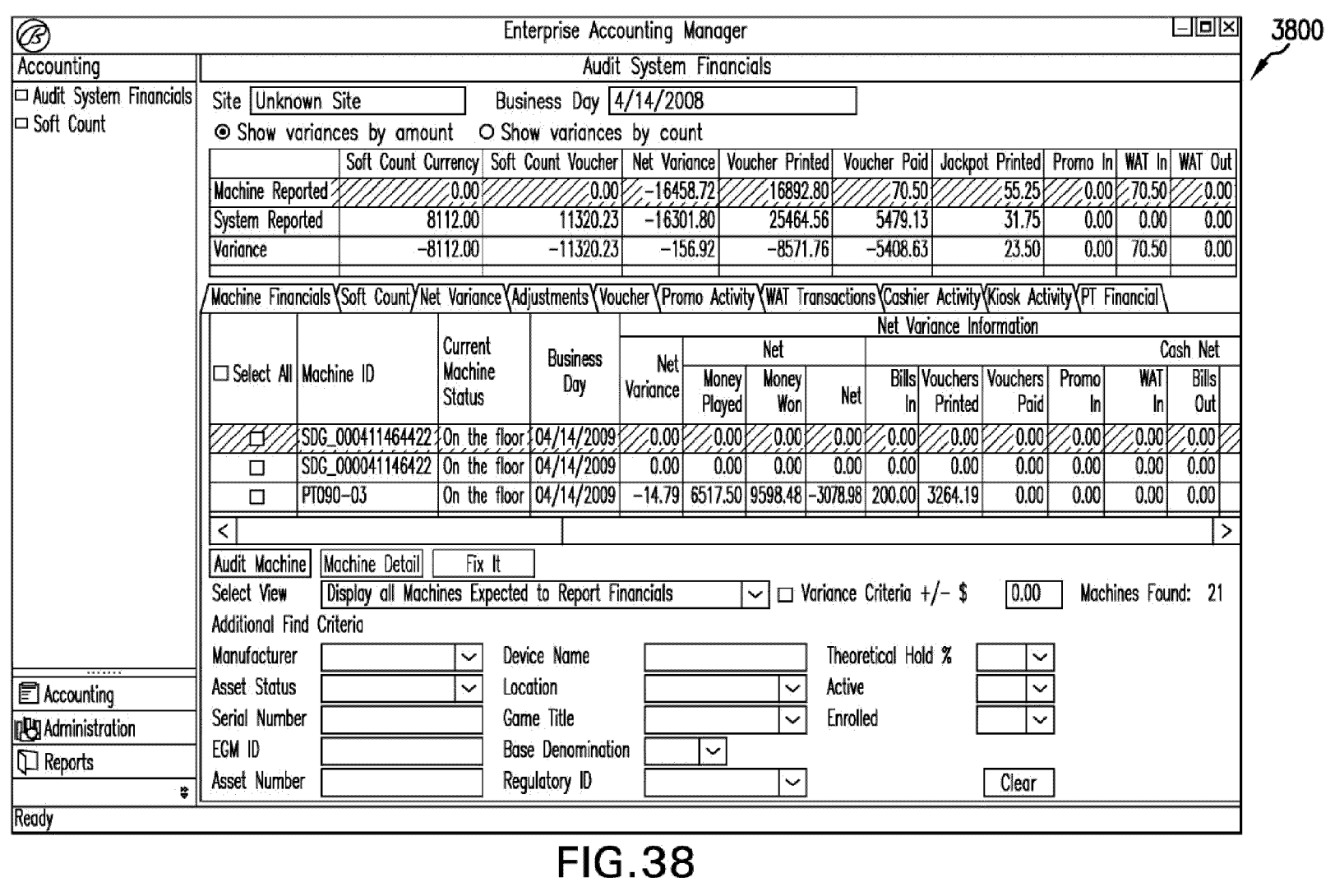

FIG. 38 shows a Net Variance window or screen 3800, according to one illustrated embodiment.

Audit System Financials—Net Variance—The window or screen 3800 may have a Net Variance wizard to quickly identify machines that have a variance between net calculated on cash transactions and net calculated on money played. This calculation is based on [Bills In+vouchers Paid+Promo In+WAT In]−[Vouchers Printed+Bills Out+Cancelled Credit Out+Promo Out+WAT Out−Credit Meter]=Cash Net. There is no Fix It Button on this wizard.

TABLE 41

Net Variance Grid

| Column Text | Description | Type | Format |
|---|---|---|---|
| These columns are ALWAYS displayed. | | | |
| Select All | Select box to select a machine to audit | Boolean | Check box |
| Machine ID | The configured display name of the machine | Varchar 32 | Ascii |
| Current Machine Status | Status of the machine | | |
| Business Day | The business day for the information | Varchar 32 | MMDDYYYY |
| Net Variance | Net minus Cash Net | Numeric | Dollar amount with dollar signs |
| The below three columns are grouped as Net | | | |
| Money Played | The money played delta reported by the EGM | | |
| Money Won | The money played delta reported by the EGM | | |
| Net | Money Played minus Money Won | | |
| The below columns are grouped into Cash Net | | | |
| Bills In | The Bills In reported by the machine | | |
| Vouchers Printed | The Voucher Out reported by the machine | | |
| Vouchers Paid | The Voucher In reported by the machine | | |
| Promo In | The Promo In reported by the machine | | |
| WAT In | The WAT In reported by the machine | | |
| Bills Out | The Bills Out reported by the machine | | |
| Cancelled Credit Out | The Cancelled Credits Out reported by the machine | | |
| Promo Out | The Promo Out reported by the machine | | |
| Cash Net | The net of all cash, vouchers, promo, and WAT IN and OUT reported by this machine | | |
| WAT Out | The WAT Out reported by the machine | | |
| Credit Meter | The Credit Meter reported by the machine | | |

TABLE 42

Processing Buttons

| Button Name | Description |
|---|---|
| Audit Machine | Allow the user to audit a single machine |
| Machine Detail | Allow the user to view machine details |
| Variance Criteria | Allow the user to enter criteria for showing variances |
| Fix It | Allow the user to use a wizard to fix known issues |

Finding a Machine: Additional criteria can provide to find a machine for the following information: Manufacturer ID;

Asset status; Serial Number; EGM ID; Asset Number; Device Name; Location; Game Title; Base Denomination; Regulatory ID; Theoretical Hold %; Active; Enrolled.

| With a Slot Move | No |
|---|---|

TABLE 43

Filters for Net Variance

| Filter Text | Fix It Active? | Description |
|---|---|---|
| All Machines | No | Unfiltered, All rows displayed |
| Expected to report financials | No | Machines expected to report financials |
| That did not report financials | Yes | Machines that did not reported financials |
| That reported unexpected financials | No | Machines that reported unexpected financials |
| With a Voucher Printed variance | Yes | Machines that have a variance between the voucher printed meter and what the voucher system reported printed by that machine |
| With a Voucher Paid variance | Yes | Machines that have a variance between the voucher paid meter and what the voucher system reported paid by that machine |
| With a Jackpot Printed variance | Yes | Machines that have a variance between the jackpot printed meter and what the voucher system reported jackpots printed by that machine |
| With a Promo In variance | Yes | Machines that have a variance between the promo in meter and what the promo system reported paid by that machine |
| With a WAT In variance | Yes | Machines that have a variance between the WAT In meter and what the system reported WAT In transactions for that machine |
| With a WAT Out variance | Yes | Machines that have a variance between the WAT Out meter and what the system reported WAT Out transactions for that machine |

Fix It Button Functions for Net Variance

Figure 39:
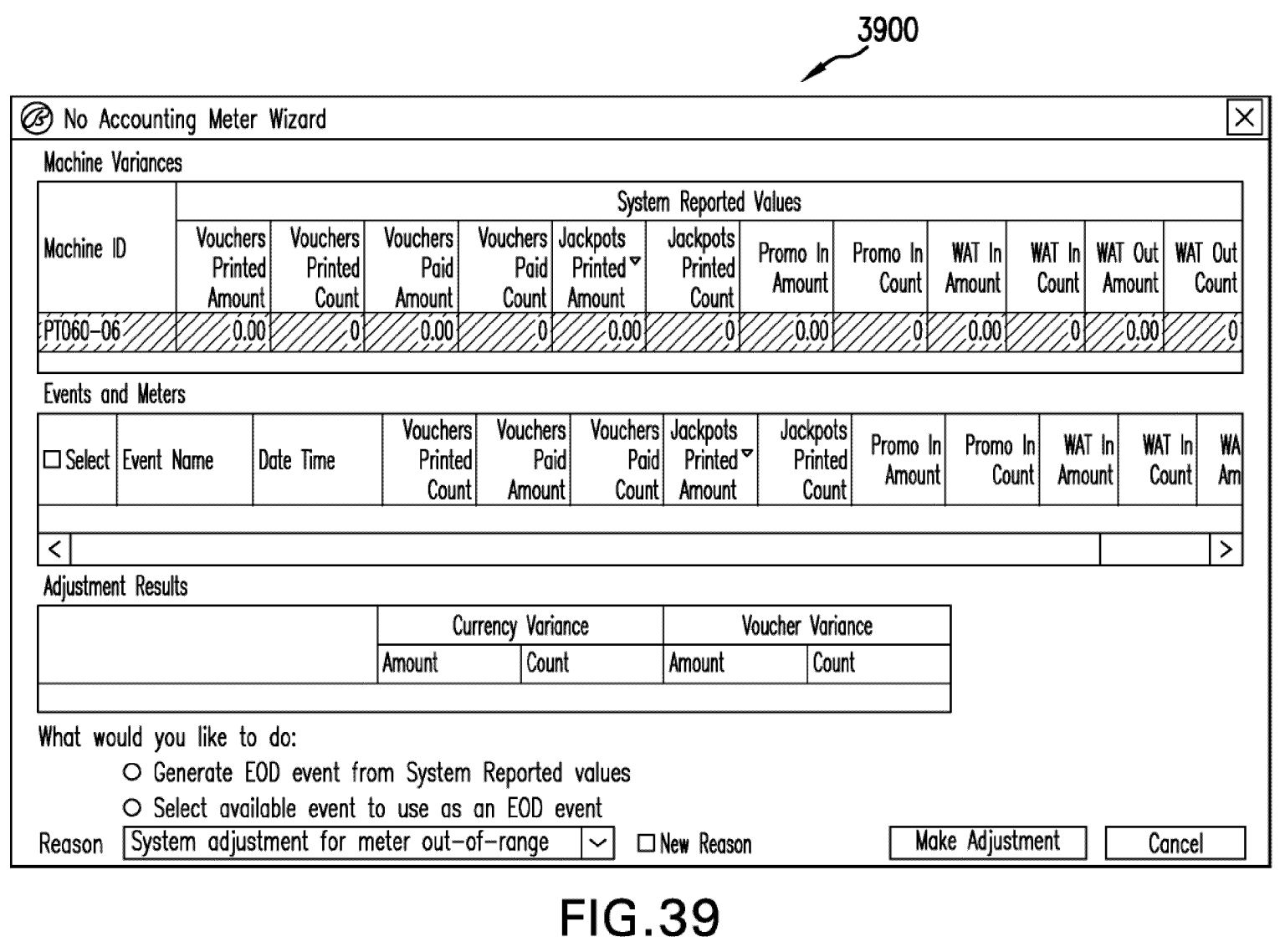

FIG. 39 shows a No Accounting Meter window or screen 3900, according to one illustrated embodiment.

That did Not Report financials—The window or screen 3900 may have a No Accounting Meter wizard to quickly identify machines that did not have an EOD accounting meter reported to the system. This wizard may have a Fix It button that prompts the user to either generate an EOD based on detailed transactions or to manually select an available event to use for activity. When the user selects the Fix It button, it may pop up the "No Accounting Meter Wizard".

TABLE 44

No Accounting Meter Wizard

| Column Text | Description | Type | Format |
|---|---|---|---|
| Machine Variances Grid | | | |
| Machine ID | The configured display name of the machine | | |
| System Reported Values | | | |
| Vouchers Printed Amount | Voucher Printed amount by the machine | | |
| Vouchers Printed Count | Voucher Printed count by the machine | | |
| Vouchers Paid Amount | Voucher Paid amount by the machine | | |
| Vouchers Paid Count | Voucher Paid count by the machine | | |
| Jackpots Printed Amount | Jackpot Printed amount by the machine | | |
| Jackpots Printed Count | Jackpot Printed count by the machine | | |
| Promo In Amount | Promo Voucher Paid amount by the machine | | |
| Promo In Count | Promo Voucher Paid count by the machine | | |
| WAT In Amount | WAT In amount for the machine | | |
| WAT In Count | WAT In count for the machine | | |
| WAT Out Amount | WAT Out amount for the machine | | |
| WAT Out Count | WAT Out count for the machine | | |
| Events and Meters Grid | | | |
| Select | Select meters | | |
| Event Name | This is the name of the event that was adjusted | | |
| Date and Time | Date and time of event adjusted | | |
| Vouchers Printed Amount | Vouchers Printed amount by the machine | | |
| Vouchers Printed Count | Vouchers Printed count by the machine | | |
| Vouchers Paid Amount | Voucher Paid amount by the machine | | |
| Vouchers Paid Count | Voucher Paid count by the machine | | |
| Jackpots Printed Amount | Jackpot Printed amount by the machine | | |
| Jackpots Printed Count | Jackpot Printed count by the machine | | |
| Promo In Amount | Promo Voucher Paid amount by the machine | | |
| Promo In Count | Promo Voucher Paid count by the machine | | |
| WAT In Amount | WAT In amount for the machine | | |
| WAT In Count | WAT In count for the machine | | |
| WAT Out Amount | WAT Out amount for the machine | | |
| WAT Out Count | WAT Out count for the machine | | |
| Adjustment Results Grid | | | |
| Currency Variance Amount | Variance amount in currency | | |
| Currency Variance Count | Variance count in currency | | |

TABLE 44-continued

No Accounting Meter Wizard

| Column Text | Description | Type | Format |
|---|---|---|---|
| Voucher Variance Amount | Variance amount in voucher | | |
| Voucher Variance Count | Variance count in voucher | | |

FIG. 40 shows a Voucher Printed window or screen 4000, according to one illustrated embodiment.

Machines with a Voucher Printed variance—The window or screen 4000 may have a Voucher Printed wizard to quickly identify machines that have a variance between machine metered voucher printed values and individual transactions in the vouchering system. This wizard may have a Fix It button that allows auditor to update the machine summary meters with the count and amount from the vouchering system. When the user selects the Fix It button, it may pop up the "Voucher Printed Wizard".

TABLE 45

Voucher Printed Wizard

| Column Text | Description | Type | Format |
|---|---|---|---|
| | Machine Variance Grid | | |
| Machine ID | The configured display name of the machine | | |
| Variance Amount | System Reported Amount - Machine Reported Amount | | |
| Variance Count | System Reported Count-Machine Reported Count | | |
| Machine Metered Amount | The voucher printed amount reported by machine | | |
| Machine Metered Count | The voucher printed count reported by machine | | |
| System Reported Amount | The voucher printed amount reported by system | | |
| System Reported Count | The voucher printed count reported by system | | |
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 41 shows a Voucher Paid Variance window or screen 4100, according to one illustrated embodiment.

Machines with a Voucher Paid variance—The window or screen 4100 may have a Voucher Paid wizard to quickly identify machines that have a variance between machine metered voucher printed values and individual transactions in the vouchering system. This wizard may have a Fix It button that allows auditor to update the machine summary meters with the count and amount from the vouchering system. When the user selects the Fix It button, it may pop up the "Voucher Paid Wizard".

TABLE 46

Voucher Paid Wizard

| Column Text | Description | Type | Format |
|---|---|---|---|
| | Machine Variance Grid | | |
| Machine ID | The configured display name of the machine | | |
| Variance Amount | System Reported Amount - Machine Reported Amount | | |
| Variance Count | System Reported Count -Machine Reported Count | | |
| Machine Metered Amount | The voucher paid amount reported by machine | | |
| Machine Metered Count | The voucher paid count reported by machine | | |
| System Reported Amount | The voucher paid amount reported by system | | |
| System Reported Count | The voucher paid count reported by system | | |
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 42 shows a Jackpot Printed window or screen 4200, according to one illustrated embodiment.

Machines with a Jackpot Printed variance—This window or screen 4200 may have a Jackpot wizard to quickly identify machines that have a variance between machine metered Jackpot values and individual jackpot voucher and jackpot handpay cancelled credit events. This wizard may have a Fix It button that allows auditor to update the machine summary meters with the count and amount from the vouchering system. When the user selects the Fix It button, it may pop up the "Jackpot Printed Wizard".

TABLE 47

Jackpot Printed Wizard

| Column Text | Description | Type | Format |
|---|---|---|---|
| | Machine Variance Grid | | |
| Machine ID | The configured display name of the machine | | |
| Variance Amount | System Reported Amount - Machine Reported Amount | | |
| Variance Count | System Reported Count - Machine Reported Count | | |
| Machine Metered Amount | The jackpot printed amount reported by machine | | |
| Machine Metered Count | The jackpot printed count reported by machine | | |
| System Reported Amount | The jackpot printed amount reported by system | | |
| System | The jackpot printed | | |

TABLE 47-continued

Jackpot Printed Wizard

| Column Text | Description | Type | Format |
| --- | --- | --- | --- |
| Reported Count | count reported by system | | |
| *Adjustment Results Grid* | | | |
| *Adjustment Type Rows* | | | |
| Before Adjustment | Amount or count before adjustment | | |
| After Adjustment | Amount or count after adjustment | | |
| *Variance Columns* | | | |
| Amount | Variance in amount | | |
| Count | Variance in count | | |

FIG. 43 shows a Promo Coupon window or screen 4300, according to one illustrated embodiment.

Machines with a Promo In variance—This window or screen 4300 may have a Promo Coupon wizard to quickly identify machines that have a variance between machine metered promotional coupons redeemed and individual transactions in the promotional system. This wizard may have a Fix It button that allows auditor to update the machine summary meters with the count and amount from the vouchering system. When the user selects the Fix It button, it may pop up the "Promo Coupon Wizard".

TABLE 48

Promo Coupon Wizard

| Column Text | Description | Type | Format |
| --- | --- | --- | --- |
| *Machine Variance Grid* | | | |
| Machine ID | The configured display name of the machine | | |
| Variance Amount | System Reported Amoun t- Machine Reported Amount | | |
| Variance Count | System Reported Count - Machine Reported Count | | |
| Machine Metered Amount | The Promo In amount reported by machine | | |
| Machine Metered Count | The Promo In count reported by machine | | |
| System Reported Amount | The Promo In amount reported by system | | |
| System Reported Count | The Promo In count reported by system | | |
| *Adjustment Results Grid* | | | |
| *Adjustment Type Rows* | | | |
| Before Adjustment | Amount or count before adjustment | | |
| After Adjustment | Amount or count after adjustment | | |
| *Variance Columns* | | | |
| Amount | Variance in amount | | |
| Count | Variance in count | | |

FIG. 44 shows a WAT In window or screen 4400, according to one illustrated embodiment.

Machines with a WAT In variance—This window or screen 4400 may have a WAT In wizard to quickly identify machines that have a variance between machine metered WAT transfers to the machine and individual transactions from the WAT system. This wizard may have a Fix It button that prompts the user to either update the machine meters with the WAT system values or to post balancing adjustment against the WAT system using the delta from machine meters. When the user selects the Fix It button, it may pop up the "WAT In Wizard".

TABLE 49

WAT In Wizard Grid

| Column Text | Description | Type | Format |
| --- | --- | --- | --- |
| *Machine Variance Grid* | | | |
| Machine ID | The configured display name of the machine | | |
| Variance WAT In Amount | System Reported WAT In Amount - Machine Reported WAT In Amount | | |
| Variance WAT In Count | System Reported WAT In Count - Machine Reported WAT In Count | | |
| Machine Metered WAT In Amount | The WAT In amount reported by machine | | |
| Machine Metered WAT In Count | The WAT In count reported by machine | | |
| System Reported WAT In Amount | The WAT In amount reported by system | | |
| System Reported WAT In Count | The WAT In count reported by system | | |
| *Adjustment Results Grid* | | | |
| *Adjustment Type Rows* | | | |
| Before Adjustment | Amount or count before adjustment | | |
| After Adjustment | Amount or count after adjustment | | |
| *Variance Columns* | | | |
| Amount | Variance in amount | | |
| Count | Variance in count | | |

FIG. 45 shows a WAT Out window or screen 4500, according to one illustrated embodiment.

Machines with a WAT Out variance—This window or screen 4500 may have a WAT Out wizard to quickly identify machines that have a variance between machine metered WAT transfers from the machine and individual transaction to the WAT system. This wizard may have a Fix It button that prompts the user to either update the machine meters with the WAT system values or to post balancing adjustment against the WAT system using the delta from machine meters. When the user selects the Fix It button, it may pop up the "WAT Out Wizard".

TABLE 50

WAT Out Wizard Grid

| Column Text | Description | Type | Format |
| --- | --- | --- | --- |
| *Machine Variance Grid* | | | |
| Machine ID | The configured display name of the machine | | |
| Variance WAT Out Amount | System Reported WAT Out Amount - Machine Reported WAT Out Amount | | |

TABLE 50-continued

WAT Out Wizard Grid

| Column Text | Description | Type | Format |
|---|---|---|---|
| Variance WAT Out Count | System Reported WAT Out Count - Machine Reported WAT Out Count | | |
| Machine Metered WAT Out Amount | The WAT Out amount reported by machine | | |
| Machine Metered WAT Out Count | The WAT Out count reported by machine | | |
| System Reported WAT Out Amount | The WAT Out amount reported by system | | |
| System Reported WAT Out Count | The WAT Out count reported by system | | |

Adjustment Results Grid
Adjustment Type Rows

| | | | |
|---|---|---|---|
| Before Adjustment | Amount or count before adjustment | | |
| After Adjustment | Amount or count after adjustment | | |

Variance Columns

| | | | |
|---|---|---|---|
| Amount | Variance in amount | | |
| Count | Variance in count | | |

Interface for Net Variance

Figure 46:
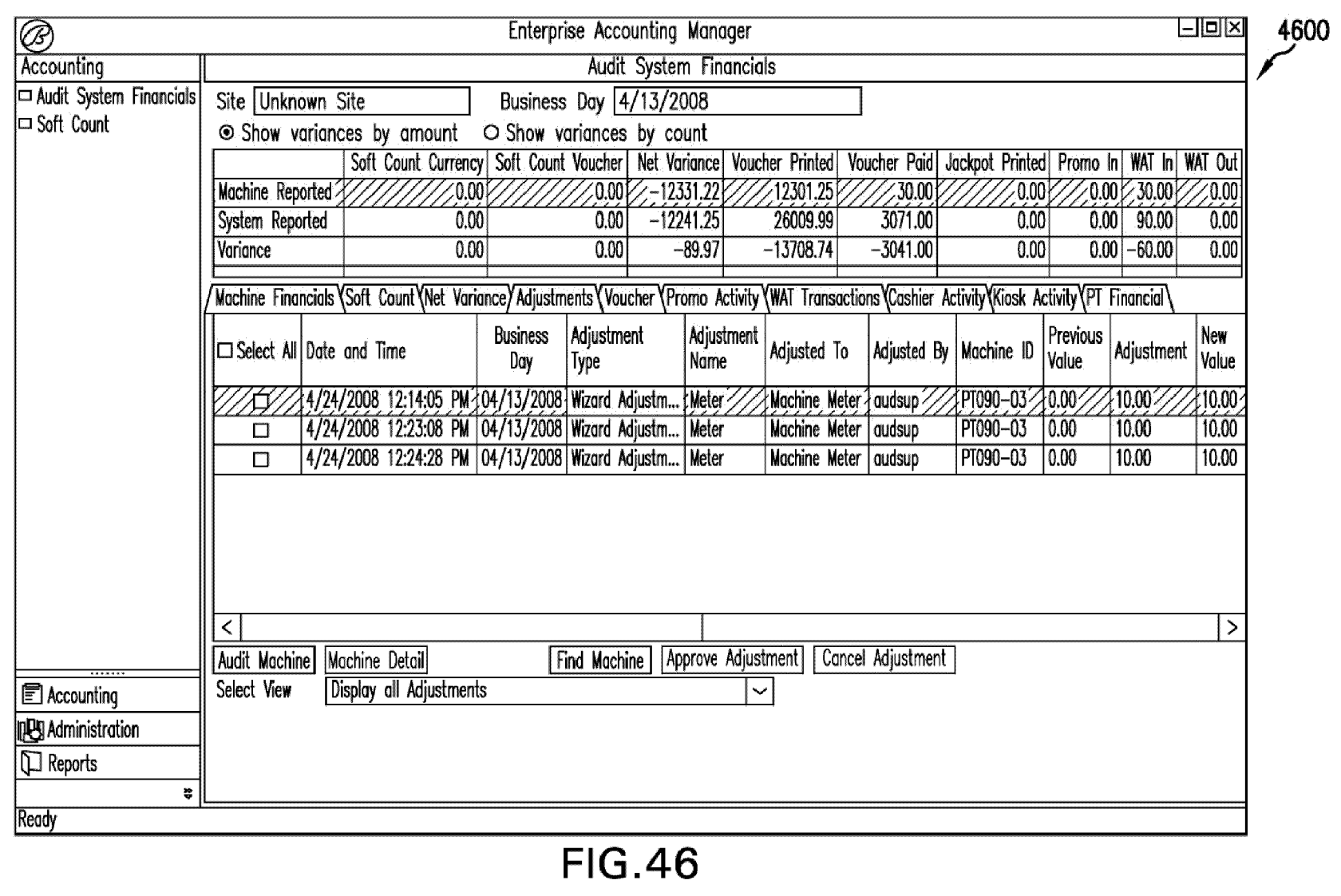

FIG. 46 shows an Audit System Financials window or screen 4600, according to one illustrated embodiment.

Audit System Financials—Adjustments

TABLE 51

Adjustments Grid

| Column Text | Description | Type | Format |
|---|---|---|---|
| These columns are ALWAYS displayed. | | | |
| Select All | | | |
| Date and Time | This is effective time of adjustment. | | |
| Business Day | Business day | | |
| Adjustment Type | This is adjustment type (Meter, Counted, Floor Event, Fund Transfer, Event Drop, Machine Meter) | | |
| Adjustment Name | This is the Source of Adjustment (System Adjustment, Manual Adjustment or Wizard Adjustment) | | |
| Adjusted To | This may be where the adjustment was applied to i.e. Machine Meter, Voucher, Jackpot, Promo In, WAT In, WAT Out | | |
| Adjusted By | This is who made the adjustment i.e. System or the name of the user | | |
| Machine ID | This is the name of the machine affected by the adjustment | | |
| Previous Value | This is the value before the adjustment was made | | |

TABLE 51-continued

Adjustments Grid

| Column Text | Description | Type | Format |
|---|---|---|---|
| Adjustment | This is the value of the adjustment | | |
| New Value | This is the value after the adjustment is applied | | |
| Date Time Approved | This is the date and time the adjustment was approved | | |
| Approving Supervisor | This is the user name of the approving supervisor | | |
| Reason | This is the reason that was entered when the adjustment was made | | |
| Event | This is the name of the event that was adjusted | | |
| Device Type | | | |
| Meter Type | This is the name of the meter | | |
| Meter Start | This is the starting meter value | | |
| Meter End | This is the ending meter value | | |
| Meter Delta | This is the delta between the starting and ending meter value | | |
| Meter Adjustment | This is the value to the meter after the adjustment was made (Meter Delta + Adjustment) | | |

TABLE 52

Processing Buttons

| Button Name | Description |
|---|---|
| Audit Machine | Allow the user to audit a single machine |
| Machine Detail | Allow the user to view machine details |
| Fix It | Allow the user to use a wizard to fix known issues |
| Find Machine | Allow the user to find a machine |
| Cancel Adjustment | Allows user to make cancel selected adjustments |
| Approve Adjustment | Allows user to approve selected adjustments |

TABLE 53

Filters for Adjustments

| Filter Text | Fix It Active? | Approved Adjustment? | Cancel Adjustment? | Description |
|---|---|---|---|---|
| Display all adjustments | No | No | No | Show all adjustments for this business day |
| Display all machine adjustments | No | No | No | Show only machine adjustments |
| Display all machine detail adjustments | No | No | No | Show only machine adjustments with meter detail information |
| Display all manual adjustments | No | No | No | Show only manual adjustments |
| Display all system | No | No | No | Show only system |

TABLE 53-continued

Filters for Adjustments

| Filter Text | Fix It Active? | Approved Adjustment? | Cancel Adjustment? | Description |
|---|---|---|---|---|
| adjustments | | | | adjustments |
| Display all wizard adjustments | No | No | No | Show only adjustments made by wizards |
| Display all un-approved adjustments | No | Yes | Yes | Show only adjustments that need to be approved |
| Display all approved adjustments | No | No | No | Show all approved adjustments |
| Display all cancel adjustments | No | No | No | Show all cancel adjustments |

Figure 47:
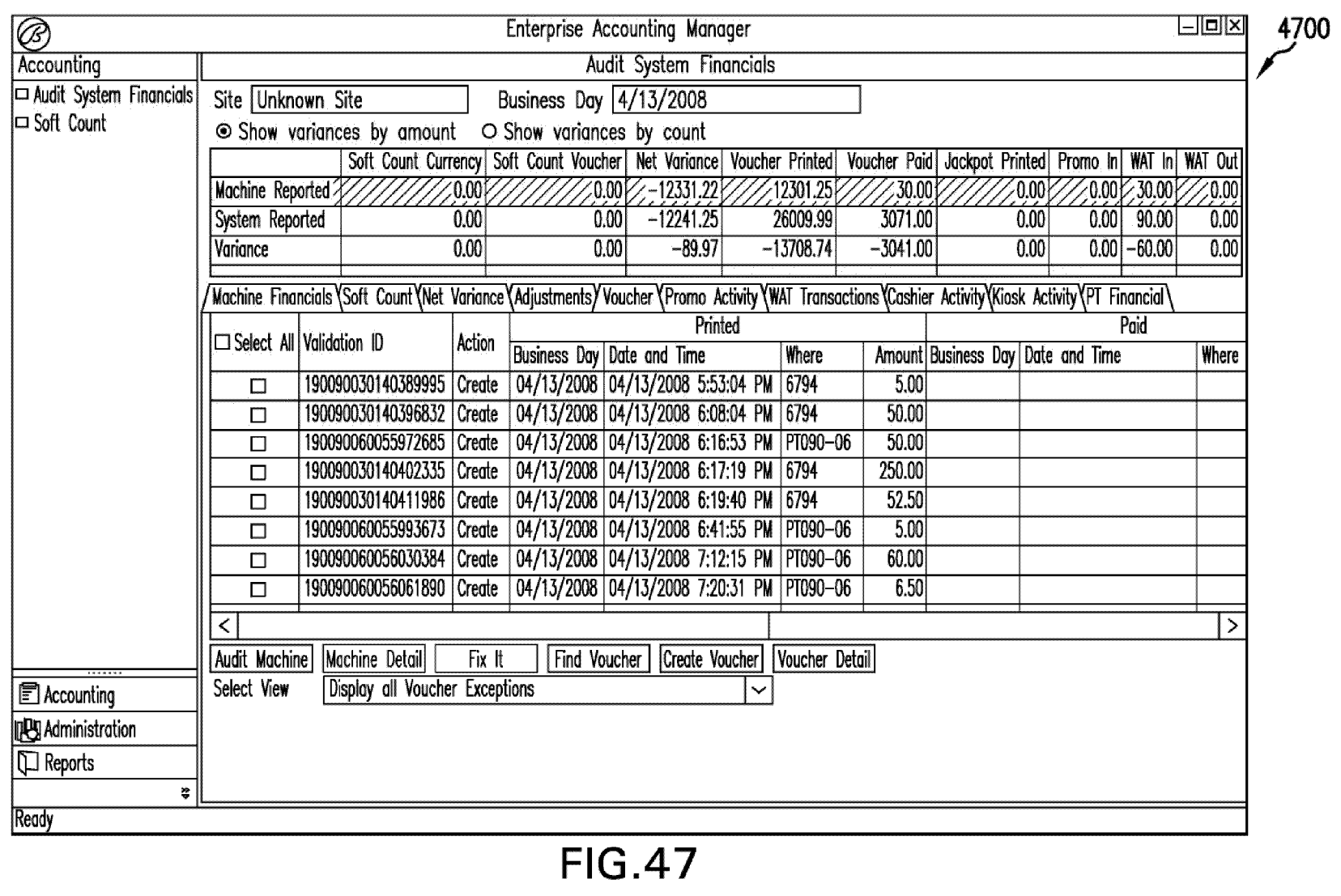

FIG. 47 shows an Audit System Financials window or screen 4700, according to one illustrated embodiment.

Audit System Financials—Voucher

TABLE 54

Voucher Grid

| Column Text | Description | Type | Format |
|---|---|---|---|
| These columns are ALWAYS displayed. | | | |
| Select All | Select box to select a voucher | Boolean | Check box |
| Validation ID | Barcode of voucher | Varchar 32 | Ascii |
| Action | Vouchers action like create, redeem etc | | |
| Printed | | | |
| Business Day | The business day when the voucher was printed | | MMDDYYYY |
| Date and Time | Date time when the voucher was printed | | |
| Where | Where the voucher was printed | | |
| Amount | Amount of the voucher when it was printed | | |
| Paid | | | |
| Business Day | The business day when the voucher was paid | | |
| Date and Time | Date time when the voucher was paid | | |
| Where | Where the voucher was paid | | |
| Amount | Amount the voucher was paid | | |
| Void | | | |
| Business Day | The business day when the voucher was Void | | |
| Date and Time | Date time when the voucher was void | | |
| Where | Where the voucher was voided | | |
| Amount | Amount of the voucher if it was voided | | |
| Expired | | | |
| Business Day | The business day when the voucher was expired | | |
| Date and Time | When the voucher is supposed to be expired | | |
| Amount | Amount of the voucher if it was expired | | |

TABLE 55

Processing Buttons

| Button Name | Description |
|---|---|
| Audit Machine | Allow the user to audit a single machine. If the voucher has not been paid, then audit the printed machine. If the voucher has been paid, then prompt the user for the machine that either printed the voucher or paid the voucher |
| Machine Detail | Allow the user to view machine details |
| Variance Criteria | Allow the user to enter criteria for showing variances |
| Fix It | Allow the user to use a wizard to fix known issues |
| Voucher Detail | Allow the user to view the details of the voucher |
| Find Voucher | Allow the user to search for a voucher |
| Create Voucher | Allow the user to create a voucher |

TABLE 56

Filters for Voucher

| Filter Text | Fix It Active? | Description |
|---|---|---|
| All Vouchers for this business day | No | Unfiltered, All rows displayed |
| All Paid Pending Vouchers | Yes | Show rows for all vouchers that have a status of Paid Pending. |
| All Printed Vouchers not on correct business day | Yes | Show rows for all vouchers that have a printed date that does not correspond with the business day of the voucher |
| All Paid Vouchers with a paid date prior to the creation date | No | Show rows for all vouchers that have a paid date that is prior to the creation date |
| All Vouchers past the Expiration Period | Yes | Show rows for all vouchers that have past the site expiration period and have a cashable status |
| All Voucher Exceptions | Yes No | Show rows for all vouchers that have either a printed or paid machine that does not correspond to an existing machine |

Fix It Button Functions for Voucher

Figure 48:
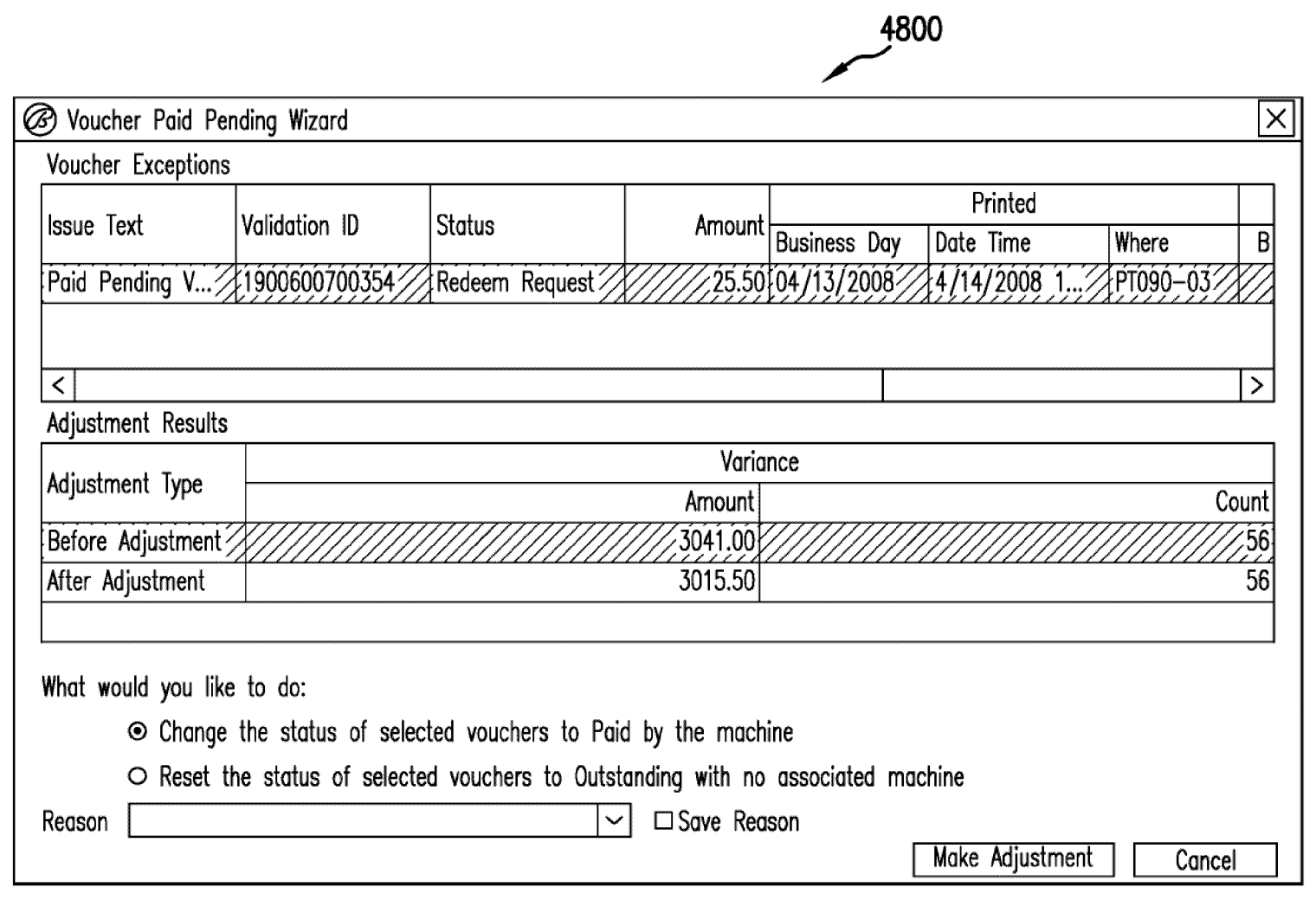

FIG. 48 shows a Paid Pending Vouchers window or screen 4800, according to one illustrated embodiment.

All Paid Pending Vouchers—The window or screen 4800 may have a Paid Pending wizard to identify all vouchers with a status of Paid Pending. The Fix It button may prompt the user to change the status to paid by the device associated with the action or to reset the status to Outstanding with no associated device. When the user selects the Fix It button, it may pop up the "Paid Pending Wizard".

TABLE 57

Voucher Paid Pending Wizard Grid

| Column Text | Description | Type | Format |
|---|---|---|---|
| Voucher Exceptions Grid | | | |
| Issue Text | Type of Vouchers | | |
| Validation ID | Barcode of voucher | | |
| Status | Status of the Voucher | | |
| Amount | Amount of the Voucher | | |
| Printed Business Day | Business day on which the voucher printed | | |
| Printed Date and time | Voucher printed date and time | | |
| Printed Where | Printed location | | |
| Paid Business Day | Business day when voucher was paid | | |
| Paid Date and Time | Date and time when the voucher was paid | | |
| Paid Where | Voucher paid location | | |
| Adjustment Results Grid | | | |
| Adjustment Type | | | |
| Before Adjustment | Amount/Count before adjustment | | |
| After Adjustment | Amount/Count after adjustment | | |
| Variance | | | |
| Amount | Voucher amount | | |
| Count | Voucher count | | |

FIG. 49 shows an All Printed Vouchers window or screen 4900, according to one illustrated embodiment.

All Printed Vouchers not on correct business day—This window or screen 4900 may have a Printed/Created wizard to identify all vouchers that show a printed date not corresponding with the business date of the voucher. The Fix It button may prompt the user to change the gaming date of the vouchers currently selected or accept the variance. When the user selects the Fix It button, it may pop up the "Voucher Printed Created Wizard".

TABLE 58

Voucher Printed Created Wizard

| Column Text | Description | Type | Format |
|---|---|---|---|
| Voucher Exceptions Grid | | | |
| Issue Text | Type of Vouchers | | |
| Validation ID | Barcode of voucher | | |
| Status | Status of the Voucher | | |
| Amount | Amount of the Voucher | | |
| Printed Business Day | Business day on which the voucher printed | | |
| Printed Date and time | Voucher printed date and time | | |
| Printed Where | Printed location | | |
| Paid Business Day | Business day when voucher was paid | | |
| Paid Date and Time | Date and time when the voucher was paid | | |
| Paid Where | Voucher paid location | | |
| Adjustment Results Grid | | | |
| Adjustment Type | | | |
| Before Adjustment | Amount/Count before adjustment | | |
| After Adjustment | Amount/Count after adjustment | | |

TABLE 58-continued

Voucher Printed Created Wizard

| Column Text | Description | Type | Format |
|---|---|---|---|
| Variance | | | |
| Amount | Voucher amount | | |
| Count | Voucher count | | |

FIG. 50 shows a Voucher Past Expiration window or screen 5000, according to one illustrated embodiment.

All Vouchers past the Expiration Period—This window or screen 5000 may have a Past Expiration Period wizard to identify all vouchers that have passed the expiration period for the site but do not have a status of Expired. The Fix It button may prompt the user to change the status to Expired. When the user selects the Fix It button, it may pop up the "Voucher Past Expiration Period Wizard".

TABLE 59

Voucher Past Expiration Period Wizard

| Column Text | Description | Type | Format |
|---|---|---|---|
| Voucher Exception | | | |
| Issue Text | Type of Vouchers | | |
| Validation ID | Barcode of voucher | | |
| Status | Status of the Voucher | | |
| Amount | Amount of the Voucher | | |
| Printed Business Day | Business day on which the voucher printed | | |
| Printed Date and time | Voucher printed date and time | | |
| Printed Where | Printed location | | |
| Paid Business Day | Business day when voucher was paid | | |
| Paid Date and Time | Date and time when the voucher was paid | | |
| Paid Where | Voucher paid location | | |

Interface for Voucher

Figure 51:
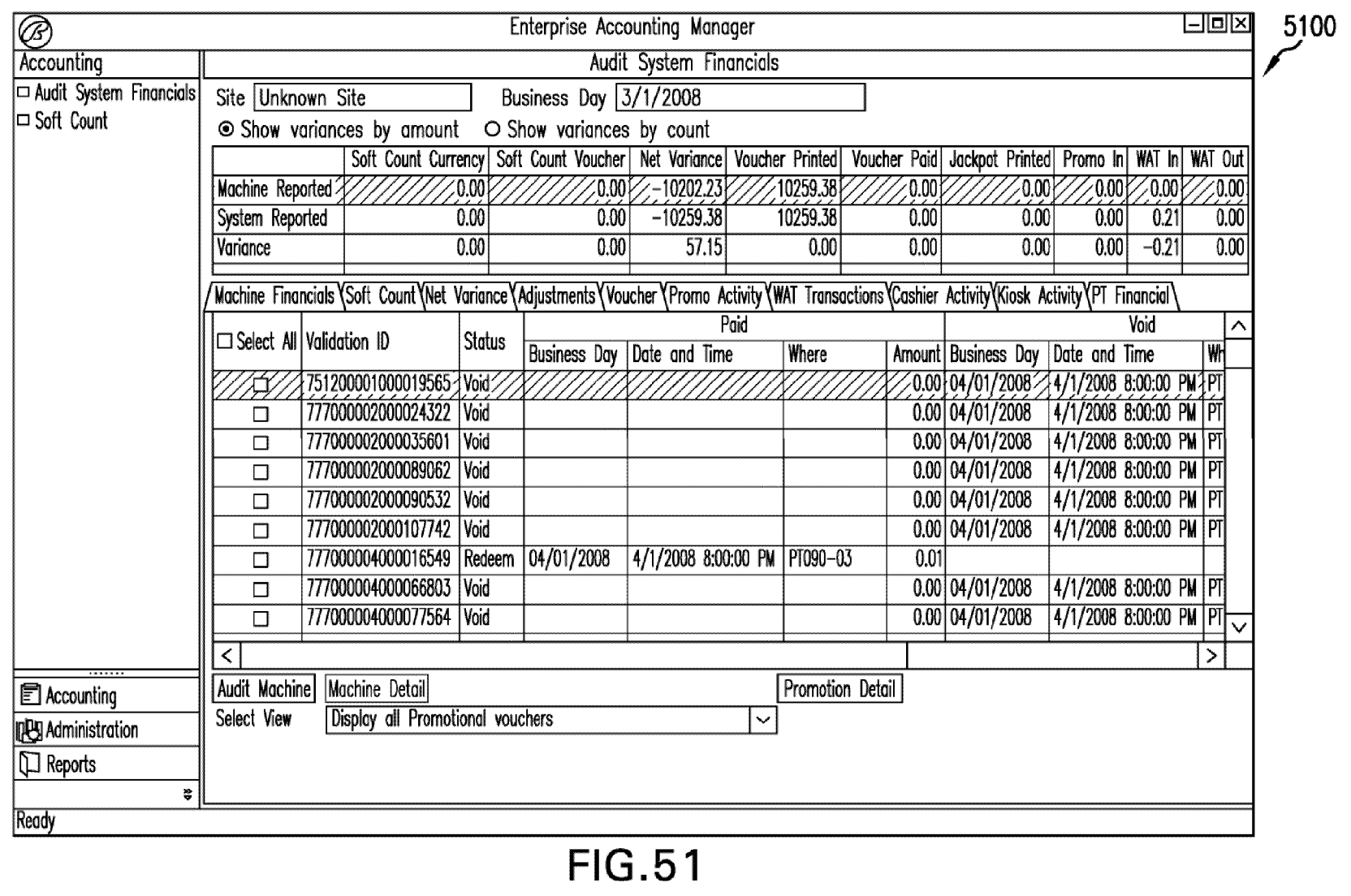

FIG. 51 shows an Audit System Financials window or screen 5100, according to one illustrated embodiment.

Audit System Financials—Promo Activity

TABLE 60

Promo Activity Grid

| Column Text | Description | Type | Format |
|---|---|---|---|
| These columns are ALWAYS displayed. | | | |
| Select All | Select box to select a promotion | Boolean | Check box |
| Validation ID | The barcode of the promotional voucher | | |
| Status | Voucher status | | |
| | Paid | | |
| Business Day | The business day the promotional voucher was paid | Varchar 32 | MMDDYYYY |
| Date and Time | Date and Time the promotional voucher was paid | | |
| Where | Paid location | | |
| Amount | Paid amount | | |

TABLE 60-continued

Promo Activity Grid

| Column Text | Description | Type | Format |
|---|---|---|---|
| | Void | | |
| Business Day | The business day the promotional voucher was paid | Varchar 32 | MMDDYYYY |
| Date and Time | Date and Time the promotional voucher was paid | | |
| Where | Void location | | |
| Amount | Void amount | | |
| | Expired | | |
| Business Day | The business day the promotional voucher was paid | Varchar 32 | MMDDYYYY |
| Date and Time | Date and Time the promotional voucher was paid | | |
| Amount | Expired voucher amount | | |

TABLE 61

Processing Buttons

| Button Name | Description |
|---|---|
| Audit Machine | Allow the user to audit a single machine |
| Machine Detail | Allow the user to view machine details |
| Promotion Detail | Allow the user to view the details of the promotion |

TABLE 62

Filters for Promo Activity

| Filter Text | Fix It Active? | Description |
|---|---|---|
| Show all Promotional vouchers | No | Displays all promotional vouchers |
| Show all Printed Promotional vouchers | No | Displays all Printed Promotional vouchers |
| Show all Paid Promotional vouchers | No | Displays all Paid Promotional vouchers |

Fix It Button Functions for Promo Activity
Interface for Promo Activity

Figure 52:
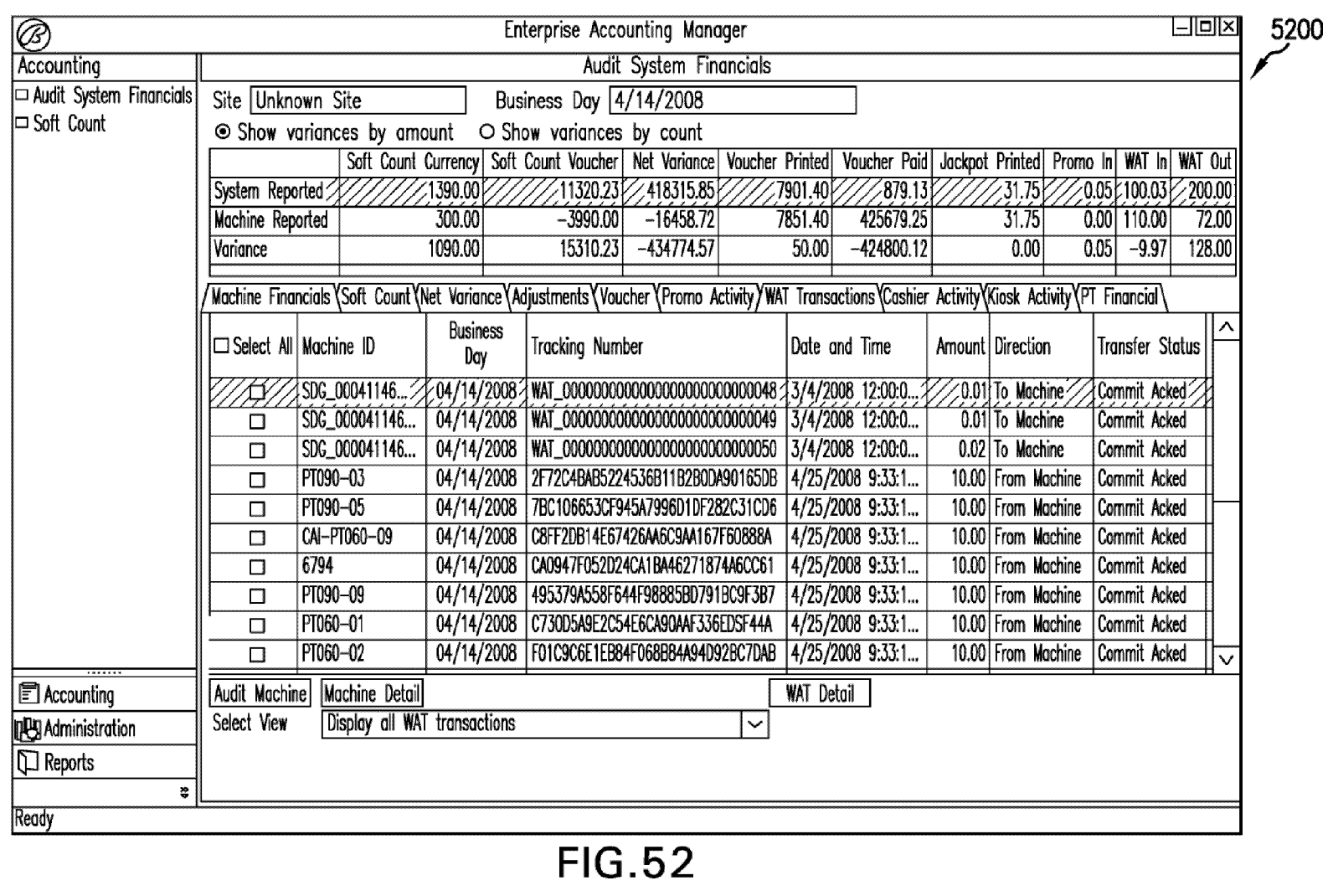

FIG. 52 shows an Audit System Financials—WAT Transactions window or screen 5200, according to one illustrated embodiment.

TABLE 63

WAT Transactions Grid

| Column Text | Description | Type | Format |
|---|---|---|---|
| | These columns are ALWAYS displayed. | | |
| Select All | Select box to select a WAT transaction | Boolean | Check box |
| Transaction | The transaction identifier of the WAT transaction | | |
| Business Day | WAT Transactions business day | | |
| Date and Time | The date and time the transaction occurred | | |

TABLE 63-continued

WAT Transactions Grid

| Column Text | Description | Type | Format |
|---|---|---|---|
| Direction | The direction of the WAT transaction. It is either To Machine or From Machine | | |
| Machine ID | The machine that the WAT transaction occurred | | |
| Status | The status of the WAT transaction | | |
| Amount | The amount of the WAT transaction | | |
| Patron | The patron that generated the WAT transaction | | |
| Metered Amount | Amount reported from the meter table for this business day | | |
| System Amount | System reported amount from the fund transfer table for this business day. | | |
| Variance Amount | Metered minus System amount | | |
| Metered Count | Count reported from the meter table for this business day | | |
| System Count | System reported count from the fund transfer table for this business day | | |
| Variance Count | Metered minus System count | | |

TABLE 64

Processing Buttons

| Button Name | Description |
|---|---|
| Audit Machine | Allow the user to audit a single machine |
| Machine Detail | Allow the user to view machine details |
| WAT Detail | Allow the user to view the details of the WAT transaction |
| Fix It | Allow the user to use a wizard to fix known issues |

TABLE 65

Filters for WAT Transactions

| Filter Text | Fix It Active? | Description |
|---|---|---|
| Show all WAT Transactions | No | Show all WAT transactions for this business day in the order they were recorded |
| Show all WAT In transactions | No | Show all WAT In transactions for this business day in the order they were recorded |
| Show all WAT Out transactions | No | Show all WAT Out transactions for this business day in the order they were recorded |

TABLE 65-continued

Filters for WAT Transactions

| Filter Text | Fix It Active? | Description |
|---|---|---|
| Show all WAT In transactions for machines with a WAT In variance | No | Show all WAT In transactions for this business day in the order they were recorded for machines that have a WAT In variance |
| Show all WAT Out transactions for machines with a WAT Out variance | No | Show all WAT Out transactions for this business day in the order they were recorded for machines that have a WAT Out variance |

Interface for WAT Transactions

Figure 53:
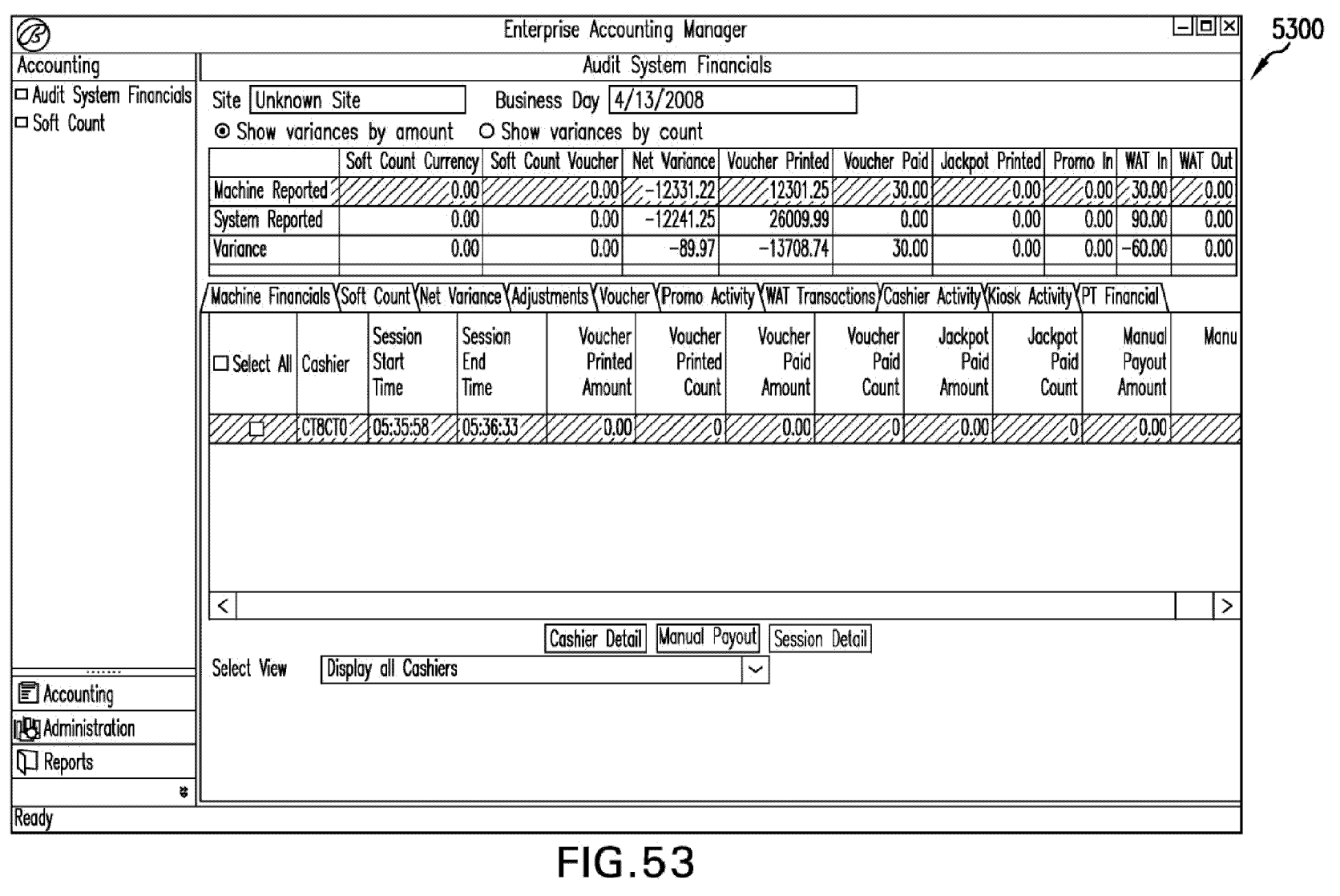

FIG. 53 shows an Audit System Financials—Cashier Activity window or screen 5300, according to one illustrated embodiment.

TABLE 66

Cashier Activity Grid

| Column Text | Description | Type | Format |
|---|---|---|---|
| These columns are ALWAYS displayed. | | | |
| Select All | Select box to select a cashier | Boolean | Check box |
| Cashier | The name of the cashier | | |
| Session Start Time | The session start time for this cashier | | |
| Session End Time | The session end time for this cashier | | |
| Voucher Printed Amount | The total amount of vouchers printed by this cashier | | |
| Voucher Printed Count | The total count of vouchers printed by this cashier | | |
| Voucher Paid Amount | The total amount of vouchers paid by this cashier | | |
| Voucher Paid Count | The total count of vouchers paid by this cashier | | |
| Jackpot Paid Amount | The total amount of jackpots paid by this cashier | | |
| Jackpot Paid Count | The total count of jackpots paid by this cashier | | |
| Manual Payout Amount | The total amount of manual slips by this cashier | | |
| Manual Payout Count | The total count of manual slips by this cashier | | |

TABLE 67

Processing Buttons

| Button Name | Description |
|---|---|
| Cashier Detail | Allow the user to view the details of the cashier |
| Session Detail | Allow the user to view the activity for that session |
| Manual Payout | Allow the user to create a manual payout slip |

TABLE 68

Filters for Cashier Activity

| Filter Text | Fix It Active? | Description |
|---|---|---|
| Show all Cashiers | No | Show all cashiers that had financial activity for this business day |

Fix It Button Functions for Cashier Activity

Interface for Cashier Activity

Figure 54:
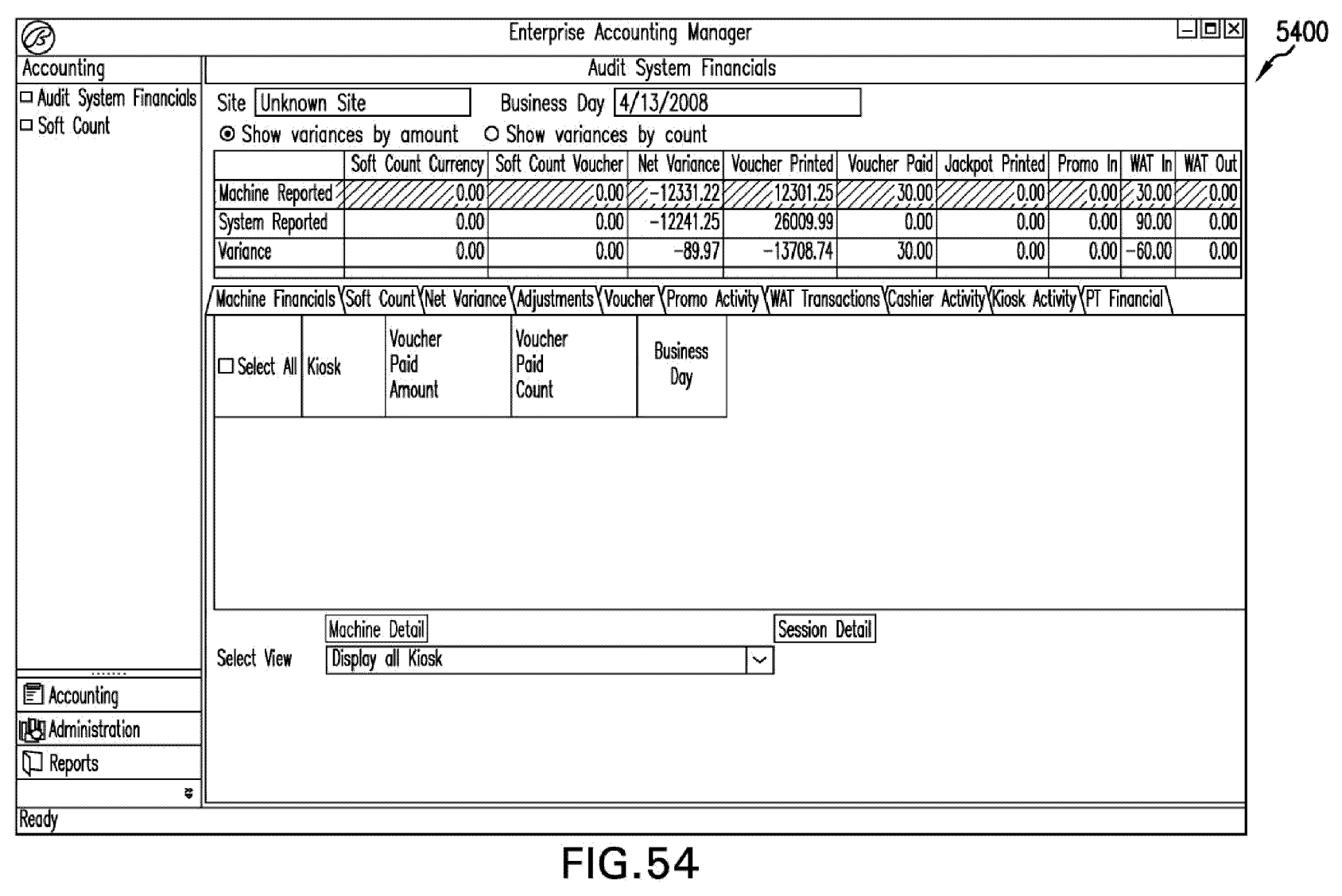

FIG. 54 shows an Audit System Financials—Kiosk Activity window or screen 5400, according to one illustrated embodiment.

TABLE 69

Kiosk Activity Grid

| Column Text | Description | Type | Format |
|---|---|---|---|
| These columns are ALWAYS displayed. | | | |
| Select All | Select box to select a kiosk | Boolean | Check box |
| Kiosk | The name of the kiosk | Varchar 32 | Ascii |
| Voucher Paid Amount | The total amount of vouchers paid by this kiosk for this business day | Numeric | Dollar amount with dollar signs |
| Voucher Paid Count | The total count of vouchers paid by this kiosk for this business day | Numeric | |
| Business Day | The business day for the information | Varchar 32 | MMDDYYYY |

TABLE 70

Processing Buttons

| Button Name | Description |
|---|---|
| Session Detail | Allow the user to view the activity for that kiosk during that session |
| Machine Detail | Allow the user to view the details of the machine (kiosk is a type of machine) |

TABLE 71

Filters for Kiosk Activity

| Filter Text | Fix It Active? | Description | Requirement |
|---|---|---|---|
| Show all Kiosk | No | Show all kiosks that had financial activity for this business day | 5.6.3.8.1.1 5.6.3.8.1.2 |

Fix It Button Functions for Kiosk Activity

Interface for Kiosk Activity

Figure 55:
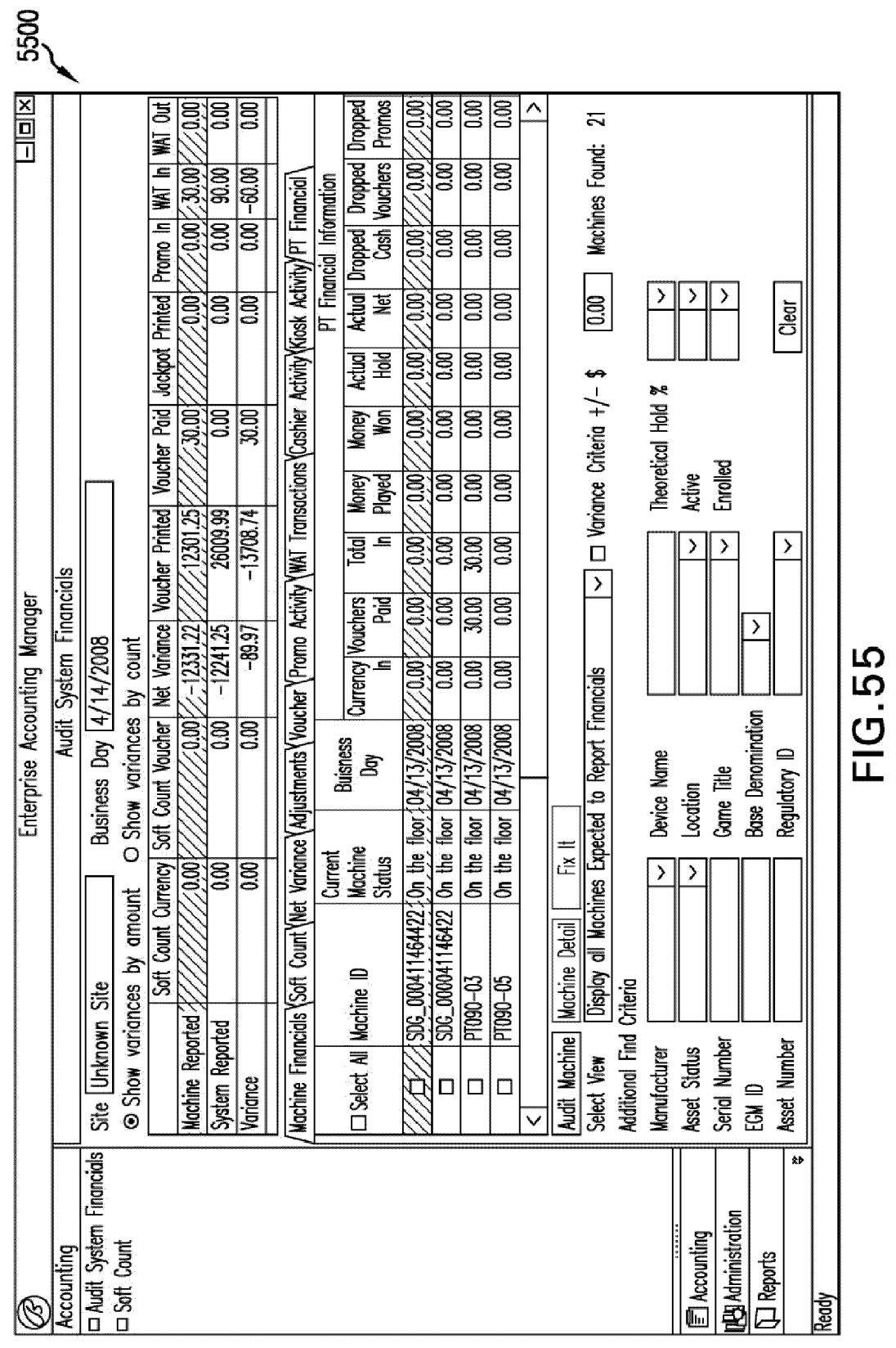

FIG. 55 shows an Audit System Financials—PT Financial window or screen 5500, according to one illustrated embodiment.

TABLE 72

PT Financial Grid

| Column Text | Description | Type | Format |
|---|---|---|---|
| These columns are ALWAYS displayed. | | | |
| Select All | Select box to select a machine to audit | Boolean | Check box |
| Machine ID | The configured display name of the machine | Varchar 32 | Ascii |
| Current Machine Status | | | |
| Business Day | The business day for the information | Varchar 32 | MMDDYYYY |
| PT Financial Information | | | |
| Currency In | The amount of currency received by this machine for this business day | | |
| Vouchers Paid | | | |
| Ticket In | The amount of vouchers received by this machine for this business day | | |
| Total In | The amount of currency and tickets received by this machine for this business day | | |
| Total Out | The amount of vouchers printed by this machine for this business day | | |
| Money Played | The amount of money played by this machine for this business day | | |
| Money Won | The amount of money won by this machine for this business day | | |
| Actual Hold % | The actual hold for this machine for this business day | | |
| Actual Net | The net hold for this machine for this business day | | |
| Dropped Cash | The amount dropped by this machine for this business day | | |
| Dropped Vouchers | | | |
| Dropped Promos | | | |
| Dropped Total | | | |
| Jackpot Amount | The amount of jackpot tickets printed by this machine for this business day | | |
| Stacker Cash | The amount of money in the stacker at EOD | | |
| Stacker Vouchers | | | |
| Stacker Promos | | | |
| Stacker Total | | | |
| Promo In | The amount of promotional coupons received by this machine for this business day | | |

TABLE 72-continued

PT Financial Grid

| Column Text | Description | Type | Format |
|---|---|---|---|
| WAT In | The amount of WAT In transactions for this machine for this business day | | |
| WAT Out | The amount of WAT Out transactions for this machine for this business day | | |

TABLE 73

Processing Buttons

| Button Name | Description |
|---|---|
| Audit Machine | Allow the user to audit a single machine |
| Machine Detail | Allow the user to view machine details |
| Fix It | Allow the user to use a wizard to fix known issues |

Finding a Machine: Additional criteria can provide to find a machine for the following information: Manufacturer ID; Asset status; Serial Number; EGM ID; Asset Number; Device Name; Location; Game Title; Base Denomination; Regulatory ID; Theoretical Hold %; Active; Enrolled.

TABLE 74

Filters for PT Financial

| Filter Text | Fix It Active? | Description | Requirement |
|---|---|---|---|
| All Machines | No | Unfiltered, All machines are displayed | |
| Expected to report financials | No | Show rows where the status in Bally_Asset Asset table Asset_Status_ID is 'On The Floor' | 5.6.3.5.1.1 |
| That did not report financials | Yes | Show rows where the status in Bally_Asset Asset table Asset_Status_ID is 'On The Floor' and there is no onEOD event | 5.6.3.5.1.2 |
| That reported unexpected financials | No | Show rows where the status in Bally_Asset Asset table Asset_Status_ID is not 'On The Floor' and there is an onEOD event | |
| with a Voucher Printed variance | Yes | Machines that have a variance between the voucher printed meter and what the voucher system reported printed by that machine | 5.6.3.5.1.4 |

TABLE 74-continued

Filters for PT Financial

| Filter Text | Fix It Active? | Description | Requirement |
|---|---|---|---|
| with a Voucher Paid variance | Yes | Machines that have a variance between the voucher paid meter and what the voucher system reported paid by that machine | 5.6.3.5.1.5 |
| with a Jackpot Printed variance | Yes | Machines that have a variance between the jackpot printed meter and what the voucher system reported jackpots printed by that machine | 5.6.3.5.1.6 |
| with a Promo In variance | Yes | Machines that have a variance between the promo in meter and what the promo system reported paid by that machine | 5.6.3.5.1.7 |
| with a WAT In variance | Yes | Machines that have a variance between the WAT In meter and what the system reported WAT In transactions for that machine | 5.6.3.5.1.8 |
| with a WAT Out variance | Yes | Machines that have a variance between the WAT Out meter and what the system reported WAT Out transactions for that machine | 5.6.3.5.1.9 |
| With a Slot Move | No | | |

Fix It Button Functions for PT Financial

FIG. 56 shows a No Accounting Meter window or screen 5600, according to one illustrated embodiment.

Machines that did not Report Financials—The window or screen 5600 may have a No Accounting Meter wizard to quickly identify machines that did not have an EOD accounting meter reported to the system. This wizard may have a Fix It button that prompts the user to either generate an EOD based on detailed transactions or to manually select an available event to use for activity. When the user selects the Fix It button, it may pop up the "No Accounting Meter Wizard".

TABLE 75

No Accounting Meter Wizard Grid

| Column Text | Description | Type | Format |
|---|---|---|---|
| *Machine Variances Grid* | | | |
| Machine ID | The configured display name of the machine | | |
| *System Reported Values* | | | |
| Vouchers Printed Amount | Voucher Printed amount by the machine | | |
| Vouchers Printed Count | Voucher Printed count by the machine | | |
| Vouchers Paid Amount | Voucher Paid amount by the machine | | |
| Vouchers Paid Count | Voucher Paid count by the machine | | |
| Jackpots Printed Amount | Jackpot Printed amount by the machine | | |
| Jackpots Printed Count | Jackpot Printed count by the machine | | |
| Promo In Amount | Promo Voucher Paid amount by the machine | | |
| Promo In Count | Promo Voucher Paid count by the machine | | |
| WAT In Amount | WAT In amount for the machine | | |
| WAT In Count | WAT In count for the machine | | |
| WAT Out Amount | WAT Out amount for the machine | | |
| WAT Out Count | WAT Out count for the machine | | |
| *Events and Meters Grid* | | | |
| Select | Select meters | | |
| Event Name | This is the name of the event that was adjusted | | |
| Date and Time | Date and time of event adjusted | | |
| Vouchers Printed Amount | Vouchers Printed amount by the machine | | |
| Vouchers Printed Count | Vouchers Printed count by the machine | | |
| Vouchers Paid Amount | Voucher Paid amount by the machine | | |
| Vouchers Paid Count | Voucher Paid count by the machine | | |
| Jackpots Printed Amount | Jackpot Printed amount by the machine | | |
| Jackpots Printed Count | Jackpot Printed count by the machine | | |
| Promo In Amount | Promo Voucher Paid amount by the machine | | |
| Promo In Count | Promo Voucher Paid count by the machine | | |
| WAT In Amount | WAT In amount for the machine | | |
| WAT In Count | WAT In count for the machine | | |
| WAT Out Amount | WAT Out amount for the machine | | |
| WAT Out Count | WAT Out count for the machine | | |
| *Adjustment Results Grid* | | | |
| Currency Variance Amount | Variance amount in currency | | |
| Currency Variance Count | Variance count in currency | | |
| Voucher Variance Amount | Variance amount in voucher | | |
| Voucher Variance Count | Variance count in voucher | | |

Figure 57:
FIG. 57 is a screen print showing a Voucher Printed window or screen, according to one illustrated embodiment.

FIG. 57 shows a Voucher Printed window or screen 5700, according to one illustrated embodiment.

Machines with a Voucher Printed variance—The window or screen 5700 may have a Voucher Printed wizard to quickly identify machines that have a variance between machine metered voucher printed values and individual transactions in the vouchering system. This wizard may have a Fix It button that allows auditor to update the machine summary meters with the count and amount from the vouchering system. When the user selects the Fix It button, it may pop up the "Voucher Printed Wizard".

TABLE 76

Voucher Printed Wizard

| Column Text | Description | Type | Format |
|---|---|---|---|
| | Machine Variance Grid | | |
| Machine ID | The configured display name of the machine | | |
| Variance Amount | System Reported Amount-Machine Reported Amount | | |
| Variance Count | System Reported Count-Machine Reported Count | | |
| Machine Metered Amount | The voucher printed amount reported by machine | | |
| Machine Metered Count | The voucher printed count reported by machine | | |
| System Reported Amount | The voucher printed amount reported by system | | |
| System Reported Count | The voucher printed count reported by system | | |
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 58 shows a Voucher Paid window or screen 5800, according to one illustrated embodiment.

Machines with a Voucher Paid variance—The window or screen 5800 may have a Voucher Paid wizard to quickly identify machines that have a variance between machine metered voucher printed values and individual transactions in the vouchering system. This wizard may have a Fix It button that allows auditor to update the machine summary meters with the count and amount from the vouchering system. When the user selects the Fix It button, it may pop up the "Voucher Paid Wizard".

TABLE 77

Voucher Paid Wizard Grid

| Column Text | Description | Type | Format |
|---|---|---|---|
| | Machine Variance Grid | | |
| Machine ID | The configured display name of the machine | | |
| Variance Amount | System Reported Amount-Machine Reported Amount | | |

TABLE 77-continued

Voucher Paid Wizard Grid

| Column Text | Description | Type | Format |
|---|---|---|---|
| Variance Count | System Reported Count-Machine Reported Count | | |
| Machine Metered Amount | The voucher paid amount reported by machine | | |
| Machine Metered Count | The voucher paid count reported by machine | | |
| System Reported Amount | The voucher paid amount reported by system | | |
| System Reported Count | The voucher paid count reported by system | | |
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 59 shows a Jackpot Printed window or screen 5900, according to one illustrated embodiment.

Machines with a Jackpot Printed variance—This window or screen 5900 may have a Jackpot wizard to quickly identify machines that have a variance between machine metered Jackpot values and individual jackpot voucher and jackpot handpay cancelled credit events. This wizard may have a Fix It button that allows auditor to update the machine summary meters with the count and amount from the vouchering system. When the user selects the Fix It button, it may pop up the "Jackpot Printed Wizard".

TABLE 78

Jackpot Printed Wizard

| Column Text | Description | Type | Format |
|---|---|---|---|
| | Machine Variance Grid | | |
| Machine ID | The configured display name of the machine | | |
| Variance Amount | System Reported Amount-Machine Reported Amount | | |
| Variance Count | System Reported Count-Machine Reported Count | | |
| Machine Metered Amount | The jackpot printed amount reported by machine | | |
| Machine Metered Count | The jackpot printed count reported by machine | | |
| System Reported Amount | The jackpot printed amount reported by system | | |
| System Reported Count | The jackpot printed count reported by system | | |

TABLE 78-continued

Jackpot Printed Wizard

| Column Text | Description | Type | Format |
|---|---|---|---|
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 60 shows a Promo Coupon window or screen 6000, according to one illustrated embodiment.

Machines with a Promo In variance—This window or screen 6000 may have a Promo Coupon wizard to quickly identify machines that have a variance between machine metered promotional coupons redeemed and individual transactions in the promotional system. This wizard may have a Fix It button that allows auditor to update the machine summary meters with the count and amount from the vouchering system. When the user selects the Fix It button, it may pop up the "Promo Coupon Wizard".

TABLE 79

Promo Coupon Wizard

| Column Text | Description | Type | Format |
|---|---|---|---|
| | Machine Variance Grid | | |
| Machine ID | The configured display name of the machine | | |
| Variance Amount | System Reported Amount-Machine Reported Amount | | |
| Variance Count | System Reported Count-Machine Reported Count | | |
| Machine Metered Amount | The Promo In amount reported by machine | | |
| Machine Metered Count | The Promo In count reported by machine | | |
| System Reported Amount | The Promo In amount reported by system | | |
| System Reported Count | The Promo In count reported by system | | |
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 61 shows a WAT In window or screen 6100, according to one illustrated embodiment.

Machines with a WAT In variance—This window or screen 6100 may have a WAT In wizard to quickly identify machines that have a variance between machine metered WAT transfers to the machine and individual transactions from the WAT system. This wizard may have a Fix It button that prompts the user to either update the machine meters with the WAT system values or to post balancing adjustment against the WAT system using the delta from machine meters. When the user selects the Fix It button, it may pop up the "WAT In Wizard".

TABLE 80

WAT In Wizard Grid

| Column Text | Description | Type | Format |
|---|---|---|---|
| | Machine Variance Grid | | |
| Machine ID | The configured display name of the machine | | |
| Variance WAT In Amount | System Reported WAT In Amount-Machine Reported WAT In Amount | | |
| Variance WAT In Count | System Reported WAT In Count-Machine Reported WAT In Count | | |
| Machine Metered WAT In Amount | The WAT In amount reported by machine | | |
| Machine Metered WAT In Count | The WAT In count reported by machine | | |
| System Reported WAT In Amount | The WAT In amount reported by system | | |
| System Reported WAT In Count | The WAT In count reported by system | | |
| | Adjustment Results Grid | | |
| | Adjustment Type Rows | | |
| Before Adjustment | Amount or count before adjustment | | |
| After Adjustment | Amount or count after adjustment | | |
| | Variance Columns | | |
| Amount | Variance in amount | | |
| Count | Variance in count | | |

FIG. 62 shows a WAT Out window or screen 6200, according to one illustrated embodiment.

Machines with a WAT Out variance—This window or screen 6200 may have a WAT Out wizard to quickly identify machines that have a variance between machine metered WAT transfers from the machine and individual transaction to the WAT system. This wizard may have a Fix It button that prompts the user to either update the machine meters with the WAT system values or to post balancing adjustment against the WAT system using the delta from machine meters. When the user selects the Fix It button, it may pop up the "WAT Out Wizard".

TABLE 81

WAT Out Wizard

| Column Text | Description | Type | Format |
|---|---|---|---|
| | Machine Variance Grid | | |
| Machine ID | The configured display name of the machine | | |
| Variance WAT Out Amount | System Reported WAT Out Amount-Machine Reported WAT Out Amount | | |

TABLE 81-continued

WAT Out Wizard

| Column Text | Description | Type | Format |
|---|---|---|---|
| Variance WAT Out Count | System Reported WAT Out Count-Machine Reported WAT Out Count | | |
| Machine Metered WAT Out Amount | The WAT Out amount reported by machine | | |
| Machine Metered WAT Out Count | The WAT Out count reported by machine | | |
| System Reported WAT Out Amount | The WAT Out amount reported by system | | |
| System Reported WAT Out Count | The WAT Out count reported by system | | |
| *Adjustment Results Grid* | | | |
| *Adjustment Type Rows* | | | |
| Before Adjustment | Amount or count before adjustment | | |
| After Adjustment | Amount or count after adjustment | | |
| *Variance Columns* | | | |
| Amount | Variance in amount | | |
| Count | Variance in count | | |

Interface for PT Financial Machine Detail Financials

Figure 63:
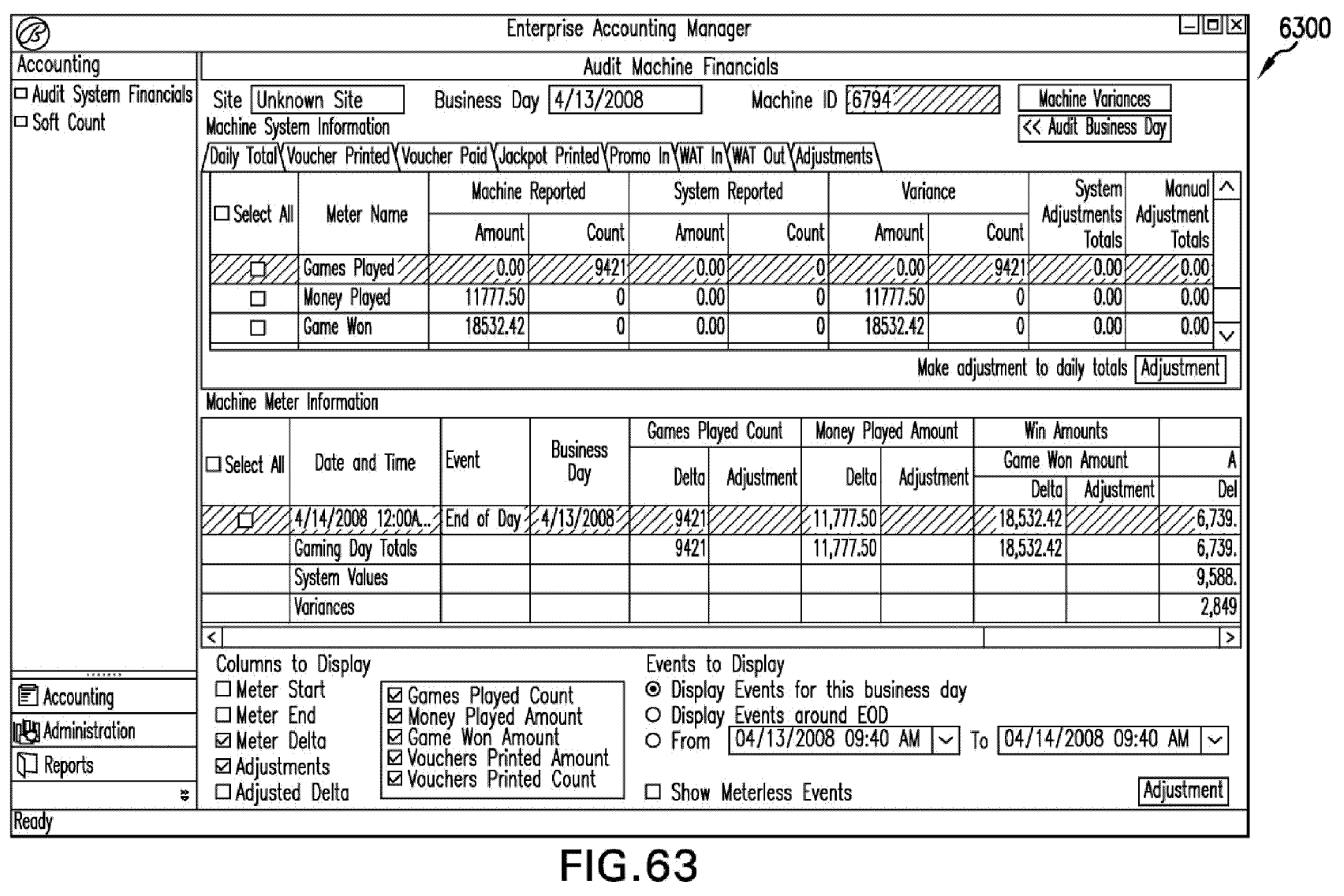

FIG. 63 shows a System Information—Daily Total window or screen 6300, according to one illustrated embodiment.

TABLE 82

Daily Total Grid

| Column Text | Description | Type | Format |
|---|---|---|---|
| *These columns are ALWAYS displayed.* | | | |
| Select All | Select meter name | Boolean | Check box |
| Meter Name | Different kind of meters | | |
| Machine Reported Amount | Amount reported by machine | | |
| Machine Reported Count | Count reported by machine | | |
| System Reported Amount | Amount reported by system | | |
| System Reported Count | Count reported by system | | |
| Variance Amount | System Reported Amount-Machine Reported Amount | | |
| Variance Count | System Reported Count-Machine Reported Count | | |

TABLE 82-continued

Daily Total Grid

| Column Text | Description | Type | Format |
|---|---|---|---|
| System Adjustment Totals | Total amount adjusted by system | | |
| Manual Adjustment Totals | Total amount adjusted manually | | |

TABLE 83

Processing Buttons

| Button Name | Description |
|---|---|
| Adjustment | All the user to make daily adjustment |

TABLE 84

Filters for Daily Total

| Filter Text | Fix It Active? | Description | Requirement |
|---|---|---|---|

Figure 64:
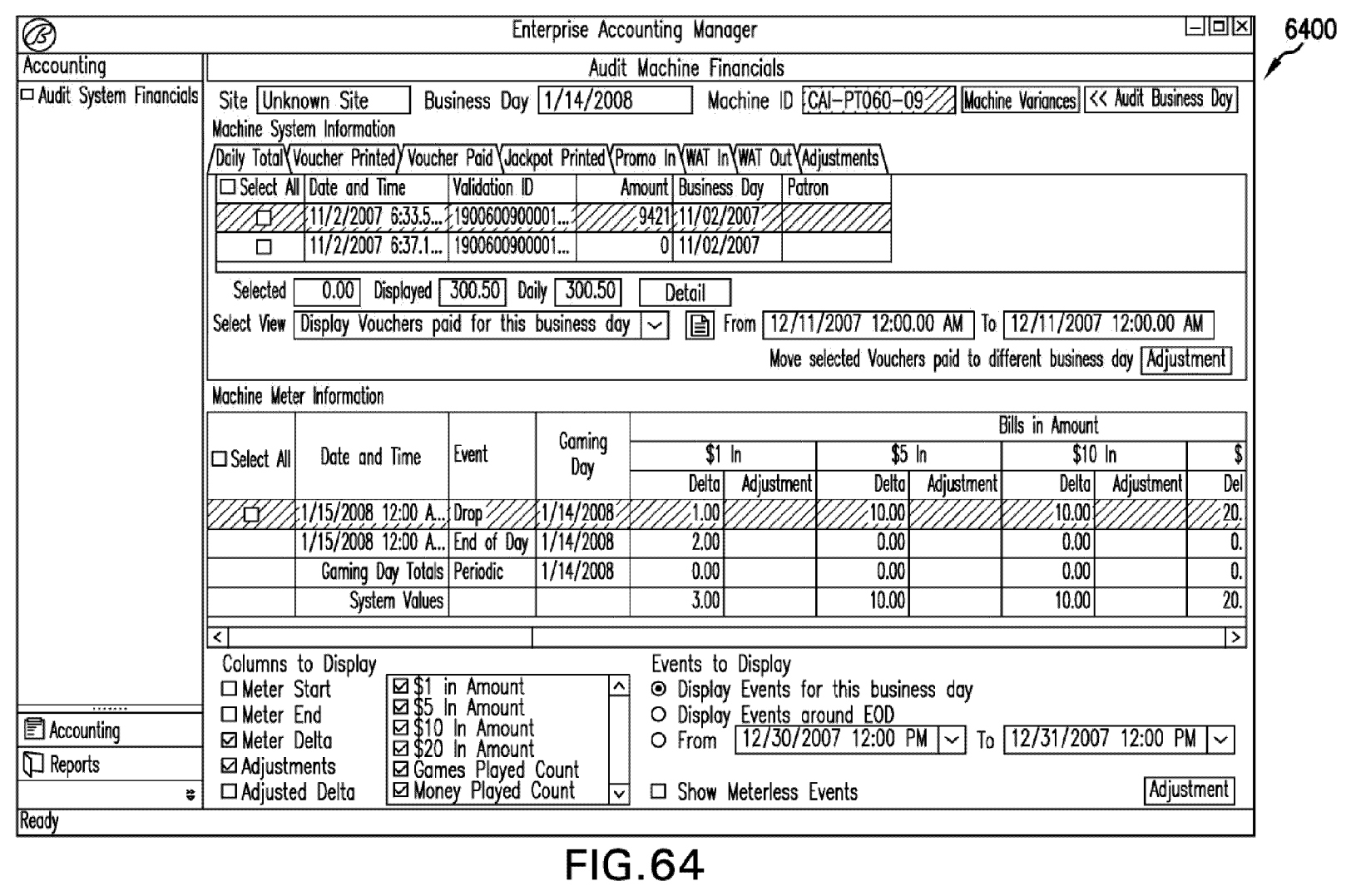

FIG. 64 shows a System Information—Voucher Paid window or screen 6400, according to one illustrated embodiment.

TABLE 85

Voucher Paid Grid

| Column Text | Description | Type | Format |
|---|---|---|---|
| *These columns are ALWAYS displayed.* | | | |
| Select All | Select vouchers | Boolean | Check box |
| Date and Time | Date and time of paid vouchers | | |
| Validation ID | The barcode of voucher | | |
| Amount | Amount of the voucher | | |
| Business Day | Business day of the voucher paid | | |
| Patron | The patron that generated the voucher paid | | |

TABLE 86

Processing Buttons

| Button Name | Description |
|---|---|
| Adjustment | Allows user to make system adjustments for voucher paid. |
| Detail | Allows user to view voucher detail |

TABLE 87

Filters for Voucher Paid

| Filter Text | Fix It Active? | Description | Requirement |
|---|---|---|---|
| Display Vouchers paid for this business day | No | | |
| Display Vouchers by paid date and time | No | | |

Figure 65:
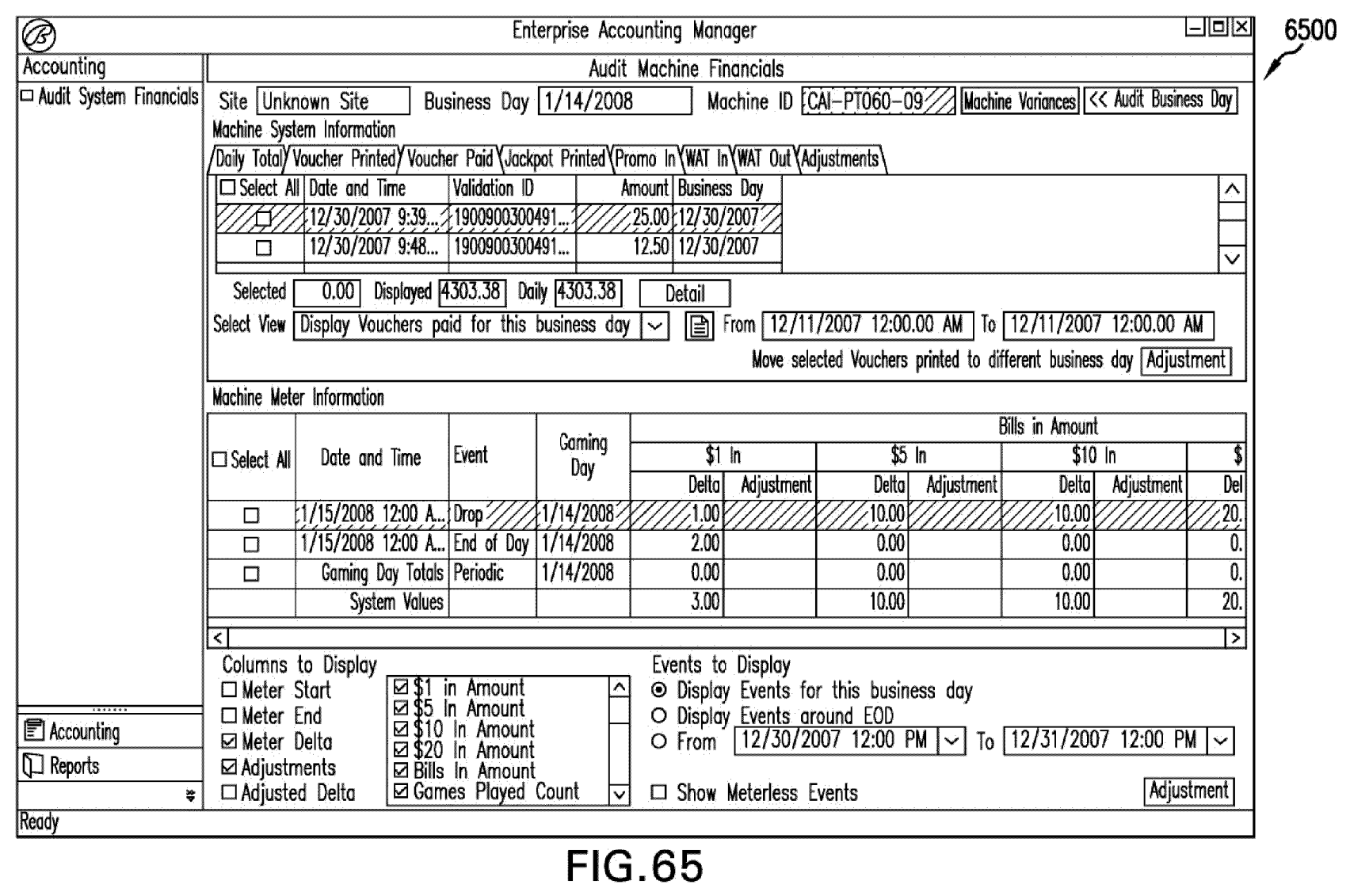

FIG. 65 shows a System Information—Voucher Printed window or screen 6500, according to one illustrated embodiment.

TABLE 88

Voucher Printed Grid

| Column Text | Description | Type | Format |
|---|---|---|---|
| *These columns are ALWAYS displayed.* | | | |
| Select All | Select a voucher printed | Boolean | Check box |
| Date and Time | Date and time of the voucher printed | | |
| Validation ID | The barcode of the voucher | | |
| Amount | Amount of the voucher | | |
| Business Day | Business day on which the voucher was printed | | |
| Ticket Sequence | | | |

TABLE 89

Processing Button

| Button Name | Description |
|---|---|
| Adjustment | Allows user to make system adjustments for voucher printed |
| Detail | Allows user to view voucher detail |

TABLE 90

Filters for Voucher Printed

| Filter Text | Fix It Active? | Description | Requirement |
|---|---|---|---|
| Display Voucher printed for this business day | No | | |
| Display Voucher by printed date and time | No | | |

Figure 66:
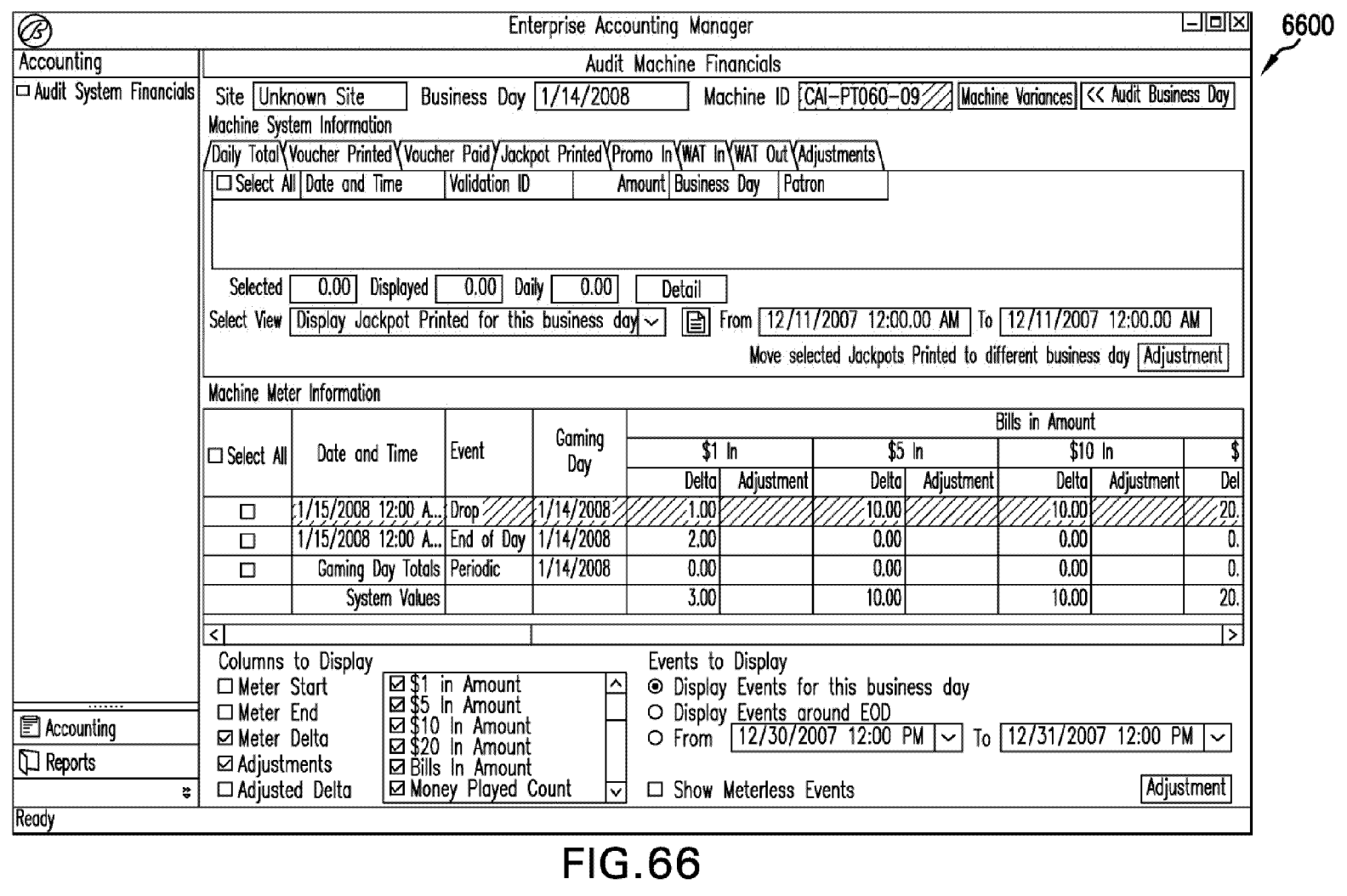

FIG. 66 shows a System Information—Jackpot Printed window or screen 6600, according to one illustrated embodiment.

TABLE 91

Jackpot Printed Grid

| Column Text | Description | Type | Format |
|---|---|---|---|
| *These columns are ALWAYS displayed.* | | | |
| Select All | Select a jackpot printed | Boolean | Check box |
| Date and Time | Date and time the jackpot printed | | |

TABLE 91-continued

Jackpot Printed Grid

| Column Text | Description | Type | Format |
|---|---|---|---|
| Validation ID | Barcode of the voucher | | |
| Amount | Amount of the voucher | | |
| Business Day | Business day on which the jackpot printed | | |
| Patron | The patron that generated the jackpot printed | | |

TABLE 92

Processing Buttons

| Button Name | Description |
|---|---|
| Adjustment | Allows user to make system adjustment for Jackpot Printed. |
| Detail | Allows user to view voucher detail |

TABLE 93

Filters for Jackpot Printed

| Filter Text | Fix It Active? | Description | Requirement |
|---|---|---|---|
| Display Jackpot Printed for this business day | | | |
| Display Jackpot by Printed date and time | | | |

Figure 67:
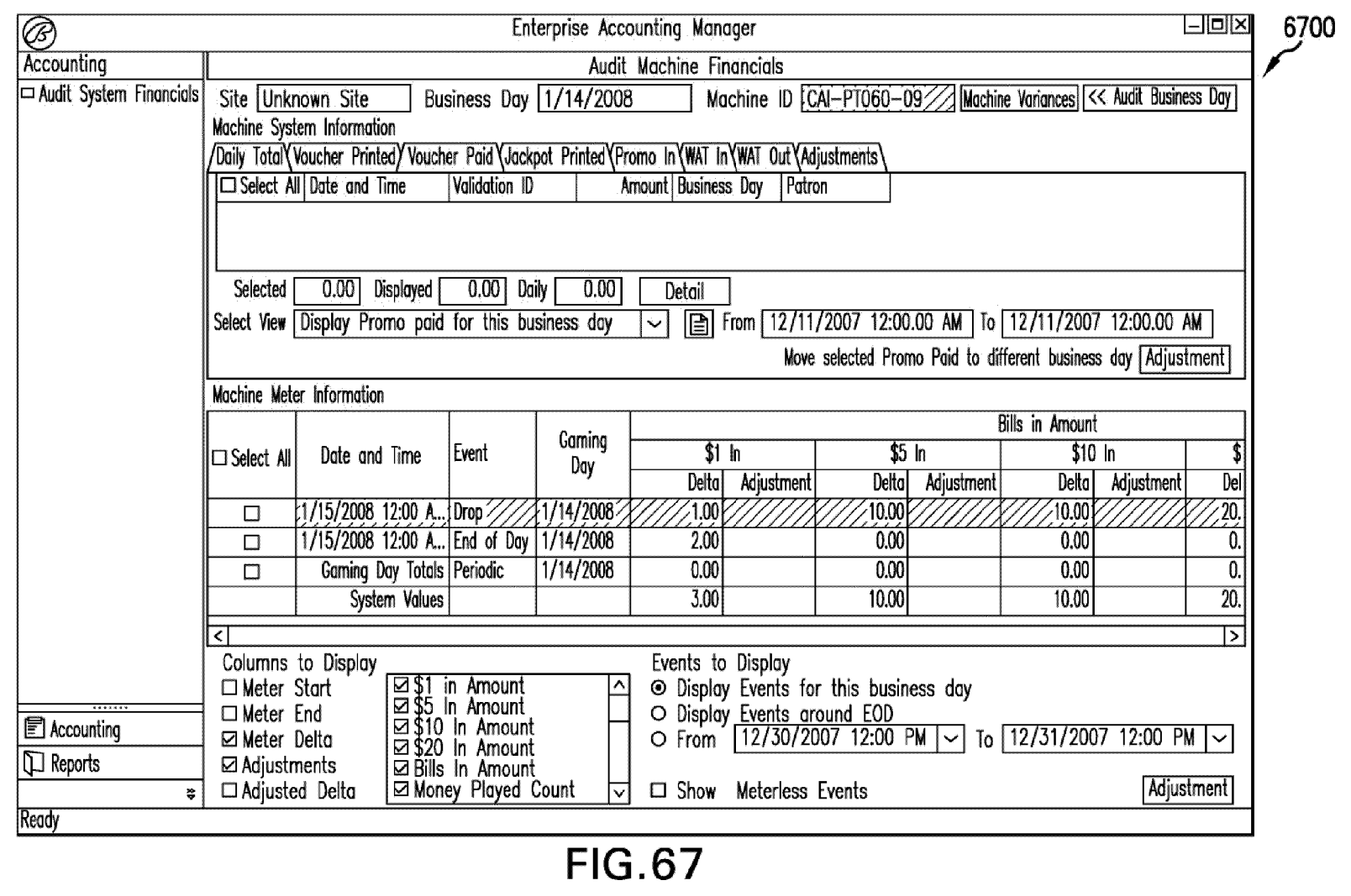

FIG. 67 shows a System Information—Promo In window or screen 6700, according to one illustrated embodiment.

TABLE 94

Promo In Grid

| Column Text | Description | Type | Format |
|---|---|---|---|
| *These columns are ALWAYS displayed.* | | | |
| Select All | Select a promo | Boolean | Check box |
| Date and Time | Date and time of Promo In | | |
| Validation ID | Barcode of the voucher | | |
| Amount | Amount of the voucher | | |
| Business Day | Business day on which the Promo In happen | | |
| Patron | The patron that generated the Promo In | | |

TABLE 95

Processing Buttons

| Button Name | Description |
|---|---|
| Adjustment | Allows user to make adjustment to Promo In |
| Detail | Allows user to view voucher detail |

TABLE 96

Filters for Promo In

| Filter Text | Fix It Active? | Description | Requirement |
|---|---|---|---|
| Display Promo paid for this business day | | | |
| Display Promo by paid date and time | | | |

Figure 68:
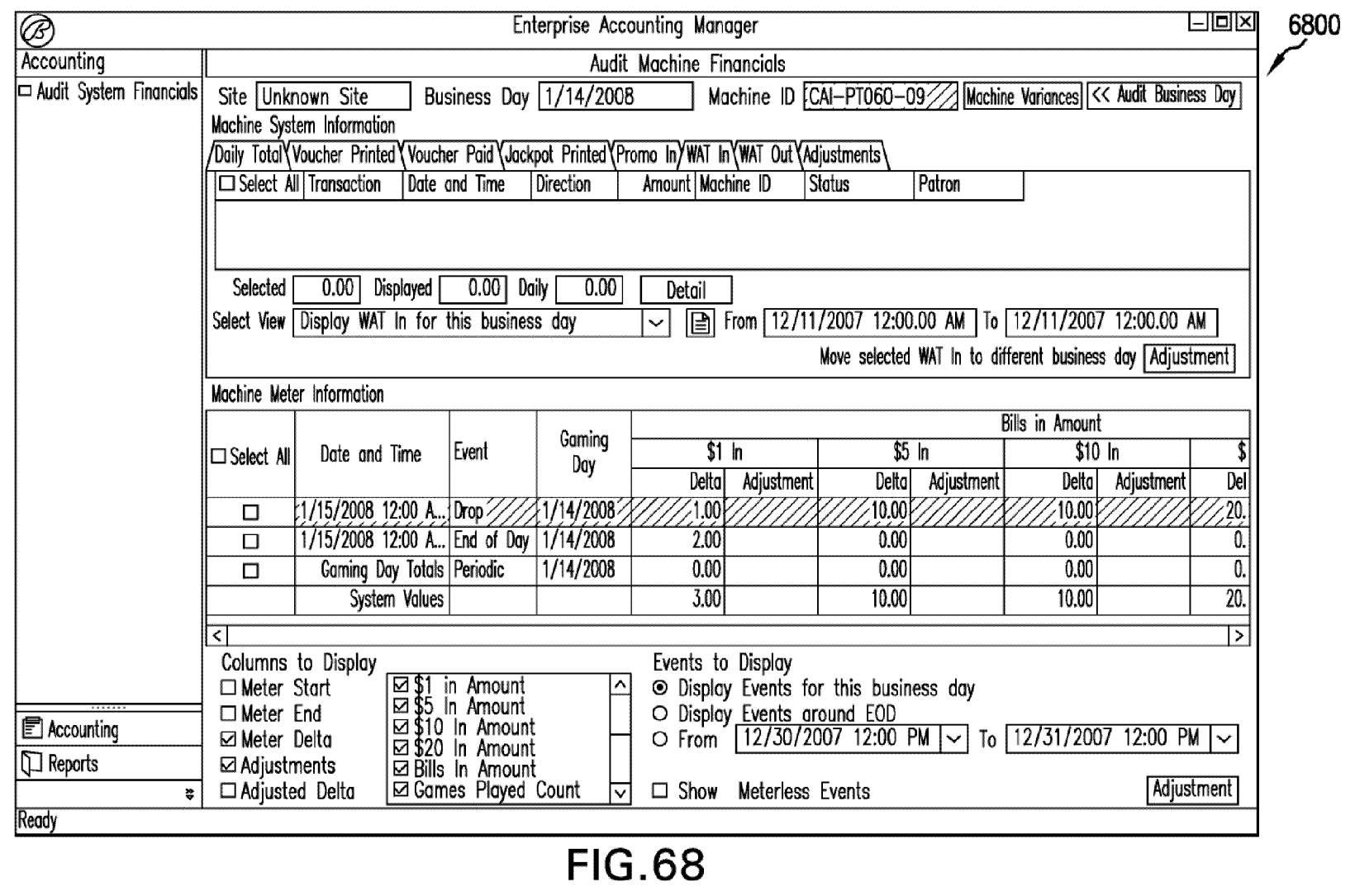

FIG. 68 shows a System Information—WAT In window or screen 6800, according to one illustrated embodiment.

TABLE 97

WAT In Grid

| Column Text | Description | Type | Format |
|---|---|---|---|
| These columns are ALWAYS displayed. | | | |
| Select All | | | |
| Transaction | Select a WAT In Kind of WAT transaction | | |
| Date and Time | Date and time of the WAT In | | |
| Direction | Direction of the WAT In | | |
| Amount | Amount of the WAT In | | |
| Machine ID | | | |
| Status | Status of the WAT In | | |
| Patron | | | |

TABLE 98

Processing Buttons

| Button Name | Description |
|---|---|
| Adjustment | Allows user to make system adjustment to WAT In. |
| Detail | Allows user to view voucher detail |

TABLE 99

Filters for WAT In

| Filter Text | Fix It Active? | Description | Requirement |
|---|---|---|---|
| Display WAT In for this business day | | | |
| Display WAT In by date and time | | | |

Figure 69:
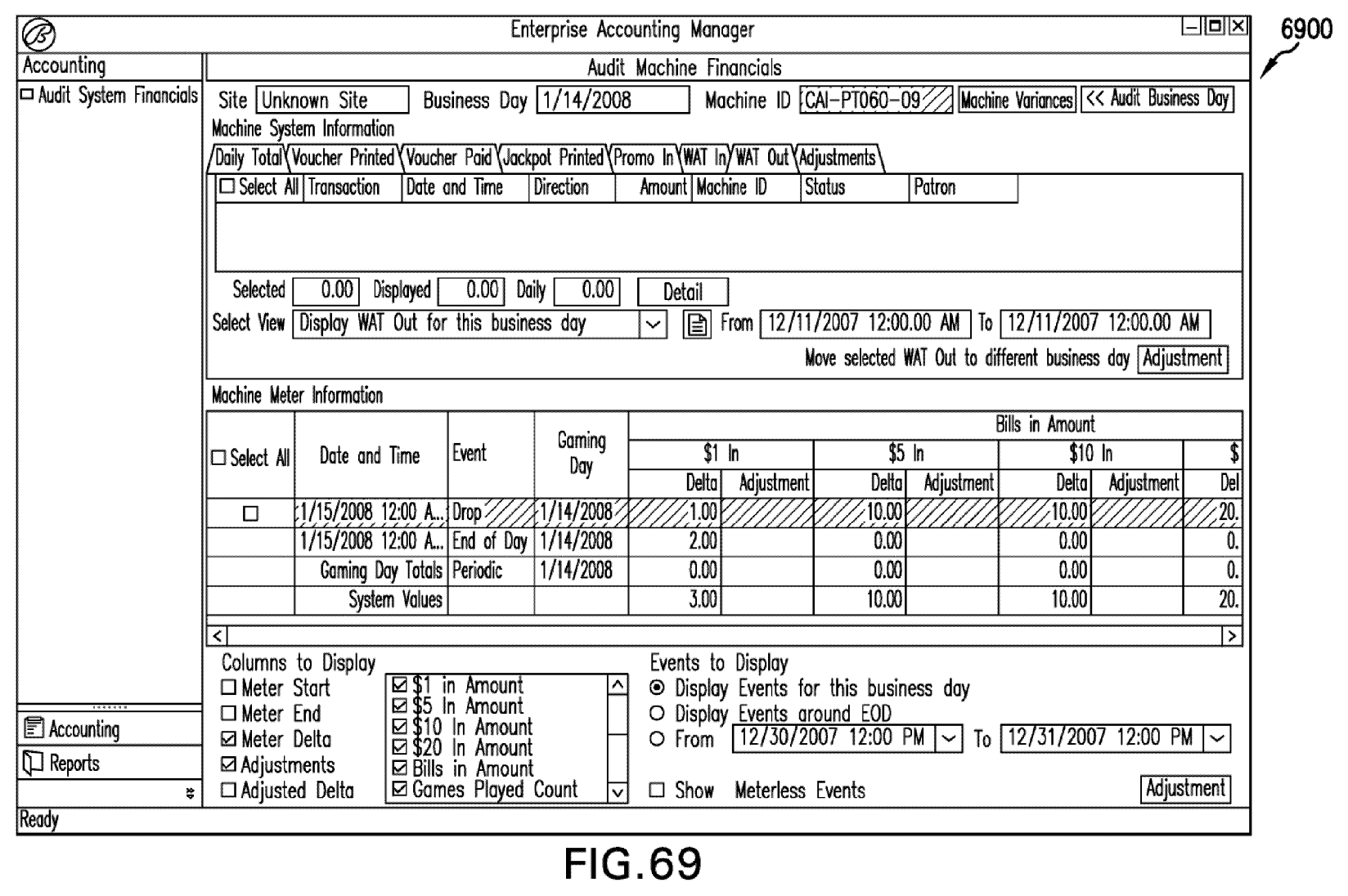

FIG. 69 shows a System Information—WAT Out window or screen 6900, according to one illustrated embodiment.

TABLE 100

WAT Out Grid

| Column Text | Description | Type | Format |
|---|---|---|---|
| These columns are ALWAYS displayed. | | | |
| Select All | | | |
| Transaction | Select a WAT Out Kind of WAT Out transaction | Boolean | Check box |
| Date and Time | Date and time of the WAT Out | | |

TABLE 100-continued

WAT Out Grid

| Column Text | Description | Type | Format |
|---|---|---|---|
| Direction | Direction of the WAT Out | | |
| Amount | Amount of WAT Out | | |
| Machine ID | | | |
| Status | Status of WAT Out | | |
| Patron | | | |

TABLE 101

Processing Buttons

| Button Name | Description |
|---|---|
| Adjustment | Allows user to make system adjustment to WAT Out |
| Detail | Allows user to view voucher detail |

TABLE 102

Filters for WAT Out

| Filter Text | Fix It Active? | Description | Requirement |
|---|---|---|---|
| Display WAT Out for this business day | No | | |
| Display WAT Out by date and time | No | | |

Figure 70:
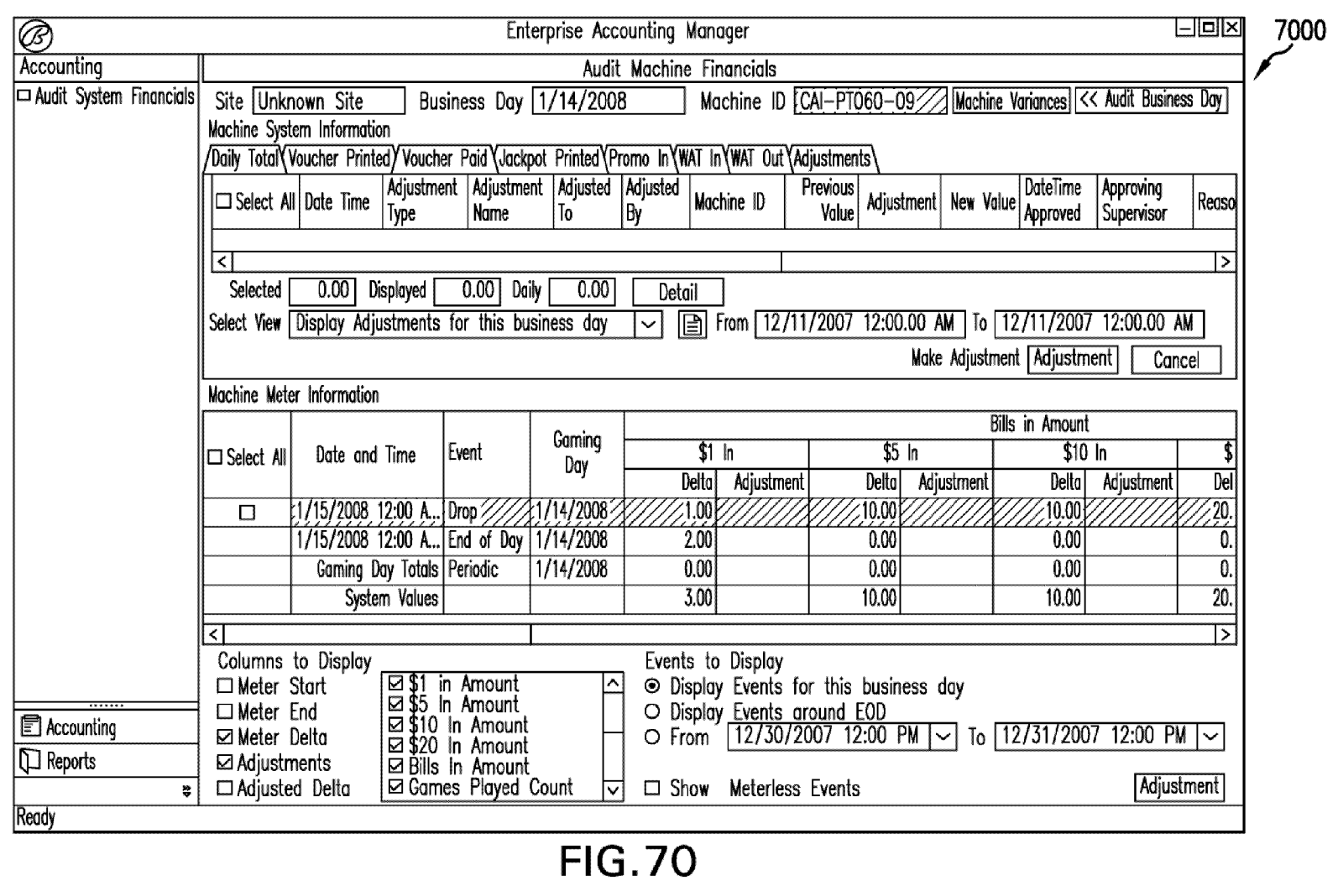

FIG. 70 shows a System Information—Adjustments window or screen 7000, according to one illustrated embodiment.

TABLE 103

Adjustment Grid

| Column Text | Description | Type | Format |
|---|---|---|---|
| These columns are ALWAYS displayed. | | | |
| Select All | | | |
| Date and Time | This is the date and time the adjustment was done | | |
| Adjustment Type | This may be the type of adjustment i.e. System, Manual, Wizard, Financial Adjustment Utility | | |
| Adjustment Name | This may be the name of the adjustment i.e. Meter Reset, Meter Rollover, Invalidate Meter, Game Day Change, etc. | | |
| Adjusted To | This may be where the adjustment was applied to i.e. Machine Meter, Voucher, Jackpot, Promo In, WAT In, WAT Out | | |
| Adjusted By | This is who made the adjustment i.e. System or the name of the user | | |
| Machine ID | This is the name of the machine affected by the adjustment | | |
| Previous Value | This is the value before the adjustment was made | | |

TABLE 103-continued

Adjustment Grid

| Column Text | Description | Type | Format |
| --- | --- | --- | --- |
| Adjustment | This is the value of the adjustment | | |
| New Value | This is the value after the adjustment is applied | | |
| Date and Time Approved | This is the date and time the adjustment was approved | | |
| Approving Supervisor | This is the user name of the approving supervisor | | |
| Reason | This is the reason that was entered when the adjustment was made | | |
| These columns are hidden unless "Display all machine detail adjustments" filter is applied. | | | |
| Event | This is the name of the event that was adjusted | | |
| Meter Type | This is the name of the meter | | |
| Meter Start | This is the starting meter value | | |
| Meter End | This is the ending meter value | | |
| Meter Delta | This is the delta between the starting and ending meter value | | |
| Meter Adjustment | This is the value to the meter after the adjustment was made | | |

TABLE 104

Processing Buttons

| Button Name | Description |
| --- | --- |
| Approve | |
| Cancel | |

TABLE 105

Filters for Adjustment

| Filter Text | Fix It Active? | Description | Requirement |
| --- | --- | --- | --- |
| Display Adjustments for this business day | No | | |
| Display Adjustments by date and time | No | | |

Figure 71:
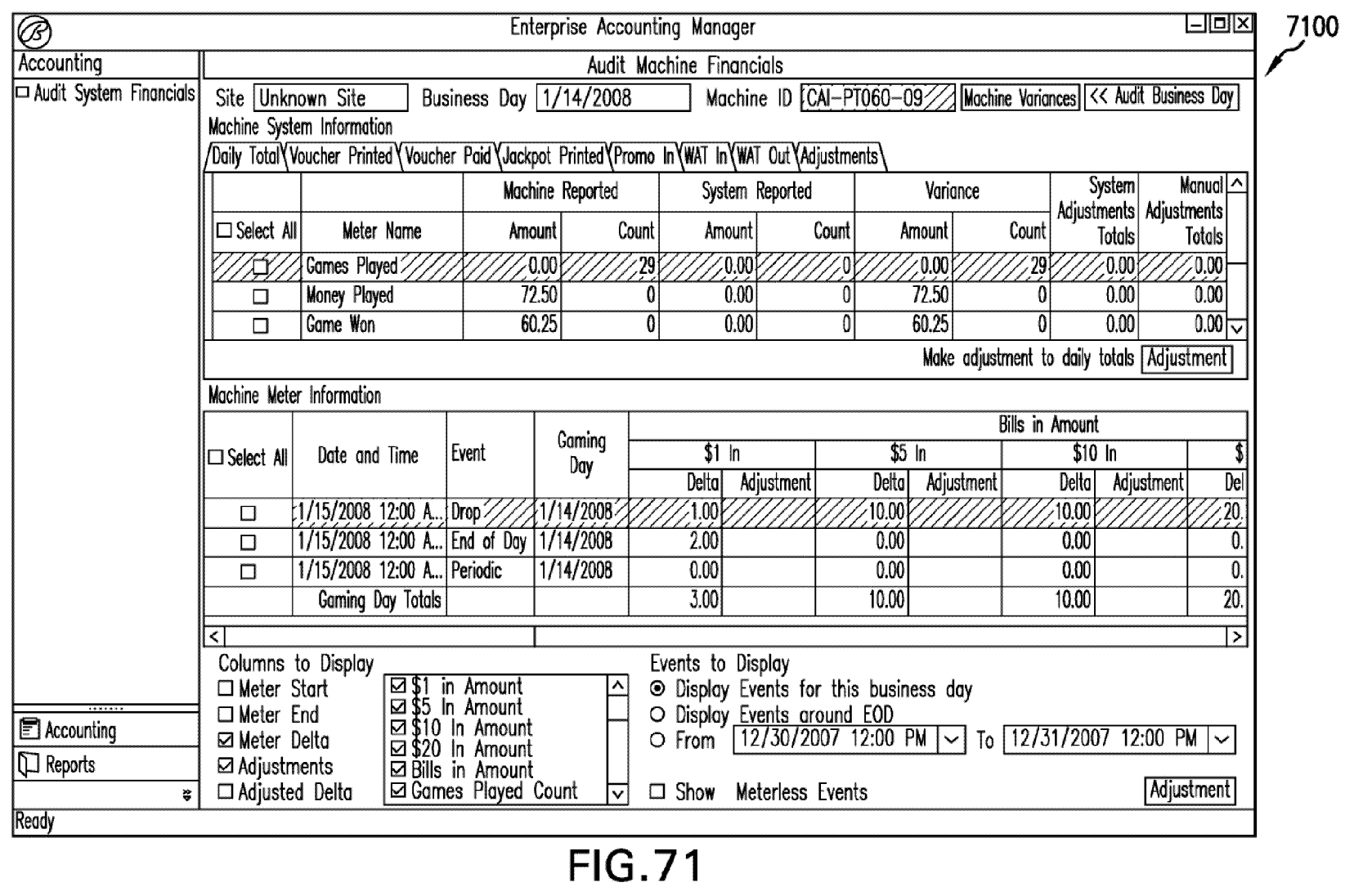

FIG. 71 shows a Machine Detail Financials—Metered Information window or screen 7100, according to one illustrated embodiment. When the Audit Machine button on the Audit System Financials view is pressed, the view changes to Audit Machine Financials. Initially, it displays the events of the gaming day being audited which contain meters. The Show Meterless Events checkbox allows all events to be displayed. The checked list box displays all meters that are part of the displayed events.

FIG. 72 shows an Adjustment—Meter window or screen 7200, according to one illustrated embodiment. When the Adjustment button icon in the Machine Meter Information group box of the Audit Machine Financials is selected, the Meter Adjustment form, below, is displayed. The checked list box displays all meters, with those selected in Audit Machine Financials initially checked.

TABLE 106

Types of Adjustment to Perform - Radio Buttons

| Radio Button Name | Description |
| --- | --- |
| Invalidate these Events | Causes the Make Adjustment button to invalidate the events. This radio button is enabled unless any of the events are from a closed gaming day. |
| Move these Events to different gaming day | Causes the Make Adjustment button to move the events to the selected gaming day. This radio button is enabled unless any of the events are not from the gaming day being audited. |
| Calculate New Deltas | Allows the user to invalidate meters between selected events. This radio button is enabled if there are at least 3 events, and they are consecutive. |
| Make these Events as a drop Events | Causes the Make Adjustment button to turn the events into drop events. |
| Perform Manual Adjustments | Allows the user to add adjustments. This radio button is enabled if adjusting only one event, which is on an open gaming day. |

FIG. 73 shows a Moving Events to Different Gaming Day window or screen 7300, according to one illustrated embodiment. When the radio button is clicked for moving events to a different gaming day, a calendar is displayed, as shown below.

FIG. 74 shows a Perform Manual Events window or screen 7400, according to one illustrated embodiment. When the Perform Manual Adjustments radio button is clicked, the grid is changed, as shown below. For the one event being audited, it shows a row of the raw values, a row of the current values (with adjustments applied), a row of amounts to add to delta values, and the final delta. The user can edit either the Add To Delta value or the Final Delta value, and the other may change accordingly.

FIGS. 75A and 75B show a Calculate New Deltas window or screen 7500, according to one illustrated embodiment. When the Calculate New Deltas radio button is selected (e.g., clicked), the grid is changed, as shown below. For each event being audited, it shows a row of the raw values, a row of the current values (with adjustments applied), and for events that are of open gaming days, a row of amounts to add to delta values, and the final delta. The user can edit either the Add To Delta value or the Final Delta value, and the other may change accordingly.

Next to each Final Delta grid cell is a checkbox. Up to two checkboxes of each column can be checked. Checking a third checkbox unchecks one of the other two. The lower checked event cannot belong to a closed gaming day. When two checkboxes are checked in a column, an adjustment is applied to the lower checked event which reverses the effects of the events between the checked events, non-inclusively. Additionally, manual adjustments can be entered.

FIG. 76 shows an Adjustment—System window or screen 7600, according to one illustrated embodiment. System Adjustment Voucher Paid should provide the following details: 1) Variance before adjustment, a) Machine reported, b) System reported, c) Variance; and 2) Adjustment Results, a) Total Count of Items moved, b) Total Amount of Items moved, c) Old Variance, d) Adjustment, and e) New Variance.

FIG. 77 shows an Adjustment—Daily Total window or screen 7700, according to one illustrated embodiment.

TABLE 107

Daily Total Grid

| Column Text | Description | Type | Format |
|---|---|---|---|
| Meter Name | Name of the meter | | |
| Machine Reported Amount | Amount reported by the machine | | |
| Machine Reported Count | Count reported by the machine | | |
| System Reported Amount | Amount reported by the system | | |
| System Reported Count | Count reported by the system | | |
| Variance Amount | System Reported Amount - Machine Reported Amount | | |
| Variance Count | System Reported Count - Machine Reported Count | | |
| System Adjustment Totals | Total amount adjusted by system | | |
| Manual Adjustment Totals | Total amount adjusted manually | | |

FIG. 78 shows a Machine Detail Financials—Machine Variance window or screen 7800, according to one illustrated embodiment.

TABLE 108

Machine Variance Grid

| Column Text | Description | Type | Format |
|---|---|---|---|
| These columns are ALWAYS displayed. | | | |
| Meter Name | Name of the meter | | |
| Machine Reported Amount | Amount reported by the machine | | |
| Machine Reported Count | Count reported by the machine | | |
| System Reported Amount | Amount reported by the system | | |
| System Reported Count | Count reported by the system | | |
| Variance Amount | System Reported Amount - Machine Reported Amount | | |
| Variance Count | System Reported Count - Machine Reported Count | | |
| System Adjustment Totals | Total amount adjusted by system | | |
| Manual Adjustment Total | Total amount adjusted manually | | |

Product Features—System Options

Configure Enterprise Accounting Options—The user may be able to view and change the following system options from the database:

TABLE 109

| System Option | Requirement |
|---|---|
| Specify primary Machine identifier for lookup and reports (Asset, Device Name, etc) | 5.1.1.1 |
| Meter Display Mode may use Bally Standards | 5.1.1.2 |
| Default Soft Count Variance Dollar Amount | 5.1.1.3 |
| Default Actual vs. Theoretical Hold Variance Percentage | 5.1.1.4 |
| Default Cash to Played Net Variance Dollar Amount | 5.1.1.5 |

Figure 79:
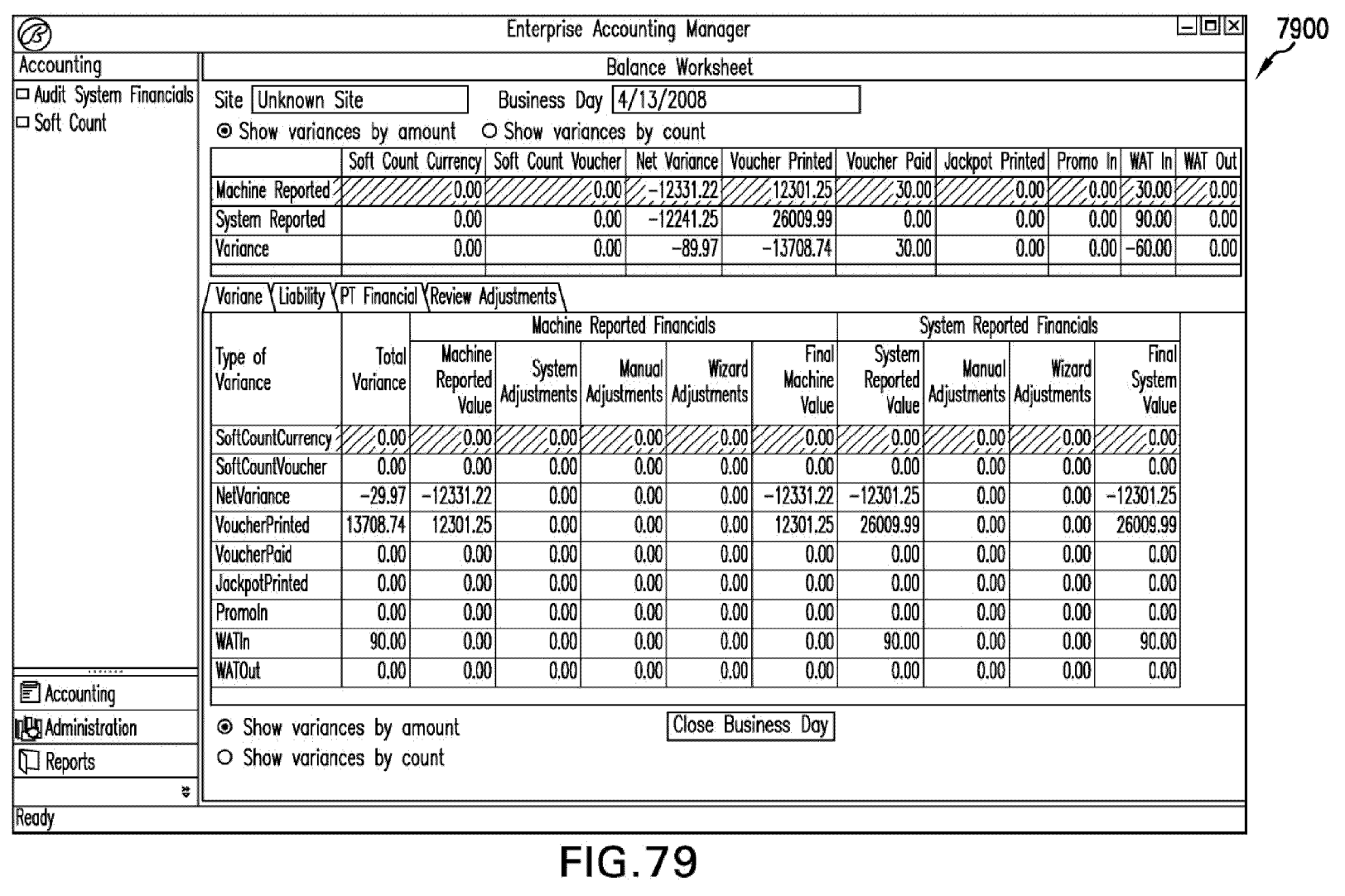

FIG. 79 shows a Final Balance Worksheet—Variance window or screen 7900, according to one illustrated embodiment. The words 'Final Balance Worksheet' may be a task item under 'Audit System Financials' in the main Accounting Snap-In. When the user selects 'Final Balance Worksheet' they may go to this page. If the user is in 'Select Site' screen and they select an open day and press the 'Close Business Day' button, they may also be brought to this page.

Variance Grid—The grid may have a radial button option to display variances either by amount or counts. This grid may have the following column names:

TABLE 110

| Column Text | Description | Type | Format |
|---|---|---|---|
| Type of Variance | The type of variance | | |
| Total Variance | The Final Machine Reported value minus the Final System Reported value | | |
| Machine Reported Financials | | | |
| Machine Reported Value | The original value reported by the machine | | |
| System Adjustments | The total adjustments made by the accounting engine | | |
| Manual Adjustments | The total adjustments made by the accounting users | | |
| Wizard Adjustments | The total adjustments made by the accounting wizards | | |
| Final Machine Value | The final value reported by the machine after all the adjustments have been applied | | |
| System Reported Financials | | | |
| System Reported Value | The original value reported by the system | | |
| Manual Adjustments | The total adjustments made by the accounting users | | |
| Wizard Adjustments | The total adjustments made by the accounting wizards | | |
| Final System Value | The final value reported by the system after all the adjustments have been applied | | |

This grid may have the following row names under the 'Type Of Variance' column:

TABLE 111

| Row Text | Description | Type | Format |
|---|---|---|---|
| Soft Count Currency | Variance of soft count currency | | |
| Soft Count Voucher | Variance of soft count voucher | | |
| NetVariance | Variance of net variance | | |
| Voucher Printed | Variance of voucher printed | | |
| Voucher Paid | Variance of voucher paid | | |
| Jackpot Printed | Variance of jackpot printed | | |
| Promo In | Variance of Promo In | | |
| WAT In | Variance of WAT In | | |
| WAT Out | Variance of WAT Out | | |

This grid may have the following radio buttons:
Show variances by amount
Show variances by count

TABLE 112

| Processing Buttons | |
|---|---|
| Button Name | Description |
| Close Business Day | Allow the user to close business day |

Figure 80:
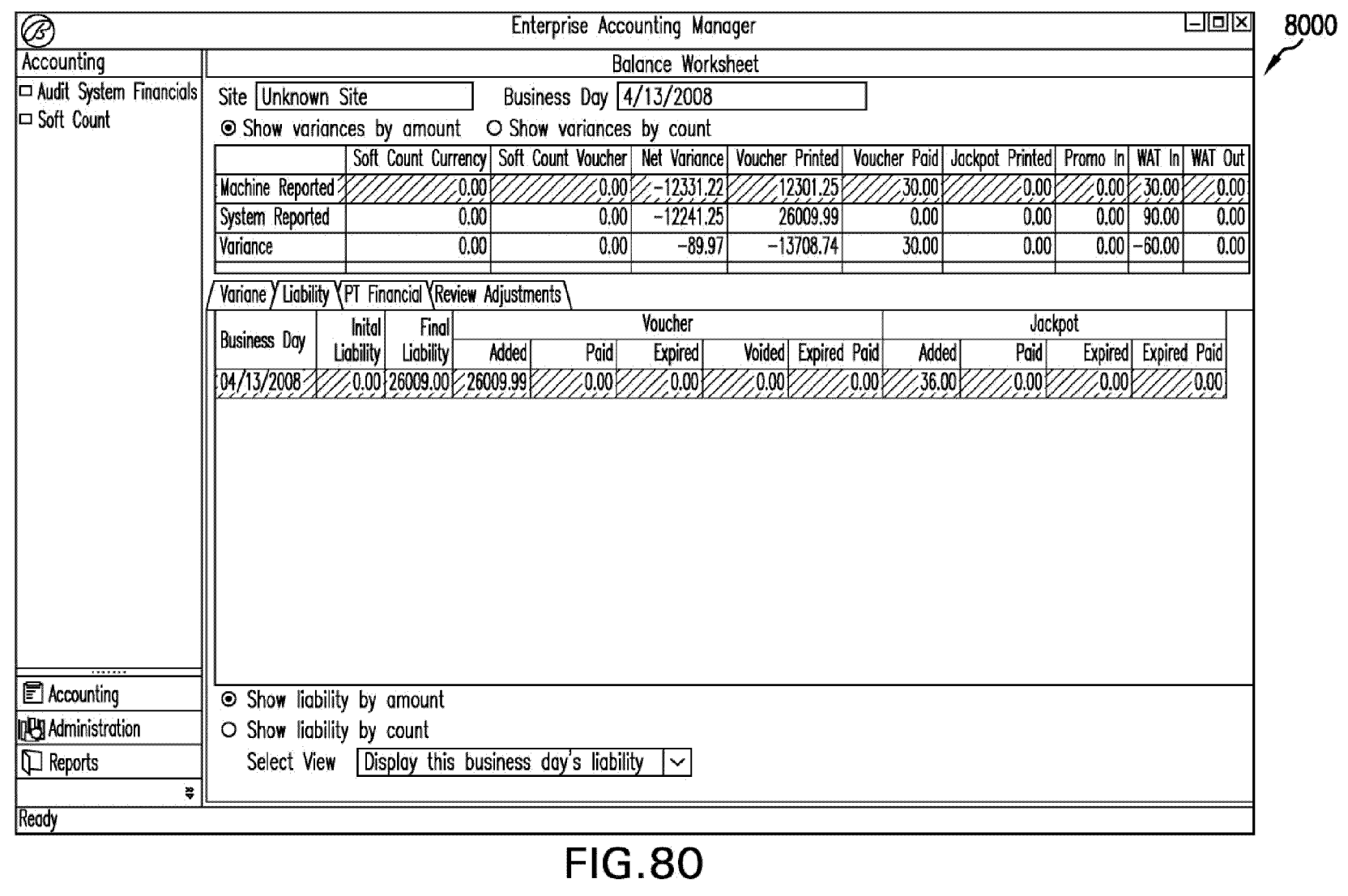

FIG. 80 shows a Final Balance Worksheet—Liability window or screen 8000, according to one illustrated embodiment.

TABLE 113

| Liability Grid | | | |
|---|---|---|---|
| Column Text | Description | Type | Format |
| These columns are ALWAYS displayed. | | | |
| Business Day | The business day for this liability information | | |
| Initial Liability | The starting liability | | |
| Final Liability | The ending liability | | |
| Vouchers Added | Vouchers Added | | |
| Vouchers Paid | Vouchers Paid | | |
| Vouchers Expired | Vouchers Expired | | |
| Vouchers Voided | Vouchers Voided | | |
| Expired Vouchers Paid | Expired Vouchers Paid | | |
| Jackpots Added | Jackpots Added | | |
| Jackpots Paid | Jackpots Paid | | |
| Jackpots Expired | Jackpots Expired | | |
| Expired Jackpots Paid | Expired Jackpots Paid | | |

This grid may have the following user selectable radio button icons: 1) Show liability by amount; and 2) Show liability by count.

TABLE 114

| Filters for Liability | | | |
|---|---|---|---|
| Filter Text | Fix It Active? | Description | Requirement |
| Show this business day's liability | No | Show the liability for this business day only | |
| Show week to date liability | No | Show all liability records since the beginning of the week | |
| Show month to date liability | No | Show all liability records since the beginning of the month | |

Figure 81:
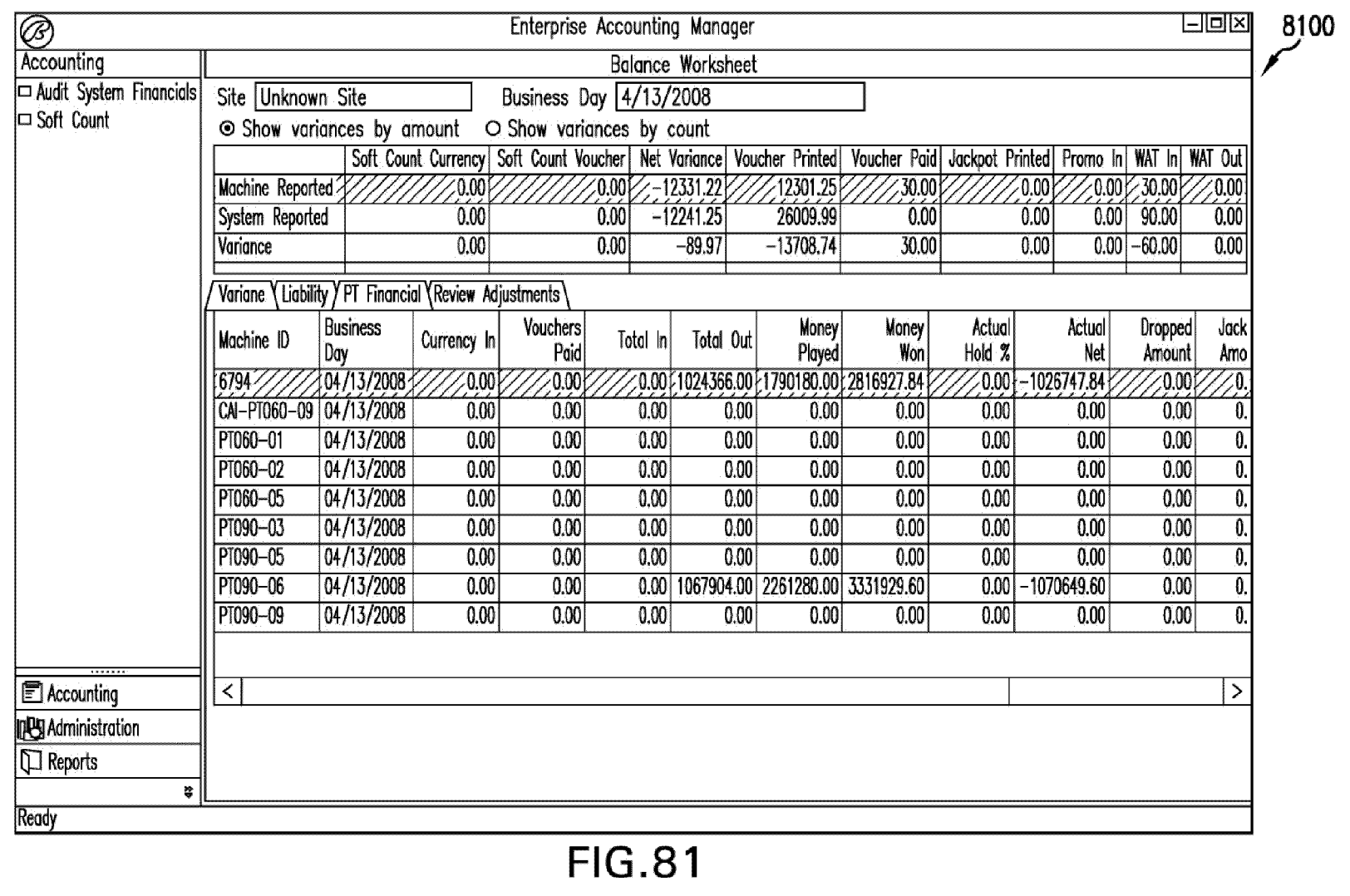

FIG. 81 shows a Final Balance Worksheet—PT Financial window or screen 8100, according to one illustrated embodiment.

TABLE 115

| PT Financial Grid | | | |
|---|---|---|---|
| Column Text | Description | Type | Format |
| These columns are ALWAYS displayed. | | | |
| Machine ID | The configured display name of the machine | Varchar 32 | Ascii |
| Business Day | The business day for the information | Varchar 32 | MMDDYYYY |
| Currency In | The amount of currency received by this machine for this business day | | |
| Vouchers Paid | The amount of paid vouchers | | |
| Total In | The amount of currency and tickets received by this machine for this business day | | |
| Total Out | The amount of vouchers printed by this machine for this business day | | |
| Money Played | The amount of money played by this machine for this business day | | |
| Money Won | The amount of money won by this machine for this business day | | |
| Actual Hold % | The actual hold for this machine for this business day | | |
| Actual Net | The net hold for this machine for this business day | | |
| Dropped Amount | The amount dropped by this machine for this business day | | |
| Jackpot Amount | The amount of jackpot tickets printed by this machine for this business day | | |
| Stacker Amount | The amount of money in the stacker at EOD | | |
| Promo In | The amount of promotional coupons received by this machine for this business day | | |

TABLE 115-continued

PT Financial Grid

| Column Text | Description | Type | Format |
|---|---|---|---|
| WAT In | The amount of WAT In transactions for this machine for this business day | | |
| WAT Out | The amount of WAT Out transactions for this machine for this business day | | |

TABLE 116

Processing Buttons

| Button Name | Description |
|---|---|

Figure 82:
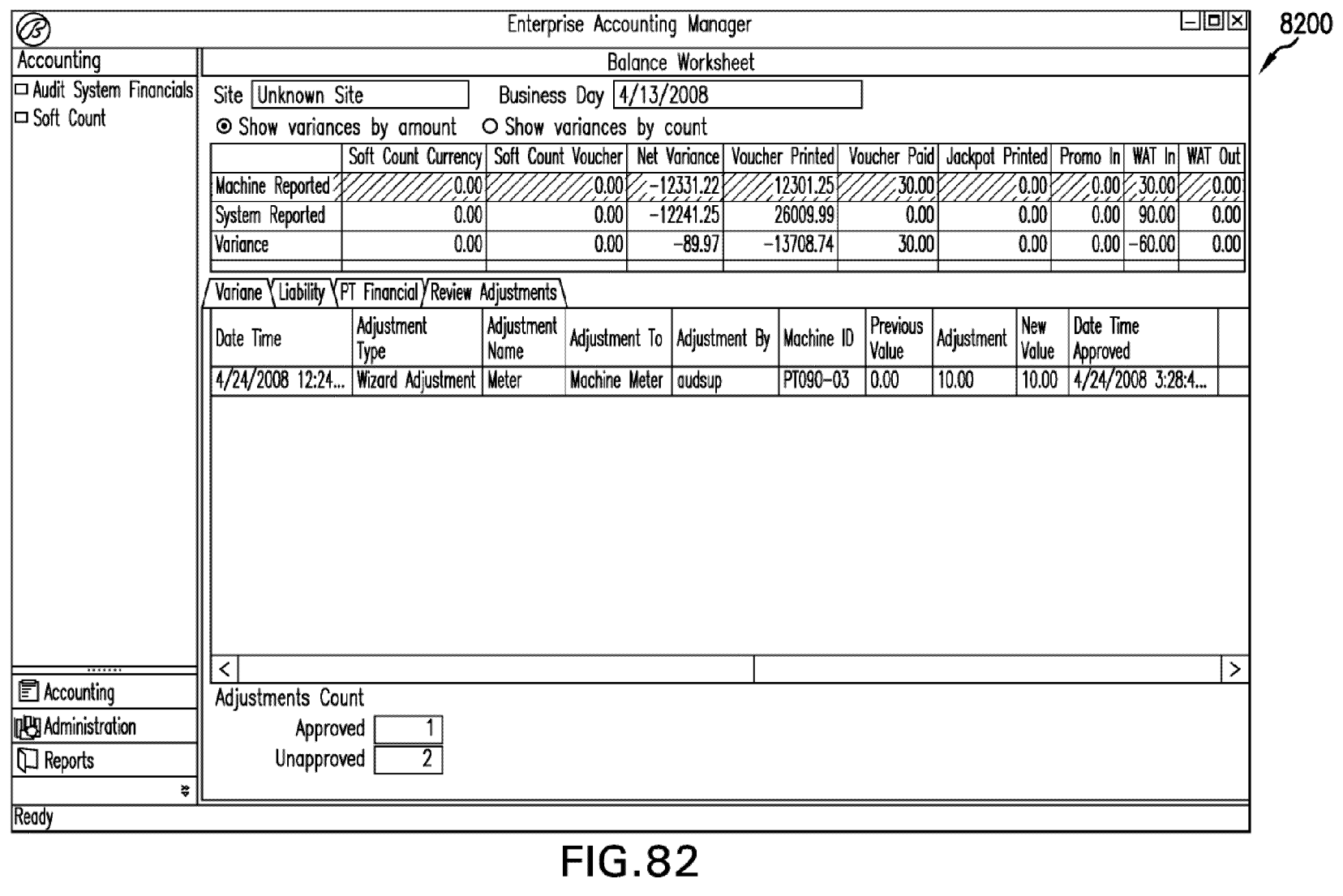

FIG. 82 shows a Final Balance Worksheet—Review Adjustments window or screen 8200, according to one illustrated embodiment.

TABLE 117

Review Adjustments Grid

| Column Text | Description | Type | Format |
|---|---|---|---|
| These columns are ALWAYS displayed. | | | |
| Date Time | This is the date and time the adjustment was done | | |
| Adjustment Type | This may be the type of adjustment i.e. System, Manual, Wizard, Financial Adjustment Utility | | |
| Adjustment Name | This may be the name of the adjustment i.e. Meter Reset, Meter Rollover, Invalidate Meter, Game Day Change, etc. | | |
| Adjusted To | This may be where the adjustment was applied to i.e. Machine Meter, Voucher, Jackpot, Promo In, WAT In, WAT Out | | |
| Adjusted By | This is who made the adjustment i.e. System or the name of the user | | |
| Machine ID | This is the name of the machine affected by the adjustment | | |
| Previous Value | This is the value before the adjustment was made | | |
| Adjustment | This is the value of the adjustment | | |
| New Value | This is the value after the adjustment is applied | | |
| Date Time Approved | This is the date and time the adjustment was approved | | |
| Approving Supervisor | This is the user name of the approving supervisor | | |
| Reason | This is the reason that was entered when the adjustment was made | | |
| Event | This is the name of the event that was adjusted | | |
| Device Type | Type of the device | | |
| Meter Type | This is the name of the meter | | |

TABLE 117-continued

Review Adjustments Grid

| Column Text | Description | Type | Format |
|---|---|---|---|
| Meter Start | This is the starting meter value | | |
| Meter End | This is the ending meter value | | |
| Meter Delta | This is the delta between the starting and ending meter value | | |
| Meter Adjustment | This is the value to the meter after the adjustment was made | | |

TABLE 118

Processing Buttons

| Button Name | Description |
|---|---|

TABLE 119

Filters for Review Adjustments

| Filter Text | Fix It Active? | Description | Requirement |
|---|---|---|---|

Some features that may be implemented with the EAM:

Allowing multiple EA clients to work simultaneously from the same database, and obtain updated information in a real-time manner and using a feature of WCF for secure communication. May also provide for selective notification (not UDP as in DCM disclosure).

Reopening of gaming days. A day auditing change may cause a 'ripple-effect' forward in time. How is this situation determined and handled?

How to deal with liabilities of middle days (days between reopened day to current day).

A daily process in a casino is to audit the financial data from the slot machines. After that audit process, the auditors may close the accounting for that day. When the auditor's close that gaming day, there may be a liability that is outstanding for that casino. This liability reflects that maximum amount of money the casino may have to pay out if necessary.

Normally, the outstanding liability is related to vouchers and would be described as the amount of un-paid vouchers at the end of that business day. But, liability can also consist of progressive jackpots, un-paid promotional coupons, and un-played WAT transactions. Liability may have a beginning value at the beginning of the gaming day, a change in liability, and a final liability at the end of the gaming day. When the auditor closes the gaming day, the beginning liability, the change in liability, and the final liability may become the final values for the liability report for that gaming day.

Most of the time, the auditors may close gaming days in a chronological order. When this happens, the final liability for the previous gaming day becomes the beginning liability for the current day. This makes the liability a "running liability" which means that only the change in liability affects the final liability.

Occasionally, the auditors at a casino may have to close gaming days out of order, or they may have to re-open closed gaming days. When either of these two conditions occur, the running liability can become incorrect. And correcting the liability becomes problematic because there could be gaming days that have already been closed and now the beginning and ending liability values are not what they should be.

There are three solutions to this condition and should be configurable because they depend on the internal controls and regulations of the casino. It is very important to be able to let the casino determine which option they want configured since it affects how they report the financial information to the regulatory bodies.

Solution 1: Do not allow closing of gaming days out of order. This solution prevents the running liability from becoming incorrect. It also requires that when a gaming day is re-opened, that all the gaming days in-between the current gaming day and the day being re-opened are also re-opened. That guarantees that gaming days may be closed or re-closed in a chronological order.

Solution 2: Do not change the liability for closed gaming days. If a gaming day is closed or re-closed and there are closed gaming days between the current day and the day being closed or re-closed, then do not update the liability for the closed game days.

Solution 3: Change the liability for closed gaming days. If a gaming day is closed or re-closed and there are closed gaming days between the current day and the day being closed or re-closed, then update the liability for the closed game days.

To summarize, one accounting application may support all known gaming jurisdiction requirements. This can be achieved through configuration and/or customer menus. This system takes into account all known types of liabilities. This list includes but is not limited to: Vouchers, jackpots, promotional vouchers, promotional coupons, progressive awards, WAT in transactions, and WAT out transactions. Gaming Days can be closed in any order and can be re-opened in any order. Also, another novel aspect of this is "the ripple effect" caused by adjusting a re-opened gaming day is now handled. Original archived EA data is never changed. Changes or 'adjustments' go into EA database as separate 'adjustment' records.

Fraud Detection
  barcode counted more than once
  Wizard in client
  Fixing of known issues; which fixes are itemized.

A problem that occurs in a casino is that vouchers may be paid twice. This usually occurs when a customer photo copies a voucher and then inserts both, the original voucher and the copied voucher into two machines at the same time. The vouchering system is supposed to prevent the same voucher from being paid twice, but due to errors in the vouchers software, this problem can happen. Sometimes this problem can go on for months until it is detected which can cause a large amount of lost revenue to the casino. Early detection of this condition is vital to the casino. This can be accomplished by having a centralized location where all data from the count rooms can be sent. Once the data is contained in a central location, then a query can be executed which may look for vouchers that have been paid more than once. A better implementation of this would be to perform this query daily during the audit process of the casino. Since the casino performs daily audits already on the financial data for the slot machines, this query can be integrated directly into their audit process.

Physical device(s) mapped to particular Logical device and the state of physical device is tracked.

Tracking the history of a device uses two ways to key info: a) physical location; and b) internal characteristics of the device.

A Slot Move is a term used in the gaming community to describe the operation of slot machines on a casino floor where the physical location of the machine is tracked with its financial data. Normally, this is a physical move where the slot machine is at one place in the casino and then moved to another location in the casino. The financial data of the slot machine is recorded at the time it was at its old physical location, and recorded at the new physical location. In Enterprise Accounting, the definition of a slot move has been enhanced to include additional functionality. A slot move can be a physical move where the slot machine is moved to a different location on the casino floor, and it can also be an internal move where certain characteristics of the slot machine changes. Examples of these characteristics are pay table changes, denomination changes, upgrades to the printer or bill acceptor firmware, etc. Basically, any change to the devices and/or software inside the slot machine cabinet can be treated as an internal slot move. The financial data of a slot machine can now be also tracked by changes done internally to the slot machine.

Description
  Types of Slot Moves:
  Physical Move

EXAMPLES

Address change. This could be its IP address if its using tcp/ip communication, or its line/drop address if its using asynchronous communication.

Asset Number change. This is the number that the accounting department uses to track the financial information. Its normally used as an inventory number.

Controller change. This is the game controller which is communicating to the slot machine. The slot machine can change to a different communication port on the game controller or can be changed to use a different game controller. The normally happens when a slot machine is moved to a different physical location on the casino floor, but in a tcp/ip network, it can change without being physically moved.

Casino Assigned Identifier change. The casino is allowed to maintain a user definable field for tracking the slot machine. This is similar to an asset number, but is used by slot floor manager instead of the accounting department.

Internal Move

Game Combo change. This is when any change is done to the slot machine that affects the pay table percentage, game theme, or denomination.

Wager change. This is when any change is done to the slot machine that affects the number of lines bet or the max bet per line.

Firmware change. This is when any change is done to the slot machine that affects the version of the software that is used by the printer or the bill acceptor.

Software change. This is when any change is done to the slot machine that affects the version of the software that is used by the slot machine for the operating system or game.

Cabinet Model change. This is when any change is done to the slot machine that affects the model of the cabinet. This could be if the slot machine changed from a round top to a chop top, or if they converted it to a bar top.

Progressive change. This is when any change is done to the slot machine that affects the progressive that the slot machine is participating in.

Implementation Logic

All slot machines are maintained in a slot table in the database based on the manufacturer and serial number. Two additional tables are used to track slot moves. One table is the slot configuration table which tracks the physical moves of the slot machine. The second table is the slot device table which tracks the internal moves of the slot machine. Both tables have a link back to the original slot table for each slot machine.

As changes occur, a new record may be inserted into either the slot configuration table or the slot device table and the previous record is updated to mark it as not active any more.

This accomplishes two purposes. One purpose is to maintain an historic account of all physical and internal moves for a slot machine, and the other purpose is to keep an active record of both the physical and internal characteristics of each slot machine.

Invalid Meter Detection and Notification/RROOR

Invalid meter detection is a process intended to automatically detect when a reported meter (count data from the game) is invalid and the logic to use to modify the recorded data to eliminate the invalid meter data.

The key to the detection and correction is how the data is determined to be invalid in the first place. This method, described below, is through a set of parameters: Does the value only grow in a positive direction, Velocity (or amount of change) that is acceptable, is the value dependant on time, or time of day/week/month/year, and is there a valid minimum, or maximum.

Below you may see the three types of meters we expect to encounter. Predictable increasing, unpredictable increasing and unpredictable variable meters. Within each of these classifications the set of parameters used to determine if the meter data is valid, or not, differs due to the nature of the meter classification.

Meter Delta Limits.doc

```
Logic
Types of Meters:
1.   Predictable increasing Meters
         Example: Games Played, money played, etc.
         Grows in positive direction only.
         Velocity is calculable
         Dependent on Time / Denominations / ???
         Detect Rollover:
         Detect Reset:
         Detect OOR:
         Detect Invalid:
2.   Unpredictable Increasing Meters
         Example: Jackpots paid amount
         Grows in positive direction only.
         Velocity is NOT calculable
         Dependent on Time / Denominations / ???
         Min Value:
         Max Value:
         Rollovers:                                  ?
         Resets:                                     ?
3.   Unpredictable Variable Meters
         Example:                                    ?
         Grows in Positive or Negative direction
         Velocity is NOT calculable
         Dependent on Time / Denominations / ???
         Min Value:                                  ?
         Max Value:                                  ?
         Rollovers:                                  ?
         Resets:                                     ?
Code
Add to bally_audit.meter_type
     Allow_Negative_Delta                       BIT
     Max_Velocity_Per_Hour                      BIGINT
     Velocity_Is_Denomination_Dependent         BIT
     Absolute_Minimum                           BIGINT
     Absolute_Maximum                           BIGINT
     RolloverCeiling (in the bally_migration.Meter)
select * from adjustment
select * from Adjustment_Reason
select * from Adjustment_Source
Adjustment_ID = useless id
Adjustment_Type_ID = from Adjustment_Type -
     Delta Limit Exceeded, Meter Reset, or Meter Rollover
Adjustment_Source_ID = from Adjustment_Source where
Short_Name =
'System'
Counted_ID = NULL
Game_Day_ID = GameDay
Floor_Event_ID = NULL
Fund_Transfer_ID = NULL
Event_Drop_ID = NULL
Meter_ID = ID of the meter being adjusted
System_Liability_ID = NULL
Adjustment_Reason_ID = from Adjustment_Reason
     where Reason_text =     System adjustment for meter out-of-range
                             System adjustment for meter reset
                             System adjustment for meter rollover
Previous = <Prev Meter End>
Delta = Adjustment amount
     For Rollovers: <New Meter End> – <Prev Meter End> + <Rollover Ceiling>
     For Resets: <Prev Meter End> * 1
     For OOR: <Meter Delta> * –1
Prev_Game_Day_ID = GameDay of the previous meter record
Non_Period = NULL
Employee = 'System User'
Authorized = NULL
Effective_TS = GETDATE( )
Authorized_TS = NULL
Created_TS = GETDATE( )
Created_User = 'ETL Events_Meters'
Updated_TS = NULL
Updated_User = NULL
Deleted_TS = NULL
Deleted_User = NULL
```

Generating 'Smooth' Meters from 'Jagged' Meters.

Disk storage reduced drastically

DB query performance increased

During the life cycle of an EGM meters are sent up on a regular basis. The relation of number of changed meters is conversely related to the time span between meters. Most of the meter set is unchanged between snapshots, and this number of unchanged meters increases as the time span gets smaller. There is no reason to store the unchanged meters since it can be calculated based on the last known value for this meter. In practice we saw that a casino floor with hourly periodic meters that roughly 10-20% of those meters actually changed. If we normalize the database and only store the meters that change, we can eliminate 95% of the database size. This also gives us the opportunity to properly index the database since the table size is now reduced. This allows us to have both an OLTP database for meters, but be able to run reports against this same dataset.

Example

GTM, Time, MeterID
Meter, Value
A, 8 am, 1
GamesPlayed, 0
MoneyInserted, 0
CabinetDoorOpened, 0
LogicDoorOpened, 0
StackerRemoved, 0
A, 9 am, 2
GamesPlayed, 100
MoneyInserted, 1000
CabinetDoorOpened, 0
LogicDoorOpened, 0
StackerRemoved, 0

A, 10 am, 3
  GamesPlayed, 200
  MoneyInserted, 1000
  CabinetDoorOpened, 0
  LogicDoorOpened, 0
  StackerRemoved, 0

In this case, we normally would have stored 3 meter messages each with 5 meters values, resulting in 15 data rows, each with 5 columns, meaning 75 data entries. Normalized and jagged stores only 3 rows for the messages and 8 for the meter values, for a total of 11 data rows, but only 31 (9 in messages+22 to store the values) data entries. As we continue this pattern, only GamesPlayed continually updates during this duration. If we carry this pattern out for 100 meters, we would have:

Denormalized and Smooth:
  500 rows with 5 columns, 2500 data entries
  BCNF and jagged:
  100 message rows w/3 columns, 300 data entries
  104 meter values w/2 columns, 208 data entries
  Total of 508 data entries Improving Sys-to-sys Performance Using Cached DB Records.

Just Previous Meters Set for Each EGM

In some cases the system needs the previous meter values to calculate deltas or to fill in missing information. Instead of relying on the system of record to provide the information, the previous value can be cached to be readily available.

For example, a factory/extension model can be used to accomplish this caching. One manager loads extensions that may record meters. The manager of the extensions is the only entry point for meters. When the meter is received, the cache is updated. Each extension may process the meter independently of each other. If they require the previous meter, the extensions do not have to know where the system of record is, or wait to make sure it is available and current, the extensions simply utilize the manager's cached meters. In each extension, there is a preprocess call that may store the cached information into their own internal queue with the message being processed if needed. That way each extension can continue processing if there is a delay in the end point processing of another extension without fearing the cache information may be incorrect.

Additional Date/time Stamp on all G2S Msgs from G2S Hosts on BFS.

The meter message now is appended with a Host received time. This eliminates quite a few points of failure for date time stamp on meter messages. Currently iView's or the GTM may send up their time with a meter in the G2S meterDateTime field. The issue is that not all GTM's can synch to a server time or that during certain conditions (battery dead) the clock may be inaccurate after reboot. The host appends a time when it receives the message, thereby only requiring 8 to 10 servers to be synched properly rather than 2500+ GTMs. This gives us a consistent date to do calculations from that is very close to when the GTM sent the meter.

Meter System

The Meter System provides a generic way for recording meter (of BallyTech.Meter.meter type) into data repositories. Currently the meter system is capable of receiving meters for a G2S Host server via the Relay service. Upon receipt of a new meter the meter processor (windows service) may then record the meter in the Bally_Meter, IGDB and MGM database. It is possible to configure the service to omit recording of the meter in either the IGDB or the MGM database.

Problem Statement

The Meter processor was written such that the business logic and database access in intertwined. Furthermore the processor was written in such a way that the different meter processors have dependencies on one another and race conditions related to the writing of the meter data to the database occur.

If designed correctly the Meter processor should be able to dynamically load the meter proc assemblies and have no interdependencies between the databases. The business logic should only reside in the individual meter proc objects and the database writer objects should only write records to the database.

Extension of Processors

This model may be extended by inheriting from the appropriate class in BallyTech.Meter.Processor. Most cases may use:

MeterProcessorMSMQ2DB<T>, which may persist messages on MSMQ and finally end up in a SQL DB.
The following methods may be implemented:
GetDBConnectionString—Simply returns the connection string to the database.
ProcessMeter—May handle any business logic that the processor does, may use the cache from the manager in this method since the cache is updated once this is called.
WriteMeterToDB—Writes the <T> message from the internal queue to the database.

Example

```
#region Libraries
using System;
using System.Collections.Generic;
using System.Data.SqlClient;
using System.Data.SqlTypes;
using System.Messaging;
using System.Text;
using BallyTech.EnterpriseLogging;
using BallyTech.Meter.Messages;
using BallyTech.Meter.Processor;
using BallyTech.Reflection;
using BallyTech.StoredProcProvider.MGMMeter;
#endregion
namespace BallyTech.Meter.MGMMeterProcessor
  [Extension(
   Key = METERPROCESSOREXTENSIONBASE_KEY,
   ClassName = MGMMeterProcessorExtension_CLASSNAME,
   Description = MGMMeterProcessorExtension_DESCRIPTION,
   StartCondition = ExtensionStartCondition.OnStartup)]
   public class MGMMeterProcessorExtension :
```

```
MeterProcessorMSMQ2DB<MGMMeter>
    {
        public const string MGMMeterProcessorExtension_CLASSNAME =
"BallyTech.MGMMeterProcessor";
        public const string MGMMeterProcessorExtension_DESCRIPTION =
"BallyTech.MGMMeterProcessor to provide meter processing to the MGM
database";
        public MGMMeterProcessorExtension(IMeterProcessorManager mgr) :
base(METERPROCESSOREXTENSIONBASE_KEY,
MGMMeterProcessorExtension_CLASSNAME,
MGMMeterProcessorExtension_DESCRIPTION, mgr) { }
        /// <summary>
        /// Processes the inbound meter to store in the internal queue
        /// </summary>
        /// <param name="ballyMeter"></param>
        /// <returns></returns>
        protected override Message[ ] ProcessMeter(meter inboundMeter)
        {
            List<Message> messagesToProcess = new List<Message>( );
            if (inboundMeter.collectionReason == "OnBaseline" &&
Helpers.RamClearDetected(inboundMeter) == RamClearType.Full)
            {
                messagesToProcess.Add(new Message(new
MGMMeter(inboundMeter,
_mgr.Cache.GetCurrentMeters(inboundMeter))));
            }
            if (inboundMeter.activityCode != null && inboundMeter.activityCode
== "BAL_ProcessDeltas")
            {
                messagesToProcess.Add(new Message(new
MGMMeter(inboundMeter)));
            }
            return messagesToProcess.ToArray( );
        }
        /// <summary>
        /// Writes to the MGM meter DB
        /// </summary>
        /// <param name="mgmMeter"></param>
        /// <param name="sql"></param>
        /// <param name="xact"></param>
        protected override void WriteMeterToDB(MGMMeter mgmMeter,
SqlConnection sql, SqlTransaction xact)
        {
            AddDeltaGameplayMeter addDeltaMeter = new
AddDeltaGameplayMeter(GetDBConnectionString( ));
            addDeltaMeter.AvgPaybackPct =
(SqlDecimal)mgmMeter.AvgPaybackPct;
            addDeltaMeter.GsaEgmId = (SqlString)mgmMeter.GSAEgmID;
            addDeltaMeter.ManufacturerCode =
(SqlString)mgmMeter.ManufacturerCode;
            addDeltaMeter.MeterDateTm =
(SqlDateTime)mgmMeter.MeterDateTime;
            addDeltaMeter.MeterGuid = new SqlGuid(mgmMeter.MeterGUID);
            addDeltaMeter.MeterType = (SqlString)mgmMeter.MeterType;
            addDeltaMeter.RawGamesPlayed =
(SqlInt32)mgmMeter.RawGamesPlayed;
            addDeltaMeter.RawMoneyPlayed =
(SqlInt32)mgmMeter.RawMoneyPlayed;
            addDeltaMeter.RawMoneyWon =
(SqlInt32)mgmMeter.RawMoneyWon;
            addDeltaMeter.Execute( );
        }
        protected override string GetDBConnectionString( )
        {
            return
MGMMeterDbUtility.LocateMGMMeterDbConnectionString("MGMMeterProcessor
");
        }
    }
}
```

Diagram: Logic Overview

Figure 83:
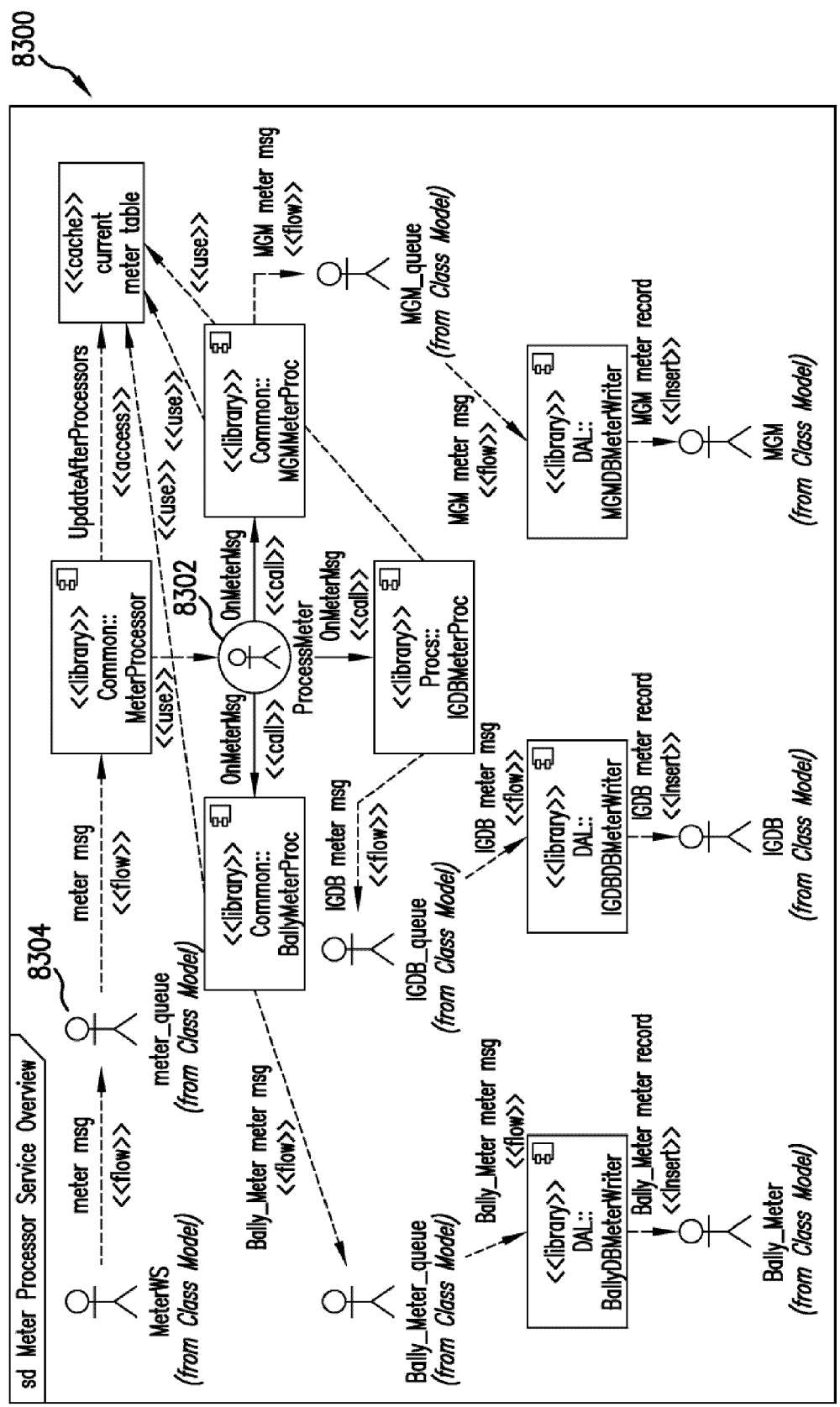
FIG. 83 is a schematic diagram showing a Meter Processor Service overview, according to one illustrated embodiment.

FIG. 83 shows a Meter Processor Service overview 8300, according to one illustrated embodiment.

The Meter processor service is logically divided into two tasks, 1) managing the specific meter processes and global data cache, 2) the meter processors. Notice the information flow of the meter message in the diagram. The ProcessMeter object 8302 may control the distribution of the meter message to each specific meter process and then release control back to the MeterProcessor object 8302. The MeterProcessor may only update the current meter table cache after each of the specific meter process has been invoked using the registered OnMeterMsg delegate.

Each specific meter process may write a process meter message into an internal queue that is monitored by the specific process. All business logic is encapsulated in the specific meter process ProcessMeter object 8302.

Using reflection, the specific meter process assemblies can be discovered and loaded at runtime. The assembly may contain the meter process. Once 'Started' the specific meter database process may spawn a thread to monitor the specific MSMQ and register to be called when a new meter message arrives in the meter service through the meter_queue 8304.

Figure 84:
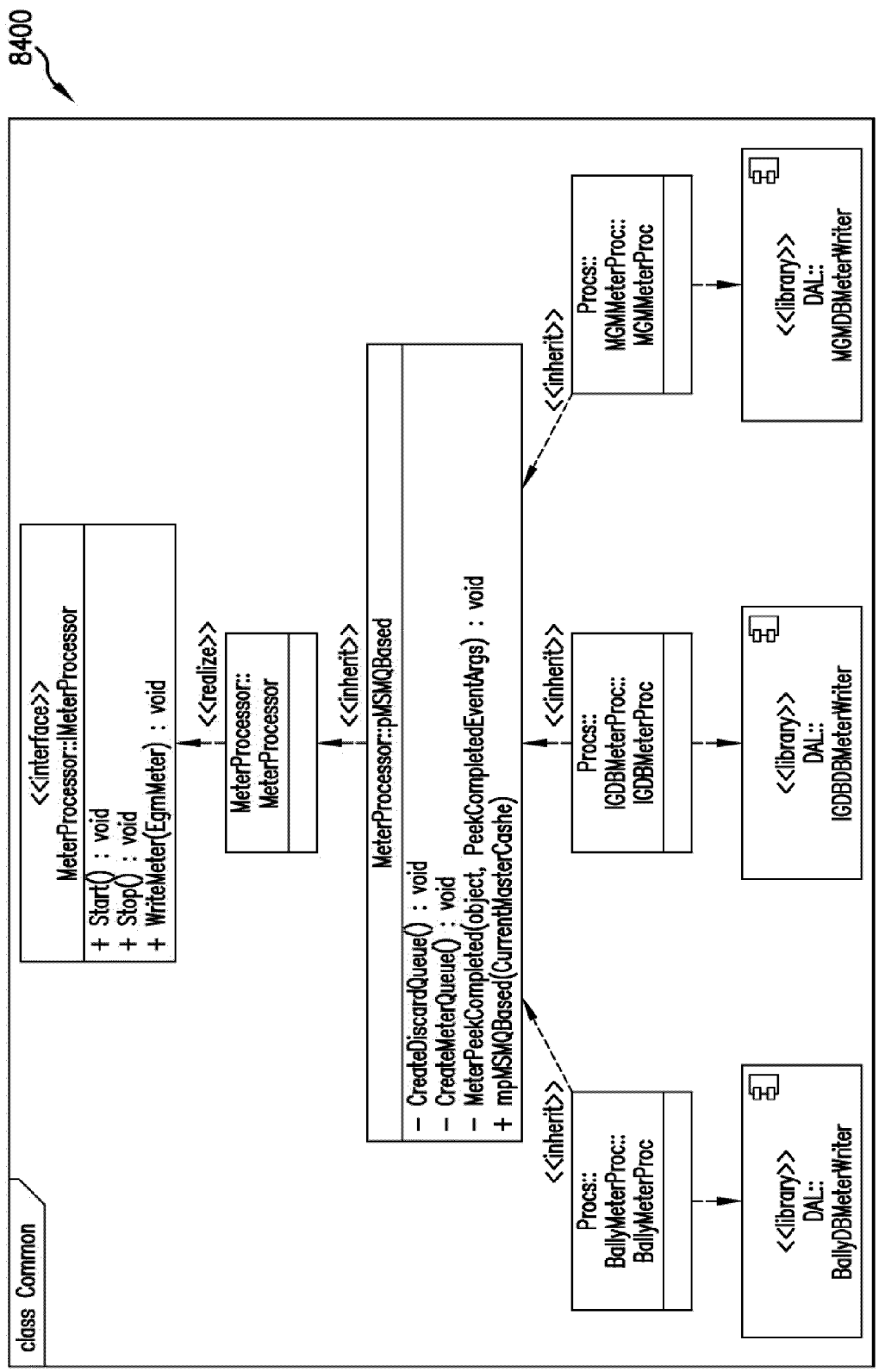
FIG. 84 is a class diagram showing a Meter Process class structure, according to one illustrated embodiment.

FIG. 84 shows a Meter Process class structure 8400, according to one illustrated embodiment.

Figure 85:
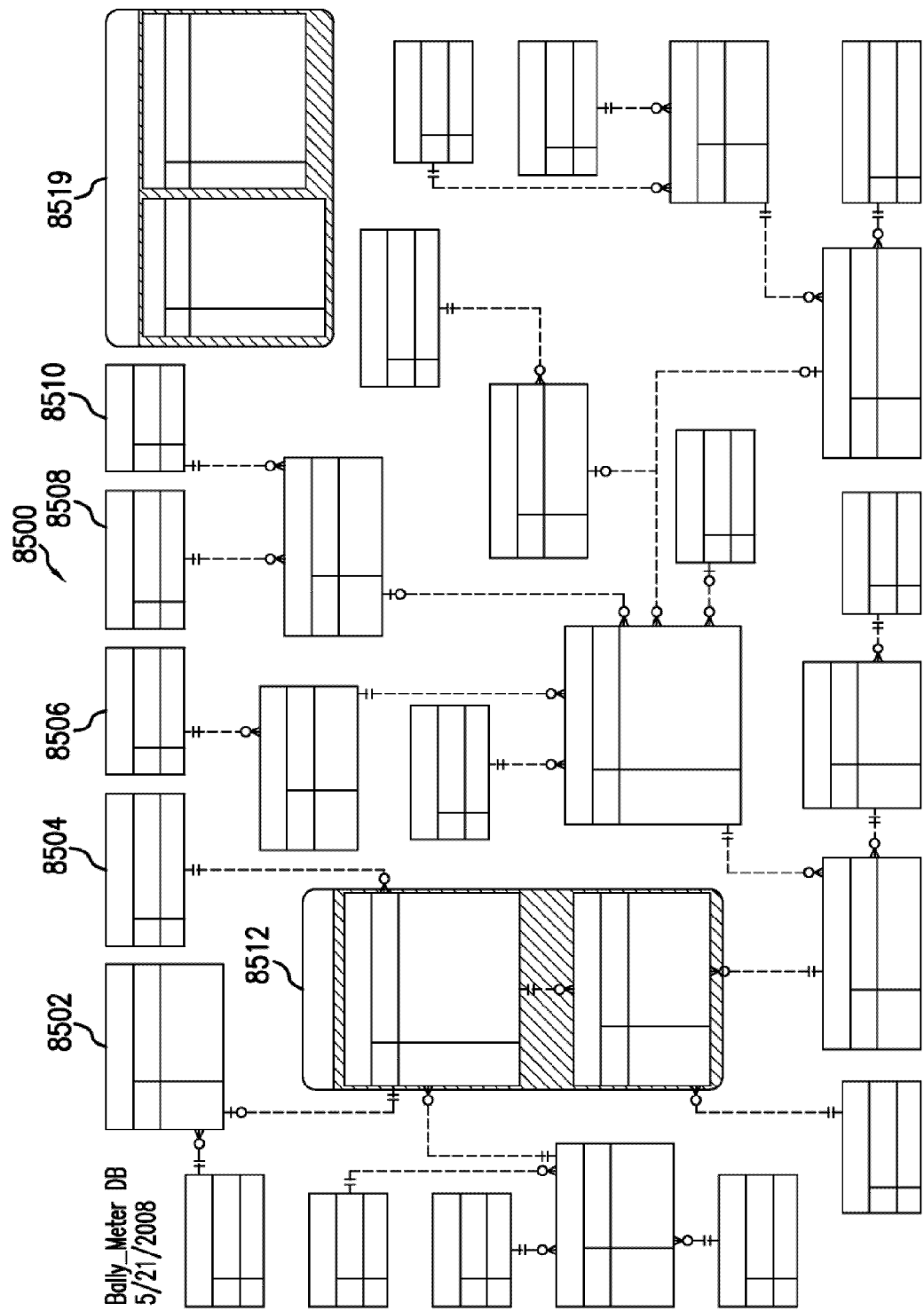
FIGS. 85-85C are a schematic diagram of a gaming meter data structure, according to one illustrated embodiment.
Figure 85A:
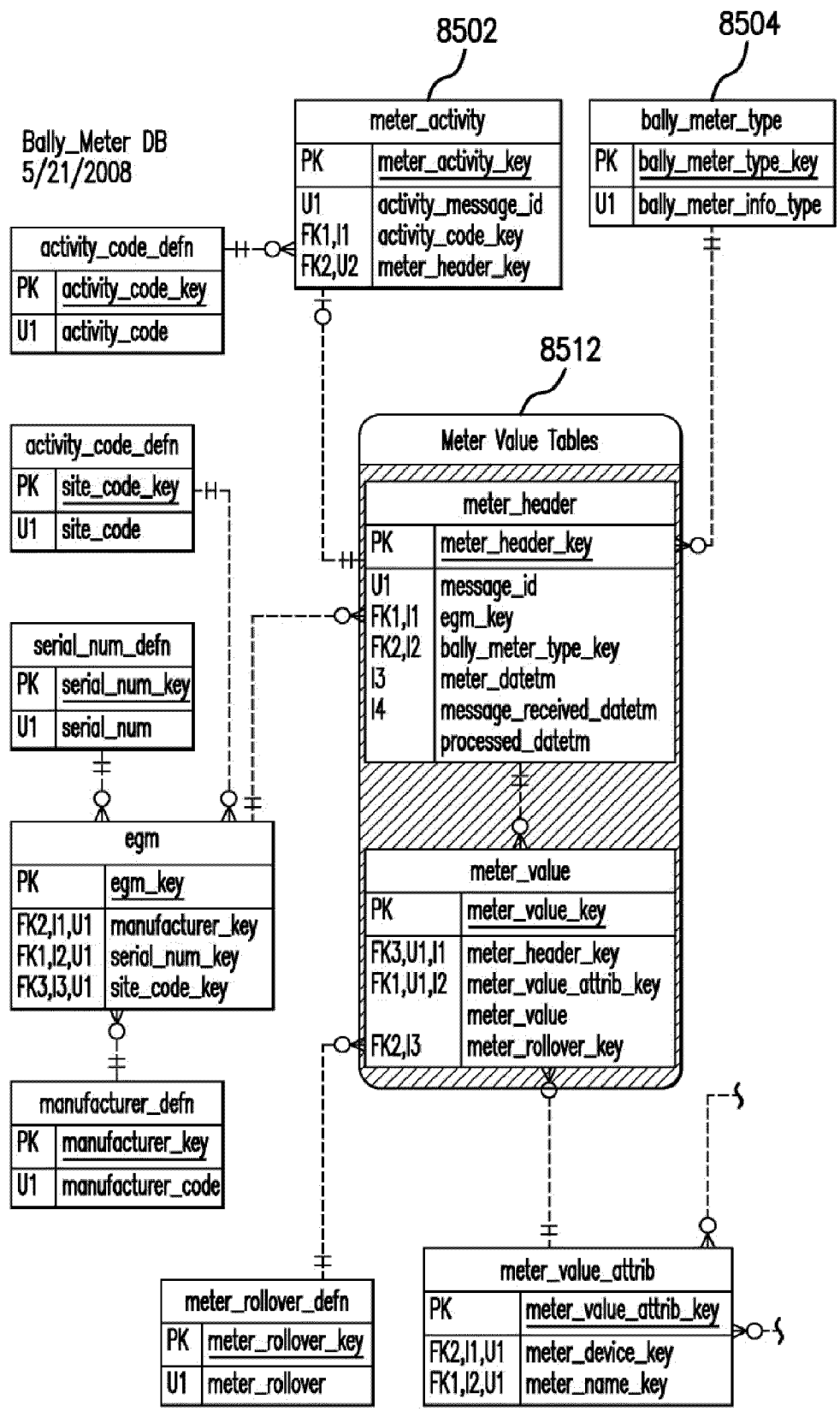
Figure 85B:
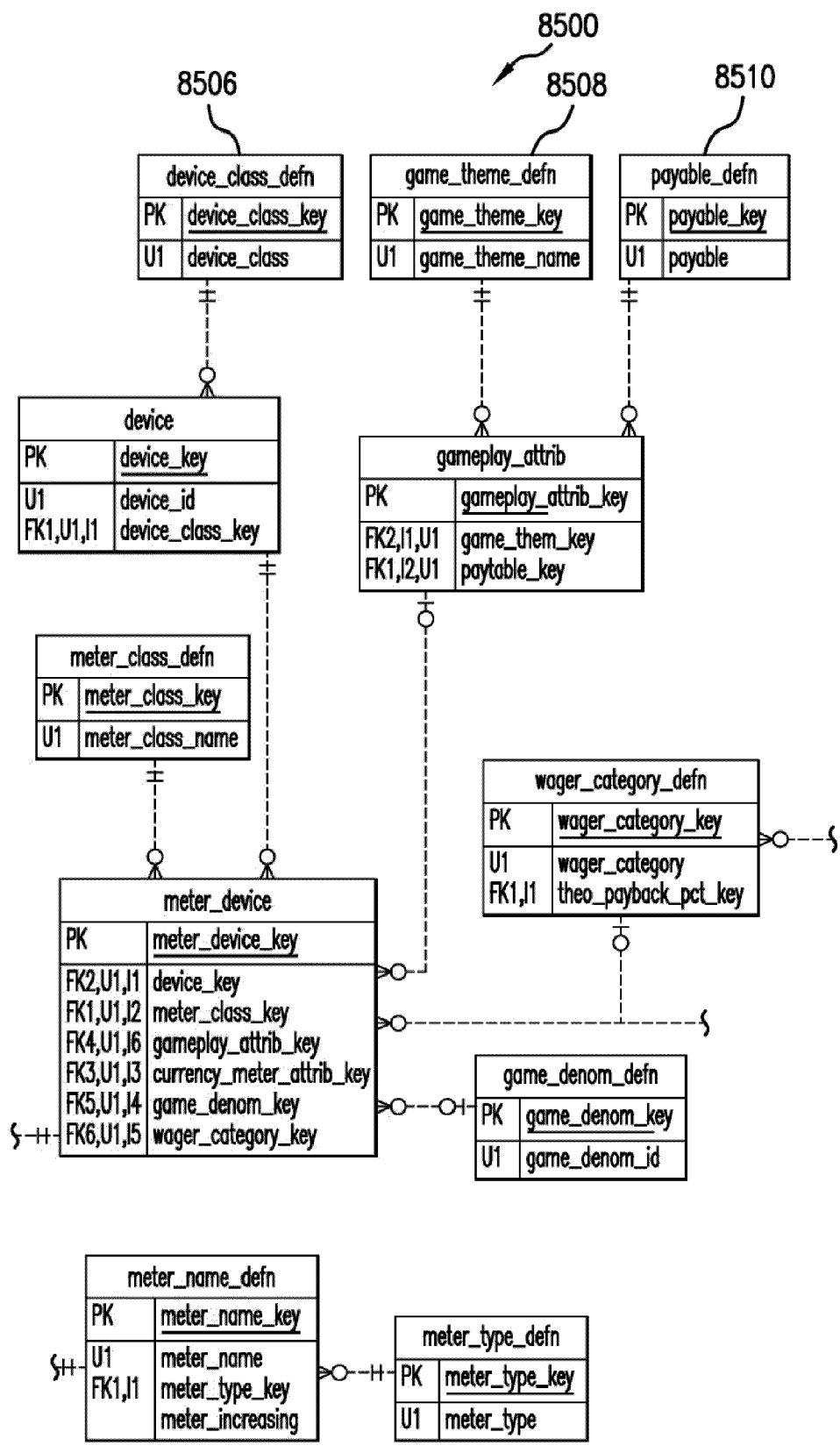
Figure 85C:
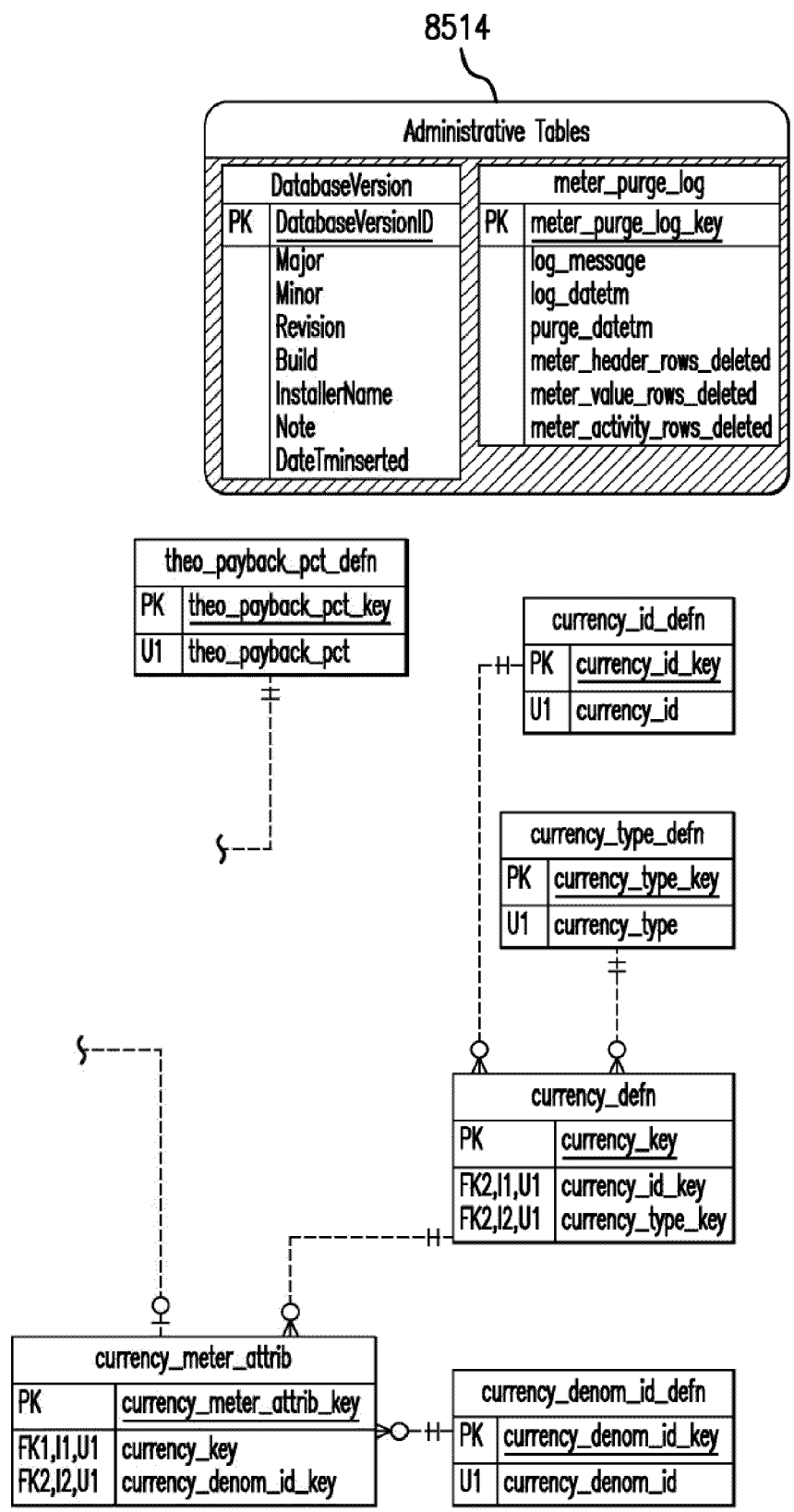

FIGS. 85A-85C show a gaming meter data structure 8500, according to one illustrated embodiment. In particular, FIG. 85 is an overview of the entire gaming meter data structure 8500, while FIGS. 85A-85C show each portion of the gaming meter data structure 8500 in detail. The gaming meter data structure 8500 includes a variety of records, with various fields (e.g., meter_activity 8502, bally_meter_type 8504, device_class_defn 8506, game_theme_defn 8508, paytable_defn 8510), as well as tables (e.g., meter value tables 8512, administrative tables 8514), and associations therebetween.

Correlating consecutive items between two lists.

This correlates consecutive items from largest (i.e., longest) to smallest (i.e., shortest) runs. For example, if it's given two lists, A, B, X, B, C, D, Y and Y, A, B, C, D, X, then it may return the following correlation:

List1: -ABXBCD-Y
List2: YA--BCDX-

Note how the run B, C, D was matched first, preventing the A, B at the beginning of list 1 from being matched with A, B in list 2.

The reason such code is useful is that in the soft count importer, counting machines place terminal IDs and currency counts in one file and terminal IDs and voucher validation IDs in another. The currency counts are to be correlated to the vouchers for each canister (identified by terminal ID). The problem is that some canisters may contain no bills, and others may contain no vouchers. Because the two files are appended to one canister at a time, the order of terminal IDs in the two files may correspond, except when data is missing from one of the files (e.g., because a canister either had no bills or no vouchers).

Improved Method of Retrieving and Caching Seldom Changed Information

A static class named StoredProcedureHandler, has a static method for calling a stored procedure and returning the result set, stored in a list (for each row) of sorted lists of cell values keyed by column names. Several overrides of another static method populate the members of a C# object from one row of a result set. The approach advantageously uses .NET reflection to copy values from the result set into corresponding members of the object. Several overrides of another static method fill a sorted list of such row objects from an entire result set. Because these methods figure out what goes where, the code for the classes of the cached tables are as simple as the following example:

```
/// <summary>
///   Cache of fields from the Area table.
/// </summary>
///
public class AreaInfo : CacheOfTableInAssetDatabase
{
```

```
public long
    Area__ID,
    Parent__ID,
    Site__ID;
public short
    Area__Type__ID;
public string
    Long__Name;
public static SortedList< long /* Area__ID */, AreaInfo >
    CachedTable;
static AreaInfo( )
{
    CachedTable = new SortedList< long, AreaInfo >( );
    Initialize( "p__Select__Area", CachedTable);
}
public static void ReadAndCache( )
{
    ReadAndCacheInfoOfCachedTable( );
}
}
```

When AreaInfo.ReadAndCache( ) is called, the CachedTable static member is cleared and then filled with a list of AreaInfo objects, keyed by area ID. Use of this data, for example to fill a combo box with all the area names, is as simple as:

foreach (DatabaseCache.AreaInfo eachAreaInfo in DatabaseCache.AreaInfo.CachedTable.Values)
    cboArea. Items.Add(eachAreaInfo.Long_Name);

Inter-property Voucher Transfer

Current systems allow a voucher issued at property A to be redeemed at property A, but not property B, even if properties A and B cooperate on other levels. This idea would allow a customer to "cash out" at property A, take the voucher to property B and redeem it. This ensures that the original property knows it was paid, the transaction remains secure, and the redeeming property is properly credited so that accounts between properties balance.

Voucher Transfer

Below is complete overview of all element details.

Symmetric Voucher Interchange System
Requirements Model
Package: Symmetric Voucher Interchange System
<Anonymous>
Type: Note
The Functional Requirements package details behavioural requirements that specify how a proposed system may process and handle information. It details the features and rules that may be present to fully implement the functionality desired.

TABLE 120

| Connections | | | |
|---|---|---|---|
| Connector | Source | Target | Notes |
| NoteLink | Public Functional Requirements | Public <anonymous> | |

Figure 86:
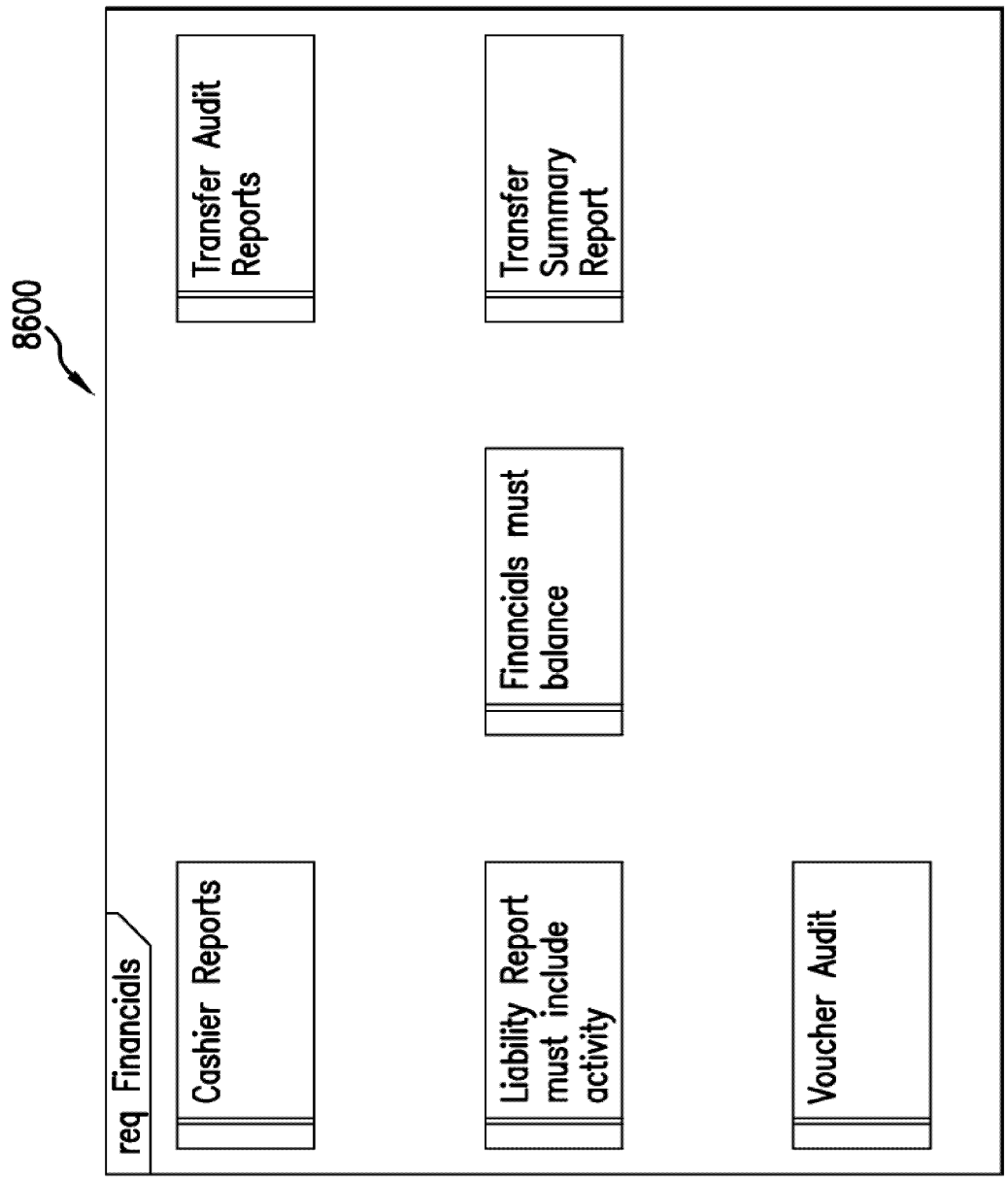
FIG. 86 is a schematic diagram showing a Financials Requirements Model, according to one illustrated embodiment.

Functional Requirements
Type: Package
Functional Requirements describe the features, behaviour, business rules and general functionality that the proposed system may support.
Features
Type: Package
FIG. 86 shows a Financials Requirements Model 8600, according to one illustrated embodiment.

Note
Type: Note
Features typically describe discrete pieces of functional behaviour that yield a specific result.
Financials
Type: Package
Cashier Reports
Type: Requirement
Package: Financials Keywords:
The cashier summary and cashier audit reports may show the voucher as being transferred (cashed/printed) at the gateway machine. the user may be blank or SDG.
Financials May Balance
Type: Requirement
Package: Financials Keywords:
The financials on the system may balance so that all monies collected and paid match the reports.

TABLE 121

| Connections | | | |
|---|---|---|---|
| Connector | Source | Target | Notes |
| Realisation Source -> Destination | Public Ability to transfer voucher | Public Financials may balance | |

Figure 87:
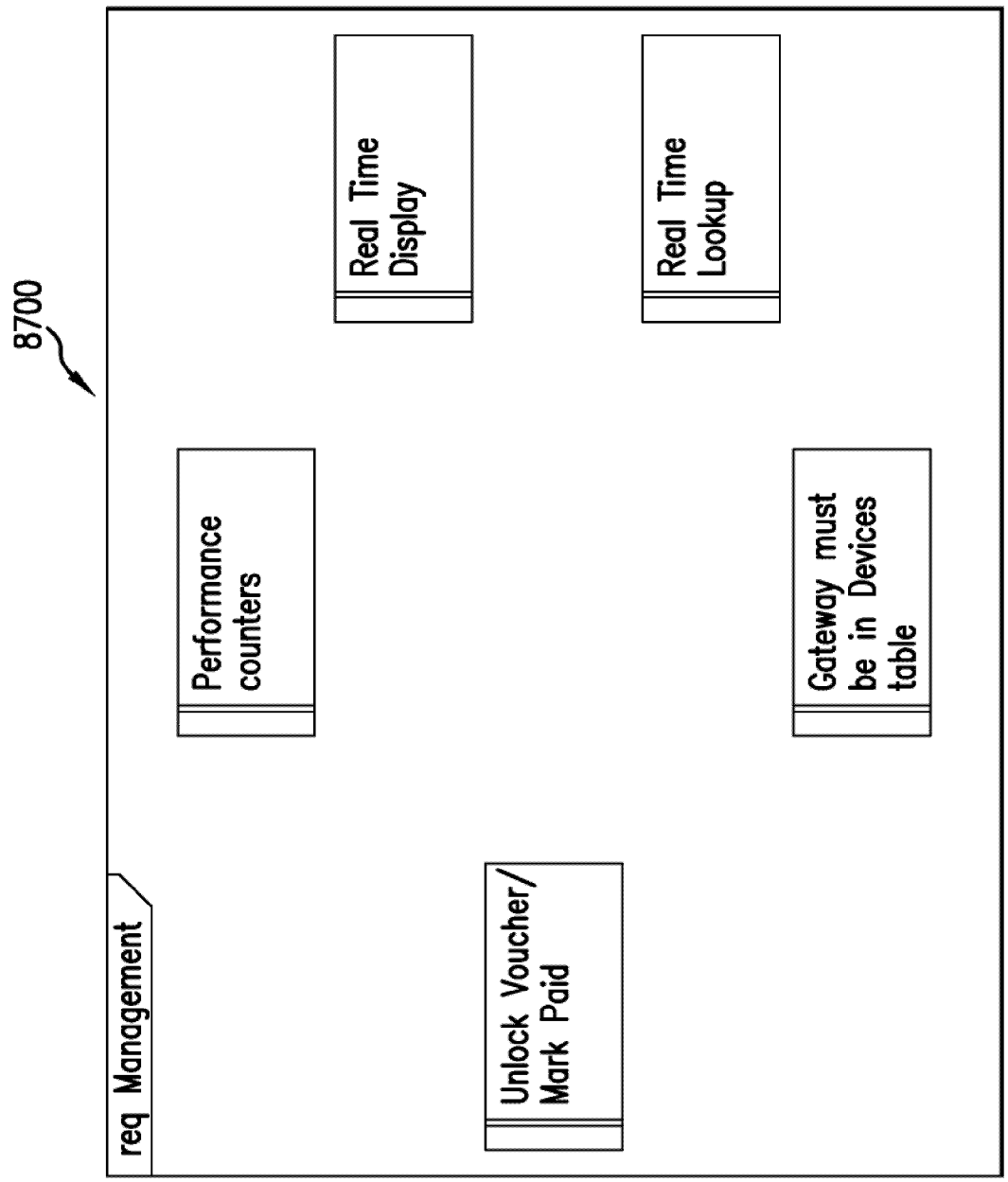
FIG. 87 is a schematic diagram showing a Management Requirements Model, according to one illustrated embodiment.
Figure 88:
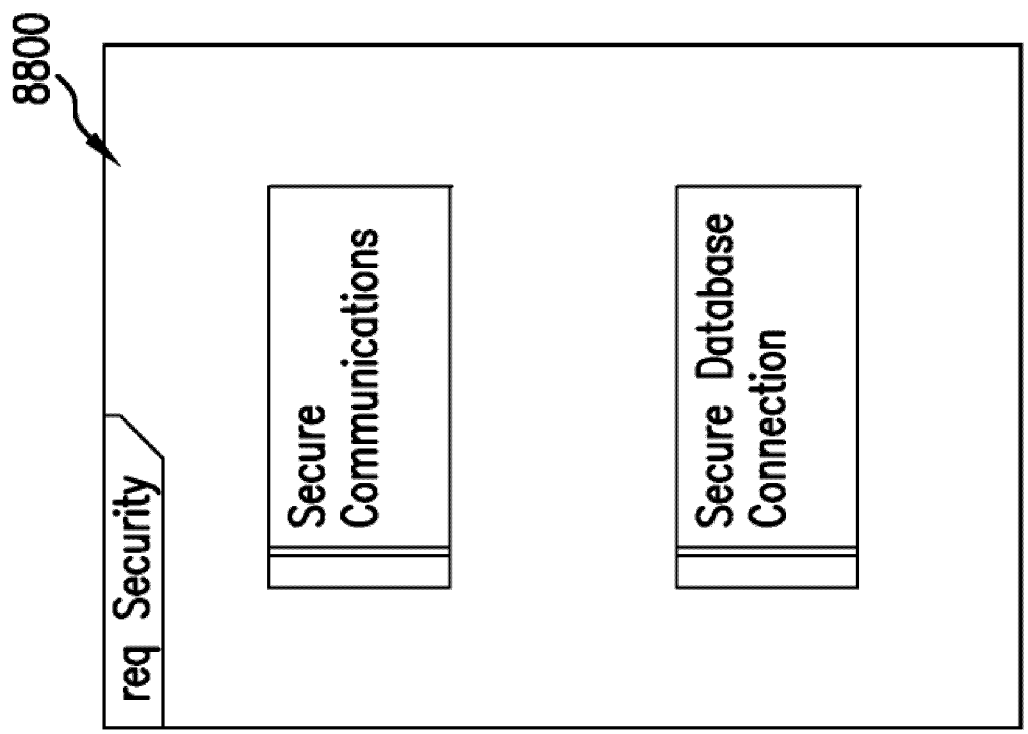
FIG. 88 is a schematic diagram showing a Security Requirements Model, according to one illustrated embodiment.

Liability Report May Include Activity
Type: Requirement
Package: Financials Keywords:
The liability report may show that the voucher has been paid on the old system and printed on the new system. The voucher may appear in liability detail in the correct manner.
Transfer Audit Report
Type: Requirement
Package: Financials Keywords:
A transfer audit report may be created that shows every voucher transferred to and from a system and the date time of the transfer. The report may show the gateway machine doing the transfer and have totals of all transfers.
Transfer Summary Report
Type: Requirement
Package: Financials Keywords:
A transfer summary report may be created that shows the total of all vouchers transferred in and out of the system. The totals may be by gateway machine and match the Transfer Audit Report.
Voucher Audit
Type: Requirement
Package: Financials Keywords:
The Voucher Audit report on the old system may show the voucher paid at the gateway. The voucher Audit on the new system may show the voucher as printed at the gateway.
Management
Type: Package
Package: Features
FIG. 87 shows a Management Requirements Model 8700, according to one illustrated embodiment. The system may provide an easy to use interface that allows for real time lookup of a voucher and the administration of the gateway.
Gateway May be in Devices Table
Type: Requirement
Package: Management Keywords:
The gateway may be listed as a device in the devices table. It needs it's own unique device type. It may be able to be administered from the MT.
Performance Counters
Type: Requirement
Package: Management Keywords:
There may be a set of performance counters available in performance monitor that show the total number of vouchers transferred in the last hour, minute, and second. It may also show error counts and failed attempts by the same criteria.
Real Time Display
Type: Requirement
Package: Management Keywords:
There may be a real time display showing the vouchers transferred (with 4 digits xed out) as they transfer across. This display may also show all errors as they occur.
Real Time Lookup
Type: Requirement
Package: Management Keywords:
The system may allow the user to lookup a voucher and determine it's status.
Unlock Voucher/Mark Paid
Type: Requirement
Package: Management Keywords:
The system may allow for the user to mark a pay pending voucher as not paid or paid.
Security
Type: Package
Package: Features
FIG. 88 shows a Security Requirements Model 8800, according to one illustrated embodiment. The system may have basic security to prevent tampering with vouchers.
Secure Communications
Type: Requirement
Package: Security Keywords:
The gateway may not send or accept any unencrypted messages

TABLE 122

| Connections | | | |
|---|---|---|---|
| Connector | Source | Target | Notes |
| Realisation Source -> Destination | Public Ability to transfer voucher | Public Secure Communications | |

Figure 89:
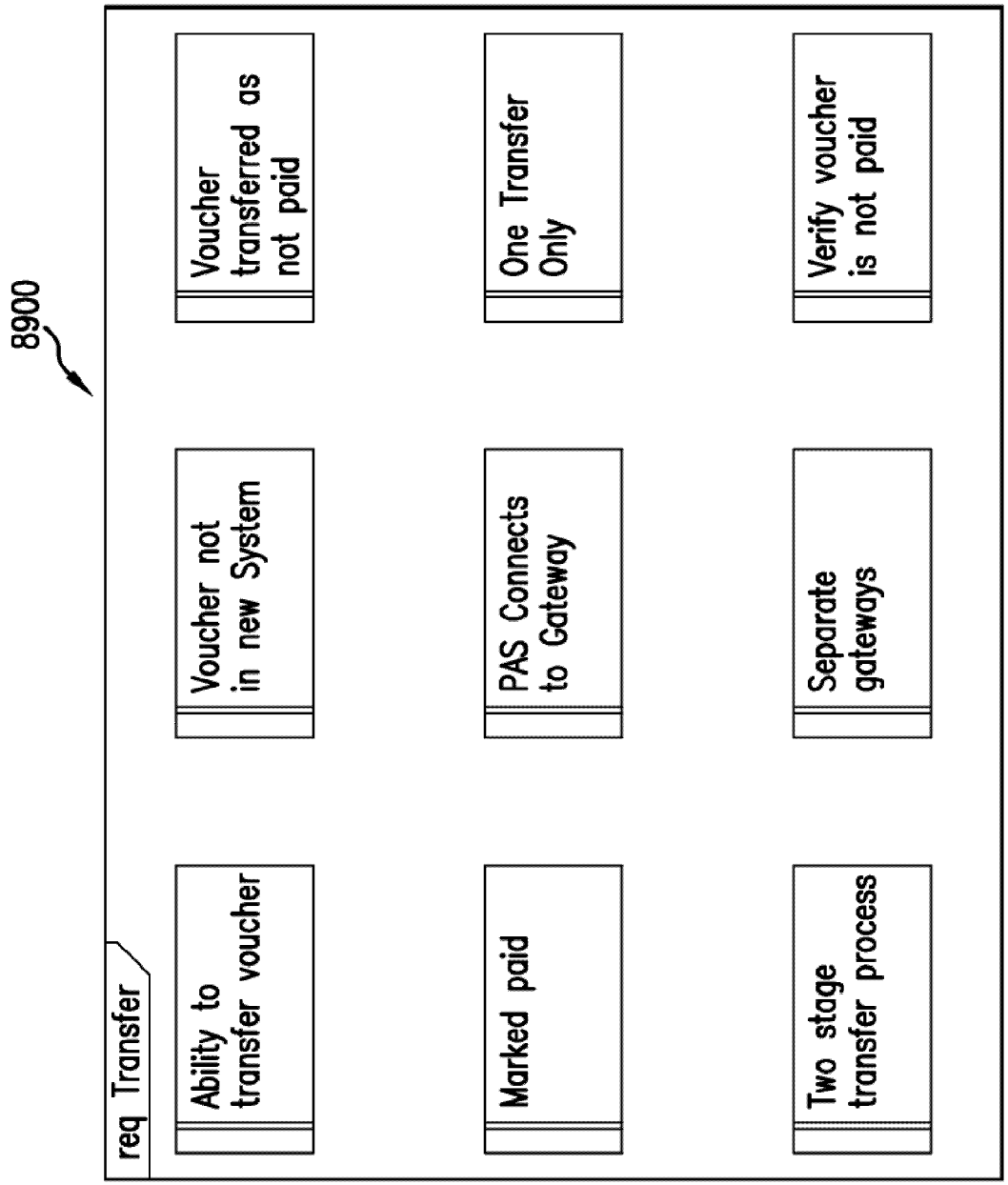
FIG. 89 is a schematic diagram showing a Transfer Requirements Model, according to one illustrated embodiment.

Secure Database Connection
Type: Requirement
Status: Proposed. Version 1.0. Phase 1.0.
Package: Security Keywords:
The gateway may use a secured database connection so that no queries or data may be readable through a network analyzer.
Transfer
Type: Package
Package: Features
FIG. 89 is a schematic diagram showing a Transfer Requirements Model 8900, according to one illustrated embodiment.

Transfer—(Requirements diagram)
Create Voucher in New System
Type: Requirement
Package: Transfer Keywords:
The system may create a new voucher with the same barcode in the system being transferred to.

TABLE 123

| Responsibilities (external requirements) |
| --- |
| Verify voucher is not paid (Proposed, Medium difficulty) The voucher being transferred may not be already paid or in a pay pending state. The only valid state to transfer is null. Voucher not in new System (Proposed, Medium difficulty) The system requesting the transfer may not already have a voucher with that barcode either paid or not. Voucher transferred as not paid (Proposed, Medium difficulty) The voucher is transferred as not paid. The paying of the voucher at the terminal is a secondary step. |

TABLE 124

| Connections | | | |
| --- | --- | --- | --- |
| Connector | Source | Target | Notes |
| Realisation Source -> Destination | Public Two stage transfer process | Public Create voucher in new system | |
| Realisation Source -> Destination | Public Create voucher in new system | Public Voucher not in new System | |
| Realisation Source -> Destination | Public Create voucher in new system | Public Verify voucher is not paid | |
| Realisation Source -> Destination | Public Create voucher in new system | Public Voucher transferred as not paid | |

Marked Paid
Type: Requirement
Status: Proposed. Version 1.0. Phase 1.0.
Package: Transfer Keywords:
The voucher in the old system may mark the voucher paid at the server that is hosting the gateway application. It is not a requirement that the old system know which terminal on the new system has cashed the voucher, just that the voucher was transferred.
One Transfer Only
Type: Requirement
Package: Transfer Keywords:
Once a voucher has been transferred it can not be transferred back. It may be paid in the new system.
PAS Connects to Gateway
Type: Requirement
Package: Transfer Keywords:
PAs may connect to the gateway on the external system.
Separate Gateways
Type: Requirement
Package: Transfer Keywords:
A gateway is required for each system exporting a voucher.
Two Stage Transfer Process
Type: Requirement
Package: Transfer Keywords:
The system may mark the voucher as pay pending until it is committed into the new system. At that time it may be marked paid.

TABLE 125

| Responsibilities (external requirements) |
| --- |
| Create voucher in new system (Proposed, Medium difficulty) The system may create a new voucher with the same barcode in the system being transferred to. |

TABLE 126

| Connections | | | |
| --- | --- | --- | --- |
| Connector | Source | Target | Notes |
| Realisation Source -> Destination | Public Two stage transfer process | Public Create voucher in new system | |

Verify Voucher is not Paid
Type: Requirement
Status: Proposed. Version 1.0. Phase 1.0.
Package: Transfer Keywords:
The voucher being transferred may not be already paid or in a pay pending state. The only valid state to transfer is null.

TABLE 127

| Connections | | | |
| --- | --- | --- | --- |
| Connector | Source | Target | Notes |
| Realisation Source -> Destination | Public Create voucher in new system | Public Verify voucher is not paid | |

Voucher not in New System
Type: Requirement
Status: Proposed. Version 1.0. Phase 1.0.
Package: Transfer Keywords:
The system requesting the transfer may not already have a voucher with that barcode either paid or not.

TABLE 128

| Connections | | | |
| --- | --- | --- | --- |
| Connector | Source | Target | Notes |
| Realisation Source -> Destination | Public Create voucher in new system | Public Voucher not in new System | |

Voucher Transferred as not Paid
Type: Requirement
Status: Proposed. Version 1.0. Phase 1.0.
Package: Transfer Keywords:
The voucher is transferred as not paid. The paying of the voucher at the terminal is a secondary step.

TABLE 129

| Connections | | | |
| --- | --- | --- | --- |
| Connector | Source | Target | Notes |
| Realisation Source -> Destination | Public Create voucher in new system | Public Voucher transferred as not paid | |

Ability to Transfer Voucher

Type: Feature

Status: Proposed. Version 1.0. Phase 1.0.

Package: Transfer Keywords:

The system may be able to transfer a voucher from one casino data system to another. The voucher can not b e transferred back.

TABLE 200

| Responsibilities (external requirements) |
| --- |
| Financials may balance (Proposed, Medium difficulty) |
| The financials on the system may balance so that all monies collected and paid match the reports. |
| Secure Communications (Proposed, Medium difficulty) |
| The gateway may not send or accept any unencrypted messages |

TABLE 201

| Custom Properties |
| --- |
| isStatic = False |

TABLE 202

| Connections | | | |
| --- | --- | --- | --- |
| Connector | Source | Target | Notes |
| Realisation Source -> Destination | Public Ability to transfer voucher | Public Financials may balance | |
| Realisation Source -> Destination | Public Ability to transfer voucher | Public Secure Communications | |

Non-Functional Requirements

Type: Package

Package: Requirements Model

Figure 90:
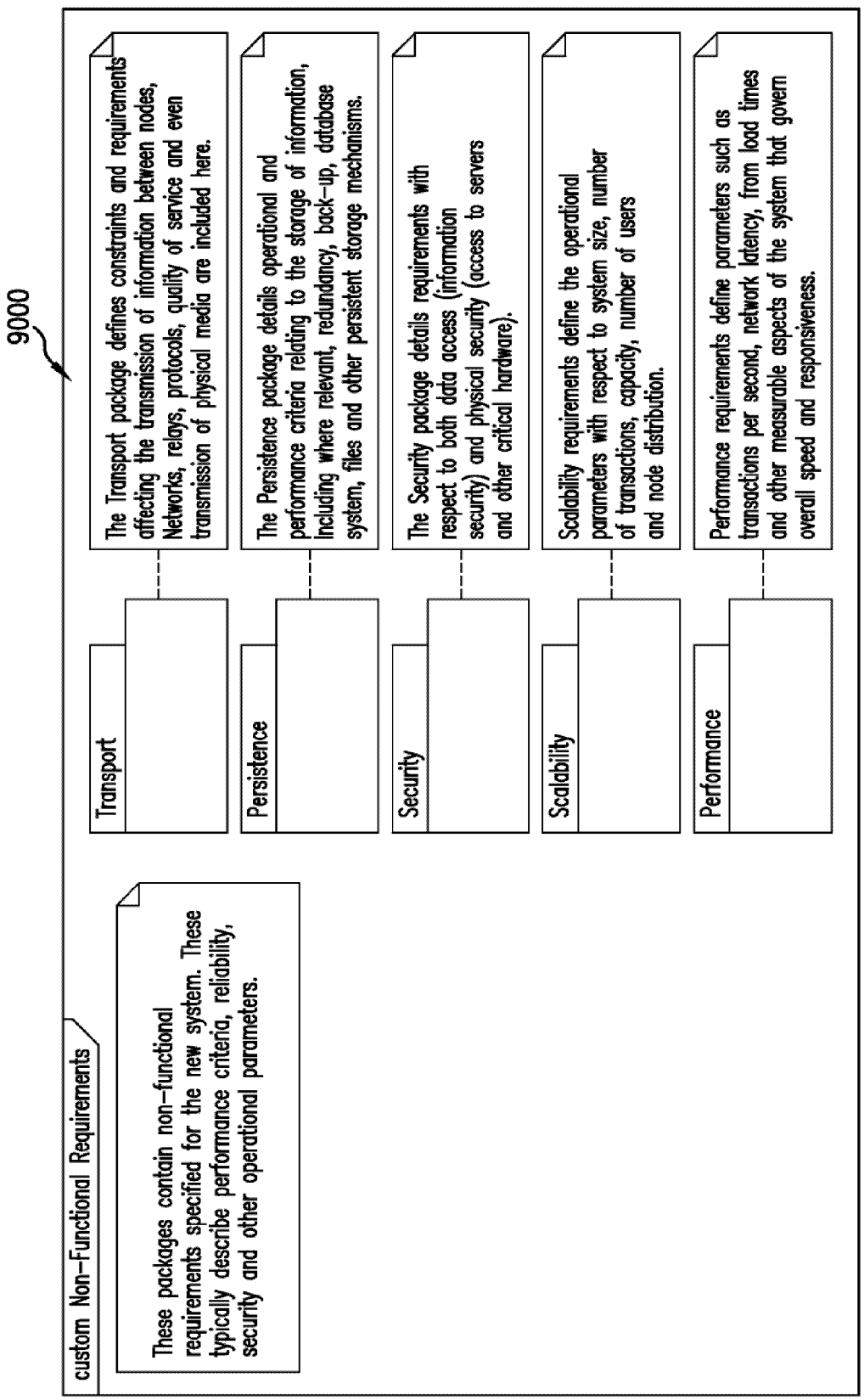
FIG. 90 is a schematic diagram showing a Non-Functional Requirements Model, according to one illustrated embodiment.

FIG. 90 is a schematic diagram showing a Non-Functional Requirements Mode 9000, according to one illustrated embodiment.

Non-Functional Requirements—(Custom diagram)

<anonymous>

Type: Note

Package: Non-Functional Requirements Keywords:

Performance requirements define parameters such as transactions per second, network latency, form load times and other measurable aspects of the system that govern overall speed and responsiveness.

TABLE 203

| Connections | | | |
| --- | --- | --- | --- |
| Connector | Source | Target | Notes |
| NoteLink | Public Performance | Public <anonymous> | |

Performance

Type: Package

Package: Non-Functional Requirements

Performance—(Custom diagram)

Scalability

Type: Package

Package: Non-Functional Requirements

Scalability—(Custom diagram)

Security

Type: Package

Package: Non-Functional Requirements

Security—(Custom diagram)

Persistence

Type: Package

Package: Non-Functional Requirements

Persistence—(Custom diagram)

Transport

Type: Package

Package: Non-Functional Requirements

Transport—(Custom diagram)

Use Case Model

Type: Package

Package: Symmetric Voucher Interchange System

Figure 91:
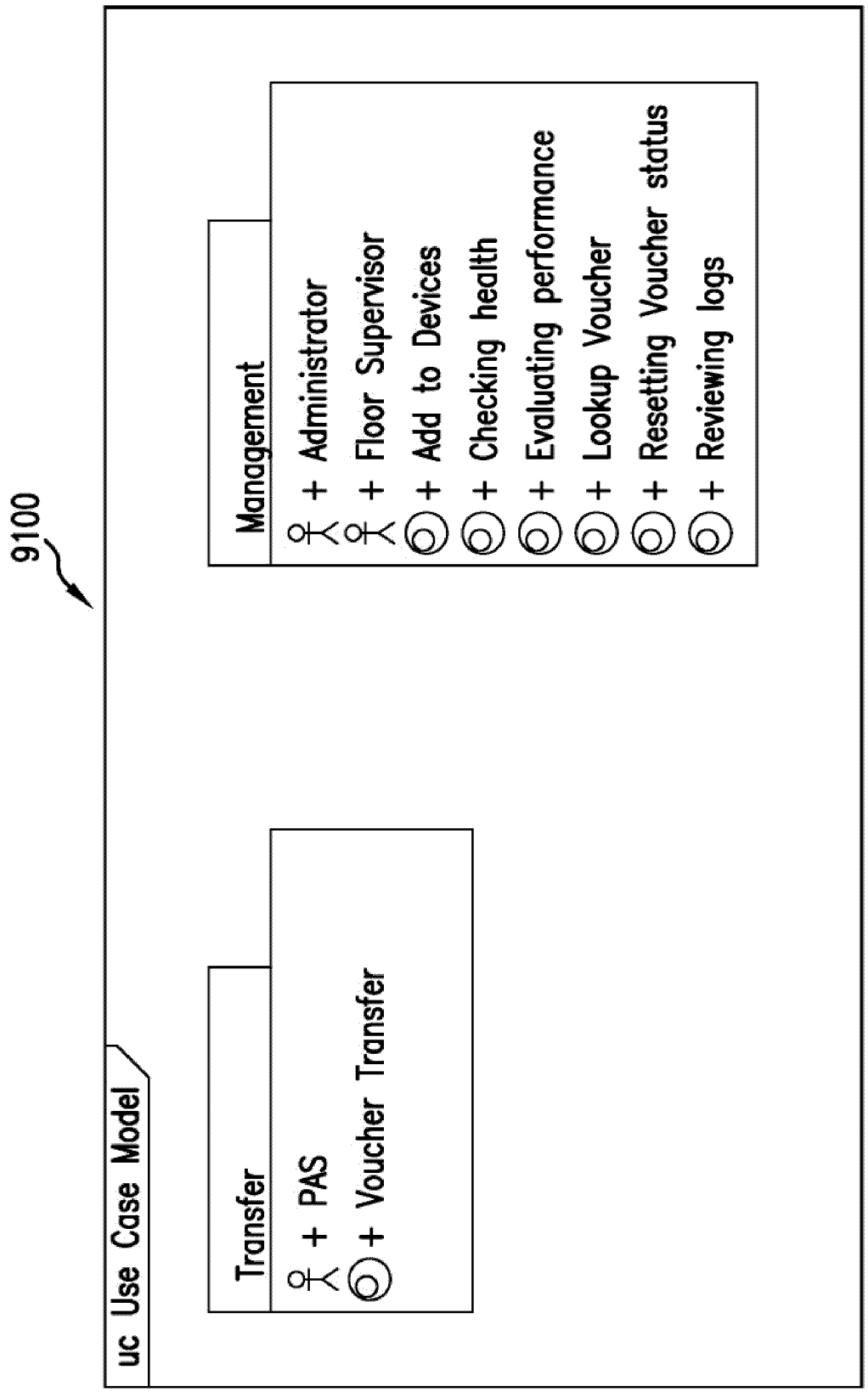
FIG. 91 is a schematic diagram showing a Use Case Model, according to one illustrated embodiment.

FIG. 91 is a schematic diagram showing a Use Case Model 9100, according to one illustrated embodiment.

Use Case Model—(Use Case diagram)

Management

Type: Package

Package: Use Case Model

Figure 92:
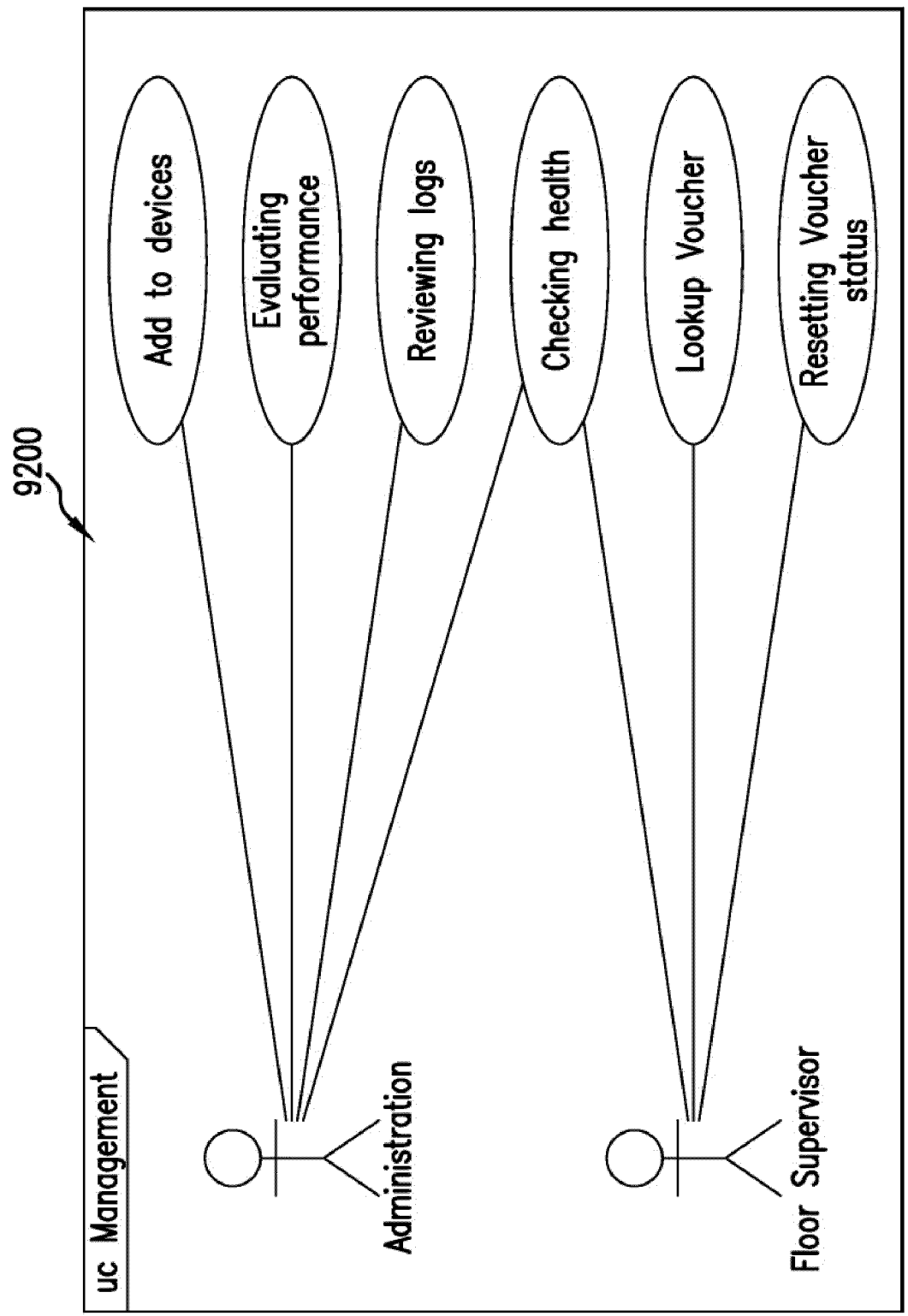
FIG. 92 is a schematic diagram showing a Use Case Management Model, according to one illustrated embodiment.

FIG. 92 is a schematic diagram showing a Use Case Management Model 9200, according to one illustrated embodiment. The functions of the system dealing with the management of the transfers such as log reading, voucher lookup, setup, etc.

Management—(Use Case diagram)

Administrator

Type: Actor

Package: Management Keywords:

Person responsible for changing the configuration of the system and diagnosing issues.

TABLE 204

| Connections | | | |
| --- | --- | --- | --- |
| Connector | Source | Target | Notes |
| UseCaseLink Source -> Destination | Public Administrator | Public Checking health | |
| UseCaseLink Source -> Destination | Public Administrator | Public Reviewing logs | |
| UseCaseLink Source -> Destination | Public Administrator | Public Add to Devices | |

TABLE 204-continued

| Connections | | | |
|---|---|---|---|
| Connector | Source | Target | Notes |
| UseCaseLink Source -> Destination | Public Administrator | Public Evaluating performance | |

Floor Supervisor
Type: Actor
Package: Management Keywords:

A casino person who is responsible for looking up the status of a voucher.

TABLE 205

| Connections | | | |
|---|---|---|---|
| Connector | Source | Target | Notes |
| UseCaseLink Source -> Destination | Public Floor Supervisor | Public Resetting Voucher status | |
| UseCaseLink Source -> Destination | Public Floor Supervisor | Public Lookup Voucher | |
| UseCaseLink Source -> Destination | Public Floor Supervisor | Public Checking health | |

Add to Devices
Type: UseCase
Package: Management Keywords:
Adding the gateway to the devices.

TABLE 206

| Connections | | | |
|---|---|---|---|
| Connector | Source | Target | Notes |
| UseCaseLink Source -> Destination | Public Administrator | Public Add to Devices | |

Checking Health
Type: UseCase
Package: Management Keywords:

Checking the gateway to see that messages are going through.

TABLE 207

| Connections | | | |
|---|---|---|---|
| Connector | Source | Target | Notes |
| UseCaseLink Source -> Destination | Public Administrator | Public Checking health | |
| UseCaseLink Source -> Destination | Public Floor Supervisor | Public Checking health | |

Evaluating Performance
Type: UseCase
Package: Management Keywords:
Monitoring the performance of the gateway.

TABLE 208

| Connections | | | |
|---|---|---|---|
| Connector | Source | Target | Notes |
| UseCaseLink Source -> Destination | Public Administrator | Public Evaluating performance | |

Lookup Voucher
Type: UseCase
Package: Management Keywords:
Looking up the status of a voucher in the external system.

TABLE 209

| Connections | | | |
|---|---|---|---|
| Connector | Source | Target | Notes |
| UseCaseLink Source -> Destination | Public Floor Supervisor | Public Lookup Voucher | |

Resetting Voucher status
Type: UseCase
Package: Management Keywords:
Marking a voucher as paid or available that is stuck in a locked state for the gateway.

TABLE 140

| Connections | | | |
|---|---|---|---|
| Connector | Source | Target | Notes |
| UseCaseLink Source -> Destination | Public Floor Supervisor | Public Resetting Voucher status | |

Reviewing logs
Type: UseCase
Package: Management Keywords:
Reviewing log files for diagnosis.

TABLE 141

| Connections | | | |
|---|---|---|---|
| Connector | Source | Target | Notes |
| UseCaseLink Source -> Destination | Public Administrator | Public Reviewing logs | |

Transfer
Type: Package
Package: Use Case Model

Figure 93:
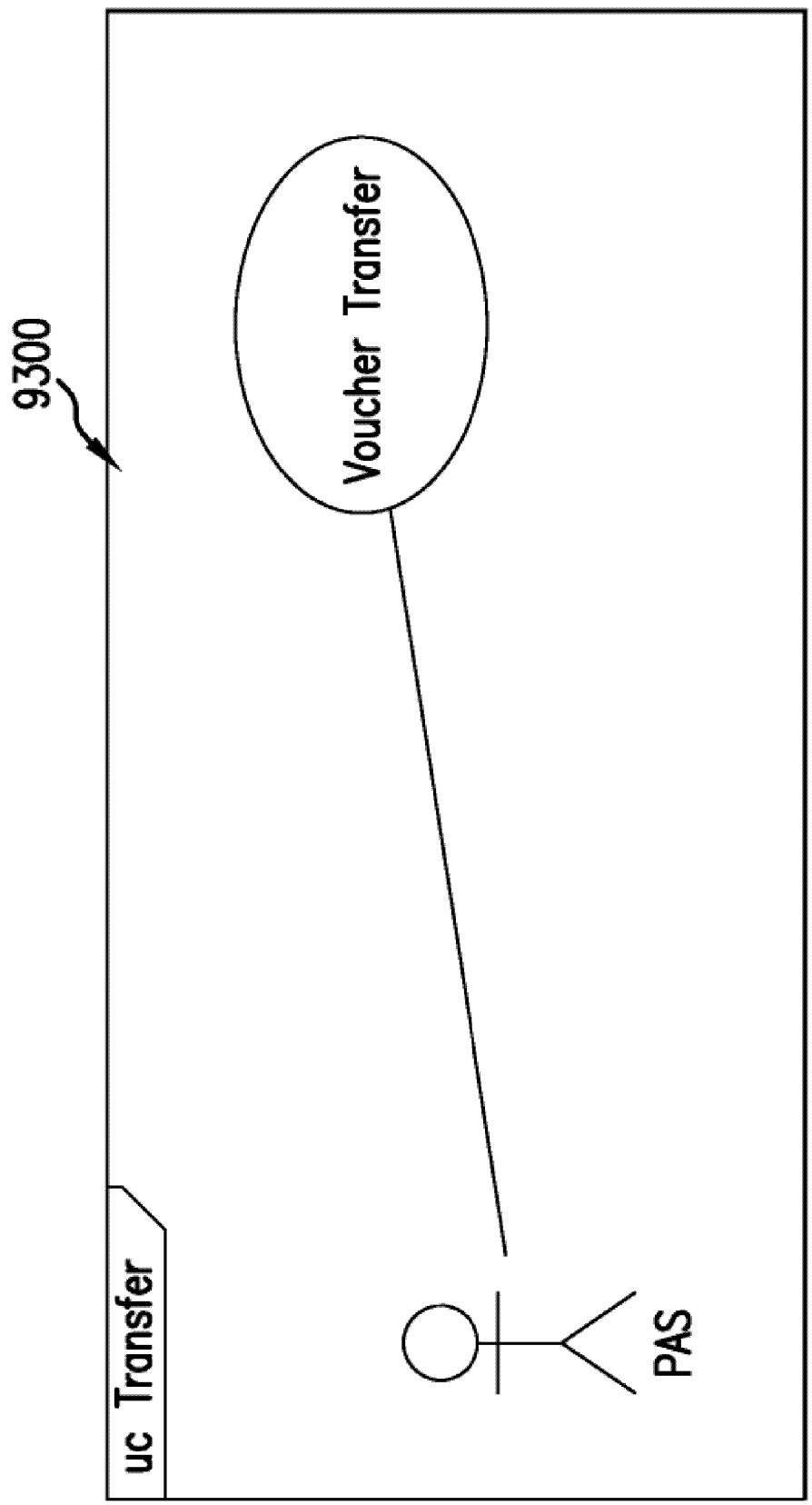
FIG. 93 is a schematic diagram showing a Use Case Transfer Model, according to one illustrated embodiment.

FIG. 93 is a schematic diagram showing a Use Case Transfer Model 9300, according to one illustrated embodiment. The functions necessary to transfer a voucher from one system to another.

Transfer—(Use Case diagram)
PAS
Type: Actor
Package: Transfer Keywords:

The PAS service of the system requesting the voucher be transferred in.

TABLE 142

| Connections | | | |
|---|---|---|---|
| Connector | Source | Target | Notes |
| UseCaseLink Source -> Destination | Public PAS | Public Voucher Transfer | |
| NoteLink Source -> Destination | Public Note | Public PAS | |
| NoteLink Source -> Destination | Public Note | Public PAS | |
| NoteLink Source -> Destination | Public Note | Public PAS | |
| Sequence Cashout Inserted Source -> Destination | Public Requesting Device | Public PAS | Normal cashout inserted message |
| Sequence Cashout Inserted Source -> Destination | Public Requesting Device | Public PAS | The voucher inserted message that a terminal would normally send. |
| Sequence Voucher Lookup Source -> Destination | Public PAS | Public IGDB (New) | Voucher may not be found. |
| Sequence Look up voucher Source -> Destination | Public PAS | Public IGDB (New) | PAS looks up the voucher in the database. |
| Sequence Voucher Transfer Source -> Destination | Public PAS | Public Web Service | |
| Sequence Voucher Transfer Source -> Destination | Public PAS | Public Web Service | PAS looks up the voucher in the other system. |
| Sequence Transfer Error Source -> Destination | Public Web Service | Public PAS | Returns back an error stating the voucher was not found (or paid already) |
| Sequence Voucher Response Source -> Destination | Public Web Service | Public PAS | This is the return value of the Voucher transfer call. |
| Sequence Cashout invalid Source -> Destination | Public PAS | Public Requesting Device | Normal cashout invalid message with error from external system. |
| Sequence Voucher Insert Source -> Destination | Public PAS | Public IGDB (New) | PAS inserts the voucher into the database. The voucher is in a pay pending state. |
| Sequence Voucher Close Source -> Destination | Public PAS | Public Web Service | PAS has acknowledged the voucher is in the database. |
| Sequence Close Tran Source -> Destination | Public Web Service | Public PAS | The voucher is marked paid and acknowledged. |
| Sequence Mark available Source -> Destination | Public PAS | Public IGDB (New) | The voucher is marked available for cashing. |
| Sequence Lookup voucher Source -> Destination | Public PAS | Public IGDB (New) | Look up the voucher again (repeat PAS code). |

TABLE 142-continued

| Connections | | | |
|---|---|---|---|
| Connector | Source | Target | Notes |
| Sequence Voucher Lock Source -> Destination | Public PAS | Public IGDB (New) | Mark the voucher as pay pending. |
| Sequence Cashout Results Source -> Destination | Public PAS | Public Requesting Device | Give the calling device the results of the voucher. |
| Sequence Cashout Closed Source -> Destination | Public Requesting Device | Public PAS | Normal cashout close message stating voucher was paid or not. |
| Sequence Mark as paid Source -> Destination | Public PAS | Public IGDB (New) | Mark the voucher as paid if the client paid it or return to available if it did not. |

Voucher Transfer

Type: UseCase

Figure 94:
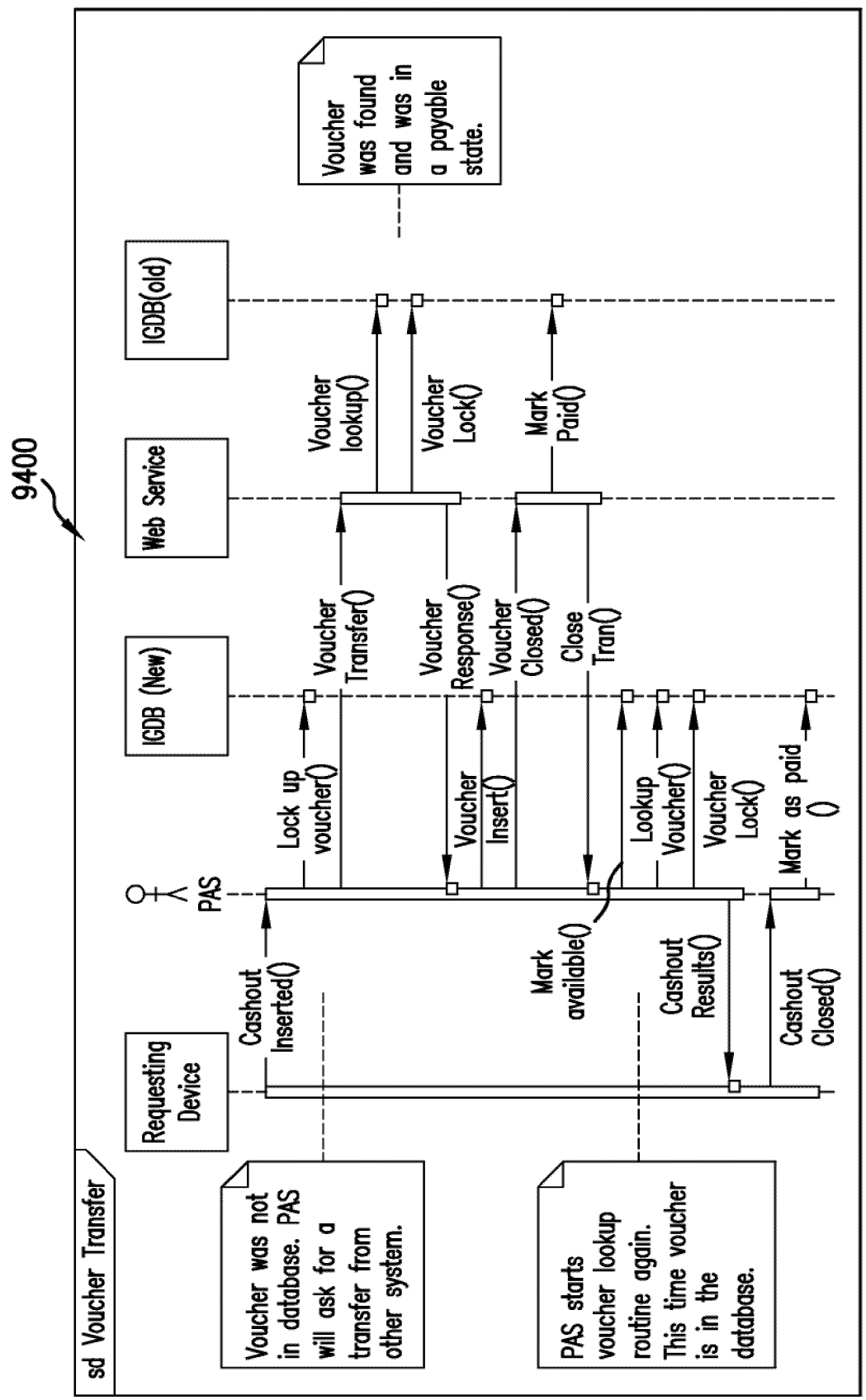
FIG. 94 is a transaction diagram of a Voucher Transfer Process, according to one illustrated embodiment.

Package: Transfer Keywords:

FIG. 94 is a transaction diagram of a Voucher Transfer Process 9400, according to one illustrated embodiment. Transferring the voucher from the old system into the new system.

TABLE 143

| Connections | | | |
|---|---|---|---|
| Connector | Source | Target | Notes |
| UseCaseLink Source -> Destination | Public PAS | Public Voucher Transfer | |

Sequence diagram: Voucher Transfer

Figure 95:
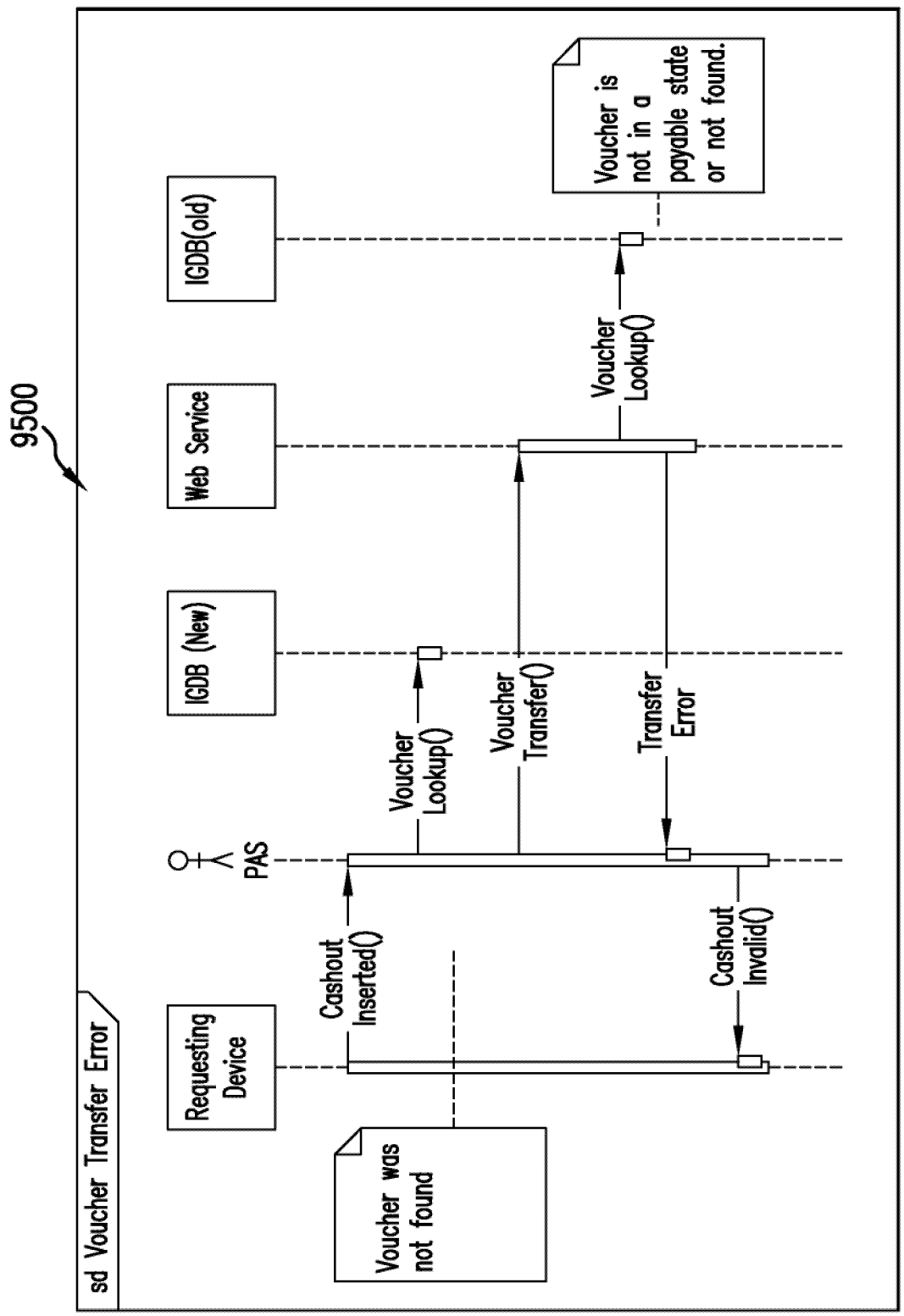
FIG. 95 is a transaction diagram of a Voucher Transfer Error Process, according to one illustrated embodiment.

FIG. 95 is a transaction diagram of a Voucher Transfer Error Process 9500, according to one illustrated embodiment.

Sequence diagram: Voucher Transfer Error

Diagrams when an error occurs during transfer due to the voucher not being found or is already paid.

IGDB (New)

Type: Sequence

Package: Transfer Keywords:

TABLE 144

| Connections | | | |
|---|---|---|---|
| Connector | Source | Target | Notes |
| Sequence Voucher Lookup Source -> Destination | Public PAS | Public IGDB (New) | Voucher may not be found. |
| Sequence Look up voucher Source -> Destination | Public PAS | Public IGDB (New) | PAS looks up the voucher in the database. |
| Sequence Voucher Insert Source -> Destination | Public PAS | Public IGDB (New) | PAS inserts the voucher into the database. The voucher is in a pay pending state. |
| Sequence Mark available Source -> Destination | Public PAS | Public IGDB (New) | The voucher is marked available for cashing. |

TABLE 144-continued

| Connections | | | |
|---|---|---|---|
| Connector | Source | Target | Notes |
| Sequence Lookup voucher Source -> Destination | Public PAS | Public IGDB (New) | Look up the voucher again (repeat PAS code). |
| Sequence Voucher Lock Source -> Destination | Public PAS | Public IGDB (New) | Mark the voucher as pay pending. |
| Sequence Mark as paid Source -> Destination | Public PAS | Public IGDB (New) | Mark the voucher as paid if the client paid it or return to available if it did not. |

IGDB(old)
Type: Sequence
Package: Transfer Keywords:
The database of the system the voucher is being transferred from.

TABLE 145

| Connections | | | |
|---|---|---|---|
| Connector | Source | Target | Notes |
| NoteLink Source -> Destination | Public Note | Public IGDB(old) | |
| NoteLink Source -> Destination | Public Note | Public IGDB(old) | |
| Sequence Voucher lookup Source -> Destination | Public Web Service | Public IGDB(old) | |
| Sequence Voucher Lookup Source -> Destination | Public Web Service | Public IGDB(old) | Voucher may not be found. |
| Sequence Voucher Lock Source -> Destination | Public Web Service | Public IGDB(old) | Set the state to pay pending on the voucher. |
| Sequence Mark Paid Source -> Destination | Public Web Service | Public IGDB(old) | The voucher is marked paid in the old system. |

Requesting Device
Type: Sequence
Package: Transfer Keywords:
This could be an LGC or CT.

TABLE 146

| Connections | | | |
|---|---|---|---|
| Connector | Source | Target | Notes |
| Sequence Cashout Inserted Source -> Destination | Public Requesting Device | Public PAS | Normal cashout inserted message |
| Sequence Cashout Inserted Source -> Destination | Public Requesting Device | Public PAS | The voucher inserted message that a terminal would normally send. |
| Sequence Cashout invalid Source -> Destination | Public PAS | Public Requesting Device | Normal cashout invalid message with error from external system. |

TABLE 146-continued

| Connections | | | |
|---|---|---|---|
| Connector | Source | Target | Notes |
| Sequence Cashout Results Source -> Destination | Public PAS | Public Requesting Device | Give the calling device the results of the voucher. |
| Sequence Cashout Closed Source -> Destination | Public Requesting Device | Public PAS | Normal cashout close message stating voucher was paid or not. |

Web Service
Type: Sequence
Package: Transfer Keywords:
The web service that receives the commands from PAS.

TABLE 147

| Connections | | | |
|---|---|---|---|
| Connector | Source | Target | Notes |
| Sequence Voucher Transfer Source -> Destination | Public PAS | Public Web Service | |
| Sequence Voucher Transfer Source -> Destination | Public PAS | Public Web Service | PAS looks up the voucher in the other system. |
| Sequence Voucher lookup Source -> Destination | Public Web Service | Public IGDB(old) | |
| Sequence Voucher Lookup Source -> Destination | Public Web Service | Public IGDB(old) | Voucher may not be found. |
| Sequence Transfer Error Source -> Destination | Public Web Service | Public PAS | Returns back an error stating the voucher was not found (or paid already) |
| Sequence Voucher Lock Source -> Destination | Public Web Service | Public IGDB(old) | Set the state to pay pending on the voucher. |
| Sequence Voucher Response Source -> Destination | Public Web Service | Public PAS | This is the return value of the Voucher transfer call. |
| Sequence Voucher Close Source -> Destination | Public PAS | Public Web Service | PAS has acknowledged the voucher is in the database. |
| Sequence Mark Paid Source -> Destination | Public Web Service | Public IGDB(old) | The voucher is marked paid in the old system. |
| Sequence Close Tran Source -> Destination | Public Web Service | Public PAS | The voucher is marked paid and acknowledged. |

Figure 96:
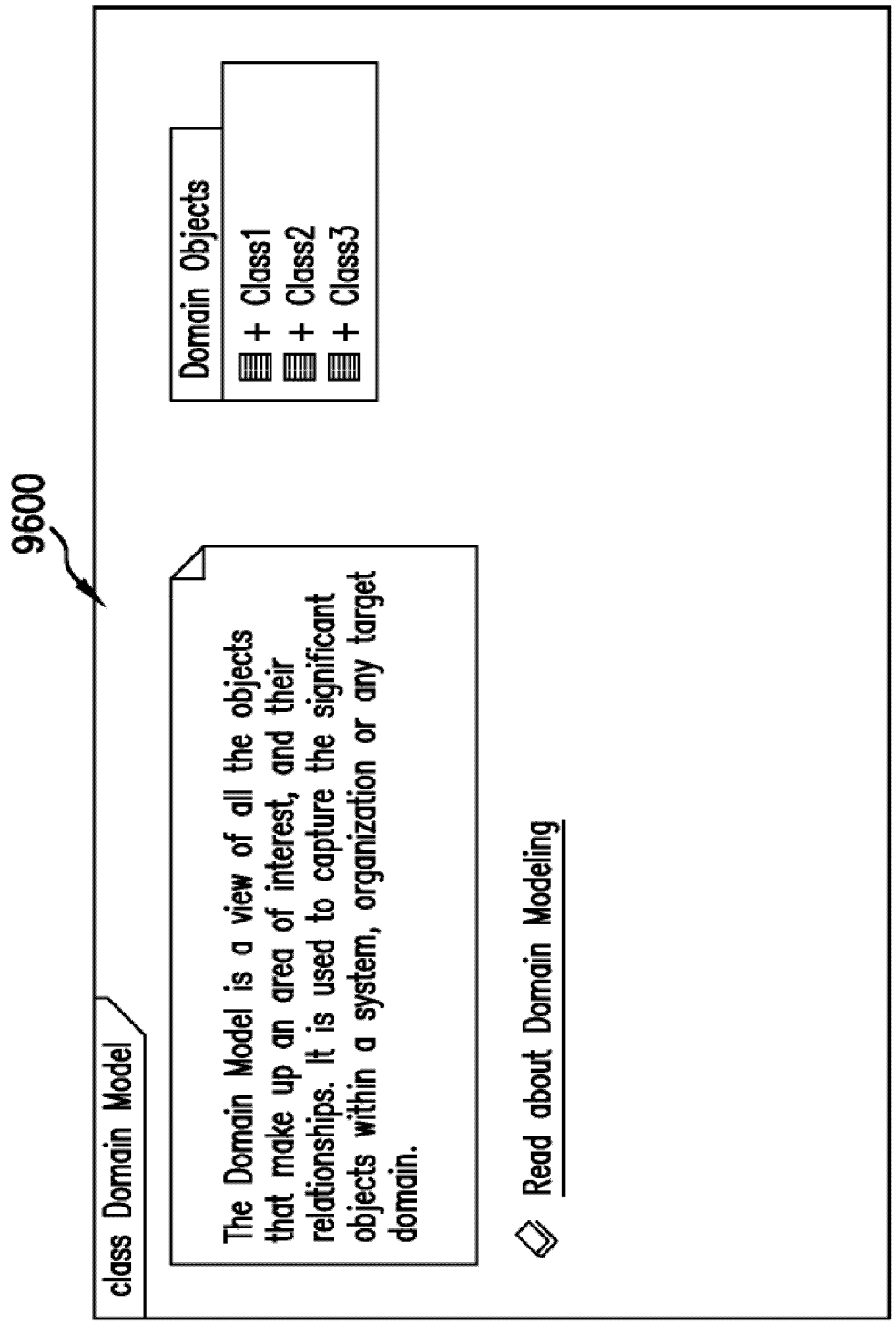
FIG. 96 is a schematic diagram showing a Domain Model, according to one illustrated embodiment.

Domain Model
Type: Package
Package: Symmetric Voucher Interchange System
FIG. 96 is a schematic diagram showing a Domain Model 9600, according to one illustrated embodiment.
Domain Model—(Logical diagram)
Note
Type: Note
Package: Domain Model Keywords:

The Domain Model is a view of all the objects that make up an area of interest, and their relationships. It is used to capture the significant objects within a system, organization or any target domain.

Domain Objects

Type: Package

Package: Domain Model

Figure 97:
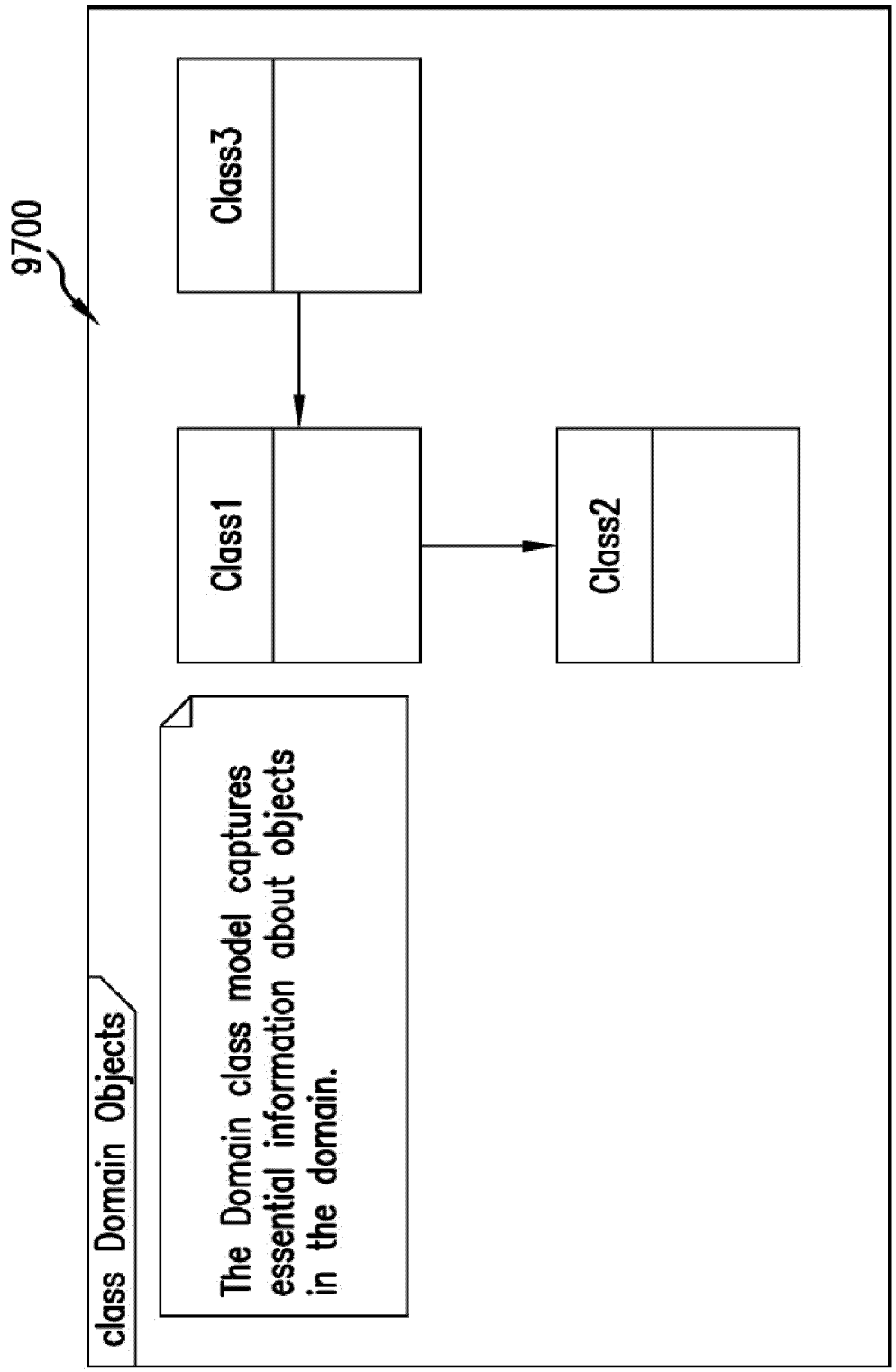
FIG. 97 is a schematic diagram showing a Domain Objects Model, according to one illustrated embodiment.

FIG. 97 is a schematic diagram showing a Domain Objects Model 9700, according to one illustrated embodiment.

Domain Objects—(Logical diagram)

Class1

Type: Class

Package: Domain Objects Keywords:

TABLE 148

| Custom Properties |
| --- |
| isActive = False |

TABLE 149

| Connections | | | |
| --- | --- | --- | --- |
| Connector | Source | Target | Notes |
| Association Source –> Destination | Public Class1 | Public Class2 | |
| Generalization Source –> Destination | Public Class3 | Public Class1 | |

Class2

Type: Class

Package: Domain Objects Keywords:

TABLE 150

| Custom Properties |
| --- |
| isActive = False |

TABLE 151

| Connections | | | |
| --- | --- | --- | --- |
| Connector | Source | Target | Notes |
| Association Source –> Destination | Public Class1 | Public Class2 | |

Class3

Type: Class Class1

Package: Domain Objects Keywords:

TABLE 152

| Custom Properties |
| --- |
| isActive = False |

TABLE 153

| Connections | | | |
| --- | --- | --- | --- |
| Connector | Source | Target | Notes |
| Generalization Source –> Destination | Public Class3 | Public Class1 | |

Data Model

Type: Package

Package: Symmetric Voucher Interchange System

Figure 98:
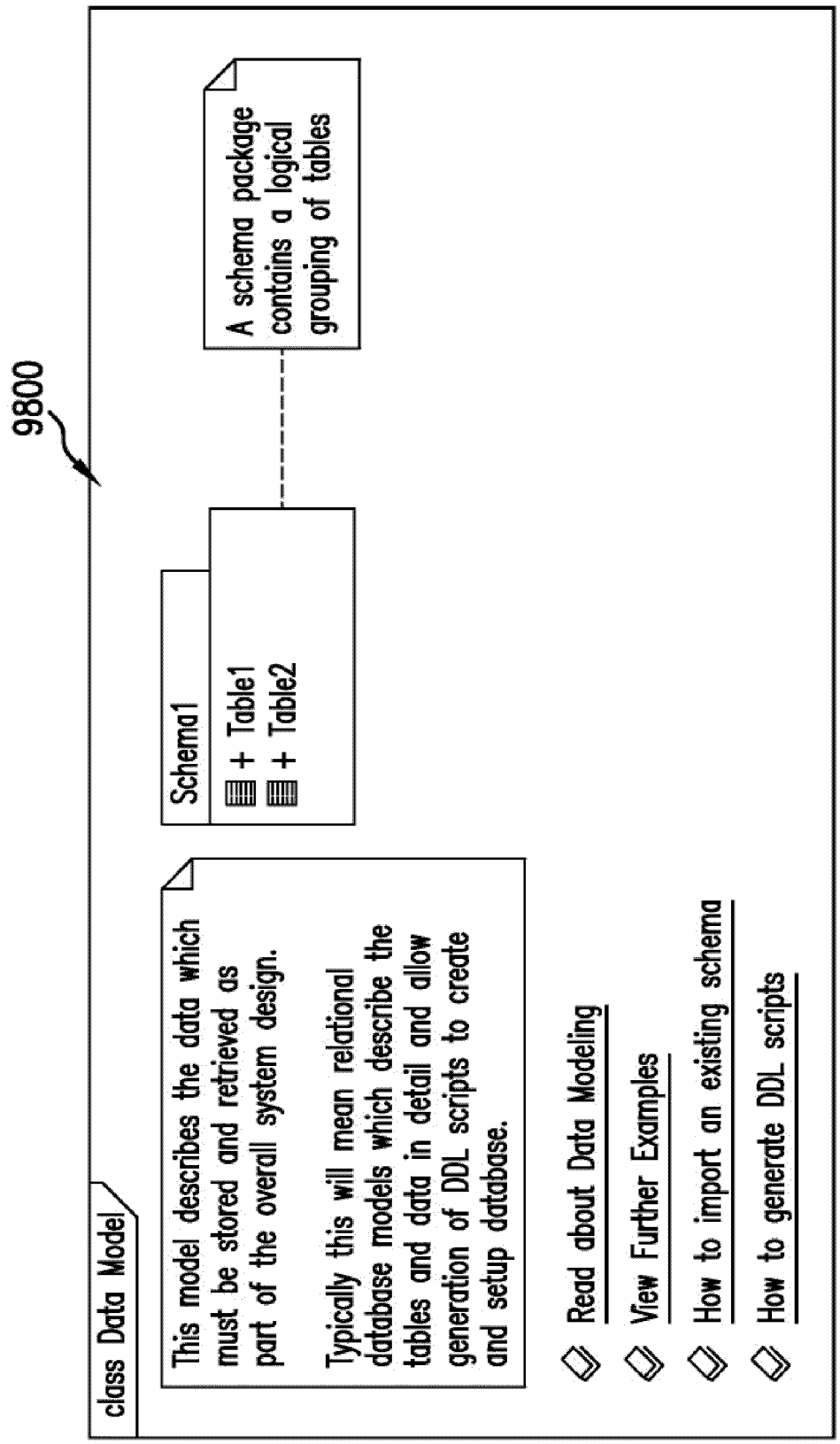
FIG. 98 is a schematic diagram showing a Data Model, according to one illustrated embodiment.

FIG. 98 is a schematic diagram showing a Data Model 9800, according to one illustrated embodiment.

Data Model—(Logical diagram)

<Anonymous>

Type: Note

Package: Data Model Keywords:

A schema package contains a logical grouping of tables

TABLE 154

| Connections | | | |
| --- | --- | --- | --- |
| Connector | Source | Target | Notes |
| NoteLink | Public Schema1 | Public <anonymous> | |

Schema1

Type: Package

Package: Data Model

Figure 99:
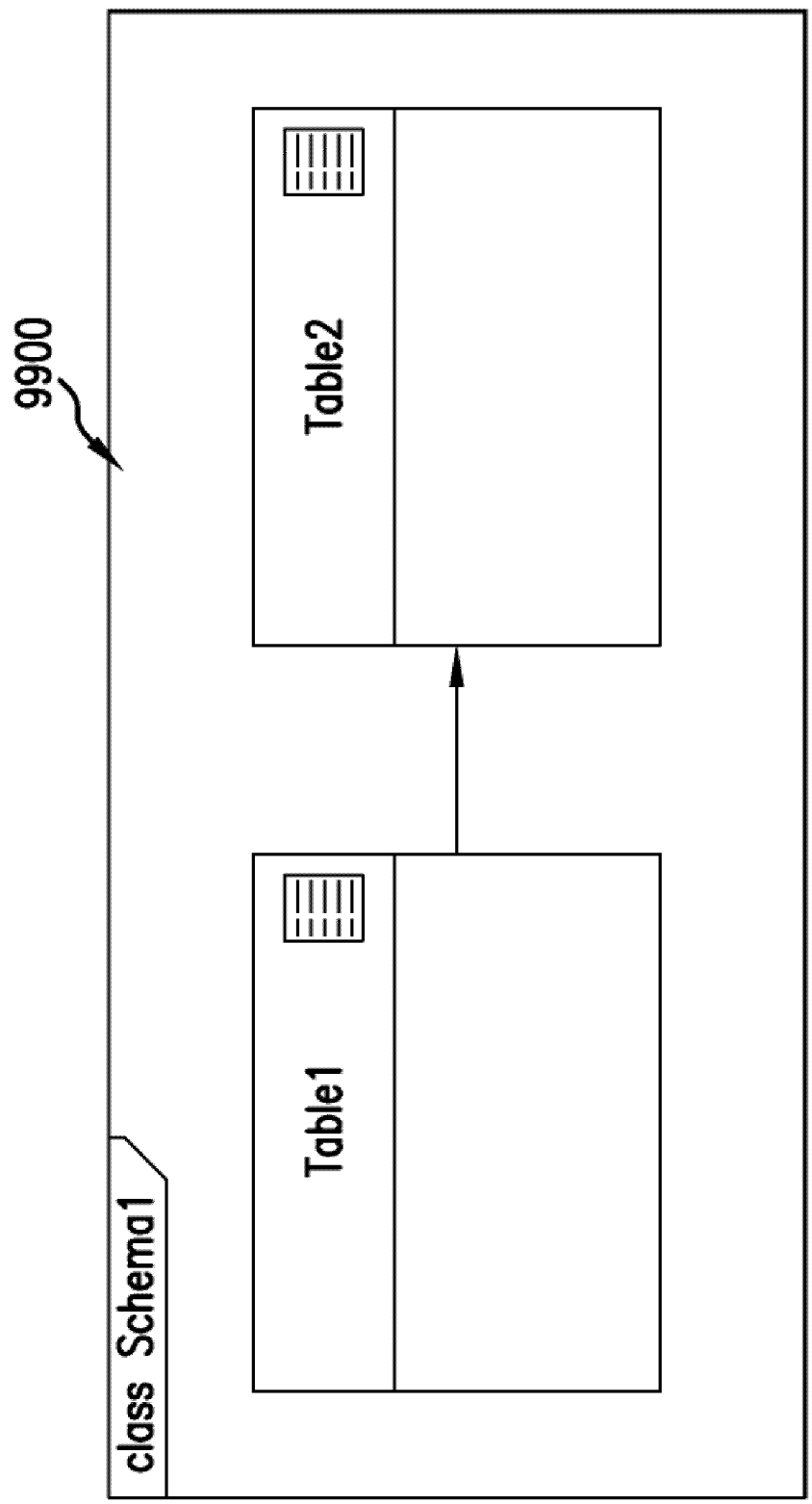
FIG. 99 is a schematic diagram showing a Schema Data Model, according to one illustrated embodiment.

FIG. 99 is a schematic diagram showing a Schema Data Model 9900, according to one illustrated embodiment.

Schema1—(Logical diagram)

TABLE 1

| Type: | Class | |
| --- | --- | --- |
| Package: | Schema1 | Keywords: |

TABLE 155

| Custom Properties |
| --- |
| isActive = False |

TABLE 156

| Connections | | | |
| --- | --- | --- | --- |
| Connector | Source | Target | Notes |
| Association Source –> Destination | Public Table1 | Public Table2 | |

TABLE 2

| Type: | Class | |
| --- | --- | --- |
| Package: | Schema1 | Keywords: |

TABLE 157

| Custom Properties |
|---|
| isActive = False |

TABLE 158

| Connections | | | |
|---|---|---|---|
| Connector | Source | Target | Notes |
| Association Source -> Destination | Public Table1 | Public Table2 | |

Figure 100:
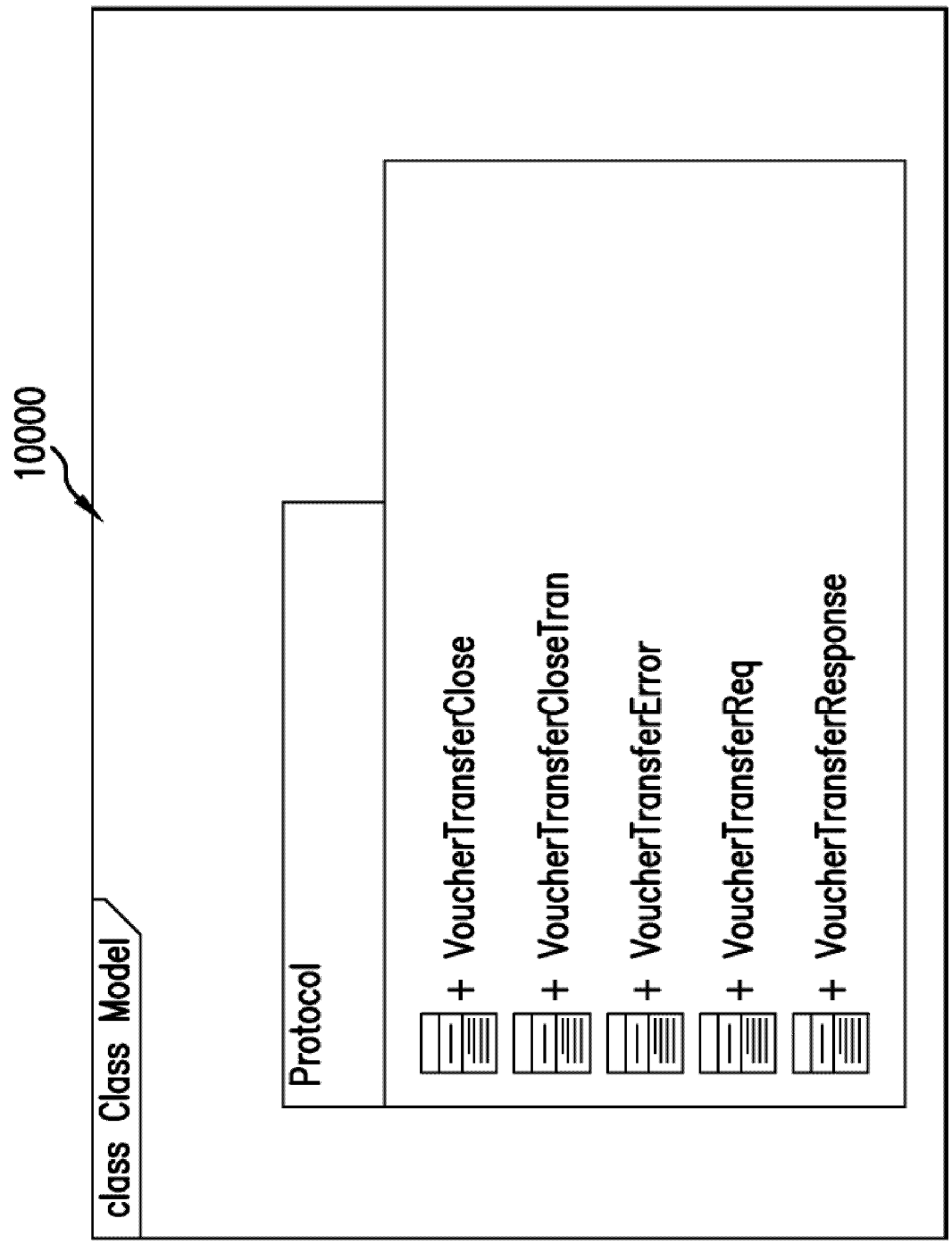
FIG. 100 is a schematic diagram showing a Voucher Class Model, according to one illustrated embodiment.
Figure 101:
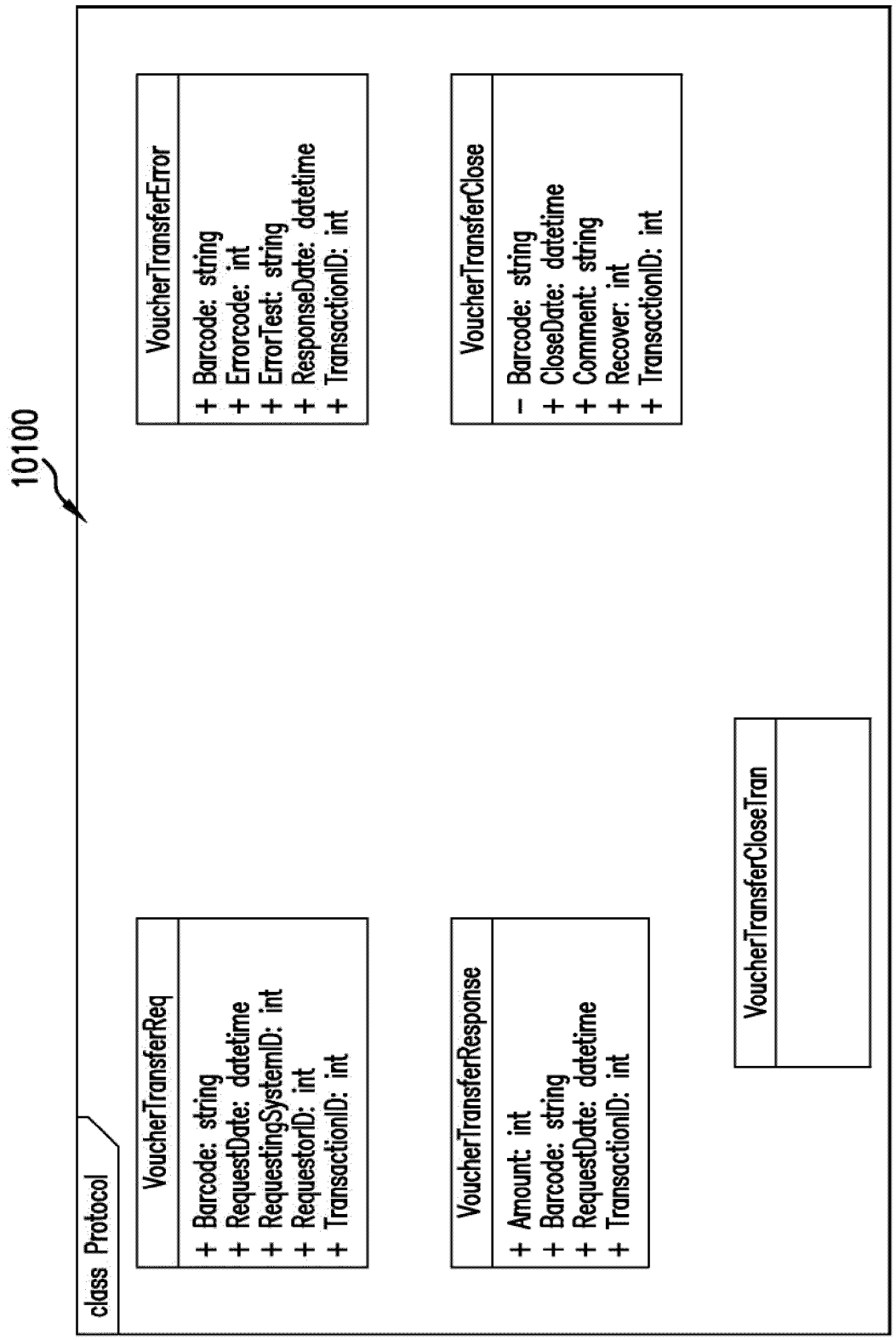
FIG. 101 is a schematic diagram showing a Protocol Class Model, according to one illustrated embodiment.
Figure 102:
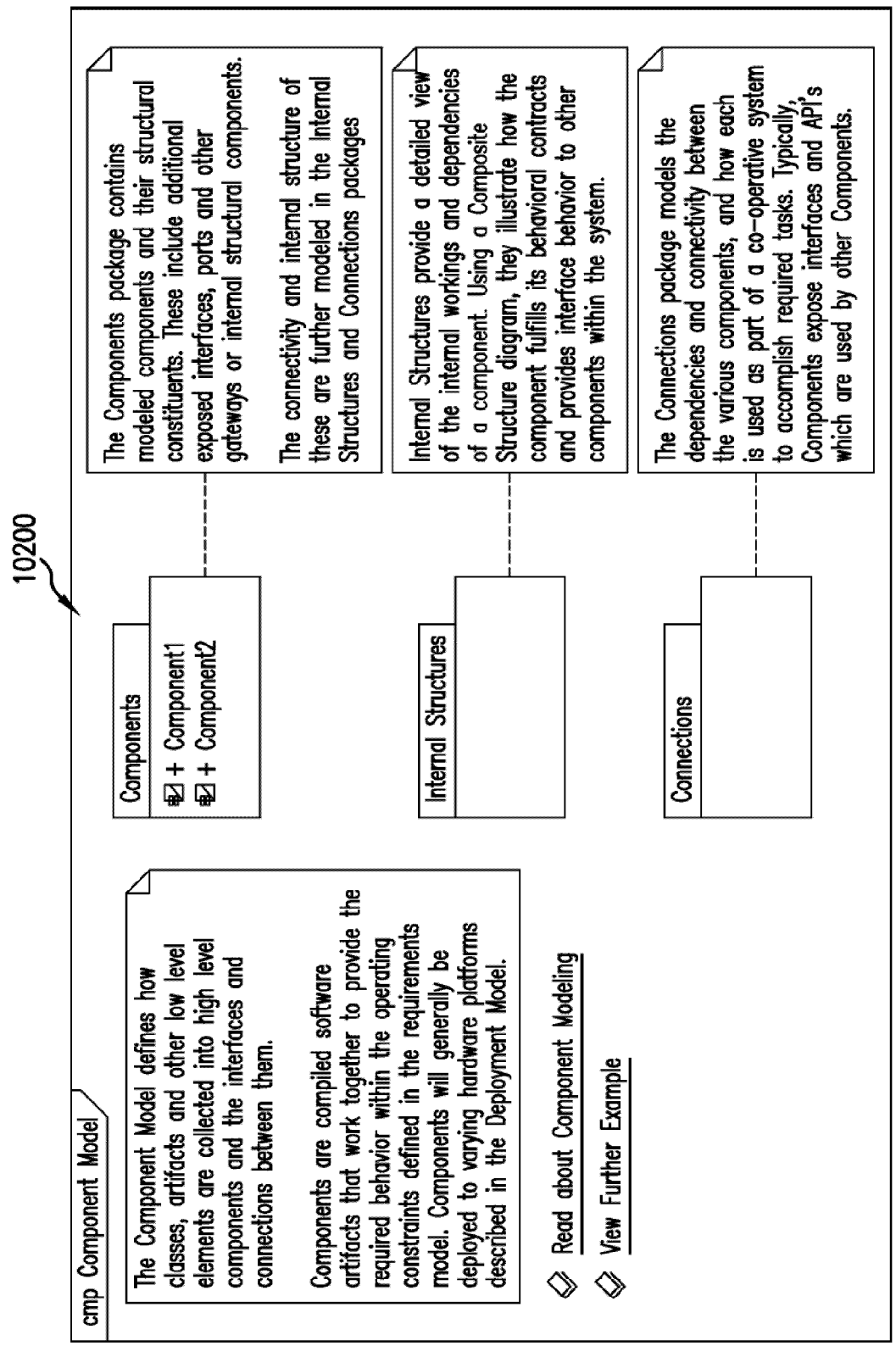
FIGS. 102 and 103 are schematic diagrams showing a CMS/SMS Component Model for a Voucher Interchange System, according to one illustrated embodiment.
Figure 103:
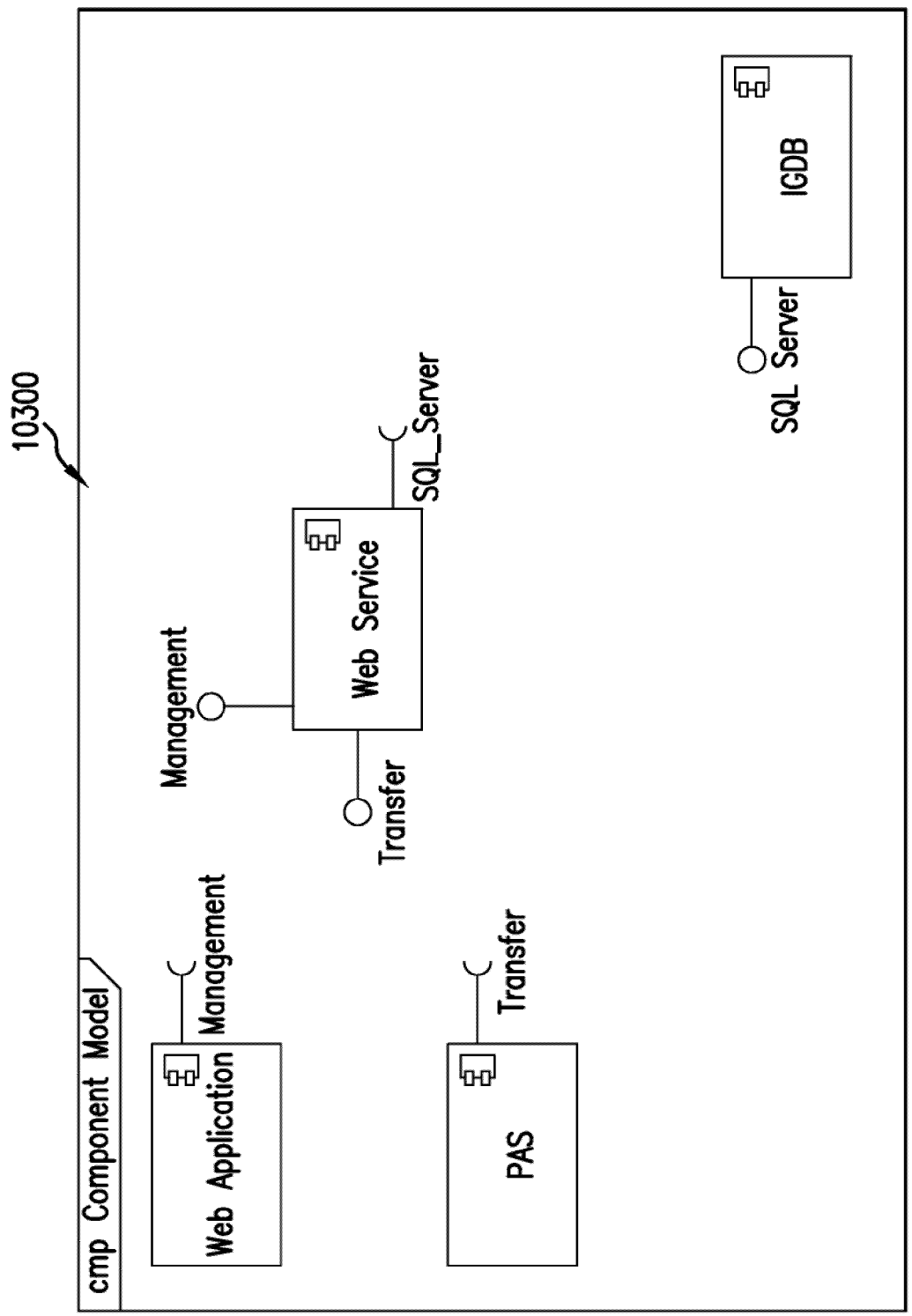

Class Model
Type: Package
Package: Symmetric Voucher Interchange System
FIG. 100 is a schematic diagram showing a Voucher Class Model 10000, according to one illustrated embodiment.
Class Model—(Logical diagram)
Protocol
Type: Package
Package: Class Model
FIG. 101 is a schematic diagram showing a Protocol Class Model 10100, according to one illustrated embodiment. Classes represented in the protocol. These are passed from application to application.
Protocol—(Logical diagram)
VoucherTransferClose
Type: Class
Package: Protocol Keywords:
The response to the Voucher Transfer Response to denote if the voucher was created in the new database or not.

TABLE 159

| Custom Properties |
|---|
| isActive = False |

TABLE 160

| Attributes | | |
|---|---|---|
| Attribute | Notes | Constraints and tags |
| Barcode string Private | Barcode of voucher being transferred. | Default: |
| CloseDate datetime Public | Time of message. | Default: |
| Comment string Public | Text to log about transaction. In particular this may hold an error text if the voucher could not be created. | Default: |
| Recover int Public | Flag to denote if the voucher should be marked as available in old system or paid. | Default: |
| TransactionID int Public | Original request ID | Default: |

VoucherTransferCloseTran
Type: Class
Package: Protocol Keywords:
Final message of transaction noting old system has dealt with voucher.

TABLE 161

| Custom Properties |
|---|
| isActive = False |

VoucherTransferError
Type: Class
Package: Protocol Keywords:
The class that is returned if the voucher transfer request can not be honored.

TABLE 162

| Custom Properties |
|---|
| isActive = False |

163

| Attributes | | |
|---|---|---|
| Attribute | Notes | Constraints and tags |
| Barcode string Public | Barcode of voucher. | Default: |
| ErrorCode int Public | The code of the error. | Default: |
| ErrorText string Public | The text of the error. | Default: |
| ResponseDate datetime Public | The date and time of the response. | Default: |
| TransactionID int Public | ID from original request. | Default: |

VoucherTransferReg
Type: Class
Package: Protocol Keywords:
The class passed to get a voucher transferred.

TABLE 164

| Custom Properties |
|---|
| isActive = False |

165

| Attributes | | |
|---|---|---|
| Attribute | Notes | Constraints and tags |
| Barcode string Public | The barcode of the voucher. Up to 32 digits. | Default: |
| RequestDate datetime Public | The time stamp of the server sending the request. | Default: |
| RequestingSystemID int Public | The system ID of the initiating system. | Default: |
| RequestorID int Public | The ID of the PAs or requesting device. | Default: |

165
Attributes

| Attribute | Notes | Constraints and tags |
|---|---|---|
| TransactionID int Public | Unique transaction ID. Not guaranteed to be sequential, but guaranteed unique. | Default: |

VoucherTransferResponse
Type: Class
Package: Protocol Keywords:
The response if the voucher can be transferred.

TABLE 166

| Custom Properties |
|---|
| isActive = False |

TABLE 167

Attributes

| Attribute | Notes | Constraints and tags |
|---|---|---|
| Amount int Public | The amount of the voucher in cents. | Default: |
| Barcode string Public | The barcode of the voucher. | Default: |
| ResponseDate datetime Public | The date of the response. | Default: |
| TransactionID int Public | The ID of the original request. | Default: |

Component Model
Type: Package
Package: Symmetric Voucher Interchange System

Figure 105:
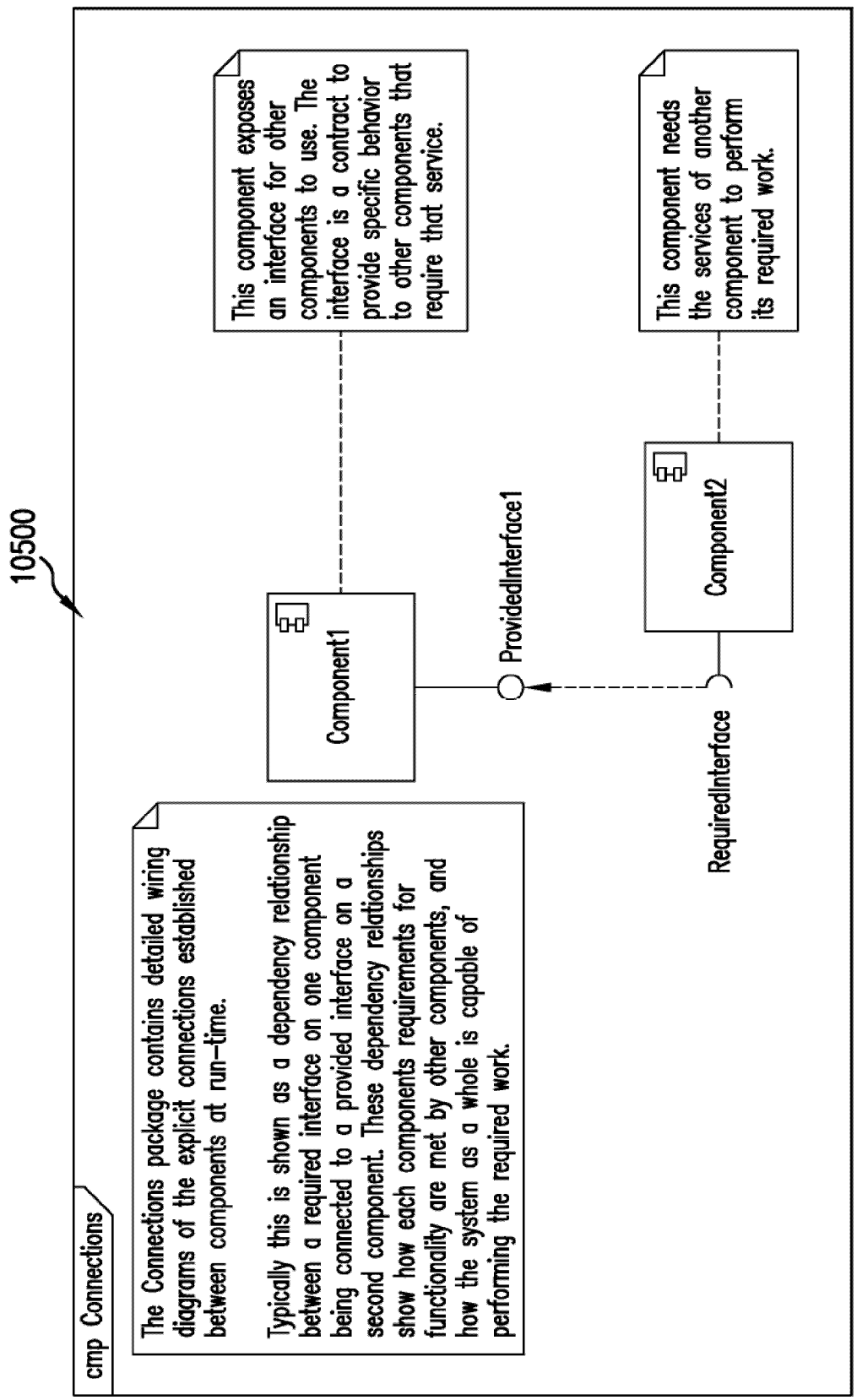
FIG. 105 is a schematic diagram showing a CMS/SMS (CMP) Components Connection Model, according to one illustrated embodiment.
Figure 106:
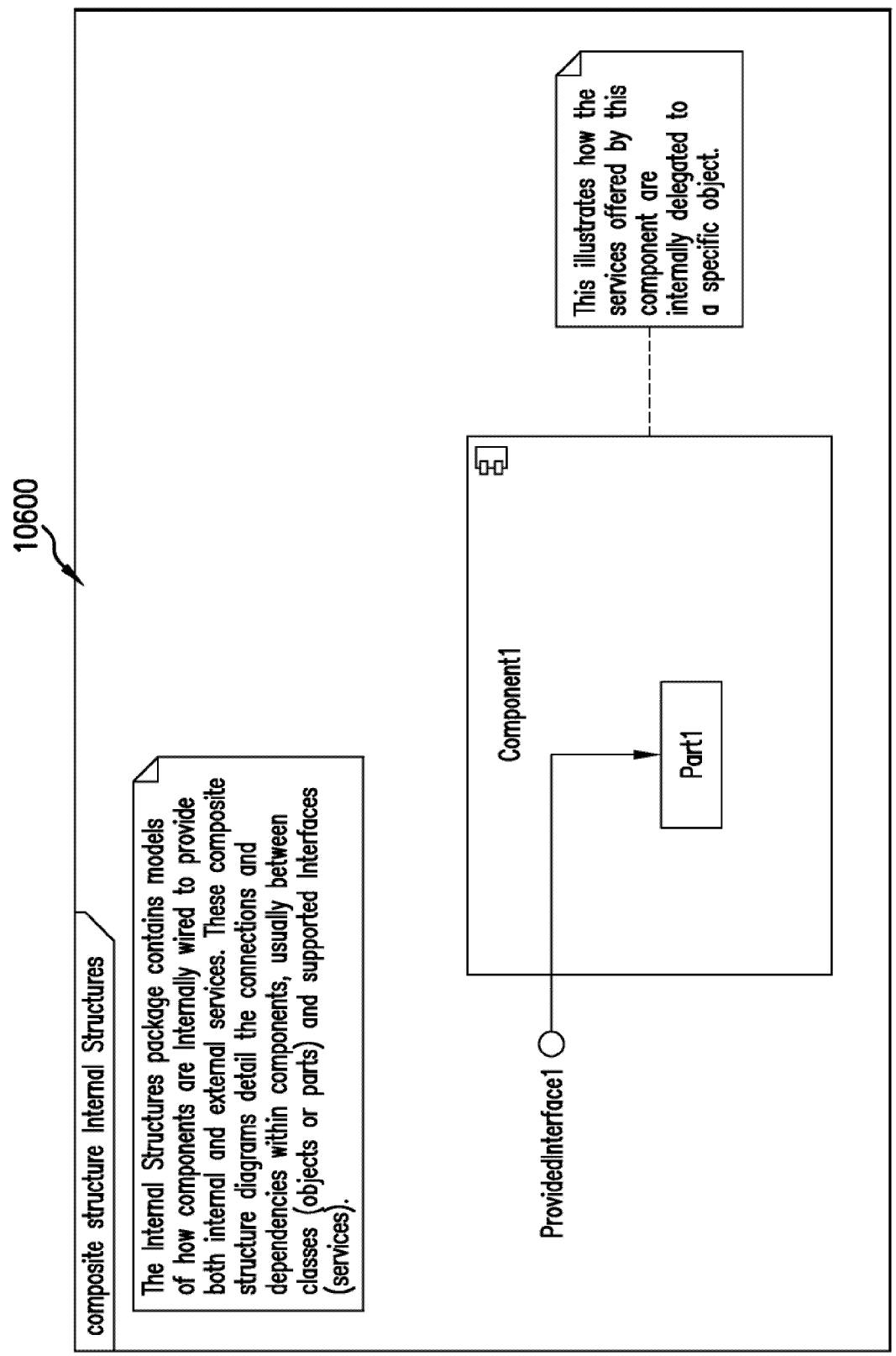
FIG. 106 is a schematic diagram showing a Internal Structures Composite Model, according to one illustrated embodiment.

FIGS. 105 and 106 are schematic diagrams showing a CMS/SMS Component Model 10200, 10300, respectively, for a Voucher Interchange System, according to one illustrated embodiment.

Component Model—(Component diagram)
Component Model—(Component diagram)
Interface1
Type: Interface
Package: Component Model Keywords:
Component1
Type: Component
Package: Component Model Keywords:

TABLE 168

| Custom Properties |
|---|
| isIndirectlyInstantiated = True |

IGDB
Type: Component
Package: Component Model Keywords:

TABLE 169

| Custom Properties |
|---|
| isIndirectlyInstantiated = True |

TABLE 170

Embedded Elements

| Element | Detail | Notes |
|---|---|---|
| Port SQLServer | Version: 1.0 | |
| ProvidedInterface SQL Server | Version: 1.0 | |

PAS
Type: Component
Package: Component Model Keywords:

TABLE 171

| Custom Properties |
|---|
| isIndirectlyInstantiated = True |

172
Embedded Elements

| Element | Detail | Notes |
|---|---|---|
| RequiredInterface Transfer | Version: 1.0 | |

Web Application
Type: Component
Package: Component Model Keywords:

TABLE 173

| Custom Properties |
|---|
| isIndirectlyInstantiated = True |

TABLE 174

Embedded Elements

| Element | Detail | Notes |
|---|---|---|
| RequiredInterface Management | Version: 1.0 | |

Web Service
Type: Component
Package: Component Model Keywords:

TABLE 175

| Custom Properties |
|---|
| isIndirectlyInstantiated = True |

TABLE 176

| Embedded Elements | | |
|---|---|---|
| Element | Detail | Notes |
| Port SqlClient | Version: 1.0 | |
| ProvidedInterface Management | Version: 1.0 | |
| ProvidedInterface Transfer | Version: 1.0 | |
| RequiredInterface SQLServer | Version: 1.0 | |

Components

Type: Package

Package: Component Model

Figure 104:
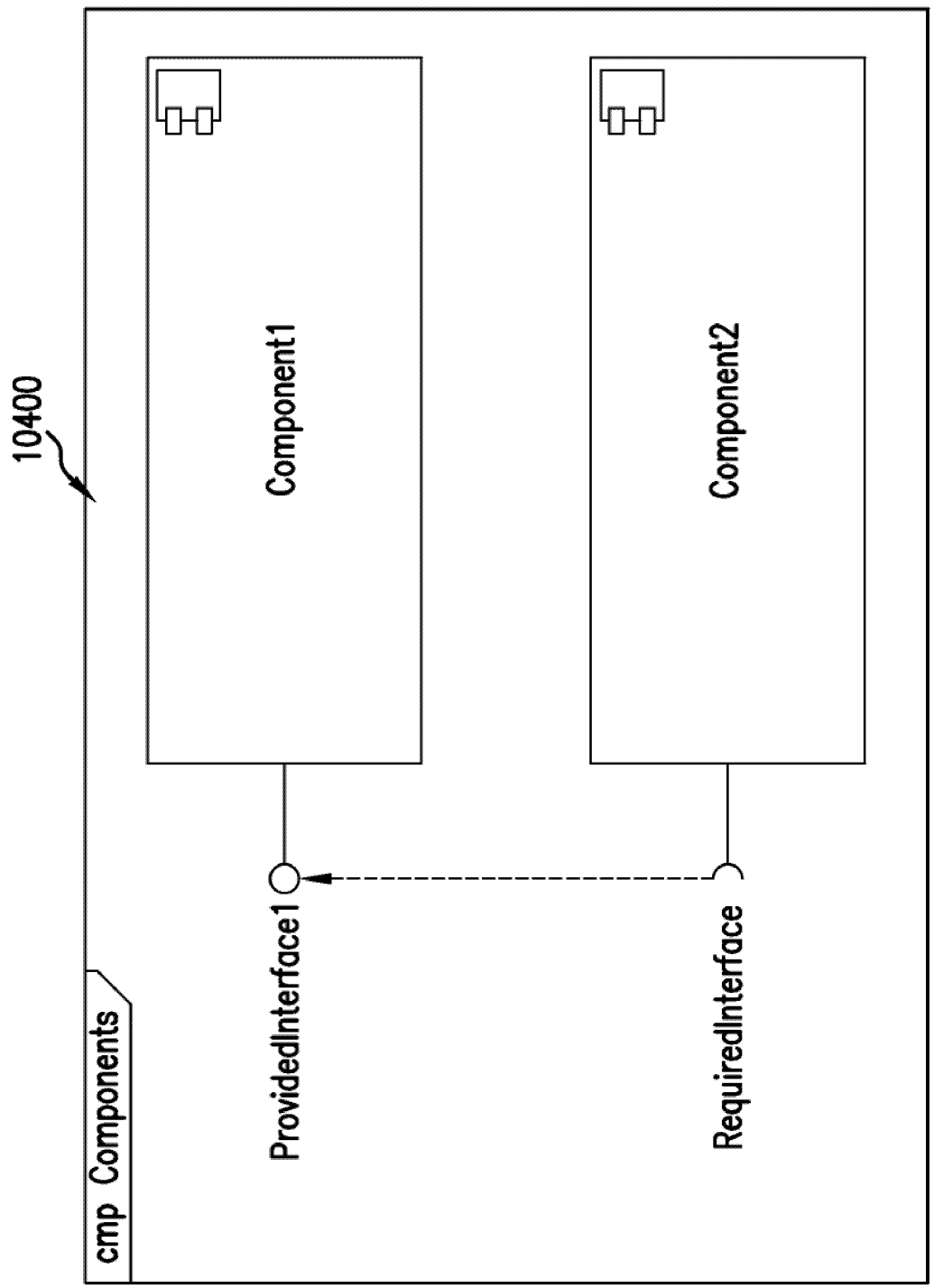
FIG. 104 is a schematic diagram showing a CMS/SMS Component Model, according to one illustrated embodiment.

FIG. 104 is a schematic diagram showing a CMS/SMS Component Model 10400, according to one illustrated embodiment.

Components—(Component diagram)

Component1

Type: Component

Package: Components Keywords:

TABLE 177

| Custom Properties |
|---|
| isIndirectlyInstantiated = True |

TABLE 178

| Connections | | | |
|---|---|---|---|
| Connector | Source | Target | Notes |
| NoteLink | Public Component1 | Public <anonymous> | |
| NoteLink | Public Component1 | Public <anonymous> | |

TABLE 179

| Embedded Elements | | |
|---|---|---|
| Element | Detail | Notes |
| ProvidedInterface ProvidedInterface1 | Version: 1.0 | |

Part1

Type: Part

Package: Components Keywords:

TABLE 180

| Custom Properties |
|---|
| isReference = False |

TABLE 181

| Connections | | | |
|---|---|---|---|
| Connector | Source | Target | Notes |
| Delegate Source -> Destination | Public ProvidedInterface 1 | Public Part1 | |

Component2

Type: Component

Package: Components Keywords:

TABLE 181

| Custom Properties |
|---|
| isIndirectlyInstantiated = True |

TABLE 182

| Connections | | | |
|---|---|---|---|
| Connector | Source | Target | Notes |
| NoteLink | Public Component2 | Public <anonymous> | |

TABLE 183

| Embedded Elements | | |
|---|---|---|
| Element | Detail | Notes |
| RequiredInterface RequiredInterface | Version: 1.0 | |

Connections

Type: Package

Package: Component Model

FIG. 105 is a schematic diagram showing a CMS/SMS (CMP) Components Connection Model 10500, according to one illustrated embodiment.

Connections—(Component diagram)

<Anonymous>

Type: Note

Package: Connections Keywords:

This component needs the services of another component to perform its required work.

TABLE 184

| Connections | | | |
|---|---|---|---|
| Connector | Source | Target | Notes |
| NoteLink | Public Component2 | Public <anonymous> | |

Internal Structures
Type: Package
Package: Component Model

FIG. 106 is a schematic diagram showing a Internal Structures Composite Model 10600, according to one illustrated embodiment.

Internal Structures—(CompositeStructure diagram)
<Anonymous>
Type: Note
Package: Internal Structures Keywords:

This illustrates how the services offered by this component are internally delegated to a specific object.

TABLE 185

| | Connections | | |
|---|---|---|---|
| Connector | Source | Target | Notes |
| NoteLink | Public Component1 | Public <anonymous> | |

Deployment Model
Type: Package
Package: Symmetric Voucher Interchange System

Figure 107:
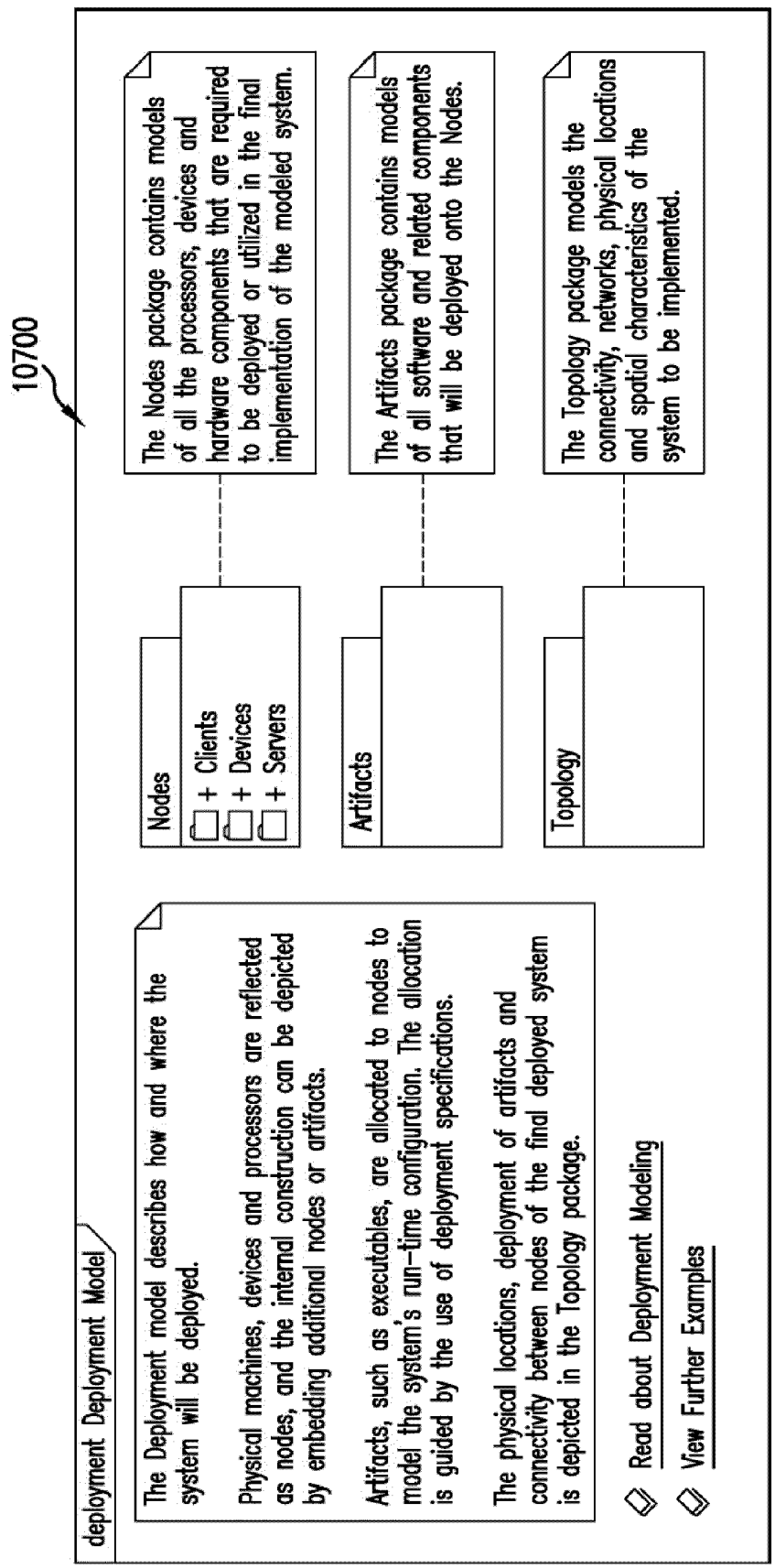
FIG. 107 is a schematic diagram showing a Deployment Model for a Voucher Interchange System, according to one illustrated embodiment.

FIG. 107 is a schematic diagram showing a Deployment Model 11000 for a Voucher Interchange System, according to one illustrated embodiment.

Deployment Model—(Deployment diagram)
<Anonymous>
Type: Note
Package: Deployment Model Keywords:

The Nodes package contains models of all the processors, devices and hardware components that are required to be deployed or utilized in the final implementation of the modelled system.

TABLE 186

| | Connections | | |
|---|---|---|---|
| Connector | Source | Target | Notes |
| NoteLink | Public Nodes | Public <anonymous> | |

Nodes
Type: Package
Package: Deployment Model
Nodes—(Deployment diagram)
Clients
Type: Package
Package: Nodes
Clients—(Deployment diagram)
Devices
Type: Package
Package: Nodes
Devices—(Deployment diagram)
Servers
Type: Package
Package: Nodes
Servers—(Deployment diagram)
Artifacts
Type: Package
Package: Deployment Model
Artifacts—(Deployment diagram)
Topology
Type: Package
Package: Deployment Model
Network—(Deployment diagram)

This application incorporates by reference the teachings of: U.S. Pat. No. 6,460,848; U.S. provisional patent application Ser. No. 60/200,368 filed Apr. 21, 1999; U.S. provisional patent application Ser. No. 60/259,658 filed Jan. 4, 2001; U.S. patent Publication No. US-2002-0086727; U.S. patent Publication No. US-2002-0165029; U.S. patent Publication No. US-2003-0173737; U.S. patent Publication No. US-2005-0146094; U.S. patent Publication No. US-2005-0206078; U.S. patent Publication No. US-2002-0198052; U.S. patent Publication No. US-2006-0121975; U.S. provisional patent application Ser. No. 60/300,253 filed Jun. 21, 2001; U.S. patent Publication No. US-2003-0220206; U.S. provisional patent application Ser. No. 60/354,730 filed Feb. 5, 2002; U.S. patent Publication No. US-2004-0005920; U.S. provisional patent application Ser. No. 60/406,246 filed Aug. 27, 2002; U.S. patent Publication No. US-2004-0207156; U.S. provisional patent application Ser. No. 60/463,978 filed Apr. 17, 2003; U.S. patent Publication No. US-2005-0207005; U.S. provisional patent application Ser. No. 60/500,898 filed Sep. 5, 2003; U.S. provisional patent application Ser. No. 60/501,489 filed Sep. 8, 2003; U.S. patent Publication No. US-2005-0121852; U.S. provisional patent application Ser. No. 60/511,931 filed Oct. 16, 2003; U.S. patent Publication No. US-2006-0019739; U.S. provisional patent application Ser. No. 60/562,796 filed Apr. 15, 2004; U.S. patent Publication No. US-2005-0102067; U.S. patent Publication No. US-2005-0258597; U.S. provisional patent application Ser. No. 60/562,772 filed Apr. 15, 2004; U.S. patent Publication No. US-2007-0057466; U.S. provisional patent application Ser. No. 60/716,538 filed Sep. 12, 2005; U.S. provisional patent application Ser. No. 60/802,921 filed May 23, 2006; U.S. nonprovisional patent application Ser. No. 11/838,148 filed Aug. 20, 2007 published as U.S. patent Publication No. US-2008-0076536; U.S. provisional patent application Ser. No. 60/847,331 filed Sep. 26, 2006; U.S. provisional patent application Ser. No. 60/887,092 filed Jan. 29, 2007; U.S. nonprovisional patent application Ser. No. 11/480,321 filed Jun. 30, 2006 published as U.S. patent Publication No. US-2007-0298868; U.S. provisional patent application Ser. No. 60/812,691 filed Jun. 8, 2006; U.S. nonprovisional patent application Ser. No. 11/479,988 filed Jun. 30, 2006 published as U.S. patent publication No. US-2007-0293303; U.S. provisional patent application Ser. No. 60/814,664 filed Jun. 16, 2006; U.S. nonprovisional patent application Ser. No. 11/480,274 filed Jun. 30, 2006 published as U.S. patent Publication No. US-2007-0243935; U.S. provisional patent application Ser. No. 60/792,097 filed Apr. 12, 2006; U.S. nonprovisional patent application Ser. No. 11/893,995 filed Aug. 17, 2007 published as U.S. patent Publication No. US-2008-0120781; U.S. provisional patent application Ser. No. 60/838,280 filed Aug. 17, 2006; U.S. nonprovisional patent application Ser. No. 11/938,231 filed Nov. 9, 2007; U.S. nonprovisional patent application Ser. No. 11/938,203 filed Nov. 9, 2007; U.S. provisional patent application Ser. No. 60/985,178, filed Nov. 2, 2007; U.S. nonprovisional patent application Ser. No. 11/938,150, filed Nov. 9, 2007; U.S. provisional patent application Ser. No. 60/865,345, filed Nov. 10, 2006; U.S. provisional patent application Ser. No. 60/865,575, filed Nov. 20, 2006; U.S. nonprovisional patent application Ser. No. 11/938,121, filed Nov. 9, 2007; U.S. provisional patent application Ser. No. 60/865,332, filed Nov. 10, 2006 U.S. provisional patent application Ser. No. 60/865,550, filed Nov. 20, 2006; and U.S. provisional patent application Ser. No. 61/055,597, filed May 24, 2008, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims that may be drawn to the various embodiments should not limited in scope by the specific implementations and examples disclosed.

The invention claimed is:

1. A computer-implemented method of operating a gaming related accounting system, the method comprising:
   at an at least one computer of an enterprise accounting system, receiving accounting related information from one of at least a table game management system, a slot management system, or a bingo management system at a first site;
   at the at least one computer of the enterprise accounting system, receiving accounting related information from another one of the table game management system, the slot management system, or the bingo management system at a second site remotely located from the first site;
   computationally consolidating the received accounting related information from the first and the second sites by the at least one computer of the enterprise accounting system;
   computationally processing the received accounting related information by the at least one computer of the enterprise accounting system;
   computationally identifying by the at least one computer of the enterprise accounting system at least one variance in the received accounting related information; and
   computationally correcting by the at least one computer of the enterprise accounting system the at least one identified variance in the accounting related information.

2. The method of claim 1, further comprising:
   displaying on the at least one computer of the enterprise accounting system at least a portion of a graphical user interface including a plurality of user selectable icons, at least one of the user selectable icons indicative of a wizard function; and
   displaying on the at least one computer of the enterprise accounting system a first set of user prompts in response to a selection of the user selectable icon indicative of the wizard function.

3. The method of claim 2 wherein
   computationally identifying by the at least one computer of the enterprise accounting system at least one variance in the received accounting related information is based at least in part on a first set of user inputs provided by a user in response to the first set of user prompts.

4. The method of claim 3 wherein
   computationally correcting by the at least one computer of the enterprise accounting system the at least one identified variance in the accounting related information is in response to a user input at the at least one computer of the enterprise accounting system indicative of a selection to fix the at least one identified variance.

5. The method of claim 1, further comprising:
   determining by the at least one computer of the enterprise accounting system whether a first set of the processed accounting related information is balanced;
   storing on the at least one computer of the enterprise accounting system the first set of the processed accounting related information in an audit database;
   later, storing on the at least one computer of the enterprise accounting system the first set of the processed accounting related information in an archive database, and
   deleting from the at least one computer of the enterprise accounting system the first set of the processed accounting related information from the audit database in response to the storing of the first set of the processed accounting related information to the archive database.

6. The method of claim 1, further comprising:
   computationally generating by the at least one computer of the enterprise accounting system at least a first report based on the processed accounting related information; and
   storing on the at least one computer of the enterprise accounting system at least the first report in a report database.

7. The method of claim 1 wherein receiving accounting related information from one of at least a table game management system, a slot management system, or a bingo management system includes receiving at least one of raw meter information, gaming event information, gaming voucher information, progressive gaming information, gaming system status information, cash information, jackpot information, electronic account transfer information or cashier information.

8. The method of claim 1 wherein receiving accounting related information from one of at least a table game management system, a slot management system, or a bingo management system includes receiving the accounting related information from a database associated with at least one gaming machine.

9. The method of claim 1, further comprising:
   displaying on the at least one computer of the enterprise accounting system at least a portion of a graphical user interface including a calendar having days that are color coded to indicate whether a respective day is at least one of open, closed or archived with respect to an accounting for each of the days.

10. The method of claim 9, further comprising:
    displaying on the at least one computer of the enterprise accounting system a graphical representation of variance in the accounting information of each of a number of days.

11. The method of claim 9, further comprising:
    in response to a user input at the at least one computer of the enterprise accounting system indicative of a selection to audit system financials, displaying on the at least one computer of the enterprise accounting system a status of each of a number of days showing at least some accounting-related variances, if any, for each of a plurality of casino floor areas.

12. The method of claim 1, further comprising:
    displaying on the at least one computer of the enterprise accounting system the at least one variance by amount.

13. The method of claim 1, further comprising:
    validating user access to the enterprise accounting system through security settings, the security settings restricting the user access to staff of the enterprise accounting system.

14. A gaming related enterprise accounting system, comprising:
    at least one enterprise accounting computing system communicatively coupled to receive accounting related information from at least two of a table game management system, a slot management system, a bingo management system, progressive gaming management system, jackpot management system, a voucher management system, the at least two systems from respective at least two sites located remotely from each other, the enterprise accounting computing system comprising at least one processor and at least one processor-readable storage medium that stores instructions that cause the at least one processor to process gaming related information, by:

computationally processing the received accounting related information from the at least two of the table game management system, the slot management system, the bingo management system, progressive gaming management system, jackpot management system, or the voucher management system;

computationally identifying at least one variance in the received accounting related information; and computationally correcting the at least one identified variance in the accounting related information.

15. The gaming related enterprise accounting system of claim 14 wherein the at least one processor-readable storage medium stores instructions that cause the at least one processor to process gaming related information, further by:

displaying at least a portion of a graphical user interface including a plurality of user selectable icons, at least one of the user selectable icons indicative of a wizard function; and displaying a first set of user prompts in response to a selection of the at least one of the user selectable icons indicative of the wizard function.

16. The gaming related enterprise accounting system of claim 15 wherein the at least one processor-readable storage medium stores instructions that cause the at least one processor to process gaming related information, wherein computationally identifying at least one variance in the received accounting related information is based at least in part on a first set of user inputs provided by a user in response to the first set of user prompts.

17. The gaming related enterprise accounting system of claim 16 wherein the at least one processor-readable storage medium stores instructions that cause the at least one processor to process gaming related information, wherein computationally correcting the at least one identified variance in the accounting related information is in response to a user input indicative of a selection to fix the at least one identified variance.

18. The gaming related enterprise accounting system of claim 14 wherein the at least one processor-readable storage medium stores instructions that cause the at least one processor to process gaming related information, further by:

displaying on the at least one computer of the enterprise accounting system the at least one variance by amount.

19. The gaming related enterprise accounting system of claim 14 wherein the at least one processor-readable storage medium stores instructions that cause the at least one processor to process gaming related information, further by:

validating user access to the enterprise accounting system through security settings, the security settings restricting the user access to staff of the enterprise accounting system.

20. A computer-implemented method of processing gaming related transactions in a gaming related accounting system, the method comprising:

receiving at an at least one computer of the gaming related accounting system a first voucher for redemption at a first gaming site, the first voucher printed at a second gaming site that is remote from the first gaming site;

computationally evaluating by the at least one computer of the gaming related accounting system characteristics of the first voucher comprising:

confirming that a paid state of the first voucher is identified as unpaid in a voucher database, confirming that an expiration date of the first voucher has not expired as identified in the voucher database, verifying an amount value of the first voucher against an amount value in the voucher database, confirming that an issue date of the first voucher is not after a current date, confirming that a unique identifier read from the first voucher matches a unique identifier as identified in the voucher database, and confirming that a voucher issuing device identifier that uniquely identifies a voucher issuing device is a known voucher issuing device; and determining by the at least one computer of the gaming related accounting system whether to authorize redemption of the first voucher based at least in part on the evaluation of the characteristics of the first voucher.

* * * * *